(12) United States Patent
Hoffberg

(10) Patent No.: US 8,874,477 B2
(45) Date of Patent: Oct. 28, 2014

(54) MULTIFACTORIAL OPTIMIZATION SYSTEM AND METHOD

(76) Inventor: Steven Mark Hoffberg, West Harrison, NY (US)

( * ) Notice: Subject to any disclaimer, the term of this patent is extended or adjusted under 35 U.S.C. 154(b) by 2050 days.

(21) Appl. No.: 11/467,931

(22) Filed: Aug. 29, 2006

(65) Prior Publication Data

US 2007/0087756 A1 Apr. 19, 2007

Related U.S. Application Data

(60) Provisional application No. 60/723,339, filed on Oct. 4, 2005.

(51) Int. Cl.
| | |
|---|---|
| *G06Q 40/00* | (2012.01) |
| *G06F 9/50* | (2006.01) |
| *G06Q 50/18* | (2012.01) |
| *G06Q 10/10* | (2012.01) |
| *G06Q 40/04* | (2012.01) |
| *G06Q 30/02* | (2012.01) |
| *G06Q 10/06* | (2012.01) |
| *G06Q 30/08* | (2012.01) |
| *G06Q 20/22* | (2012.01) |
| *H04W 84/18* | (2009.01) |

(52) U.S. Cl.
CPC .............. *G06Q 40/00* (2013.01); *G06Q 50/188* (2013.01); *G06Q 10/103* (2013.01); *G06Q 40/04* (2013.01); *G06Q 30/0201* (2013.01); *G06Q 10/0635* (2013.01); *H04W 84/18* (2013.01); *G06Q 30/08* (2013.01); *G06Q 20/22* (2013.01); *G06Q 10/06375* (2013.01); *G06Q 10/0631* (2013.01)
USPC ........................................... 705/37; 718/104

(58) Field of Classification Search
CPC .................................. G06Q 40/06; G06F 9/46
USPC ....................... 705/35; 455/450, 451; 718/104
See application file for complete search history.

(56) References Cited

U.S. PATENT DOCUMENTS

| 3,573,747 | A | 4/1971 | Adams et al. |
| 3,581,072 | A | 5/1971 | Nymeyer |

(Continued)

FOREIGN PATENT DOCUMENTS

| AU | 1997036815 | 10/1997 |
| AU | 1997036816 | 10/1997 |

(Continued)

OTHER PUBLICATIONS

Buttyan, Levente and Hubaux, Jean-Pierre, "Nuglets: a Virtual Currency to Stimulate Cooperation in Self-Organized Mobile Ad Hoc Networks", Jan. 18, 2001.*

(Continued)

*Primary Examiner* — Eric T Wong
(74) *Attorney, Agent, or Firm* — Steven M. Hoffberg; Ostrolenk Faber LLP

(57) ABSTRACT

A method for providing unequal allocation of rights among agents while operating according to fair principles, comprising assigning a hierarchal rank to each agent; providing a synthetic economic value to a first set of agents at the a high level of the hierarchy; allocating portions of the synthetic economic value by the first set of agents to a second set of agents at respectively different hierarchal rank than the first set of agents; and conducting an auction amongst agents using the synthetic economic value as the currency. A method for allocation among agents, comprising assigning a wealth generation function for generating future wealth to each of a plurality of agents, communicating subjective market information between agents, and transferring wealth generated by the secure wealth generation function between agents in consideration of a market transaction. The method may further comprise the step of transferring at least a portion of the wealth generation function between agents.

64 Claims, 6 Drawing Sheets

(56) References Cited

U.S. PATENT DOCUMENTS

| | | |
|---|---|---|
| 4,486,853 A | 12/1984 | Parsons |
| 4,672,572 A | 6/1987 | Alsberg |
| 4,789,928 A | 12/1988 | Fujisaki |
| 4,789,929 A | 12/1988 | Nishimura et al. |
| 4,799,156 A | 1/1989 | Shavit et al. |
| 4,823,264 A | 4/1989 | Deming |
| 4,827,508 A | 5/1989 | Shear |
| 4,881,178 A | 11/1989 | Holland et al. |
| 4,887,818 A | 12/1989 | Escott |
| 4,903,201 A | 2/1990 | Wagner |
| 4,930,073 A | 5/1990 | Cina, Jr. |
| 5,016,170 A | 5/1991 | Pollalis et al. |
| 5,070,453 A | 12/1991 | Duffany |
| 5,077,665 A | 12/1991 | Silverman et al. |
| 5,103,476 A | 4/1992 | Waite et al. |
| 5,111,390 A | 5/1992 | Ketcham |
| 5,136,501 A | 8/1992 | Silverman et al. |
| 5,224,163 A | 6/1993 | Gasser et al. |
| 5,235,680 A | 8/1993 | Bijnagte |
| 5,253,165 A | 10/1993 | Leiseca et al. |
| 5,270,921 A | 12/1993 | Hornick |
| 5,275,400 A | 1/1994 | Weingardt et al. |
| 5,283,731 A | 2/1994 | Lalonde et al. |
| 5,319,705 A | 6/1994 | Halter et al. |
| 5,343,527 A | 8/1994 | Moore |
| 5,347,452 A | 9/1994 | Bay, Jr. |
| 5,377,095 A | 12/1994 | Maeda et al. |
| 5,390,330 A | 2/1995 | Talati |
| 5,394,324 A | 2/1995 | Clearwater |
| 5,459,761 A | 10/1995 | Monica et al. |
| 5,491,800 A | 2/1996 | Goldsmith et al. |
| 5,530,235 A | 6/1996 | Stefik et al. |
| 5,534,975 A | 7/1996 | Stefik et al. |
| 5,573,244 A | 11/1996 | Mindes |
| 5,615,109 A | 3/1997 | Eder |
| 5,629,980 A | 5/1997 | Stefik et al. |
| 5,634,012 A | 5/1997 | Stefik et al. |
| 5,634,055 A | 5/1997 | Barnewall et al. |
| 5,638,443 A | 6/1997 | Stefik et al. |
| 5,640,546 A | 6/1997 | Gopinath et al. |
| 5,640,569 A | 6/1997 | Miller et al. |
| 5,664,115 A | 9/1997 | Fraser |
| 5,672,106 A | 9/1997 | Orford et al. |
| 5,689,652 A | 11/1997 | Lupien et al. |
| 5,692,047 A | 11/1997 | McManis |
| 5,715,403 A | 2/1998 | Stefik |
| 5,724,488 A | 3/1998 | Prezioso |
| 5,727,165 A | 3/1998 | Ordish et al. |
| 5,745,678 A | 4/1998 | Herzberg et al. |
| 5,748,960 A | 5/1998 | Fischer |
| 5,749,785 A | 5/1998 | Rossides |
| 5,757,914 A | 5/1998 | McManis |
| 5,758,328 A | 5/1998 | Giovannoli |
| 5,778,367 A | 7/1998 | Wesinger, Jr. et al. |
| 5,794,207 A | 8/1998 | Walker et al. |
| 5,797,127 A | 8/1998 | Walker et al. |
| 5,806,048 A | 9/1998 | Kiron et al. |
| 5,809,144 A | 9/1998 | Sirbu et al. |
| 5,819,237 A | 10/1998 | Garman |
| 5,826,244 A | 10/1998 | Huberman |
| 5,831,545 A | 11/1998 | Murray et al. |
| 5,835,896 A | 11/1998 | Fisher et al. |
| 5,839,114 A | 11/1998 | Lynch et al. |
| 5,845,211 A | 12/1998 | Roach, Jr. |
| 5,845,266 A | 12/1998 | Lupien et al. |
| 5,873,068 A | 2/1999 | Beaumont et al. |
| 5,873,071 A | 2/1999 | Ferstenberg et al. |
| 5,873,782 A | 2/1999 | Hall |
| 5,884,272 A | 3/1999 | Walker et al. |
| 5,889,799 A | 3/1999 | Grossman et al. |
| 5,890,138 A | 3/1999 | Godin et al. |
| 5,892,900 A | 4/1999 | Ginter et al. |
| 5,897,620 A | 4/1999 | Walker et al. |
| 5,905,975 A | 5/1999 | Ausubel |
| 5,910,987 A | 6/1999 | Ginter et al. |
| 5,911,136 A | 6/1999 | Atkins |
| 5,915,019 A | 6/1999 | Ginter et al. |
| 5,915,209 A | 6/1999 | Lawrence |
| 5,920,861 A | 7/1999 | Hall et al. |
| 5,924,082 A | 7/1999 | Silverman et al. |
| 5,924,083 A | 7/1999 | Silverman et al. |
| 5,926,796 A | 7/1999 | Walker et al. |
| 5,940,504 A | 8/1999 | Griswold |
| 5,941,947 A | 8/1999 | Brown et al. |
| 5,943,422 A | 8/1999 | Van Wie et al. |
| 5,948,040 A | 9/1999 | DeLorme et al. |
| 5,953,319 A | 9/1999 | Dutta et al. |
| 5,970,479 A | 10/1999 | Shepherd |
| 5,983,205 A | 11/1999 | Brams et al. |
| 6,012,045 A | 1/2000 | Barzilai et al. |
| 6,014,627 A | 1/2000 | Togher et al. |
| 6,014,643 A | 1/2000 | Minton |
| 6,021,397 A | 2/2000 | Jones et al. |
| 6,021,398 A | 2/2000 | Ausubel |
| 6,023,685 A | 2/2000 | Brett et al. |
| 6,023,686 A | 2/2000 | Brown |
| 6,026,383 A | 2/2000 | Ausubel |
| 6,044,363 A | 3/2000 | Mori et al. |
| 6,047,264 A | 4/2000 | Fisher et al. |
| 6,047,274 A | 4/2000 | Johnson et al. |
| 6,055,518 A | 4/2000 | Franklin et al. |
| 6,058,379 A | 5/2000 | Odom et al. |
| 6,085,175 A | 7/2000 | Gugel et al. |
| 6,098,051 A | 8/2000 | Lupien et al. |
| 6,112,181 A | 8/2000 | Shear et al. |
| 6,131,087 A | 10/2000 | Luke et al. |
| 6,134,536 A | 10/2000 | Shepherd |
| 6,141,423 A | 10/2000 | Fischer |
| 6,151,309 A | 11/2000 | Busuioc et al. |
| 6,151,589 A | 11/2000 | Aggarwal et al. |
| 6,157,721 A | 12/2000 | Shear et al. |
| 6,161,099 A | 12/2000 | Harrington et al. |
| 6,163,701 A | 12/2000 | Saleh et al. |
| 6,167,386 A | 12/2000 | Brown |
| 6,169,789 B1 | 1/2001 | Rao et al. |
| 6,175,831 B1 | 1/2001 | Weinreich et al. |
| 6,185,683 B1 | 2/2001 | Ginter et al. |
| 6,199,050 B1 | 3/2001 | Alaia et al. |
| 6,226,618 B1 | 5/2001 | Downs et al. |
| 6,230,146 B1 | 5/2001 | Alaia et al. |
| 6,236,977 B1 | 5/2001 | Verba et al. |
| 6,240,411 B1 | 5/2001 | Thearling |
| 6,243,691 B1 | 6/2001 | Fisher et al. |
| 6,249,873 B1 | 6/2001 | Richard et al. |
| 6,260,024 B1 | 7/2001 | Shkedy |
| 6,263,334 B1 | 7/2001 | Fayyad et al. |
| 6,266,652 B1 | 7/2001 | Godin et al. |
| 6,272,473 B1 | 8/2001 | Sandholm |
| 6,272,474 B1 | 8/2001 | Garcia |
| 6,321,212 B1 | 11/2001 | Lange |
| 6,324,519 B1 | 11/2001 | Eldering |
| 6,330,551 B1 | 12/2001 | Burchetta et al. |
| 6,331,986 B1 | 12/2001 | Mitra et al. |
| 6,360,222 B1 | 3/2002 | Quinn |
| 6,366,907 B1 | 4/2002 | Fanning et al. |
| 6,377,809 B1 | 4/2002 | Rezaiifar et al. |
| 6,393,276 B1 | 5/2002 | Vanghi |
| 6,398,245 B1 | 6/2002 | Gruse et al. |
| 6,415,151 B1 | 7/2002 | Kreppel |
| 6,430,537 B1 | 8/2002 | Tedesco et al. |
| 6,443,841 B1 | 9/2002 | Rossides |
| 6,449,612 B1 | 9/2002 | Bradley et al. |
| 6,459,881 B1 | 10/2002 | Hoder et al. |
| 6,466,977 B1 | 10/2002 | Sitaraman et al. |
| 6,480,587 B1 | 11/2002 | Rao et al. |
| 6,487,541 B1 | 11/2002 | Aggarwal et al. |
| 6,499,018 B1 | 12/2002 | Alaia et al. |
| 6,501,765 B1 | 12/2002 | Lu et al. |
| 6,522,946 B1 | 2/2003 | Weis |
| 6,530,537 B2 | 3/2003 | Hanlon |
| 6,542,742 B2 | 4/2003 | Schramm et al. |
| 6,556,951 B1 | 4/2003 | Deleo et al. |
| 6,560,580 B1 | 5/2003 | Fraser et al. |
| 6,564,192 B1 | 5/2003 | Kinney, Jr. et al. |

(56) References Cited

U.S. PATENT DOCUMENTS

| | | |
|---|---|---|
| 6,587,837 B1 | 7/2003 | Spagna et al. |
| 6,591,232 B1 | 7/2003 | Kassapoglou |
| 6,601,036 B1 | 7/2003 | Walker et al. |
| 6,606,607 B1 | 8/2003 | Martin et al. |
| 6,609,112 B1 | 8/2003 | Boarman et al. |
| 6,611,812 B2 | 8/2003 | Hurtado et al. |
| 6,629,082 B1 | 9/2003 | Hambrecht et al. |
| 6,639,898 B1 | 10/2003 | Dutta et al. |
| 6,647,373 B1 | 11/2003 | Carlton-Foss |
| 6,658,467 B1 | 12/2003 | Rice et al. |
| 6,661,379 B2 | 12/2003 | Stilp et al. |
| 6,662,141 B2 | 12/2003 | Kaub |
| 6,678,245 B1 | 1/2004 | Cooper et al. |
| 6,684,250 B2 | 1/2004 | Anderson et al. |
| 6,704,713 B1 | 3/2004 | Brett |
| 6,712,701 B1 | 3/2004 | Boylan, III et al. |
| 6,718,312 B1 | 4/2004 | McAfee et al. |
| 6,754,169 B2 | 6/2004 | Baum et al. |
| 6,766,307 B1 | 7/2004 | Israel et al. |
| 6,785,671 B1 | 8/2004 | Bailey et al. |
| 6,799,165 B1 | 9/2004 | Boesjes |
| 6,834,110 B1 | 12/2004 | Marconcini et al. |
| 6,834,272 B1 | 12/2004 | Naor et al. |
| 6,842,463 B1 | 1/2005 | Drwiega et al. |
| 6,847,939 B1 | 1/2005 | Shemesh |
| 6,865,559 B2 | 3/2005 | Dutta |
| 6,876,309 B1 | 4/2005 | Lawrence |
| 6,926,796 B1 | 8/2005 | Nishida et al. |
| 6,934,249 B1 | 8/2005 | Bertin et al. |
| 6,954,731 B1 | 10/2005 | Montague |
| 6,956,835 B2 | 10/2005 | Tong et al. |
| 6,959,288 B1 | 10/2005 | Medina et al. |
| 6,968,323 B1 | 11/2005 | Bansal et al. |
| 6,974,412 B2 | 12/2005 | Dobrovolny |
| 6,978,126 B1 | 12/2005 | Blaker et al. |
| 7,003,485 B1 | 2/2006 | Young |
| 7,039,598 B2 | 5/2006 | Tobin et al. |
| 7,043,245 B2 | 5/2006 | Dokko |
| 7,047,242 B1 | 5/2006 | Ponte |
| 7,062,461 B1 | 6/2006 | Ausubel |
| 7,069,308 B2 | 6/2006 | Abrams |
| 7,076,553 B2 | 7/2006 | Chan et al. |
| 7,085,682 B1 | 8/2006 | Heller et al. |
| 7,096,197 B2 | 8/2006 | Messmer et al. |
| 7,099,839 B2 | 8/2006 | Madoff et al. |
| 7,103,565 B1 | 9/2006 | Vaid |
| 7,130,579 B1 | 10/2006 | Rael et al. |
| 7,133,841 B1 | 11/2006 | Wurman et al. |
| 7,142,523 B1 | 11/2006 | Chekuri et al. |
| 7,165,046 B2 | 1/2007 | Ausubel |
| 7,184,777 B2 | 2/2007 | Diener et al. |
| 7,200,571 B1 | 4/2007 | Jenniges et al. |
| 7,246,164 B2 | 7/2007 | Lehmann et al. |
| 7,249,027 B1 | 7/2007 | Ausubel |
| 7,249,085 B1 | 7/2007 | Kinney, Jr. et al. |
| 7,251,589 B1 | 7/2007 | Crowe et al. |
| 7,287,007 B1 | 10/2007 | Detering |
| 7,319,973 B1 | 1/2008 | Tobin et al. |
| 7,330,826 B1 | 2/2008 | Porat et al. |
| 7,337,139 B1 | 2/2008 | Ausubel |
| 7,343,342 B2 | 3/2008 | Ausubel |
| 7,349,827 B1 | 3/2008 | Heller et al. |
| 7,415,436 B1 | 8/2008 | Evelyn et al. |
| 7,457,823 B2 | 11/2008 | Shraim et al. |
| 7,460,065 B2 | 12/2008 | Ogawa et al. |
| 7,464,057 B2 | 12/2008 | Cole et al. |
| 7,516,089 B1 | 4/2009 | Walker et al. |
| 7,523,085 B2 | 4/2009 | Nigam et al. |
| 7,559,070 B2 | 7/2009 | Nakamura et al. |
| 7,596,552 B2 | 9/2009 | Levy et al. |
| 7,600,017 B2 | 10/2009 | Holtzman et al. |
| 7,627,510 B2 | 12/2009 | Jain et al. |
| 7,660,783 B2 | 2/2010 | Reed |
| 7,676,423 B2 | 3/2010 | Avery |
| 7,693,939 B2 | 4/2010 | Wu et al. |
| 7,698,335 B1 | 4/2010 | Vronay |
| 7,707,118 B2 | 4/2010 | James |
| 7,711,808 B2 | 5/2010 | Parry |
| 7,725,414 B2 | 5/2010 | Nigam et al. |
| 7,729,975 B2 | 6/2010 | Ausubel et al. |
| 7,730,120 B2 | 6/2010 | Singh et al. |
| 7,739,335 B2 | 6/2010 | Siegel et al. |
| 7,742,972 B2 | 6/2010 | Lange et al. |
| 7,743,163 B2 | 6/2010 | Ruppert |
| 7,751,423 B2 | 7/2010 | Hottinen et al. |
| 7,752,064 B2 | 7/2010 | Kauffman |
| 7,774,264 B1 | 8/2010 | Ausubel |
| 7,797,732 B2 | 9/2010 | Tam et al. |
| 7,801,802 B2 | 9/2010 | Walker et al. |
| 7,808,922 B2 | 10/2010 | Dekorsy |
| 7,827,128 B1 | 11/2010 | Karlsson et al. |
| 7,843,822 B1 | 11/2010 | Paul et al. |
| 7,844,535 B2 | 11/2010 | Guler et al. |
| 7,890,581 B2 | 2/2011 | Rao et al. |
| 7,933,829 B2 | 4/2011 | Goldberg et al. |
| 7,962,346 B2 | 6/2011 | Faltings |
| 2001/0027431 A1 | 10/2001 | Rupp et al. |
| 2001/0032164 A1 | 10/2001 | Kim |
| 2001/0039528 A1 | 11/2001 | Atkinson et al. |
| 2001/0042785 A1 | 11/2001 | Walker et al. |
| 2001/0047291 A1 | 11/2001 | Garahi et al. |
| 2001/0049650 A1 | 12/2001 | Moshal et al. |
| 2001/0051540 A1 | 12/2001 | Hindman et al. |
| 2002/0010669 A1 | 1/2002 | Street |
| 2002/0010673 A1 | 1/2002 | Muller et al. |
| 2002/0013631 A1 | 1/2002 | Parunak et al. |
| 2002/0013757 A1 | 1/2002 | Bykowsky et al. |
| 2002/0035534 A1 | 3/2002 | Buist et al. |
| 2002/0040310 A1 | 4/2002 | Lieben et al. |
| 2002/0042769 A1 | 4/2002 | Gujral et al. |
| 2002/0052816 A1 | 5/2002 | Clenaghan et al. |
| 2002/0052819 A1 | 5/2002 | Burton |
| 2002/0052873 A1 | 5/2002 | Delgado et al. |
| 2002/0055899 A1 | 5/2002 | Williams |
| 2002/0059379 A1 | 5/2002 | Harvey et al. |
| 2002/0073018 A1 | 6/2002 | Mulinder et al. |
| 2002/0073049 A1 | 6/2002 | Dutta |
| 2002/0077954 A1 | 6/2002 | Slaight et al. |
| 2002/0095327 A1 | 7/2002 | Zumel et al. |
| 2002/0123954 A1 | 9/2002 | Hito |
| 2002/0161671 A1 | 10/2002 | Matsui et al. |
| 2002/0165756 A1 | 11/2002 | Tobin et al. |
| 2002/0165817 A1 | 11/2002 | Rackson et al. |
| 2002/0174052 A1 | 11/2002 | Guler et al. |
| 2002/0183066 A1 | 12/2002 | Pankaj |
| 2002/0194256 A1 | 12/2002 | Needham et al. |
| 2002/0194334 A1 | 12/2002 | Focant et al. |
| 2003/0014373 A1 | 1/2003 | Perge et al. |
| 2003/0018561 A1 | 1/2003 | Kitchen et al. |
| 2003/0035468 A1 | 2/2003 | Corbaton et al. |
| 2003/0041002 A1 | 2/2003 | Hao et al. |
| 2003/0055787 A1 | 3/2003 | Fujii |
| 2003/0055898 A1 | 3/2003 | Yeager et al. |
| 2003/0065608 A1 | 4/2003 | Cutler |
| 2003/0087652 A1 | 5/2003 | Simon et al. |
| 2003/0088488 A1 | 5/2003 | Solomon et al. |
| 2003/0097325 A1 | 5/2003 | Friesen et al. |
| 2003/0101124 A1* | 5/2003 | Semret et al. .................... 705/37 |
| 2003/0101274 A1 | 5/2003 | Yi et al. |
| 2003/0115114 A1 | 6/2003 | Tateishi et al. |
| 2003/0115251 A1 | 6/2003 | Fredrickson et al. |
| 2003/0135437 A1 | 7/2003 | Jacobsen |
| 2003/0139995 A1 | 7/2003 | Farley |
| 2003/0195780 A1 | 10/2003 | Arora et al. |
| 2003/0217106 A1 | 11/2003 | Adar et al. |
| 2003/0233307 A1 | 12/2003 | Salvadori et al. |
| 2004/0006528 A1 | 1/2004 | Kevin Fung |
| 2004/0006529 A1 | 1/2004 | Fung |
| 2004/0006534 A1 | 1/2004 | Fung |
| 2004/0024684 A1 | 2/2004 | Montepeque |
| 2004/0024687 A1* | 2/2004 | Delenda .................... 705/37 |
| 2004/0039670 A1 | 2/2004 | Fung |
| 2004/0039685 A1 | 2/2004 | Hambrecht et al. |
| 2004/0054551 A1 | 3/2004 | Ausubel et al. |

(56) References Cited

U.S. PATENT DOCUMENTS

| | | | |
|---|---|---|---|
| 2004/0054617 A1 | 3/2004 | Fung | |
| 2004/0059665 A1 | 3/2004 | Suri et al. | |
| 2004/0068447 A1 | 4/2004 | Mao et al. | |
| 2004/0093278 A1 | 5/2004 | Burchetta et al. | |
| 2004/0111308 A1* | 6/2004 | Yakov | 705/8 |
| 2004/0117302 A1 | 6/2004 | Weichert et al. | |
| 2004/0132405 A1 | 7/2004 | Kitazawa et al. | |
| 2004/0153375 A1 | 8/2004 | Mukunya et al. | |
| 2004/0184478 A1 | 9/2004 | Donescu et al. | |
| 2004/0215793 A1 | 10/2004 | Ryan et al. | |
| 2004/0259558 A1 | 12/2004 | Skafidas et al. | |
| 2005/0044032 A1 | 2/2005 | Lee et al. | |
| 2005/0080710 A1 | 4/2005 | Malato et al. | |
| 2005/0137939 A1 | 6/2005 | Calabria et al. | |
| 2005/0144064 A1 | 6/2005 | Calabria et al. | |
| 2005/0144065 A1 | 6/2005 | Calabria et al. | |
| 2005/0197857 A1 | 9/2005 | Avery | |
| 2005/0198031 A1 | 9/2005 | Pezaris et al. | |
| 2005/0246420 A1 | 11/2005 | Little, II | |
| 2005/0286426 A1 | 12/2005 | Padhye et al. | |
| 2005/0289043 A1 | 12/2005 | Maudlin | |
| 2006/0046658 A1 | 3/2006 | Cruz et al. | |
| 2006/0148414 A1 | 7/2006 | Tee et al. | |
| 2006/0167787 A1 | 7/2006 | Ausubel | |
| 2006/0168119 A1 | 7/2006 | Inoue et al. | |
| 2006/0168140 A1 | 7/2006 | Inoue et al. | |
| 2006/0168147 A1 | 7/2006 | Inoue et al. | |
| 2006/0259957 A1 | 11/2006 | Tam et al. | |
| 2007/0118463 A1 | 5/2007 | Avery | |
| 2007/0118464 A1 | 5/2007 | Avery | |
| 2007/0118465 A1 | 5/2007 | Avery | |
| 2007/0174179 A1 | 7/2007 | Avery | |
| 2007/0195048 A1 | 8/2007 | Nam | |
| 2007/0297328 A1 | 12/2007 | Semret et al. | |
| 2008/0095121 A1 | 4/2008 | Shattil | |
| 2008/0109343 A1* | 5/2008 | Robinson et al. | 705/37 |
| 2008/0162331 A1 | 7/2008 | Ephrati et al. | |
| 2008/0162666 A1 | 7/2008 | Ebihara et al. | |
| 2008/0207149 A1 | 8/2008 | Unkefer et al. | |
| 2008/0227404 A1 | 9/2008 | Harel et al. | |
| 2008/0299923 A1 | 12/2008 | O'Brien et al. | |
| 2009/0054018 A1 | 2/2009 | Waheed et al. | |
| 2009/0170607 A1 | 7/2009 | Chiao et al. | |
| 2009/0180392 A1 | 7/2009 | Greiner et al. | |

FOREIGN PATENT DOCUMENTS

| | | |
|---|---|---|
| AU | 1997036840 | 10/1997 |
| EP | 0128672 | 12/1984 |
| EP | 0399822 | 11/1990 |
| EP | 0421409 | 4/1991 |
| EP | 0565314 | 10/1993 |
| EP | 0715247 | 6/1996 |
| EP | 0913757 | 5/1999 |
| EP | 0952741 | 10/1999 |
| EP | 1054336 | 11/2000 |
| GB | 2264796 | 9/1993 |
| JP | 2001019496 | 1/2001 |
| JP | 2002342684 | 11/2002 |
| RU | 2161819 | 1/2001 |
| RU | 0017642 | 4/2001 |
| WO | WO9002382 | 3/1990 |
| WO | WO9222870 | 12/1992 |
| WO | WO9301550 | 1/1993 |
| WO | WO9403859 | 2/1994 |
| WO | WO9406103 | 3/1994 |
| WO | WO9627155 | 9/1996 |
| WO | WO9634356 | 10/1996 |
| WO | WO9737315 | 10/1997 |
| WO | WO9743761 | 11/1997 |
| WO | WO9809144 | 3/1998 |
| WO | WO9809209 | 3/1998 |
| WO | WO9810381 | 3/1998 |
| WO | WO9837481 | 8/1998 |
| WO | WO9845768 | 10/1998 |
| WO | WO9901815 | 1/1999 |
| WO | WO9924928 | 5/1999 |
| WO | WO9927476 | 6/1999 |
| WO | WO9948296 | 9/1999 |
| WO | WO0108063 | 2/2001 |
| WO | WO0108072 | 2/2001 |
| WO | WO0110076 | 2/2001 |
| WO | WO0154335 | 7/2001 |
| WO | WO0207031 | 1/2002 |
| WO | WO0291100 | 11/2002 |
| WO | WO2006047879 | 5/2006 |

OTHER PUBLICATIONS

Messer, Alan et al. "A Market Model for Resource Allocation in Distributed Operating Systems", 1995.*

Messer, Alan, and Tim Wilkinson. Dynamic Locality for Resource Information Dissemination. Technical report, City University, London, 1997. (Self-citation of [2] A. Messer, T. Wilkinson. A Market Model for Resource Allocation in Distributed Operating Systems. Technical Report, Department of Computer Science, City University. Feb. 1995.

Messer, Alan, and Tim Wilkinson. A Scalable Proportion-share Resource Allocator for Distributed Systems. tech. rep., SARC, Department of Computer Science, City University, England, 1996.

Kara, Mourad. "A global plan policy for coherent co-operation in distributed dynamic load balancing algorithms." Distributed Systems Engineering 2.4 (1995): 212.

Messer, Alan, and Tim Wilkinson. "Power to the process." (1996).

Anastasiadi, A., et al. "A computational economy for dynamic load balancing and data replication." Proceedings of the first international conference on Information and computation economies. ACM, 1998.

Kuwabara, Kazuhiro, and Toru Ishida. "Equilibratory approach to distributed resource allocation: Toward coordinated balancing." Artificial Social Systems. Springer Berlin Heidelberg, 1994. 133-146.

Rasmusson, Lars. "Evaluating resource bundle derivatives for multi-agent negotiation of resource allocation." E-Commerce Agents. Springer Berlin Heidelberg, 2001. 154-165.

Huberman, Bernardo A., and Tad Hogg. "The emergence of computational ecologies." Lectures in complex systems (1992).

Bandhopadhyay, Gautam, Shalini Gupta, and Pramod Mane. "Recovery of two process deadlock using payoff matrix approach." Computer Science and Information Technology (ICCSIT), 2010 3rd IEEE International Conference on. vol. 9. IEEE, 2010.

Anastasiadi, A., et al. "Economic Models for Resource Allocation and Services in Distributed Information Systems." (1997).

Deng, Xiaotie, Li-Sha Huang, and Minming Li. "On walrasian price of cpu time." Computing and Combinatorics. Springer Berlin Heidelberg, 2005. 586-595.

Ferguson, Donald F., et al. "Economic models for allocating resources in computer systems." Market-based control: a paradigm for distributed resource allocation (1996): 156-183.

Chun, Brent N., and David E. Culler. "User-centric performance analysis of market-based cluster batch schedulers." Cluster Computing and the Grid, 2002. 2nd IEEE/ACM International Symposium on. IEEE, 2002.

Low, Steven, and Pravin Varaiya. "An algorithm for optimal service provisioning using resource pricing." INFOCOM'94. Networking for Global Communications., 13th Proceedings IEEE IEEE, 1994.

Shum, Kam Hong, and Muslim Bozyigit. "A load distribution through competition for workstation clusters." Proc. of the Ninth International Symposium on Computer and Information Sciences. 1994.

Hogg, Tad, and Bernardo A. Huberman. "Dynamics of large autonomous computational systems." Collectives and the design of complex systems. Springer New York, 2004. 295-315.

Ferguson, Donald. "An Economy for Managing Replicated Data in Autonomous Decentralized Systems (Troceedings of International Symposium on Autonomous and Decentralized Systems, prrs) Donald Ferguson Christos Nikolaou Yechiam Yemini."

Ferguson, Donald, Christos Nikolaou, and Yechiam Yemini. "Microeconomic Algorithms for Flow Control in Virtual Circuit Networks (Subset in Infocom 1989)." (1995).

(56) References Cited

OTHER PUBLICATIONS

Byde, Andrew. A comparison between mechanisms for sequential compute resource auctions. Springer Berlin Heidelberg, 2008.

Ekbom, Kristofer, and Eric Astor. "Multi-Agent Systems in Computational Markets and Ecosystems." Organization 1103 (1996): 1581.

Yamaki, Hirofumi, Yutaka Yamauchiy, and Toru Ishiday. "Market-Based Application QoS Control: Implementation Tradeoffs." (1999).

Youssefmir, Michael, and Bernardo A. Huberman. "Resource Contention in Multiagent Systems." ICMAS. 1995.

Guenther, Oliver, Tad Hogg, and Bernardo A. Huberman. "Market organizations for controlling smart matter." Simulating Social Phenomena. Springer Berlin Heidelberg, 1997. 241-257.

Kuwabara, Kazuhiro, et al. "An equilibratory market-based approach for distributed resource allocation and its applications to communication network control." Market-based control: A paradigm for distributed resource allocation (1996): 53-73.

Ishida, Toru, Yoshiyasu Nishibe, and Tatsuya Suda. "Kazuhiro Kuwabara NTT Communication Science Laboratories 2-2 Hikaridai, Seika-cho, Soraku-gun, Kyoto 619-02, Japan E-mail: kuwabara@cslab. kecl. ntt. jp." Market-based Control: A Paradigm for Distributed Resource Allocation (1996): 53.

Kropp, Sebastian, and V. I. C. Caulfield. "Distributed Operating Systems." (2004). (Cites [3] A. Messer and T. Wilkinson. A market model for resource allocation in distributed operating systems, 1995).

The references herein cited include bibloiographical information from Google Scholar, and Applicant does not warrant the accuracy of that information, including but not limited to alleged publication date.

\* cited by examiner

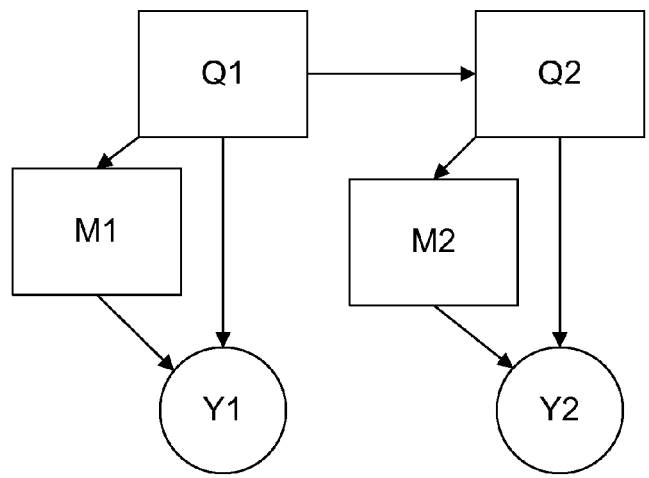
HMM with mixture of Gaussians output
Fig. 3
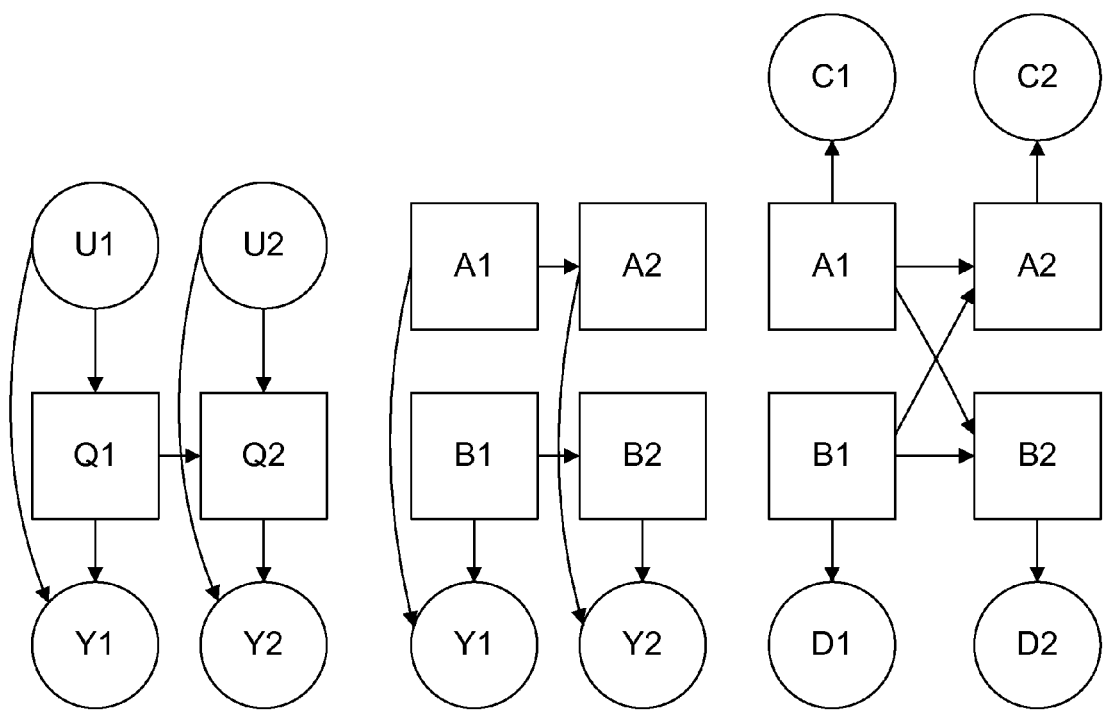
Input-output HMM
Fig. 4A
Factorial HMM
Fig. 4B
Coupled HMM
Fig. 4C und MULTIFACTORIAL OPTIMIZATION
SYSTEM AND METHOD

PRIORITY CLAIM

The present application is a Non-Provisional application of 60/723,339 filed Oct. 4, 2005.

FIELD OF THE INVENTION

The present invention relates to the field of multifactorial economic optimization, and more generally to optimization of communities of elements having conflicting requirements and overlapping resources.

BACKGROUND OF THE INVENTION

A number of fields of endeavor are relevant to the present invention, and exemplary prior art, each of which is expressly incorporated herein by reference, are disclosed below. The references disclosed provide a skilled artisan with disclosure of embodiments of various elements of the present invention, and the teachings therein may be combined and subcombined in various manners in accordance with the present teachings. Therefore, the identified prior art provides a point of reference and set of tools which are expressly available, both as a part of the invention, and to implement the invention.

The topical headings are advisory only, and are not intended to limit the applicability of any reference. While some embodiments are discussed as being preferred, it should be understood that all embodiments discussed, in any portion of this documents, whether stated as having advantages or not, form a part of the invention and may be combined and/or subcombined in a consistent manner in accordance with the teachings hereof. Likewise, the disclosure herein is intended to disclose permissive combinations, subcombinations, and attributes, and any language which appears to limit the scope of applicant's invention is intended to apply to the particular embodiment referenced, or as a permissive suggestion for implementation of other embodiments which with it may be consistently applied. The present disclosure includes details of a number of aspects, which may find independent utility, and therefore the present specifications are not intended to be construed as being limited to the conjunction of the elements of the disclosure.

Internet

The Internet is structured such various networks are interconnected, with communications effected by addressed packets conforming to a common protocol. Based on the packet addressing, information is routed from source to destination, often through a set of networks having multiple potential pathways. The communications medium is shared between all users. Statistically, some proportion of the packets are extraordinarily delayed, or simply lost. Therefore, protocols involving communications using these packets include error detection schemes that request a retransmit of required data not received within a time window. In the event that the network nears capacity or is otherwise subject to limiting constraint, the incidence of delayed or lost packets increases, thereby increasing requests for retransmission and retransmission. Therefore, as the network approaches available bandwidth, the load increases, ultimately leading to failure. In instances where a minimum quality of service must be guaranteed, special Internet technologies are required, to reserve bandwidth or to specify network pathways. End-to-end quality of service guarantees, however, may exceed the cost of circuit switched technologies, such as ISDN, especially where the high quality needs are intermittent.

Internet usage typically involves an Internet server, an automated system capable of responding to communications received through the Internet, and often communicating with other systems not directly connected to the Internet. The server typically has relatively large bandwidth to the Internet, allowing multiple simultaneous communications sessions, and usually supports the hypertext transport protocol (HTTP), which provides, in conjunction with a so-called web browser on a remote client system, a human readable interface which facilitates navigation of various resources available in the Internet. The client systems are typically human user interfaces, which employ a browser to display HTTP "web pages". The browser typically does not provide intelligence, although so-called applets or local servers may provide programmable intelligence or processing capability proximate to the user. Bandwidth between the client and Internet is typically relatively small, and various communications and display rendering considered normal. Typically, both client and server are connected to the Internet through Internet service providers, each having its own router. It is also known to provide so-called proxy servers and firewalls, which are automated systems that insulate the client system from the remote server or Internet in general. These local servers, applications and applets may be non-standard, and thus require special software to be available locally for execution.

Thus, the Internet poses a number of advantages for commercial use, including low cost and ubiquitous connectivity. Therefore, it is desirable to employ standard Internet technologies while achieving sufficient quality communications to effect an efficient transaction.

A widely dispersed network of access points may implement a mobile telecommunications protocol, such as IETF RFC 3344 (Mobile IP, IPv4), or various mobile ad hoc network (MANET) protocols, 2.5G, 3G, 4G cellular, WiMax (802.16), or other types of protocols. Preferably, the protocol allows the client to maintain communications between a source and destination while the network topology or routing path changes, such as in a mobile multihop ad hoc network or mobile node within a cellular or hotspot network. See, U.S. Pub. App. No. 20040073642, expressly incorporated herein by reference.

Mobile Internet Protocol (Mobile IP or MIP, in this case, v4) is an Internet Engineering Task Force (IETF) network layer protocol, specified in RFC-3344. It is designed to allow seamless connectivity session maintenance under TCP (Transmission Control Protocol) or other connection oriented transport protocols when a mobile node moves from one IP subnet to another. MIPv4 uses two network infrastructure entities, a Home Agent (HA) and an optional Foreign Agent (FA), to deliver packets to the mobile node when it has left its home network. MIPv4 also supports point-of-attachment Care-of Addresses (CoA) if a FA is unavailable. Mobile IP is increasingly being deployed for 2.5/3 G (2.5 or third generation wireless) provider networks and may be deployed in medium and large Enterprise IEEE 802.11-based LANs (Local Area Networks) with multiple subnets. MIPv4 relies on the use of permanently assigned "home" IP addresses to help maintain connectivity when a mobile device connects to a foreign network. On the other hand, IPsec-based (Internet Protocol Security, a security protocol from IETF) VPNs (Virtual Private Networks) use a tunneling scheme in which the outer source IP address is based on a CoA at the point-of-attachment and an inner source IP address assigned for the "home" domain. In general if either address is changed, such as when the mobile node switches IP subnets, then a new tunnel is negotiated with new keys and several round trip message exchanges. The renegotiation of the tunnel interferes with seamless mobility across wired and wireless IP networks spanning multiple IP subnets.

Clearly, newer technologies, such as IP v6, and derivatives thereof, are known, and may be applied in conjunction with the present invention.

Market Economy Systems

In modern retail transactions, predetermined price transactions are common, with market transactions, i.e., commerce conducted in a setting which allows the transaction price to float based on the respective valuation allocated by the buyer(s) and seller(s), often left to specialized fields. While interpersonal negotiation is often used to set a transfer price, this price is often different from a transfer price that might result from a best-efforts attempt at establishing a market price. Assuming that the market price is optimal, it is therefore assumed that alternatives are sub-optimal. Therefore, the establishment of a market price is desirable over simple negotiations.

One particular problem with market-based commerce is that both seller optimization and market efficiency depend on the fact that representative participants of a preselected class are invited to participate, and are able to promptly communicate, on a relevant timescale, in order to accurately value the goods or services and make an offer. Thus, in traditional market-based system, all participants are in the same room, or connected by a high quality (low latency, low error) telecommunications link. Alternately, the market valuation process is prolonged over an extended period, allowing non-real time communications of market information and bids. Thus, attempts at ascertaining a market price for non-commodity goods can be subject to substantial inefficiencies, which reduce any potential gains by market pricing. Further, while market pricing might be considered "fair", it also imposes an element of risk, reducing the ability of parties to predict future pricing and revenues. Addressing this risk may also improve efficiency of a market-based system, that is, increase the overall surplus in the market.

Auction Systems

When a single party seeks to sell goods to the highest valued purchaser(s), to establish a market price, the rules of conduct typically define an auction. Typically, known auctions provide an ascending price or descending price over time, with bidders making offers or ceasing to make offers, in the descending price or ascending price models, respectively, to define the market price. After determining the winner of the auction, typically a bidder who establishes a largest economic surplus, the pricing rules define the payment, which may be in accordance with a uniform price auction, wherein all successful bidders pay the lowest successful bid, a second price auction wherein the winning bidder pays the amount bid by the next highest bidder, and pay-what-you-bid (first price) auctions. The pay-what-you-bid auction is also known as a discriminative auction while the uniform price auction is known as a non-discriminative auction. In a second-price auction, also known as a Vickrey auction, the policy seeks to create a disincentive for speculation and to encourage bidders to submit bids reflecting their true value for the good, rather than "shaving" the bid to achieve a lower cost. In the uniform price and second price schemes, the bidder is encourages to disclose the actual private value to the bidder of the good or service, since at any price below this amount, there is an excess gain to the buyer, whereas by withholding this amount the bid may be unsuccessful, resulting in a loss of the presumably desirable opportunity. In the pay-what-you-bid auction, on the other hand, the buyer need not disclose the maximum private valuation, and those bidders with lower risk tolerance will bid higher prices. See, www.isoc.org/inet98/proceedings/3b/3b_3.html; www.ibm.com/iac/reports-technical/reports-bus-neg-internet.html.

Two common types of auction are the English auction, which sells a single good to the highest bidder in an ascending price auction, and the Dutch auction, in which multiple units are available for sale, and in which a starting price is selected by the auctioneer, which is successively reduced, until the supply is exhausted by bidders (or the minimum price/final time is reached), with the buyer(s) paying the lowest successful bid. The term Dutch auction is also applied to a type of sealed bid auction. In a multi-unit live Dutch auction, each participant is provided with the current price, the quantity on hand and the time remaining in the auction. This type of auction, typically takes place over a very short period of time and there is a flurry of activity in the last portion of the auction process. The actual auction terminates when there is no more product to be sold or the time period expires.

In selecting the optimal type of auction, a number of factors are considered. In order to sell large quantities of a perishable commodity in a short period of time, the descending price auctions are often preferred. For example, the produce and flower markets in Holland routinely use the Dutch auction (hence the derivation of the name), while the U.S. Government uses this form to sell its financial instruments. The format of a traditional Dutch auction encourages early bidders to bid up to their "private value", hoping to pay some price below the "private value". In making a bid, the "private value" becomes known, helping to establish a published market value and demand curve for the goods, thus allowing both buyers and sellers to define strategies for future auctions.

In an auction, typically a seller retains an auctioneer to conduct an auction with multiple buyers. (In a reverse auction, a buyer solicits the lowest price from multiple competing vendors for a desired purchase). Since the seller retains the auctioneer, the seller essentially defines the rules of the auction. These rules are typically defined to maximize the revenues or profit to the seller, while providing an inviting forum to encourage a maximum number of high valued buyers. If the rules discourage high valuations of the goods or services, or discourage participation by an important set of potential bidders, then the rules are not optimum. Rules may also be imposed to discourage bidders who are unlikely to submit winning bids from consuming resources. A rule may also be imposed to account for the valuation of the good or service applied by the seller, in the form of a reserve price. It is noted that these rules typically seek to allocate to the seller a portion of the economic benefit that would normally inure to the buyer (in a perfectly efficient auction), creating an economic inefficiency. However, since the auction is to benefit the seller, not society as a whole, this potential inefficiency is tolerated. An optimum auction thus seeks to produce a maximum profit (or net revenues) for the seller. An efficient auction, on the other hand, maximizes the sum of the utilities for the buyer and seller. It remains a subject of academic debate as to which auction rules are most optimum in given circumstances; however, in practice, simplicity of implementation may be a paramount concern, and simple auctions may result in highest revenues; complex auctions, while theoretically more optimal, may discourage bidders from participating or from applying their true and full private valuation in the auction process.

Typically, the rules of the auction are predefined and invariant. Further, for a number of reasons, auctions typically apply the same rules to all bidders, even though, with a priori knowledge of the private values assigned by each bidder to the goods, or a prediction of the private value, an optimization rule may be applied to extract the full value assigned by each bidder, while selling above the seller's reserve.

In a known ascending price auction, each participant must be made aware of the status of the auction, e.g., open, closed, and the contemporaneous price. A bid is indicated by the identification of the bidder at the contemporaneous price, or occasionally at any price above the minimum bid increment plus the previous price. The bids are asynchronous, and therefore each bidder must be immediately informed of the particulars of each bid by other bidders.

In a known descending price auction, the process traditionally entails a common clock, which corresponds to a decrementing price at each decrement interval, with an ending time (and price). Therefore, once each participant is made aware of the auction parameters, e.g., starting price, price decrement, ending price/time, before the start of the auction, the only information that must be transmitted is auction status (e.g., inventory remaining).

As stated above, an auction is traditionally considered an efficient manner of liquidating goods at a market price. The theory of an auction is that either the buyer will not resell, and thus has an internal or private valuation of the goods regardless of other's perceived values, or that the winner will resell, either to gain economic efficiency or as a part of the buyer's regular business. In the later case, it is a general presumption that the resale buyers are not in attendance at the auction or are otherwise precluded from bidding, and therefore that, after the auction, there will remain demand for the goods at a price in excess of the price paid during the auction. Extinction of this residual demand results in the so-called "winner's curse", in which the buyer can make no profit from the transaction during the auction. Since this detracts from the value of the auction as a means of conducting profitable commerce, it is of concern to both buyer and seller. In fact, experience with initial public offerings (IPOs) of stock through various means has demonstrated that by making stock available directly to all classes of potential purchasers, latent demand for a new issue is extinguished, and the stock price is likely to decline after issuance, resulting in an IPO which is characterized as "unsuccessful". This potential for post IPO decline tempers even initial interest in the issue, resulting in a paradoxical decline in revenues from the vehicle. In other words, the "money on the table" resulting from immediate retrading of IPO shares is deemed a required aspect of the IPO process. Thus, methods that retain latent demand after IPO shares result in post IPO increases, and therefore a "successful" IPO. Therefore, where the transaction scheme anticipates demand for resale after the initial distribution, it is often important to assure a reasonable margin for resellers and limitations on direct sale to ultimate consumers.

Research into auction theory (game theory) shows that in an auction, the goal of the seller is to optimize the auction by allocating the goods inefficiently, if possible, and thus to appropriate to himself an excess gain. This inefficiency manifests itself by either withholding goods from the market or placing the goods in the wrong hands. In order to assure for the seller a maximum gain from a misallocation of the goods, restrictions on resale are imposed; otherwise, post auction trading will tend to undue the misallocation, and the anticipation of this trading will tend to control the auction pricing. The misallocation of goods imposed by the seller through restrictions allows the seller to achieve greater revenues than if free resale were permitted. It is believed that in an auction followed by perfect resale, that any mis-assignment of the goods lowers the seller's revenues below the optimum and likewise, in an auction market followed by perfect resale, it is optimal for the seller to allocate the goods to those with the highest value. Therefore, if post-auction trading is permitted, the seller will not benefit from these later gains, and the seller will obtain sub optimal revenues.

These studies, however, typically do not consider transaction costs and internal inefficiencies of the resellers, as well as the possibility of multiple classes of purchasers, or even multiple channels of distribution, which may be subject to varying controls or restrictions, and thus in a real market, such theoretical optimal allocation is unlikely. In fact, in real markets the transaction costs involved in transfer of ownership are often critical in determining a method of sale and distribution of goods. For example, it is the efficiency of sale that motivates the auction in the first place. Yet, the auction process itself may consume a substantial margin, for example 1-15% of the transaction value. To presume, even without externally imposed restrictions on resale, that all of the efficiencies of the market may be extracted by free reallocation, ignores that the motivation of the buyer is a profitable transaction, and the buyer may have fixed and variable costs on the order of magnitude of the margin. Thus, there are substantial opportunities for the seller to gain enhanced revenues by defining rules of the auction, strategically allocating inventory amount and setting reserve pricing.

Therefore, perfect resale is but a fiction created in auction (game) theory. Given this deviation from the ideal presumptions, auction theory may be interpreted to provide the seller with a motivation to misallocate or withhold based on the deviation of practice from theory, likely based on the respective transaction costs, seller's utility of the goods, and other factors not considered by the simple analyses.

A number of proposals have been made for effecting auction systems using the Internet. These systems include consumer-to-consumer, business-to-consumer, and business-to-business types. Generally, these auctions, of various types and implementations discussed further below, are conducted through Internet browsers using hypertext markup language (HTML) "web pages", using HTTP. In some instances, such as BIDWATCH, discussed further below, an application with associated applets is provided to define a user interface instead of HTML.

As stated above, the information packets from the transaction server to client systems associated with respective bidders communicate various information regarding the status of an interactive auction during the progress thereof. The network traffic from the client systems to the transaction server is often limited to the placement of bids; however, the amount of information required to be transmitted can vary greatly, and may involve a complex dialogue of communications to complete the auction offer. Typically, Internet based auction systems have scalability issues, wherein economies of scale are not completely apparent, leading to implementation of relatively large transaction server systems to handle peak loads. When the processing power of the transaction server system is exceeded, entire system outages may occur, resulting in lost sales or diminished profits, and diminished goodwill.

In most Internet auction system implementations, there are large quantities of simultaneous auctions, with each auction accepting tens or hundreds of bids over a timescale of hours to days. In systems where the transaction volume exceeds these scales, for example in stock and commodity exchanges, which can accommodate large numbers of transactions per second involving the same issue, a private network, or even a local area network, is employed, and the public Internet is not used as a direct communications system with the transaction server. Thus, while infrastructures are available to allow successful handling of massive transaction per second volumes, these systems typically avoid direct public Internet communications or use of some of its limiting technologies. The transaction processing limitations are often due to the finite time required to handle, e.g., open, update, and close, database records.

In business-to-business auctions, buyers seek to ensure that the population of ultimate consumers for the good or services are not present at the auction, in order to avoid the "winner's curse", where the highest bidder in the auction cannot liquidate or work the asset at a profit. Thus, business-to-business auctions are distinct from business-to-consumer auctions. In the former, the optimization by the seller must account for the desire or directive of the seller to avoid direct retail distribution, and instead to rely on a distribution tier represented in the auction. In the latter, the seller seeks maximum revenues and to exhaust the possibilities for downstream trade in the goods or services. In fact, these types of auctions may be distinguished by various implementing rules, such as requiring sales tax resale certificates, minimum lot size quantities, preregistration or qualification, support or associated services, or limitations on the title to the goods themselves. The conduct of these auctions may also differ, in that consumer involvement typically is permissive of mistake or indecision, while in a pure business environment professionalism and decisiveness are mandated.

In many instances, psychology plays an important role in the conduct of the auction. In a live auction, bidders can see each other, and judge the tempo of the auction. In addition, multiple auctions are often conducted sequentially, so that each bidder can begin to understand the other bidder's patterns, including hesitation, bluffing, facial gestures or mannerisms. Thus, bidders often prefer live auctions to remote or automated auctions if the bidding is to be conducted strategically.

Internet auctions are quite different from live auctions with respect to psychological factors. Live auctions are often monitored closely by bidders, who strategically make bids, based not only on the "value" of the goods, but also on an assessment of the competition, timing, psychology, and progress of the auction. It is for this reason that so-called proxy bidding, wherein the bidder creates a preprogrammed "strategy", usually limited to a maximum price, are disfavored as a means to minimize purchase price, and offered as a service by auctioneers who stand to make a profit based on the transaction price. A maximum price proxy bidding system is somewhat inefficient, in that other bidders may test the proxy, seeking to increase the bid price, without actually intending to purchase, or contrarily, after testing the proxy, a bidder might give up, even below a price he might have been willing to pay. Thus, the proxy imposes inefficiency in the system that effectively increases the transaction cost.

In order to address a flurry of activity that often occurs at the end of an auction, an auction may be held open until no further bids are cleared for a period of time, even if advertised to end at a certain time. This is common to both live and automated auctions. However, this lack of determinism may upset coordinated schedules, thus impairing efficient business use of the auction system.

In order to facilitate management of bids and bidding, some of the Internet auction sites have provided non-Hypertext Markup Language (HTML) browser based software "applet" to track auctions. For example, ONSALE.COM has made available a Marimba Castanet® applet called Bidwatch to track auction progress for particular items or classes of items, and to facilitate bidding thereon. This system, however, lacks real-time performance under many circumstances, having a stated refresh period of 10 seconds, with a long latency for confirmation of a bid, due to constraints on software execution, quality of service in communications streams, and bid confirmation dialogue. Thus, it is possible to lose a bid even if an attempt was made prior to another bidder. The need to quickly enter the bid, at risk of being too late, makes the process potentially error prone.

Proxy bidding, as discussed above, is a known technique for overcoming the constraints of Internet communications and client processing limitations, since it bypasses the client and telecommunications links and may execute solely on the host system or local thereto. However, proxy bidding undermines some of the efficiencies gained by a live market.

U.S. Pat. No. 5,890,138 to Godin, et al. (Mar. 30, 1999), expressly incorporated herein by reference in its entirety, relates to an Internet auction system. The system implements a declining price auction process, removing a user from the auction process once an indication to purchase has been received. See, Rockoff, T. E., Groves, M.; "Design of an Internet-based System for Remote Dutch Auctions", Internet Research, v 5, n 4, pp. 10-16, MCB University Press, Jan. 1, 1995.

A known computer site for auctioning a product on-line comprises at least one web server computer designed for serving a host of computer browsers and providing the browsers with the capability to participate in various auctions, where each auction is of a single product, at a specified time, with a specified number of the product available for sale. The web server cooperates with a separate database computer, separated from the web server computer by a firewall. The database computer is accessible to the web computer server computer to allow selective retrieval of product information, which includes a product description, the quantity of the product to be auctioned, a start price of the product, and an image of the product. The web server computer displays, updated during an auction, the current price of the product, the quantity of the product remaining available for purchase and the measure of the time remaining in the auction. The current price is decreased in a predetermined manner during the auction. Each user is provided with an input instructing the system to purchase the product at a displayed current price, transmitting an identification and required financial authorization for the purchase of the product, which must be confirmed within a predetermined time. In the known system, a certain fall-out rate in the actual purchase confirmation may be assumed, and therefore some overselling allowed. Further, after a purchase is indicated, the user's screen is not updated, obscuring the ultimate lowest selling price from the user. However, if the user maintains a second browser, he can continue to monitor the auction to determine whether the product could have been purchased at a lower price, and if so, fail to confirm the committed purchase and purchase the same goods at a lower price while reserving the goods to avoid risk of loss. Thus, the system is flawed, and may fail to produce an efficient transaction or optimal price.

An Internet declining price auction system may provide the ability to track the price demand curve, providing valuable marketing information. For example, in trying to determine the response at different prices, companies normally have to conduct market surveys. In contrast, with a declining price auction, substantial information regarding price and demand is immediately known. The relationship between participating bidders and average purchasers can then be applied to provide a conventional price demand curve for the particular product.

U.S. Pat. No. 5,835,896, Fisher, et al., issued Nov. 10, 1998, expressly incorporated herein by reference in its entirety, provides method and system for processing and transmitting electronic auction information over the Internet, between a central transaction server system and remote bidder terminals. Those bids are recorded by the system and the bidders are updated with the current auction status information. When appropriate, the system closes the auction from further bidding and notifies the winning bidders and losers as to the auction outcome. The transaction server posts information from a database describing a lot available for purchase, receives a plurality of bids, stored in a bid database, in response to the information, and automatically categorizes the bids as successful or unsuccessful. Each bid is validated, and an electronic mail message is sent informing the bidder of the bid status. This system employs HTTP, and thus does not automatically update remote terminal screens, requiring the e-mail notification feature.

The auction rules may be flexible, for example including Dutch-type auctions, for example by implementing a price markdown feature with scheduled price adjustments, and English-type (progressive) auctions, with price increases corresponding to successively higher bids. In the Dutch type auction, the price markdown feature may be responsive to bidding activity over time, amount of bids received, and number of items bid for. Likewise, in the progressive auction, the award price may be dependent on the quantity desired, and typically implements a lowest successful bid price rule. Bids that are below a preset maximum posted selling price are maintained in reserve by the system. If a certain sales volume is not achieved in a specified period of time, the price is reduced to liquidate demand above the price point, with the new price becoming the posted price. On the other hand, if a certain sales volume is exceeded in a specified period of time, the system may automatically increase the price. These automatic price changes allow the seller to respond quickly to market conditions while keeping the price of the merchandise as high as possible, to the seller's benefit. A "Proxy Bidding" feature allows a bidder to place a bid for the maximum amount they are willing to pay, keeping this value a secret, displaying only the amount necessary to win the item up to the amount of the currently high bids or proxy bids of other bidders. This feature allows bidders to participate in the electronic auction without revealing to the other bidders the extent to which they are willing to increase their bids, while maintaining control of their maximum bid without closely monitoring the bidding. The feature assures proxy bidders the lowest possible price up to a specified maximum without requiring frequent inquiries as to the state of the bidding.

A "Floating Closing Time" feature may also be implemented whereby the auction for a particular item is automatically closed if no new bids are received within a predetermined time interval, assuming an increasing price auction. Bidders thus have an incentive to place bids expeditiously, rather than waiting until near the anticipated close of the auction.

U.S. Pat. No. 5,905,975, Ausubel, issued May 18, 1999, expressly incorporated herein by reference in its entirety, relates to computer implemented methods and apparatus for auctions. The proposed system provides intelligent systems for the auctioneer and for the user. The auctioneer's system contains information from a user system based on bid information entered by the user. With this information, the auctioneer's system determines whether the auction can be concluded or not and appropriate messages are transmitted. At any point in the auction, bidders are provided the opportunity to submit not only their current bids, but also to enter future bids, or bidding rules which may have the opportunity to become relevant at future times or prices, into the auction system's database. Participants may revise their executory bids, by entering updated bids. Thus, at one extreme, a bidder who wishes to economize on his time may choose to enter his entire set of bidding rules into the computerized system at the start of the auction, effectively treating this as a sealed-bid auction. At the opposite extreme, a bidder who wishes to closely participate in the auction may choose to constantly monitor the auction's progress and to submit all of his bids in real time. See also, U.S. patent application Ser. No. 08/582, 901 filed Jan. 4, 1996, which provides a method for auctioning multiple, identical objects and close substitutes.

Cryptographic Technology

U.S. Pat. No. 5,956,408 (Arnold, Sep. 21, 1999), expressly incorporated herein by reference, relates to an apparatus and method for secure distribution of data. Data, including program and software updates, is encrypted by a public key encryption system using the private key of the data sender. The sender also digitally signs the data. The receiver decrypts the encrypted data, using the public key of the sender, and verifies the digital signature on the transmitted data. The program interacts with basic information stored within the confines of the receiver. As result of the interaction, the software updates are installed within the confines of the user, and the basic information stored within the confines of the user is changed.

U.S. Pat. No. 5,982,891 (Ginter, et al., Nov. 9, 1999); U.S. Pat. No. 5,949,876 (Ginter, et al., Sep. 7, 1999); and U.S. Pat. No. 5,892,900 (Ginter, et al., Apr. 6, 1999), expressly incorporated herein by reference, relate to systems and methods for secure transaction management and electronic rights protection. Electronic appliances, such as computers, help to ensure that information is accessed and used only in authorized ways, and maintain the integrity, availability, and/or confidentiality of the information. Such electronic appliances provide a distributed virtual distribution environment (VDE) that may enforce a secure chain of handling and control, for example, to control and/or meter or otherwise monitor use of electronically stored or disseminated information. Such a virtual distribution environment may be used to protect rights of various participants in electronic commerce and other electronic or electronic-facilitated transactions. Distributed and other operating systems, environments and architectures, such as, for example, those using tamper-resistant hardware-based processors, may establish security at each node. These techniques may be used to support an all-electronic information distribution, for example, utilizing the "electronic highway."

U.S. Pat. No. 6,009,177 (Sudia, Dec. 28, 1999), expressly incorporated herein by reference, relates to a cryptographic system and method with a key escrow feature that uses a method for verifiably splitting users' private encryption keys into components and for sending those components to trusted agents chosen by the particular users, and provides a system that uses modern public key certificate management, enforced by a chip device that also self-certifies. The methods for key escrow and receiving an escrow certificate are also applied herein to a more generalized case of registering a trusted device with a trusted third party and receiving authorization from that party enabling the device to communicate with other trusted devices. Further preferred embodiments provide for rekeying and upgrading of device firmware using a certificate system, and encryption of stream-oriented data.

U.S. Pat. No. 6,052,467 (Brands, Apr. 18, 2000), expressly incorporated herein by reference, relates to a system for ensuring that the blinding of secret-key certificates is restricted, even if the issuing protocol is performed in parallel mode. A cryptographic method is disclosed that enables the issuer in a secret-key certificate issuing protocol to issue triples consisting of a secret key, a corresponding public key, and a secret-key certificate of the issuer on the public key, in such a way that receiving parties can blind the public key and the certificate, but cannot blind a predetermined non-trivial predicate of the secret key even when executions of the issuing protocol are performed in parallel.

U.S. Pat. No. 6,052,780 (Glover, Apr. 18, 2000), expressly incorporated herein by reference, relates to a computer system and process for accessing an encrypted and self-decrypting digital information product while restricting access to decrypted digital information. Some of these problems with digital information protection systems may be overcome by providing a mechanism that allows a content provider to encrypt digital information without requiring either a hardware or platform manufacturer or a content consumer to provide support for the specific form of corresponding decryption. This mechanism can be provided in a manner that allows the digital information to be copied easily for back-up purposes and to be transferred easily for distribution, but which should not permit copying of the digital information in decrypted form. In particular, the encrypted digital information is stored as an executable computer program that includes a decryption program that decrypts the encrypted information to provide the desired digital information, upon successful completion of an authorization procedure by the user. In combination with other mechanisms that track distribution, enforce royalty payments and control access to decryption keys, an improved method is provided for identifying and detecting sources of unauthorized copies. Suitable authorization procedures also enable the digital information to be distributed for a limited number of uses and/or users, thus enabling per-use fees to be charged for the digital information.

A patent application entitled "Three Party Authorization System", (Robert Nagel, David Felsher, and Steven Hoffberg, inventors, 2001) provides a three party authorization encryption technique. This technique has the significant advantage of being more secure than a Public Key system because it requires the agreement of all three parties—the creator of the secure record, the party that the secure record is about, and the database repository—on a case by case basis, in order to release secure records. Then and only then can a released secure record be decrypted and accessed by the requesting party alone. Each access generates an entry into a log file with automatic security alerts for any unusual activity. A component of this system is that each party wishing to secure records enters into a contract with a "virtual trust agency" to represent that party in all matters where privacy is an issue. The virtual trust agency never has access to the data contained in the secured records and yet acts on behalf of the party whose information is contained in the secure records to control data access to authorized requesting parties. To enable this privacy, the virtual trust agency issues a public-private key pair and maintains the party's private key. The private key is only used in calculations to generate an intermediate key that is passed on to the data repository and used to re-encrypt the data for the requesting party's view. A unique aspect of this patent pending technique is the fact that the party's records are actually protected from unauthorized use at all times inside the organization that holds the database repository or by the original record's creator, not simply in transmission from the database repository or the individual or organization that created the record in the first place, to outside requesting parties. This system requires consent of all three parties to decrypt secured information. Its virtual trust component takes the place of the trusted individual or organization in protecting the party whose record contains information that has legal mandates to rights of privacy.

E-Commerce Systems

U.S. Pat. No. 5,946,669 (Polk, Aug. 31, 1999), expressly incorporated herein by reference, relates to a method and apparatus for payment processing using debit-based electronic funds transfer and disbursement processing using addendum-based electronic data interchange. This disclosure describes a payment and disbursement system, wherein an initiator authorizes a payment and disbursement to a collector and the collector processes the payment and disbursement through an accumulator agency. The accumulator agency processes the payment as a debit-based transaction and processes the disbursement as an addendum-based transaction. The processing of a debit-based transaction generally occurs by electronic funds transfer (EFT) or by financial electronic data interchange (FEDI). The processing of an addendum-based transaction generally occurs by electronic data interchange (EDI).

U.S. Pat. No. 6,005,939 (Fortenberry, et al., Dec. 21, 1999), expressly incorporated herein by reference, relates to a method and apparatus for storing an Internet user's identity and access rights to World Wide Web resources. A method and apparatus for obtaining user information to conduct secure transactions on the Internet without having to re-enter the information multiple times is described. The method and apparatus can also provide a technique by which secured access to the data can be achieved over the Internet. A passport containing user-defined information at various security levels is stored in a secure server apparatus, or passport agent, connected to computer network. A user process instructs the passport agent to release all or portions of the passport to a recipient node and forwards a key to the recipient node to unlock the passport information.

U.S. Pat. No. 6,016,484 (Williams, et al., Jan. 18, 2000), expressly incorporated herein by reference, relates to a system, method and apparatus for network electronic payment instrument and certification of payment and credit collection utilizing a payment. An electronic monetary system provides for transactions utilizing an electronic-monetary system that emulates a wallet or a purse that is customarily used for keeping money, credit cards and other forms of payment organized. Access to the instruments in the wallet or purse is restricted by a password to avoid unauthorized payments. A certificate form must be completed in order to obtain an instrument. The certificate form obtains the information necessary for creating a certificate granting authority to utilize an instrument, a payment holder and a complete electronic wallet. Electronic approval results in the generation of an electronic transaction to complete the order. If a user selects a particular certificate, a particular payment instrument holder will be generated based on the selected certificate. In addition, the issuing agent for the certificate defines a default bitmap for the instrument associated with a particular certificate, and the default bitmap will be displayed when the certificate definition is completed. Finally, the number associated with a particular certificate will be utilized to determine if a particular party can issue a certificate.

U.S. Pat. No. 6,029,150 (Kravitz, Feb. 22, 2000), expressly incorporated herein by reference, relates to a system and method of payment in an electronic payment system wherein a plurality of customers have accounts with an agent. A customer obtains an authenticated quote from a specific merchant, the quote including a specification of goods and a payment amount for those goods. The customer sends to the agent a single communication including a request for payment of the payment amount to the specific merchant and a unique identification of the customer. The agent issues to the customer an authenticated payment advice based only on the single communication and secret shared between the customer and the agent and status information, which the agent knows about the merchant, and/or the customer. The customer forwards a portion of the payment advice to the specific merchant. The specific merchant provides the goods to the customer in response to receiving the portion of the payment advice.

U.S. Pat. No. 6,047,269 (Biffar, Apr. 4, 2000), expressly incorporated herein by reference, relates to a self-contained payment system with creating and facilitating transfer of circulating digital vouchers representing value. A digital voucher has an identifying element and a dynamic log. The identifying element includes information such as the transferable value, a serial number and a digital signature. The dynamic log records the movement of the voucher through the system and accordingly grows over time. This allows the system operator not only to reconcile the vouchers before redeeming them, but also to recreate the history of movement of a voucher should an irregularity like a duplicate voucher be detected. These vouchers are used within a self-contained system including a large number of remote devices that are linked to a central system. The central system can be linked to an external system. The external system, as well as the remote devices, is connected to the central system by any one or a combination of networks. The networks must be able to transport digital information, for example the Internet, cellular networks, telecommunication networks, cable networks or proprietary networks. Vouchers can also be transferred from one remote device to another remote device. These remote devices can communicate through a number of methods with each other. For example, for a non-face-to-face transaction the Internet is a choice, for a face-to-face or close proximity transactions tone signals or light signals are likely methods. In addition, at the time of a transaction a digital receipt can be created which will facilitate a fast replacement of vouchers stored in a lost remote device.

Micropayments

U.S. Pat. No. 5,999,919 (Jarecki, et al., Dec. 7, 1999), expressly incorporated herein by reference, relates to an efficient micropayment system. Existing software proposals for electronic payments can be divided into "on-line" schemes which require participation of a trusted party (the bank) in every transaction and are secure against overspending, and "off-line" schemes which do not require a third party and guarantee only that overspending is detected when vendors submit their transaction records to the bank (usually at the end of the day). A new "hybrid" scheme is proposed which combines the advantages of both "on-line" and "off-line" electronic payment schemes. It allows for control of overspending at a cost of only a modest increase in communication compared to the off-line schemes. The protocol is based on probabilistic polling. During each transaction, with some small probability, the vendor forwards information about this transaction to the bank. This enables the bank to maintain an accurate approximation of a customer's spending. The frequency of polling messages is related to the monetary value of transactions and the amount of overspending the bank is willing to risk. For transactions of high monetary value, the cost of polling approaches that of the on-line schemes, but for micropayments, the cost of polling is a small increase over the traffic incurred by the off-line schemes.

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/or a vendor/rights-holder to validate a transaction, at low transactional costs.

Neural Networks

The resources relating to Neural Networks, listed in the Neural Networks References Appendix, each of which is expressly incorporated herein by reference, provides a sound basis for understanding the field of neural networks (and the subset called artificial neural networks, which distinguish biological systems) and how these might be used to solve problems. A review of these references will provide a state of knowledge appropriate for an understanding of aspects of the invention which rely on Neural Networks, and to avoid a prolix discussion of no benefit to those already possessing an appropriate state of knowledge.

Telematics

The resources relating to telematics listed in the Telematics Appendix, each of which is expressly incorporated herein by reference, provides a background in the theory and practice of telematics, as well as some of the underlying technologies. A review of these references is therefore useful in understanding practical issues and the context of functions and technologies which may be used in conjunction with the advances set forth herein.

BRIEF DESCRIPTION OF THE DRAWINGS

The drawings show:

FIG. 3 shows a model of the output of a Markov chain as a mixture of Gaussians;

FIGS. 4A-4C show an input-output, a factorial, and a coupled Hidden Markov Model (HMM), respectively;

DESCRIPTION OF THE INVENTION

Figure 1:
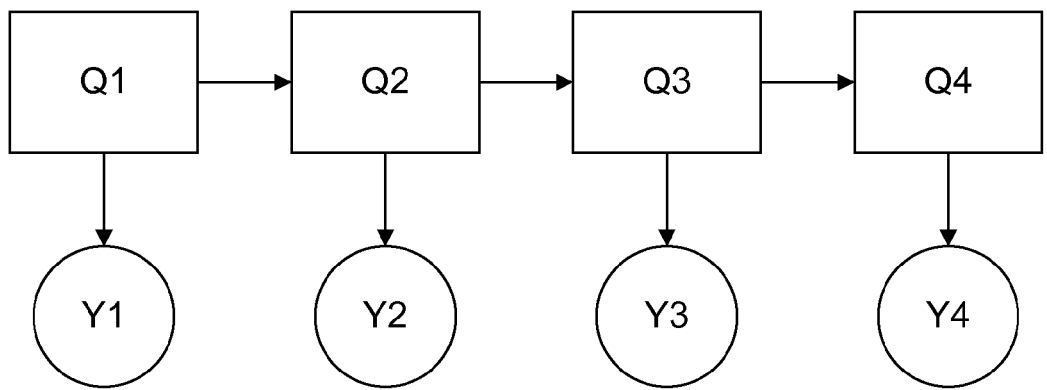
FIG. 1 shows a Bayesian Network.
Figure 2:
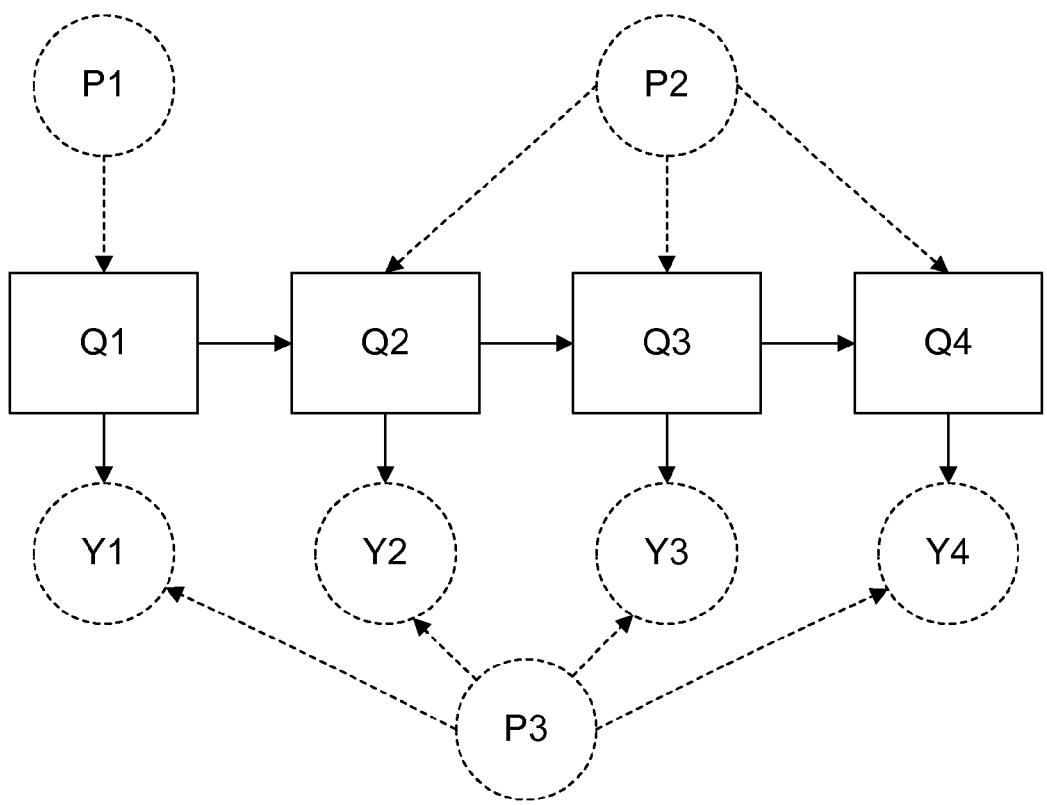
FIG. 2 shows a Markov chain.

The present invention seeks, among other aspects, to apply aspects of optimization theory to the control and arbitration of communities of resources, that is, elements or agents which operate independently and therefore cannot be directly controlled without compromise. Rather, the system is controlled by providing incentives and disincentives for various behaviors and actions seeking to promote an efficient outcome for the system as a whole, given the external constraints. Each agent then maximizes its own state based on its own value function, in light of the incentives and disincentives, resulting in an optimal network.

This optimization employs elements of game theory, and the present invention therefore invokes all those elements encompassed within its scope as applied to the problems and systems presented. The ad hoc network of elements typically reside within "communities", that is, the present invention does not particularly seek to apply principles to trivial networks which can be optimized without compromise or arbitration, although its principles may be applicable. The present invention therefore applies to the enhancement or optimization of communities. These communities may themselves have various rules, reputation hierarchies, arrangements or cultures, which can be respected or programmed as a part of the system operation, or merely operate as constraints on optimization. Thus, in accordance with a game theoretic analysis, various rules and perceived benefits may be applied to appropriately model the real system, or may be imposed to control behavior.

These communities may be formed or employed for various purposes, and typically interoperate in a "commons" or economy, in which all relevant actions of each member of the community have an effect on others, and this effect can be quantified or normalized into "economic" terms. For example, a typical application of this technology would be to arbitrate access to a common or mutually interfering medium, such as a communications network. By optimizing communications, the greatest aggregate value of communications will generally be achieved, which may or may not correspond to a greatest aggregate communications bandwidth. For example, both quantity and quality of service may be independent (or semi-independent) parameters. Thus, the system tends to promote a high quality of service (or at least as high a quality as is required) over a bulk volume of service. This, in turn, permits new applications which depend on reliable communications.

A general type of economic optimization is a market economy, in which independent agents each act to maximize their respective interests. A subset of a market is an auction, in which a resource is allocated to a highest valued user or consumer, or a user or consumer acquires a resource at a lowest cost, in a single process. In a market economy, agents may act as peers, and each agent may act as a source of supply or assert a demand. That is, at some market price, a consumer may relinquish assets to others and become a supplier. Generally, a consumer has a higher private value for a resource than a supplier. The supper, for example, may have a lower cost to obtain the resource, or a lower value for consumption of the resource, or both. Peers that both buy and sell a resource may seek to arbitrage, that is, seek to establish a committed source of supply at a lower cost than a committed purchaser, thus assuring a profit. In order to be effective, arbitrage requires that the intermediary have an advantage, or else the ultimate buyer would transact directly with the ultimate seller. The advantage(s) may be, for example, information, proprietary elements or methods, location, lower transactional costs, available capital, risk tolerance, storage facility, or the like.

So long as the advantage does not derive from an economically inefficient monopoly or other structure that artificially and/or "illegally" limits the efficiency of other agents, the arbitrage agent increases net efficiency of the network. That is, the presence and action of the arbitrage agent increases the economic surplus of the transaction and the market in general.

An object of the present invention therefore seeks to overcome the inefficiency of seeking to solve a complex NP-complete optimization problem by providing arbitrage opportunities that allow a market solution to the optimization which balances optimization cost with intermediary profits. Accordingly, while the net result may deviate from an abstract optimum condition, when one considers the cost of achieving this abstract optimum, the arbitrage mediated result is superior in terms of market surplus. The availability of arbitrage and intermediaries therefore allows a particular agent to balance its own optimization costs against overall gains.

The subject of complexity theory, including combinatorial optimization, and solution of approximation of NP-complete problems, has been extensively studied. See, e.g., the references set forth in the combinatorial optimization and auction appendix, which are expressly incorporated herein by reference.

Assuming a set of rational agents, each agent will seek to locally optimize its state to achieve the greatest gains and incur the lowest net costs. Thus, in a system which seeks to optimize a network of such agents, by permitting each agent to optimize its local environment state, the network may then be approximated by a network of local, environments, each typically comprising a plurality of agents. Thus, in the same way as the complexity of an NP-complete problem grows in polynomial space, the simplification of an NP complete problem will also be polynomial. While this simplification incurs an inefficiency, each agent models a proximate region in the space of interest, which tends to be linear (i.e., superposable) in a preferred embodiment. Agents compete with each other, and therefore the incentive to distort is limited. Likewise, since the preferred simplification of the problem does not impose a heuristic (i.e., a substitution of a first relatively simpler or more readily analytic algorithm for a second more intractable algorithm), it does not accordingly distort the incentives from those inherent in the basic optimization.

In a simple auction, a role is imposed on an agent, while in a market an agent can choose its own role dynamically, in a series of transactions, dependent on its own value function. In a market, a set of agents having a resource or requiring a resource seek to interact to reallocate the resource, such that the needs are generally satisfied, up to a "market clearing price". That is, individual agents transact to transfer the resource from those with supply to those with demand, at a price between the private values of the two agents, which reallocation occurs until the demand ask price is higher than the supply bid price. An auction is designed to maximize the economic surplus, which is then typically allocated to the more restrictive of the source of supply or consumer or the sponsor. A market, on the other hand, generally operates to minimize the gap between bids and asks over an extended period, and thus the economic surplus tends to proportionate based on the balance of supply and demand at the clearing price. The particular reallocation also depends on the state of information of each agent, inefficiencies in transfer, and the like.

Where a need or supply is not unitary, one possible means for achieving an optimal solution is a combinatorial auction, in which multiple suppliers, or multiple consumers, or both, reallocate the resource or portions thereof. Thus, a single need is not met by a single supplier, but rather there are at least three parties to a transaction. The net result is a competition between parties that raises the potential for a holdout. In fact, one way to circumvent this issue (a "holdout" problem) is to have direct or indirect (bypass) competition for each element.

In such a circumstance, no agent can effectively demand more than the least cost alternate(s).

A combinatorial auction (multifactorial optimization, also known as a Vickrey Clarke Grove [VCG] Auction) seeks to match, for the entire network of possibilities, the highest valued users with the lowest cost suppliers. This leads, however, to a surplus between the two, which must be allocated. In a one-to-many auction, the surplus is generally allocated to the restricted agent, i.e., the agent(s) with "market power". On the other hand, in an optimal market, the surplus will tend toward zero. That is, the profit to each party will tend toward a competitive mean, with higher profits only gained by undertaking higher risk. In imperfect markets, arbitrage opportunities exist, where profits can be made by trading the same resource.

In a multihop ad hoc network, a path between source and destination consists of a number of legs, with alternate paths available for selection of an optimum. If each node has its own distinct destination, there will likely be competing demands for each intermediate communication node.

One way to promote revealing a private value is if the end result of the process does not penalize those with aberrantly high or low values. One known method is to compute the result of the process as if the bidder or askor was not involved, leading to a so-called second price. Thus, the highest bidder wins, at a price established by a second highest bid. A lowest askor wins, at a price established by the second lowest askor. In a market, the highest bidder and lowest askor win, with a second price dependant on a more restrictive of supply and demand. In a combinatorial auction, this may be extended to price each component as if the highest bidder was uninvolved. In one embodiment of the invention, the second price applies to both buyer and seller, respectively, with the economic surplus allocated to other purposes. Thus, in this case, neither party gains the particular benefit of an imbalance of supply and demand. In fact, this perturbs the traditional market somewhat, in that an imbalance in supply and demand does not particularly recruit new market entrants in the same manner as an allocation of the surplus.

Arbritage

The present invention seeks to model, within a microeconomy, the elements of the real economy which tend to improve efficiency toward "perfection", that is, a perfect universal balance of supply and demand, for which no strategy (other than bidding a true private value) will produce a superior result.

These efficiency producing elements, paradoxically, are the parasitic elements which thrive off of predictable inefficiencies. That is, by promoting competition among the parasitic elements, an efficient balance of optimization of the direct market and optimization of the derivative markets will produce an overall superior result to an optimization of the direct market alone.

While the use of derivative markets in real economies is well known, the implementation of these as aspects of microeconomies and isolated markets is not well known, and a part of an embodiment of the present invention. For example, in a corporate bankruptcy auction, there are often resellers present who seek to purchase assets cheaply at a "wholesale" price, and to redistribute them on a less urgent basis or in smaller quantities, or at a different location, or otherwise transformed, and to sell them at a higher "retail" price. The auction price is determined by the number and constitution of bidders, as well as the possibility of proxy or absentee bidding. In fact, we presume that the auctioneers themselves are efficient, and that significantly higher bid prices are not available in a modified process without incurring substantial investment, risk, or delay. Indeed, these premises in a narrow sense might be false, i.e., a rational auctioneer might indeed make greater investment, undertake higher risk, or incur greater delay. However, this possible inefficiency merely shifts the allocation of the surplus, and to the extent there is a substantial gain to be made, encourages arbitrage, which in turn encourages competition at subsequent auctions, leading to at least a partial remediation of the allocation "error" in the long term, over a series of auctions.

Therefore, the market system, with derivative and arbitrage possibilities, and deviations from optimal performance is at least partially self-correcting over the long term.

Likewise, because the system has mechanisms for reducing the effects of imperfections in the presumptions and/or the conformance of a real system to the stated mechanisms and applicable rules, particular aspects of the system which impose administrative or overhead burdens may be circumvented by imposing less restrictive criteria and allowing a "self correcting" mechanism to remediate. Thus, for example, if a theoretically ideal mechanism imposes a 15% burden due to overhead, thus achieving an 85% overall efficiency (100−15=85), while a simplifying presumption achieves a result which imposes a 20% efficiency impairment but only a 2% overhead factor (100−20−2=78), and an arbitrage mechanism is available to correct the simplified model to gain 12% efficiency with another 2% overhead (78+12−2), the net result is 88% efficiency, above that of the theoretically ideal mechanism.

An arbitrage mechanism seeks to identify inefficiency based on superior information or mechanism, and a pricing or value disparity, and conduct a countertrade seeking to exploit the disparity while undertaking relatively low risk, to increase overall market efficiency. (That is, to ultimately reallocate resources from a lower valued holder to a higher valued holder).

An ad hoc network generally presents a case where individual nodes have imperfect information, and efforts to gain better information invariably lead to increased overhead. Therefore, by intentionally truncating the information gathering and discovery aspect of the ad hoc network, a residual arbitrage opportunity will remain, but the inherent inefficiency of the arbitrage may be less than the corresponding overhead involved in providing more perfect information to the individual nodes (i.e., overall arbitrage cost is less than efficiency gain).

As such, a design feature of an embodiment of the invention is to provide or even encourage arbitrage mechanisms and arbitrage opportunities, in an effort to improve overall system efficiency. In fact, an embodiment of the system is preferably constructed to regularly provide arbitrage opportunities which can be conducted with low risk and with substantial market efficiency gains, and these arbitrage opportunities may be an important part of the operation of the embodiment.

A second opportunity provides risk transference, such as debt transactions, insurance, and market-making, and/or the like. In such transactions, a market risk is apparent. Each node, on the other and, has its own subjective risk tolerance. Likewise, the market risk provides an opportunity for nodes having a high risk tolerance to improve yield, by trading risk for return. Those nodes which have generally greater liquid resources, which inherently have no return while uninvested, and may permit other nodes having lesser resources to borrow, at interest. Because there is a risk of non-payment, nodes may have different credit ratings, and this creates an opportunity for credit rating "agencies" and/or guarantors. In an ad hoc network, there is also a possibility for delivery failure, which, in turn, provides an opportunity for insurance.

Fair Allocation Perturbed by Hierarchal Considerations

In a typical auction, each player is treated fairly; that is, the same rules apply to each player, and therefore a single economy describes the process. The fair auction therefore poses challenges for an inherently hierarchal set of users, such as a military organization, where rank is accompanied by privilege. The net result, however, is a decided disadvantage to lower ranking agents, at least when viewed in light of constricted self-interest. The issues that arise are similar to the relating to "altruism", although not identical, and thus the game theoretic analysis of altruistic behavior may be imported for consideration as appropriate.

In a mobile ad hoc communications network, a real issue is user defection or non-compliance. For example, where a cost is imposed on a user for participating in the ad hoc network, e.g., battery power consumption, if the anticipated benefit does not exceed the cost, the user will simply turn off the device until actually needed. The result of mass defection will, of course, be the instability and failure of the ad hoc network itself, leading to decreased utility, even for those who gain an unfair or undue advantage under the system. Thus, perceived fairness and net benefit is required to network success, assuming that defection and/or non-compliance are possible.

On the other hand, in military systems, the assertion of rank as a basis for priority is not itself arbitrary and capricious. Orders and communications from a central command are critical for the organization itself, and thus the lower ranking agents gain at least a peripheral benefit as their own chain of command employs their resources. Therefore, the difficulty in analyzing the application of a fair game to a hierarchal organization is principally a result of conceptualizing and aligning the individual incentives with those of the organization as a whole and the relationship between branches. Thus, in contradistinction to typical self-organizing peer-to-peer networks, a hierarchal network is not seen as self-organizing, at least in terms of the hierarchy, which is extrinsic to the formation of the communications network under consideration.

As discussed below, the "distortions" of the network imposed by the external hierarchy can be analyzed and accounted for by, for example, the concepts of inheritance and delegation. Thus, each branch of a hierarchy tree may be considered an object, which receives a set of characteristics from its root, and from which each sub-branch inherits the characteristics and adds subcharacteristics of, for example, specialization. It is noted that the hierarchy need not follow non-ambiguous or perfect rules, and thus there is no particular limit imposed that the hierarchy necessarily follow these formalisms. Rather, by analyzing those aspects of the hierarchy which comply with these formalisms in accordance therewith, efficiency is facilitated.

In establishing an economic system, a preliminary question is whether the system is microeconomic or macroeconomic; that is, whether the economy is linked to a real economy or insulated from it. One disadvantage of a real economy with respect to a peer relationship is that external wealth can override internal dynamics, thus diminishing the advantages to be gained by optimization, and potentially creating a perception of unfairness for externally less wealthy agents, at least unless and until the system accomplishes a wealth redistribution. An artificial economy provides a solution for a peer network in which each node has an equal opportunity to gain control over the ad hoc network, independent of outside influences. On the other hand, by insulating the network from external wealth redistribution, real efficiency gains may be unavailable. Therefore, both types of economies, as well as hybrids, are available. Thus, as discussed in more detail below, a "fair" initial (or recurring) wealth distribution may be applied, which may be supplemented with, and/or provide an output of, external wealth. The rules or proportion of external influence may be predetermined, adaptive, or otherwise.

In accordance with the proposed artificial economy, each node has a generator function for generating economic units, which are then used in an auction with other nodes to create a market economy, that is, each node has a supply and demand function, and acts as a source or sink for a limited resource. In some cases, nodes may have only supply or demand functions, or a degree of asymmetry, but in this case, these are typically subject to an external economic consideration, and the artificial economy will be less effective in providing appropriate incentives. According to this embodiment, the artificial economic units have a temporally and spatially declining value, so that wealth does not accumulate over long periods and cannot be transferred over large distances. The decline may be linear, exponential, or based on some other function. This creates a set of microeconomies insulated from each other. Where distant microeconomies must deal with each other, there is a discount. This architecture provides a number of advantages, for example, by decreasing the influence of more spatially and temporally distant effects, the scope of an optimization analysis may be relatively constrained, while reducing the amount of information which must be stored over time and/or carried over distance in order to permit an optimization. Likewise, since the economy is artificial, the discount need not be recouped within the scope of the system. In the same manner, a somewhat different incentive structure may be provided; that is, economic units generated at one location and at one time may have a higher value at a different location and time; this may encourage reduced immediate use of the system, and relocation to higher valued locations. As discussed below, one embodiment of the invention permits trading of credits, and thus, for example, a user may establish a repeater site at an underserved location to gain credits for use elsewhere. Preferably, beyond a "near field" effect, the value does not continue to increase, since this may result in inflationary pressures, and undermine the utility of the system in optimally balancing immediate supply and demand at a particular location.

As can be seen, through modifications of the governing rules and formulae, the system can be incentivized to behave in certain ways, but care should be exercised since a too narrow analysis of the incentive might result in unintended effects. To the extent that human behavior is involved, care should also be exercised in applying a rationality assumption, since this is not always true. Rather, there may be applicable models for human irrational behavior that are better suited to an understanding of the network behavior in response to a perturbation.

The typical peer-to-peer ad hoc network may be extended to the hierarchal case by treating each branch (including sub-branches) within the chain of command as an economic unit with respect to the generator function. At any level of the hierarchy, the commander retains a portion of the wealth generation capacity, and delegates the remainder to its subordinates. Therefore, the rank and hierarchal considerations are translated to an economic wealth (or wealth generation) distribution. One aspect of this system allows wealth transfer or redistribution, although in a real system, a time delay is imposed, and in the event of a temporally and/or spatially declining value, the transfer will impose a cost. Thus, an initial misallocation is undesired, and there will be an incentive to optimally distribute the wealth initially. Of course, if centralized control with low penalty is desired, it is possible to limit the penalty, of any, for wealth redistribution through appropriate rules, although the time for propagation through the network remains an issue, and blind nodes (i.e., those which do not have an efficient communication path, or have insufficient resources to utilize otherwise available paths through the hierarchy) may also lead to limitations on system performance.

In this system, there may be an economic competitive distortion, under which a node's subjective value of a resource is influenced by its then subjective wealth. If a node is supplied with wealth beyond its needs, the wealth is wasted, since it declines in value and cannot be hoarded indefinitely. (In a network wealth model in which wealth could be hoarded indefinitely, small deviations from optimality and arbitrage opportunities may be exploited to create a perception of unfairness, thus, this is not preferred.) If a node is supplied with insufficient wealth, economic surplus through transactional gains are lost. Thus, each node must analyze its expected circumstances to retain or delegate the generator function, and to optimally allocate wealth between competing subordinates. Likewise, there may be a plurality of quasi-optimal states.

In any economic transaction, there is an amount that a seller requires to part with the resource, a price a buyer is willing to pay, and a surplus between them. Typically, in a two party transaction, the surplus is allocated to the party initiating the transaction, that is, the party initiating the transaction uses some discovery mechanism to find the minimum price acceptable by the buyer. In brokered or agent-mediated transactions, a portion of the surplus is allocated to a facilitator. In accordance with this aspect of the present invention, compliance with the community rules, as well as an incentive to bid or ask a true private value is encouraged by distributing a portion of the transaction surplus to competitive bidders in accordance with their reported valuations. In particular, the competitive bidders seeking to allocate a scarce resource for themselves receive compensation for deferring to the winning bidder in an amount commensurate with their reported value. Thus, sellers receive their minimum acceptable value, buyers pay their maximum valuation, the surplus is distributed to the community in a manner tending to promote the highest bids, that is, the true bidder value (or even possibly slightly higher). In a corresponding manner, the auction rules can be established to incentivized sellers to ask the minimum possible amount. For example, a portion of the surplus may be allocated to bidders in accordance with how close they come to the winning ask. Therefore, both incentives may be applied, for example with the surplus split in two, and half allocated to the bidder pool and half allocated to the seller pool. Clearly, other allocations are possible.

The winning bidder and/or seller may be included within the rebate pool. This is particularly advantageous where for various reasons, the winning bidder is not selected. Thus, this process potentially decouples the bidding (auction) process and the resulting commercial transaction. It may also be useful to apply Vickrey (second price) rules to the auction, that is, the winning bidder pays the second bid price, and/or the winning seller pays the second ask price.

Because of transactional inefficiencies, human behavioral aspects, and a desire to avoid increased network overhead by "false" bidders seeking a share of the allocation pool without intending to win the auction, it may be useful to limit the allocation of the surplus pool to a subset of the bidders and/or sellers, for example the top three of one or both. This therefore encourages bidders and/or sellers to seek to be in the limited group splitting the pool, and thus incentivizes higher bids and lower asks. Of course, a party will have a much stronger incentive to avoid bidding outside its valuation bounds, so the risk of this type of inefficiency is small.

As discussed above, one embodiment of the invention provides a possible redistribution or wealth among nodes within a hierarchal chain. This redistribution may be of accumulated wealth, or of the generation function portion. Trading among hierarchally related parties is preferred, since the perceived cost is low, and the wealth can be repeatedly redistributed. In fact, it is because of the possibility of wealth oscillation and teaming that the declining wealth function is preferred, since this will tend to defeat closely related party control over the network for extended periods.

It is noted that, in a multihop mobile ad hoc network, if a communication path fail, no further transfers are possible, potentially resulting in stalled or corrupt system configuration. It is possible to transfer an expiring or declining portion of the generating function; however, this might lead a node which is out of range to have no ability to rejoin the network upon return, and thus act as an impediment to efficient network operation. Therefore, it is preferred that, in an artificial economy, each node has some intrinsic wealth generator function, so an extended period of inactivity, a node gains wealth likely sufficient to rejoin the network as a full participant.

In practice, in a typical military-type hierarchy, the bulk of the wealth generating function will be distributed to the lowest ranks with the highest numbers. Thus, under normal circumstances, the network will appear to operate according to a non-hierarchal (i.e., peer-to-peer) model, with the distortion that not all nodes have a common generator function. On the other hand, hierarchically superior nodes either retain, or more likely, can quickly recruit surrounding subordinates to allocate their wealth generating function and accumulated wealth to pass urgent or valuable messages. Thus, if 85% of the wealth and network resources are distributed to the lowest-ranking members, then the maximum distortion due to hierarchal modifications is 15%.

One way that this allocation of wealth may be apparent is with respect to the use of expensive assets. Thus, a high level node might have access to a high power broadcast system or licensed spectrum, while low level nodes might ordinarily be limited to lower power transmission and/or unlicenced spectrum or cellular wireless communications. For a low level node to generate a broadcast using an expensive asset (or to allocate a massive amount of space bandwidth product), it must pass the request up through the chain of command, until sufficient wealth (i.e., authority) is available to implement the broadcast.

In fact, such communications and authorizations are quite consistent with the expectations within a hierarchal organization, and this construct is likely to be accepted within a military-type hierarchal organization.

Under normal circumstances, a superior would have an incentive to assure that each subordinate node possesses sufficient wealth to carry out its function and be incentivized to participate in the network. If a subordinate has insufficient initial wealth (or wealth generating function) allocation, it may still participate, but it must expend its internal resources to obtain wealth for participation in its own benefit. This, in turn, leads to a potential exhaustion of resources, and the unavailability of the node for ad hoc intermediary use, even for the benefit of the hierarchy. An initial surplus allocation will lead to overbidding for resources, and thus inefficient resource allocation, potential waste of allocation, and a disincentive to act as an intermediary in the ad hoc network. While in a traditional military hierarchy, cooperation can be mandated, in systems where cooperation is perceived as contrary to the net personal interests of the actor, network stability may be poor, and defection in spite of mandate.

In a military system, it is thus possible to formulate an "engineered" solution which forces participation and eliminates defection; however, it is clear that such solutions forfeit the potential gains of optimality, and incentivizes circumvention and non-compliance. Further, because such a system is not "cost sensitive" (however the appropriate cost function might be expressed), it fails to respond to "market" forces.

Accordingly, a peer to peer mobile ad hoc network suitable for respecting hierarchal organization structures is delegation is provided. In this hierarchal system, the hierarchy is represented by an initial wealth or wealth generation function distribution, and the hierarchally higher nodes can reallocate wealth of nodes beneath themselves, exercising their higher authority. This wealth redistribution can be overt or covert, and if overt, the hierarchal orders can be imposed without nodal assent. In a covert redistribution, trust may be required to assure redistribution by a node to a grandchild node. The wealth and its distribution can be implemented using modified micropayment techniques and other verifiable cryptographic techniques. This wealth can be applied to auctions and markets, to allocate resources. Various aspects of this system are discussed in more detail elsewhere in this specification.

Manet System

Multihop Ad Hoc Networks require cooperation of nodes which are relatively disinterested in the content being conveyed. Typically, such disinterested intermediaries incur a cost for participation, for example, power consumption or opportunity cost. Economic incentives may be used to promote cooperation of disinterested intermediaries, also known as recruitment. An economic optimization may be achieved using a market-finding process, such as an auction. In many scenarios, the desire for the fairness of an auction is tempered by other concerns, i.e., there are constraints on the optimization which influence price and parties of a transaction. For example, in military communication systems, rank may be deemed an important factor in access to, and control over, the communications medium. A simple process of rank-based preemption, without regard for subjective or objective importance, will result in an inefficient economic distortion. In order to normalize the application of rank, one is presented with two options: imposing a normalization scheme with respect to rank to create a unified economy, or providing considering rank using a set of rules outside of the economy. One way to normalize rank, and the implicit hierarchy underlying the rank, is by treating the economy as an object-oriented hierarchy, in which each individual inherits or is allocated a subset of the rights of a parent, with peers within the hierarchy operating in a purely economic manner. The extrinsic consideration of rank, outside of an economy, can be denominated "respect", which corresponds to the societal treatment of the issue, rather than normalizing this factor within the economy, in order to avoid unintended secondary economic distortion. Each system has its merits and limitations.

An economic optimization is one involving a transaction in which all benefits and detriments can be expressed in normalized terms, and therefore by balancing all factors, including supply and demand, at a price, an optimum is achieved. Auctions are well known means to achieve an economic optimization between distinct interests, to transfer a good or right in exchange for a market price. While there are different types of auctions, each having their limitations and attributes, as a class these are well accepted as a means for transfer of goods or rights at an optimum price. Where multiple goods or rights are required in a sufficient combination to achieve a requirement, a so-called Vickrey-Clarke-Groves (VCG) auction may be employed. In such an auction, each supplier asserts a desired price for his component. The various combinations which meet the requirement are then compared, and the lowest selected. In a combinatorial supply auction, a plurality of buyers each seek a divisible commodity, and each bids its best price. The bidders with the combination of prices which is maximum are selected. In a commodity market, there are a plurality of buyers and sellers, so the auction is more complex. In a market economy, the redistribution of goods or services is typically transferred between those who value them least to those who value them most. The transaction price depends on the balance between supply and demand; with the surplus being allocated to the limiting factor.

Derivatives, Hedges, Futures and Insurance

In a market economy, the liquidity of the commodity is typically such that the gap between bid and ask is small enough that the gap between them is small enough that it is insignificant in terms of preventing a transaction. In a traditional market, the allocation of the surplus oscillates in dependence on whether it is a buyer's or seller's market. Of course, the quantum of liquidity necessary to assure an acceptably low gap is subjective, but typically, if the size of the market is sufficient, there will be low opportunity for arbitrage, or at least a competitive market for arbitrage. The arbitrage may be either in the commodity, or options, derivatives, futures, or the like.

In a market for communications resources, derivatives may provide significant advantages over a simple unitary market for direct transactions. For example, a node may wish to procure a reliable communications pathway (high quality of service or QoS) for an extended period. Thus, it may seek to commit resources into the future, and not be subject to future competition for or price fluctuation of those resources, especially being subject to a prior broadcast of its own private valuation and a potential understanding by competitors of the presumed need for continued allocation of the resources. Thus, for similar reasons for the existence of derivative, options, futures, etc. markets in the real economy, their analogy may be provided within a communications resource market.

In a futures market analogy, an agent seeks to procure its long-term or bulk requirements, or seeks to dispose of its assets in advance of their availability. In this way, there is increased predictability, and less possibility of self-competition. It also allows transfer of assets in bulk to meet an entire requirement or production lot capability, thus increasing efficiency and avoiding partial availability or disposal.

One issue in mobile ad hoc networks is accounting for mobility of nodes and unreliability of communications. In commodities markets, one option is insurance of the underlying commodity and its production. The analogy in communications resource markets focuses on communications reliability, since one aspect of reliability, nodal mobility is "voluntary" and not typically associated with an insurable risk. On the other hand, the mobility risk may be mitigated by an indemnification. In combination, these, and other risk transfer techniques, may provide means for a party engaged in a communications market transaction to monetarily compensate for risk tolerance factors. An agent in the market having a low risk tolerance can undertake risk transference, at some additional but predetermined transaction costs, while one with a high risk tolerance can "go bare" and obtain a lower transaction cost, or undertake third party risk for profit.

Insurance may be provided in various manners. For example, some potential market participants may reserve wealth, capacity or demand for a fee, subject to claim in the event of a risk event. In other cases, a separate system may be employed, such as a cellular carrier, to step in, in the event that a lower cost resource is unavailable (typically for bandwidth supply only). A service provider may provide risk-related allocations to network members in an effort to increase perceived network stability; likewise, if the network is externally controlled, each node can be subject to a reserve requirements which is centrally (or hierarchally) allocated.

If an agent promises to deliver a resource, and ultimately fails to deliver, it may undertake an indemnification, paying the buyer an amount representing "damages", the transaction cost of buyer, e.g., the cost of re-procurement plus lost productivity. Likewise, if an agent fails to consume resources committed to it, it owes the promised payment, less the resale value of the remaining resources. An indemnification insurer/guarantor can undertake to pay the gap on behalf of the defaulting party. Typically, the insurer is not a normal agent peer, but can be.

Hedge strategies may also be employed in known manner.

In order for markets to be efficient, there must be a possibility of beneficial use or resale of future assets. This imposes some complexity, since the assets are neither physical nor possessed by the intermediary. However, cryptographic authentication of transactions may provide some remedy. On the other hand, by increasing liquidity and providing market-makers, the transaction surplus may be minimized, and thus the reallocation of the surplus as discussed above minimized. Likewise, in a market generally composed of agents within close proximity, the interposition of intermediaries may result in inefficiencies rather than efficiencies, and the utility of such complexity may better come from the facilitation of distant transactions. Thus, if one presumes slow, random nodal mobility, little advantage is seen from liquid resource and demand reallocation. On the other hand, if an agent has a predefined itinerary for rapidly relocating, it can efficiently conduct transactions over its path, prearranging communication paths, and thus providing trunk services. Thus, over a short term, direct multihop communications provide long-distance communications of both administrative and content data. On the other hand, over a longer term, relocation of agents may provide greater efficiency for transport of administrative information, increasing the efficiency of content data communications over the limited communications resources, especially if a store-and-forward paradigm is acceptable.

It is noted that in an economy having persistent and deep use of financial derivatives, a stable currency is preferred, and the declining value credit discussed above would provide a disincentive to agents who might otherwise take risks over a long time-frame. It is possible, however, to distinguish between credits held by "consumers" and those held by "arbitrageurs" or institutions, with the former having a declining value but can be spent, and those which have a stable value but must be first converted (at some possible administrative cost) for consumer use.

Bandwidth Auction

A previous scheme proposes the application of game theory in the control of multihop mobile ad hoc networks according to "fair" principles. In this prior scheme, nodes seeking to control the network (i.e., are "buyers" of bandwidth), conduct an auction for the resources desired. Likewise, potential intermediate nodes conduct an auction to supply the resources. The set of winning bidders and winning sellers is optimized to achieve the maximum economic surplus. Winning bidders pay the maximum bid price or second price, while winning sellers receive their winning ask or second price. The remaining surplus is redistributed among the winners and losing bidders, whose cooperation and non-interference with the winning bidders is required for network operation. The allocation of the portion to losing bidders is, for example, in accordance with their proportionate bid for contested resources, and for example, limited to the few (e.g., 3) highest bidders or lowest offerors. The winning bids are determined by a VCG combinatorial process. The result is an optimum network topology with a reasonable, but by no means the only, fairness criterion, while promoting network stability and utility.

The purpose of rewarding losers is to encourage recruitment, and therefore market liquidity. In order to discourage strategic losing bids, one possible option is to impose a statistical noise on the process to increase the risk that a strategically losing bid will be a winning bid. Another way is to allocate the available surplus corresponding to the closeness of the losing bid to the winning bid, not merely on its magnitude. Alternately, a "historical" value for the resource may be established, and an allocation made only if the bid is at or above the trailing mean value. Further, the loser's allocation may be dependent on a future bid with respect to a corresponding resource at or above the prior value. In similar manner, various algorithms for surplus allocation may be designed to encourage recruitment of agents seeking to win, while possibly discouraging bidders who have little realistic possibility of winning. Bidders who do not seek to win impose an inefficiency on the network, for example requiring other agents to communicate, evaluate, acknowledge, and defer to these bids. Therefore, a relatively small bidding fee may be imposed in order to assert a bid, which may be used to increase the available surplus to be allocated between the winning and top losing bidders.

As discussed above, risk may be a factor in valuing a resource. The auction optimization may therefore be normalized or perturbed in dependence on an economic assessment of a risk tolerance, either based on a personal valuation, or based on a third party valuation (insurance/indemnification). Likewise, the optimization may also be modified to account for other factors.

Thus, one issue with such a traditional scheme for fair allocation of resources is that it does not readily permit intentional distortions, that is, the system is "fair". However, in some instances, a relatively extrinsic consideration to supply and subjective demand may be a core requirement of a system. For example, in military systems, it is traditional and expected that higher military rank will provide access to and control over resources on a favored basis. (Note that, in contrast to an example discussed elsewhere herein, this favoritism is not enforced by a hierarchal wealth generation distribution). In civilian systems, emergency and police use may also be considered privileged. However, by seeking to apply economic rules to this access, a number of issues arise. Most significantly, as a privileged user disburses currency, this is distributed to unprivileged users, leading to an inflationary effect and comparative dilution of the intended privilege. If the economy is real, that is the currency is linked to a real economy, this grant of privilege will incur real costs, which is also not always an intended effect. If the economy is synthetic, that is, it is unlinked to external economies, then the redistribution of wealth within the system can grant dramatic and potentially undesired control to a few nodes, potentially conveying the privilege to those undeserving, except perhaps due to fortuitous circumstances such as being in a critical location or being capable of interfering with a crucial communication.

Two different schemes may be used to address this desire for both economic optimality and hierarchal considerations. One scheme maintains optimality and fairness within the economic structure, but applies a generally orthogonal consideration of "respect" as a separate factor within the operation of the protocol. Respect is a subjective factor, and thus permits each bidder to weight its own considerations. It is further noted that Buttyan et al. have discussed this factor as a part of an automated means for ensuring compliance with network rules, in the absence of a hierarchy. Levente Buttyan and Jean-Pierre Hubaux, Nuglets: a Virtual Currency to Stimulate Cooperation in Self-Organized Mobile Ad Hoc Networks, Technical Report DSC/2001/004, EPFL-DI-ICA, January 2001, incorporated herein by reference. See, P. Michiardi and R. Molva, CORE: A collaborative reputation mechanism to enforce node cooperation in mobile ad hoc networks, In B. Jerman-Blazic and T. Klobucar, editors, Communications and Multimedia Security, IFIP TC6/TC11 Sixth Joint Working Conference on Communications and Multimedia Security, Sep. 26-27, 2002, Portoroz, Slovenia, volume 228 of IFIP Conference Proceedings, pages 107-121. Kluwer Academic, 2002; Sonja Buchegger and Jean-Yves Le Boudec, A Robust Reputation System for P2P and Mobile Ad-hoc Networks, Second Workshop on the Economics of Peer-to-Peer Systems, June 2004; Po-Wah Yau and Chris J. Mitchell, Reputation Methods for Routing Security for Mobile Ad Hoc Networks; Frank Kargl, Andreas Klenk, Stefan Schlott, and Micheal Weber. Advanced Detection of Selfish or Malicious Nodes in Ad Hoc Network. The 1st European Workshop on Security in Ad-Hoc and Sensor Networks (ESAS 2004); He, Qi, et al., SORI: A Secure and Objective Reputation-based Incentive Scheme for Ad-Hoc Networks, IEEE Wireless Communications and Networking Conference 2004, each of which is expressly incorporated herein by reference.

The bias introduced in the system operation is created by an assertion by one claiming privilege, and deference by one respecting privilege. One way to avoid substantial economic distortions is to require that the payment made be based on a purely economic optimization, while selecting the winner based on other factors. In this way, the perturbations of the auction process itself is subtle, that is, since bidders realize that the winning bid may not result in the corresponding benefit, but incurs the publication of private values and potential bidding costs, there may be perturbation of the bidding strategy from optimal. Likewise, since the privilege is itself unfair and predictable, those with lower privilege ratings will have greater incentive to defect from, or act against, the network. Therefore, it is important that either the assertion of privilege be subjectively reasonable to those who must defer to it, or the incidence or impact of the assertions be uncommon or have low anticipated impact on the whole. On the other hand, the perturbation is only one-sided, since the payment is defined by the network absent the assertion of privilege.

In the extreme case, the assertion of privilege will completely undermine the auction optimization, and the system will be prioritized on purely hierarchal grounds, and the pricing non-optimal or unpredictable. This condition may be acceptable or even efficient in military systems, but may be unacceptable where the deference is voluntary and choice of network protocol is available, i.e., defection from the network policies is an available choice.

It is noted that those seeking access based on respect, must still make an economic bid. This bid, for example, should be sufficient in the case that respect is not afforded, for example, from those of equal rank or above, or those who for various reasons have other factors that override the assertion of respect. Therefore, one way to determine the amount of respect to be afforded is the self-worth advertised for the resources requested. This process therefore may minimize the deviation from optimal and therefore promotes stability of the network. It is further noted that those who assert respect based on hierarchy typically have available substantial economic resources, and therefore it is largely a desire to avoid economic redistribution rather than an inability to effect such a redistribution, that compels a consideration of respect.

In a combinatorial auction, each leg of a multihop link is separately acquired and accounted. Therefore, administration of the process is quite involved. That is, each bidder broadcasts a set of bids for the resources required, and an optimal network with maximum surplus is defined. Each leg of each path is therefore allocated a value. In this case, it is the winning bidder who defers based on respect, since the other resources are compensated equally and therefore agnostic.

Thus, if pricing is defined by the economic optimization, then the respect consideration requires that a subsidy be applied, either as an excess payment up to the amount of the winning bid, or as a discount provided by the sellers, down to the actually bid value.

Since the pricing is dependent on the network absent the respect consideration, there is an economic deficit or required subsidy. In some cases, the respected bidder simply pays the amount required, in excess of its actual bid. If we presume that the respected bidder could have or would have outbid the winning bidder, it then pays the third price, rather than the second price. If the respected bidder does not have, or will not allocate the resources, then the subsidy must come from the others involved. On one hand, since the respect in this case may be defined by the otherwise winning bidder, this bidder, as an element of its respect, may pay the difference. However, this cost (both the lost economic gains of the transaction and the subsidy) will quickly disincentivize any sort of grant of respect. The recipients could also provide a discount, however this would require consent of both the winning bidder and the recipients, making concluding the transaction more difficult. One other possibility is to request "donations" from nearby nodes to meet the subsidy, a failure of which undermines the assertion of respect.

Another alternate is to assume that there is a surplus between the aggregate winning bid and the aggregate cost, and so long as the bidder claiming respect pays the minimum cost, then the system remains operable, although the benefits of surplus allocation are lost, and all affected nodes must defer to this respect mechanism. In this case, it is more difficult to arbitrate between competing demands for respect, unless a common value function is available, which in this case we presume is not available.

The node demanding respect may have an impact on path segments outside its required route and the otherwise optimal interfering routes; and thus the required payment to meet the differential between the optimum network and the resulting network may thus be significant.

It is noted that, in the real economy, where the U.S. Government allocates private resources, it is required to pay their full value. This model appears rational, and therefore a preferred system requires a node claiming privilege and gaining a resulting benefit to pay the winning bid value (as an expression of market value), and perhaps in addition pay the winning bidder who is usurped its anticipated benefit, that is, the difference in value between the second price and its published private valuation, this having an economically neutral affect, but also requiring a respected node to potentially possess substantial wealth.

A further possible resolution of this issue provides for an assessment of an assertion of respect by each involved node. Since the allocation of respect is subjective, each bidder supplies a bid, as well as an assertion of respect. Each other node receives the bids and assertions, and applies a weighting or discount based on its subjective analysis of the respect assertion. In this case, the same bid is interpreted differently by each supplier, and the subjective analysis must be performed by or for each supplier. By converting the respect assertion into a subjective weighting or discount, a pure economic optimization may then be performed, with the subjectively perturbed result by each node reported and used to compute the global optimization.

An alternate scheme for hierarchal deference is to organize the economy itself into a hierarchy, as discussed in the first example. In a hierarchy, a node has one parent and possibly multiple children. At each level, a node receives an allocation of wealth from its parent, and distributes all or a portion of its wealth to children. A parent is presumed to control its children, and therefore can allocate their wealth or subjective valuations to its own ends. When nodes representing different lineages must be reconciled, one may refer to the common ancestor for arbitration, or a set of inherited rules to define the hierarchal relationships.

In this system, the resources available for reallocation between branches of the hierarchy depend on the allocation by the common grandparent, as well as competing allocations within the branch. This system presumes that children communicate with their parents and are obedient. In fact, if the communication presumption is violated, one must then rely on a priori instructions, which may not be sufficiently adaptive to achieve an optimal result. If the obedience presumption is violated, then the hierarchal deference requires an enforcement mechanism within the hierarchy. If both presumptions are simultaneously violated, then the system will likely fail, except on a voluntary basis, with results similar to the "reputation" scheme described herein.

Thus, it is possible to include hierarchal deference as a factor in optimization of a multihop mobile ad hoc network, leading to compatibility with tiered organizations, as well as with shared resources.

Game Theory

Use of Game Theory to control arbitration of ad hoc networks is well known. F. P. Kelly, A. Maulloo, and D. Tan. Rate control in communication networks: shadow prices, proportional fairness and stability. Journal of the Operational Research Society, 49, 1998. citeseer.ist.psu.edu/kelly98rate.html; J. MacKie-Mason and H. Varian. Pricing congestible network resources. IEEE Journal on Selected Areas in Communications, 13(7):1141-1149, 1995. Some prior studies have focused on the incremental cost to each node for participation in the network, without addressing the opportunity cost of a node foregoing control over the communication medium. Courcoubetis, C., Siris, V. A. and Stamoulis, G. D. Integration of pricing and flow control for available bit rate services in ATM networks. In Proceedings IEEE Globecom '96, pp. 644-648. London, UK. citeseer.ist.psu.edu/courcoubetis96integration.html.

A game theoretic approach addresses the situation where the operation of an agent which has freedom of choice, allowing optimization on a high level, considering the possibility of alternatives to a well designed system. According to game theory, the best way to ensure that a system retains compliant agents, is to provide the greatest anticipated benefit, at the least anticipated cost, compared to the alternates.

Game Theory provides a basis for understanding the actions of Ad hoc network nodes. A multihop ad hoc network requires a communication to be passed through a disinterested node. The disinterested node incurs some cost, thus leading to a disincentive to cooperate. Meanwhile, bystander nodes must defer their own communications in order to avoid interference, especially in highly loaded networks. By understanding the decision analysis of the various nodes in a network, it is possible to optimize a system which, in accordance with game theory, provides benefits or incentives, to promote network reliability and stability. The incentive, in economic form, may be charged to those benefiting from the communication, and is preferably related to the value of the benefit received. The proposed network optimization scheme employs a modified combinatorial (VCG) auction, which optimally compensates those involved in the communication, with the benefiting party paying the second highest bid price (second price). The surplus between the second price and VCG price is distributed among those who defer to the winning bidder according to respective bid value. Equilibrium usage and headroom may be influenced by deviating from a zero-sum condition. The mechanism seeks to define fairness in terms of market value, providing probable participation benefit for all nodes, leading to network stability.

Ad Hoc Networks

An ad hoc network is a wireless network which does not require fixed infrastructure or centralized control. The terminals in the network cooperate and communicate with each other, in a self organizing network. In a multihop network, communications can extend beyond the scope of a single node, employing neighboring nodes to forward messages to their destination. In a mobile ad hoc network, constraints are not placed on the mobility of nodes, that is, they can relocate within a time scale which is short with respect to the communications, thus requiring consideration of dynamic changes in network architecture.

Ad hoc networks pose control issues with respect to contention, routing and information conveyance. There are typically tradeoffs involving equipment size, cost and complexity, protocol complexity, throughput efficiency, energy consumption, and "fairness" of access arbitration. Other factors may also come into play. L. Buttyan and J.-P. Hubaux. Rational exchange—a formal model based on game theory. In Proceedings of the 2nd International Workshop on Electronic Commerce (WELCOM), November 2001. citeseer.ist.psu.edu/an01rational.html; P. Michiardi and R. Molva. Game theoretic analysis of security in mobile ad hoc networks. Technical Report RR-02-070, Institut Eurécom, 2002; P. Michiardi and R. Molva. A game theoretical approach to evaluate cooperation enforcement mechanisms in mobile ad hoc networks. In Proceedings of WiOpt '03, March 2003; Michiardi, P., Molva, R.: Making greed work in mobile ad hoc networks. Technical report, Institut Eurecom (2002) citeseer.ist.psu.edu/michiardi02making.html; S. Shenker. Making greed work in networks: A game-theoretic analysis of switch service disciplines. IEEE/ACM Transactions on Networking, 3(6):819-831, December 1995; A. B. MacKenzie and S. B. Wicker. Selfish users in aloha: A game-theoretic approach. In Vehicular Technology Conference, 2001. VTC 2001 Fall. IEEE VTS 54th, volume 3, October 2001; J. Crowcroft, R. Gibbens, F. Kelly, and S. Ostring. Modelling incentives for collaboration in mobile ad hoc networks. In Proceedings of WiOpt '03, 2003.

Game theory studies the interactions of multiple independent decision makers, each seeking to fulfill their own objectives. Game theory encompasses, for example, auction theory and strategic decision-making. By providing appropriate incentives, a group of independent actors may be persuaded, according to self-interest, to act toward the benefit of the group. That is, the selfish individual interests are aligned with the community interests. In this way, the community will be both efficient and the network of actors stable and predictable. Of course, any systems wherein the "incentives" impose too high a cost, themselves encourage circumvention. In this case, game theory also addresses this issue.

In computer networks, issues arise as the demand for communications bandwidth approaches the theoretical limit. Under such circumstances, the behavior of nodes will affect how close to the theoretical limit the system comes, and also which communications are permitted. The well known collision sense, multiple access (CSMA) protocol allows each node to request access to the network, essentially without cost or penalty, and regardless of the importance of the communication. While the protocol incurs relatively low overhead and may provide fully decentralized control, under congested network conditions, the system may exhibit instability, that is, a decline in throughput as demand increases, resulting in ever increasing demand on the system resources and decreasing throughput. Durga P. Satapathy and Jon M. Peha, "Performance of Unlicensed Devices With a Spectrum Etiquette," Proceedings of IEEE Globecom, November 1997, pp. 414-418. citeseer.ist.psu.edu/satapathy97performance.html. According to game theory, the deficit of the CSMA protocol is that it is a dominant strategy to be selfish and hog resources, regardless of the cost to society, resulting in "the tragedy of the commons." Garrett Hardin. The Tragedy of the Commons. Science, 162:1243-1248, 1968. Alternate Location: dieoff.com/page95.htm.

In an ad hoc network used for conveying real-time information, as might be the case in a telematics system, there are potentially unlimited data communication requirements (e.g., video data), and network congestion is almost guaranteed. Therefore, using a CSMA protocol as the paradigm for basic information conveyance is destined for failure, unless there is a disincentive to network use. (In power constrained circumstances, this cost may itself provide such a disincentive). On the other hand, a system which provides more graceful degradation under high load, sensitivity to the importance of information to be communicated, and efficient utilization of the communications medium would appear more optimal.

One way to impose a cost which varies in dependence on the societal value of the good or service, is to conduct an auction, which is a mechanism to determine the market value of the good or service, at least between the auction participants.

Walsh, W. and M. Wellman (1998). A market protocol for decentralized task allocation, in "Proceedings of the Third International Conference on Multi-Agent Systems," pp. 325-332, IEEE Computer Society Press, Los Alamitos. In an auction, the bidder seeks to bid the lowest value, up to a value less than or equal to his own private value (the actual value which the bidder appraises the good or service, and above which there is no surplus), that will win the auction. Since competitive bidders can minimize the gains of another bidder by exploiting knowledge of the private value attached to the good or service by the bidder, it is generally a dominant strategy for the bidder to attempt to keep its private value a secret, at least until the auction is concluded, thus yielding strategies that result in the largest potential gain. On the other hand, in certain situations, release or publication of the private value is a dominant strategy, and can result in substantial efficiency, that is, honesty in reporting the private value results in the maximum likelihood of prospective gain.

Application of Game Theory to Ad Hoc Networks

There are a number of aspects of ad hoc network control which may be adjusted in accordance with game theoretic approaches. An example of the application of game theory to influence system architecture arises when communications latency is an issue. A significant factor in latency is the node hop count. Therefore, a system may seek to reduce node hop count by using an algorithm other than a nearest neighbor algorithm, bypassing some nodes with longer distance communications. In analyzing this possibility, one must not only look at the cost to the nodes involved in the communication, but also the cost to nodes which are prevented from simultaneously accessing the network dude to interfering uses of network resources. As a general proposition, the analysis of the network must include the impact of each action, or network state, on every node in the system, although simplifying presumptions may be appropriate where information is unavailable, or the anticipated impact is trivial.

Game theory is readily applied in the optimization of communications routes through a defined network, to achieve the best economic surplus allocation. In addition, the problem of determining the network topology, and the communications themselves, are ancillary, though real, applications of game theory. Since the communications incidental to the arbitration require consideration of some of the same issues as the underlying communications, corresponding elements of game theory may apply at both levels of analysis. Due to various uncertainties, the operation of the system is stochastic. This presumption, in turn, allows estimation of optimality within a margin of error, simplifying implementation as compared to a rigorous analysis without regard to statistical significance.

There are a number of known and proven routing models proposed for forwarding of packets in ad hoc networks. These include Ad Hoc On-Demand Distance Vector (AODV) Routing, Optimized Link State Routing Protocol (OLSR), Dynamic Source Routing Protocol (DSR), and Topology Dissemination Based on Reverse-Path Forwarding (TBRPF). M. Mauve, J. Widmer, and H. Hartenstein. A survey on position-based routing in mobile ad hoc networks. IEEE Network Magazine, 15(6):30-39, November 2001. citeseer.ist.psu.edu/article/mauve01survey.html; Z. Haas. A new routing protocol for reconfigurable wireless networks. In IEEE 6th International Conference on Universal Communications Record, volume 2, pages 562-566, October 1997; X. Hong, K. Xu, and M. Gerla. Scalable routing protocols for mobile ad hoc networks. IEEE Networks, 16(4):11-21, July 2002; D. Johnson, D. Maltz, and Y.-C. Hu. The dynamic source routing protocol for mobile ad hoc networks, April 2003. www.ietf.org/internet-drafts/draft-ietf-manet-dsr-09.txt; S.-J. Lee, W. Su, J. Hsu, M. Gerla, and R. Bagrodia. A performance comparison study of ad hoc wireless multicast protocols. In Proceedings of IEEE INFOCOM 2000, pages 565-574, March 2000; K. Mase, Y. Wada, N. Mori, K. Nakano, M. Sengoku, and S. Shinoda. Flooding schemes for a universal ad hoc network. In Industrial Electronics Society, 2000. IECON 2000, v. 2, pp. 1129-1134, 2000; R. Ogier, F. Templin, and M. Lewis. Topology dissemination based on reversepath forwarding, October 2003. vesuvio.ipv6.cselt.it/internet-drafts/draft-ietf-manet-tbrpf-11.txt; A. Orda, R. Rom, and N. Shimkin. Competitive routing in multi-user communication networks. IEEE/ACM Transactions on Networking, 1(5):510-521, October 1993; C. Perkins, E. Belding-Royer, and S. Das. Ad hoc on-demand distance vector (AODV) routing. Request for comments 3561, Internet Engineering Task Force, 2003; C. E. Perkins, editor. Ad Hoc Networking. Addison-Wesley, Boston, 2001; E. Royer and C.-K. Toh. A review of current routing protocols for ad hoc mobile wireless networks. IEEE Personal Communications, 6(2):46-55, April 1999; Holger Füfsler, Hannes Hartenstein, Dieter Vollmer, Martin Mauve, Michael Kasemann, Location-Based Routing for Vehicular Ad-Hoc Networks, Reihe Informatik March 2002, citeseer.ist.psu.edu/560036.html; J. Broch, D. A. Maltz, D. B. Johnson, Y. C. Hu, and J. Jetcheva. A Performance Comparison of Multi-Hop Wireless Ad Hoc Network Routing Protocols. In Proc. of the ACM/IEEE MobiCom, October 1998, citeseer.ist.psu.edu/broch98 performance-.html.

In most systems analyzed to date, the performance metrics studied were power consumption, end-to-end data throughput and delay, route acquisition time, percentage out-of-order delivery, and efficiency. A critical variable considered in many prior studies is power cost, presuming a battery operated transceiver with limited power availability. Juha Leino, "Applications of Game Theory in Ad Hoc Network", Master's Thesis, Helsinki University Of Technology (2003); J. Shneidman and D. Parkes, "Rationality and Self-Interest in Peer to Peer Networks", In Proc. 2nd Int. Workshop on Peer-to-Peer Systems (IPTPS '03), 2003, citeseer.nj.nec.com/shneidman03rationality.html; V. Rodoplu and H.-Y. Meng. Minimum energy mobile wireless networks. IEEE Journal on Selected Areas in Communications, 17(8):1333-1344, August 1999; S. Singh, M. Woo, and C. S. Raghavendra. Power-aware routing in mobile ad hoc networks. In Proceeding of MOBICOM 1998, pages 181-190, 1998; A. Urpi, M. Bonuccelli, and S. Giordano. Modelling cooperation in mobile ad hoc networks: a formal description of selfishness. In Proceedings of WiOpt '03, March 2003; A. van den Nouweland, P. Borm, W. van Golstein Brouwers, R. Groot Bruinderink, and S. Tijs. A game theoretic approach to problems in telecommunication. Management Science, 42(2):294-303, February 1996.

There can be significant differences in optimum routing depending on whether a node can modulate its transmit power, which in turn controls range, and provides a further control over network topology. Likewise, steerable antennas, antenna arrays, and other forms of multiplexing provide further degrees of control over network topology. Note that the protocol-level communications are preferably broadcasts, while information conveyance communications are typically point-to-point. Prior studies typically presume a single transceiver, with a single omnidirectional antenna, operating according to in-band protocol data, for all communications. The tradeoff made in limiting system designs according to these presumptions should be clear.

It is the general self-interest of a node to conserve its own resources, maintain an opportunity to access network resources, while consuming whatever resource of other nodes as it desires. Clearly, this presents a significant risk of the "tragedy of the commons", in which selfish individuals fail to respect the very basis for the community they enjoy, and a network of rational nodes operating without significant incentives to cooperate would likely fail. On the other hand, if donating a node's resources generated a sufficient associated benefit to that node, while consuming network resources imposed a sufficient cost, stability and reliability can be achieved. So long as the functionality is sufficient to meet the need, and the economic surplus is "fairly" allocated, that is, the cost incurred is less than the private value of the benefit, and that cost is transferred as compensation to those burdened in an amount in excess of their incremental cost, adoption of the system should increase stability. In fact, even outside of these bounds, the system may be more stable than one which neither taxes system use nor rewards altruistic behavior.

While the basic system may be a zero sum system, and over time, the economic effects will likely average out (assuming symmetric nodes), in any particular instance, the incentive for selfish behavior by a node will be diminished.

One way to remedy selfish behavior is to increase the cost of acting this way, that is, to impose a cost or tax for access to the network. In a practical implementation, however, this is problematic, since under lightly loaded conditions, the "value" of the communications may not justify a fixed cost which might be reasonable under other conditions, and likewise, under heavier loads, critical communications may still be delayed or impeded. A variable cost, dependent on relative "importance", may be imposed, and indeed, as alluded to above, this cost may be market based, in the manner of an auction. In a multihop network, such an auction is complicated by the requirement for a distribution of payments within the chain of nodes, with each node having potential alternate demands for its cooperation. The market-based price-finding mechanism excludes nodes which ask a price not supported by its market position, and the auction itself may comprise a value function encompassing reliability, latency, quality of service, or other non-economic parameters, expressed in economic terms. The network may further require compensation to nodes which must defer communications because of inconsistent states, such as in order to avoid interference or duplicative use of an intermediary node, and which take no direct part in the communication. It is noted that the concept of the winner of an auction paying the losers is not generally known, and indeed somewhat counterintuitive. Indeed, the effect of this rule perturbs the traditional analysis framework, since the possibility of a payment from the winner to the loser alters the allocation of economic surplus between the bidder, seller, and others. Likewise, while the cost to the involved nodes may be real, the cost to the uninvolved nodes may be subjective. While it would appear that involved nodes would generally be better compensated than uninvolved nodes, the actual allocation or reallocation of wealth according to the optimization may result in a different outcome.

The network provides competitive access to the physical transport medium, and cooperation with the protocol provides significant advantages over competition with it. Under normal circumstances, a well developed ad hoc network system can present as a formidable coordinated competitor for access to contested bandwidth by other systems, while within the network, economic surplus is optimized. Thus, a node presented with a communications requirement is presented not with the simple choice to participate or abstain, but rather whether to participate in an ad hoc network with predicted stability and mutual benefit, or one with the possibility of failure due to selfish behavior, and non-cooperation. Even in the absence of a present communication requirement, a network which rewards cooperative behavior may be preferable to one which simply expects altruism without rewarding it.

The protocol may also encompass the concept of node reputation, that is, a positive or negative statement by others regarding the node in question. P. Michiardi and R. Molva. Core: A collaborative reputation mechanism to enforce node cooperation in mobile ad hoc networks. In Communication and Multimedia Security 2002 Conference, 2002. This reputation may be evaluated as a parameter in an economic analysis, or applied separately, and may be anecdotal or statistical. In any case, if access to resources and payments are made dependent on reputation, nodes will be incentivized to maintain a good reputation, and avoid generating a bad reputation. Therefore, by maintaining and applying the reputation in a manner consistent with the community goals, the nodes are compelled to advance those goals in order to benefit from the community. Game theory distinguishes between good reputation and bad reputation. Nodes may have a selfish motivation to assert that another node has a bad reputation, while it would have little selfish motivation, absent collusion, for undeservedly asserting a good reputation. On the other hand, a node may have a selfish motivation in failing to reward behavior with a good reputation.

Economics and reputation may be maintained as orthogonal considerations, since the status of a node's currency account provides no information about the status of its reputation.

This reputation parameter may be extended to encompass respect, that is, a subjective deference to another based on an asserted or imputed entitlement. While the prior system uses reputation as a factor to ensure compliance with system rules, this can be extended to provided deferential preferences either within or extrinsic to an economy. Thus, in a military hierarchy, a relatively higher ranking official can assert rank, and if accepted, override a relatively lower ranking bidder at the same economic bid. For each node, an algorithm is provided to translate a particular assertion of respect (i.e., rank and chain of command) into an economic perturbation. For example, in the same chain of command, each difference in rank might be associated with a 25% compounded discount, when compared with other bids, i.e.

$$B_1 = B_0 10(1+0.25\Delta R),$$

Wherein B1 is the attributed bid, B0 is the actual bid, and ΔR is the difference in rank, positive or negative.

Outside the chain of command, a different, generally lower, discount (dNCOC) may be applied, possibly with a base discount as compared to all bids within the chain of command (dCOC), i.e., $$B_1 = B_0 10(1+dCOC+dNCOC\Delta R).$$

The discount is applied so that higher ranking officers pay less, while lower ranking officers pay more. Clearly, there is a high incentive for each bid to originate from the highest available commander within the chain of command, and given the effect of the perturbation, for ranking officers to "pull rank" judiciously.

The Modified VCG Auction

A so-called Vickrey-Clarke-Groves, or VCG, auction, is a type of auction suitable for bidding, in a single auction, for the goods or services of a plurality of offerors, as a unit. Vickrey, W. (1961). Counterspeculation, auctions, and competitive sealed tenders, Journal of Finance 16, 8-37; Clarke, E. H. (1971). Multipart pricing of public goods, Public Choice 11, 17-33; Felix Brandt and Gerhard Weifs. Antisocial Agents and Vickrey Auctions. In Pre-proceedings of the Eighth International Workshop on Agent Theories, Architectures, and Languages (ATAL-2001), pages 120-132, 2001; Tuomas Sandholm. Limitations of the Vickrey Auction in Computational Multiagent Systems. In Proceedings of the 2nd International Conference on Multi-Agent Systems (ICMAS). AAAI Press, 1996. Menlo Park, Calif.; Ron Lavi, Ahuva Mu'alem, and Noam Nisan, "Towards a Characterization of Truthful Combinatorial Auctions", citeseer.ist.psu.edu/lavi03towards.html; Moulin, H. (1999). Incremental cost sharing; characterization by strategyproofness, Social Choice and Welfare 16, 279-320; Moulin, H. and S. Shenker (1997). Strategyproof Sharing of Submodular Costs: Budget Balance Versus Efficiency, to appear in Economic Theory. www.aciri-.org/shenker/cost.ps; Moulin, Hervé, and Scott Shenker (2001). "Strategyproof Sharing of Submodular Costs: Budget Balance versus Efficiency." Economic Theory 18, 511-533; Feigenbaum, Joan, Christos Papadimitriou, Rahul Sami, and Scott Shenker (2002). "A BGP-based Mechanism for Lowest Cost Routing." In Proc. 21st Symposium on Principles of Distributed Computing, ACM Press, 173-182; J. Feigenbaum and S. Shenker. Distributed algorithmic mechanism design: Recent results and future directions. In Proc. 6th Int'l Workshop on Discrete Algorithms and Methods for Mobile Computing and Communications, pages 1-13, Atlanta, Ga., September 2002; Nisan, N. and A. Ronen (2000). Computationally Feasible VCG Mechanisms, to be presented at "Games 2000." http:/www.cs.huji.ac.il/~noam/vcg-based.ps; Tuomas Sandholm. Limitations of the Vickrey Auction in Computational Multiagent Systems. In Proceedings of the 2nd International Conference on Multi-Agent Systems (ICMAS). AAAI Press, 1996. Menlo Park, Calif.; C. Jason Woodard and David C. Parkes, 1st Workshop on the Economics of P2P systems, Strategyproof Mechanisms for Ad Hoc Network Formation, 2003, www.sims.berkeley.edu/research/conferences/p2pecon/papers/s6-woodard.pdf; D. C. Parkes. Iterative Combinatorial Auctions: Achieving Economic and Computational Efficiency (Chapter 2). PhD thesis, University of Pennsylvania, May 2001. www.eecs.harvard.edu/~parkes/pubs/ch2.ps.

In the classic case, each bidder bids a value vector for each available combination of goods or services. The various components and associated ask price are evaluated combinatorially to achieve the minimum sum to meet the requirement. The winning bid set is that which produces the maximum value of the accepted bids, although the second (Vickrey) price is paid. In theory, the Vickrey price represents the maximum state of the network absent the highest bidder, so that each bidder is incentivized to bit its private value, knowing that its pricing will be dependent not on its own value, but the subjective value applied by others. In the present context, each offeror submits an ask price (reserve) or evaluatable value function for a component of the combination. If the minimum aggregate to meet the bid requirement is not met, the auction fails. If the auction is successful, then the set of offerors selected is that with the lowest aggregate bid, and they are compensated that amount.

The VCG auction is postulated as being optimal for allocation of multiple resources between agents. It is "strategyproof" and efficient, meaning that it is a dominant strategy for agents to report their true valuation for a resource, and the result of the optimization is a network which maximizes the value of the system to the agents. Game theory also allows an allocation of cost between various recipients of a broadcast or multicast. That is, the communication is of value to a plurality of nodes, and a large set of recipient nodes may efficiently receive the same information. This allocation from multiple bidders to multiple sellers is a direct extension of VCG theory, and a similar algorithm may be used to optimize allocation of costs and benefit.

The principal issue involved in VCG auctions is that the computational complexity of the optimization grows with the number of buyers and their different value functions and allocations. While various simplifying presumptions may be applied, studies reveal that these simplifications may undermine the VCG premise, and therefore do not promote honesty in reporting the buyer's valuation, and thus are not "strategyproof", which is a principal advantage of the VCG process.

The surplus, i.e., gap between bid and ask, is then available to compensate the deferred bidders. This surplus may be, for example, distributed proportionately to the original bid value of the bidder, thus further encouraging an honest valuation of control over the resource. Thus, if we presume that a bidder may have an incentive to adopt a strategy in which it shaves its bid to lower values, an additional payoff dependent on a higher value bid will promote higher bides and disincentivize shaving. On the other hand, it would be inefficient to promote bidding above a bidder's private value, and therefore care must be exercised to generally avoid this circumstance. In similar manner, potential offerors may be compensated for low bids, to promote availability of supply. It is noted that, by broadcasting supply and demand, fault tolerance of the network is improved, since in the event that an involved node becomes unavailable, a competing node or set of nodes for that role may be quickly enlisted.

The optimization is such that, if any offeror asks an amount that is too high, it will be bypassed in favor of more "reasonable" offerors. Since the bidder pays the second highest price, honesty in bidding the full private value is encouraged. The distribution of the surplus to losing bidders, which exercise deference to the winner, is proportional to the amount bid, that is, the reported value.

In a scenario involving a request for information meeting specified criteria, the auction is complicated by the fact that the information resource content is unknown to the recipient, and therefore the bid is blind, that is, the value of the information to the recipient is indeterminate. However, game theory supports the communication of a value function or utility function, which can then be evaluated at each node possessing information to be communicated, to normalize its value to the requestor. Fortunately, it is a dominant strategy in a VCG auction to communicate a truthful value, and therefore broadcasting the private value function, to be evaluated by a recipient, is not untenable. In a mere request for information conveyance, such as the intermediate transport nodes in a multihop network, or in a cellular network infrastructure extension model, the bid may be a true (resolved) value, since the information content is not the subject of the bidding; rather it is the value of the communications per se, and the bidding node can reasonably value its bid.

Game theory also allows an allocation of cost between various recipients of a broadcast or multicast. That is, in many instances, information which is of value to a plurality of nodes, and a large set of recipient nodes may efficiently receive the same information. This allocation is a direct extension of VCG theory.

Operation of Protocol

The preferred method for acquiring an estimate of the state of the network is through use of a proactive routing protocol. Thus, in order to determine the network architecture state, each node must broadcast its existence, and, for example, a payload of information including its identity, location, itinerary (navigation vector) and "information value function". Typically, the system operates in a continuous set of states, so that it is reasonable to commence the process with an estimate of the state based on prior information. Using an in-band or out-of-band propagation mechanism, this information must propagate to a network edge, which may be physically or artificially defined. If all nodes operate with a substantially common estimation of network topology, only deviations from previously propagated information need be propagated. On the other hand, various nodes may have different estimates of the network state, allowing efficiency gains through exploitation of superior knowledge as compared with seeking to convey full network state information to each node.

A CSMA scheme may be used for the protocol-related communications because it is relatively simple and robust, and well suited for ad hoc communications in lightly loaded networks. We presume that the network is willing to tolerate a protocol related inefficiency, and therefore that protocol communications can occur in a lightly loaded network even if the content communications are saturated. An initial node transmits using an adaptive power protocol, to achieve an effective transmit range, for example, of greater than an average internodal distance, but not encompassing the entire network. This distance therefore promotes propagation to a set of nearby nodes, without unnecessarily interfering with communications of distance nodes and therefore allowing this task to be performed in parallel in different regions. Neighboring nodes also transmit in succession, providing sequential and complete protocol information propagation over a relevance range, for example 3-10 maximum range hops.

If we presume that there is a spatial limit to relevance, for example, 5 miles or 10 hops, then the network state propagation may be so limited. Extending the network to encompass a large number of nodes will necessarily reduce the tractability of the optimization, and incur an overhead which may be inefficient. Each node preferably maintains a local estimate of relevance. This consideration is accommodated, along with a desire to prevent exponential growth in protocol-related data traffic, by receiving an update from all nodes within a node's network relevance boundary, and a state variable which represents an estimate of relevant status beyond the arbitrarily defined boundary. The propagation of network state may thus conveniently occur over a finite number of hops, for example 3-10. In a dense population of nodes, such as in a city, even a single maximum range communication may result in a large number of encompassed nodes. On the other hand, in a deserted environment, there may be few or no communications partners, at any time.

Under conditions of relatively high nodal densities, the system may employ a zone strategy, that is, proximate groups of nodes are is treated as an entity or cluster for purposes of external state estimation, especially with respect to distant nodes or zones. In fact, a supernode may be nominated within a cluster to control external communications for that cluster. Such a presumption is realistic, since at extended distances, geographically proximate nodes may be modeled as being similar or inter-related, while at close distances, and particularly within a zone in which all nodes are in direct communication, internode communications may be subject to mutual interference, and can occur without substantial external influence. Alternately, it is clear that to limit latencies and communication risks, it may be prudent to bypass nearby and neighboring nodes, thus trading latency for power consumption and overall network capacity. Therefore, a hierarchal scheme may be implemented to geographically organize the network at higher analytical levels, and geographic cells may cooperate to appear externally as a single coordinated entity.

In order to estimate a network edge condition, a number of presumptions must be made. The effect of an inaccurate estimate of the network edge condition typically leads to inefficiency, while inordinate efforts to accurately estimate the network edge condition may also lead to inefficiency. Perhaps the best way to achieve compromise is to have a set of adaptive presumptions or rules, with a reasonable starting point. For example, in a multihop network, one might arbitrarily set a network edge the maximum range of five hops of administrative data using a 95% reliable transmission capability. Beyond this range, a set of state estimators is provided by each node for its surroundings, which are then communicated up to five hops (or the maximum range represented by five hops). This state estimator is at least one cycle old, and by the time it is transferred five hops away, it is at least six cycles old. Meanwhile, in a market economy, each node may respond to perceived opportunities, leading to a potential for oscillations if a time-element is not also communicated. Thus, it is preferred that the network edge state estimators represent a time-prediction of network behavior under various conditions, rather than a simple scalar value or instantaneous function.

For example, each node may estimate a network supply function and a network demand function, liquidity estimate and bid-ask gap for its environment, and its own subjective risk tolerance, if separately reported; the impact of nodes closer than five hops may then be subtracted from this estimate to compensate for redundant data. Further, if traffic routes are identifiable, which would correspond in a physical setting of highways, fixed infrastructure access points, etc., a state estimator for these may be provided as well. As discussed above, nodes may bid not only for their own needs or resources, but also to act as market-makers or merchants, and may obtain long term commitments (futures and/or options) and employ risk reduction techniques (insurance and/or indemnification), and thus may provide not only an estimate of network conditions, but also "guaranty" this state.

A node seeking to communicate within the five hop range needs to consider the edge state estimate only when calculating its own supply and demand functions, bearing in mind competitive pressures from outside. On the other hand, nodes seeking resources outside the five hop range must rely on the estimate, because a direct measurement or acquisition of information would require excess administrative communications, and incur an inefficient administrative transaction. Thus, a degree of trust and reliance on the estimate may ensue, wherein a node at the arbitrary network edge is designated as an agent for the principal in procuring or selling the resource beyond its own sphere of influence, based on the provided parameters. The incentive for a node to provide misinformation is limited, since nodes with too high a reported estimate value lose gains from competitive sale transactions, and indeed may be requested to be buyers, and vice versa. While this model may compel trading by intermediary nodes, if the information communicated accurately represents the network state, an economic advantage will accrue to the intermediary participating, especially in a non-power constrained, unlicensed spectrum node configuration.

It should be borne in mind that the intended administration of the communications is an automated process, with little human involvement, other than setting goals, risk tolerance, cost constraints, etc. In a purely virtual economy with temporally declining currency value, the detriment of inaccurate optimizations is limited to reduced nodal efficiency, and with appropriate adaptivity, the system can learn from its "mistakes". (A defined decline in currency value tends to define the cost constraints for that node, since wealth cannot be accumulated nor overspent).

A supernode within a zone may be selected for its superior capability, or perhaps a central location. The zone is defined by a communication range of the basic data interface for communications, with the control channel preferably having a longer range, for example at least double the normal data communications range. Communications control channel transmitters operate on a number of channels, for example at least 7, allowing neighboring zones in a hexagonal tiled array to communicate simultaneously without interference. In a geographic zone system, alternate zones which would otherwise be interfering may use an adaptive multiplexing scheme to avoid interference. All nodes may listen on all control channels, permitting rapid analysis and propagation of control information. As discussed elsewhere herein, directional antennas of various types may be employed, although it is preferred that out-of-band control channels employ omnidirectional antennas, having a generally longer range (and lower data bandwidth) than the normal data communications channels, in order to have a better chance to disseminate the control information to potentially interfering sources, and to allow coordination of nodes more globally.

In order to effectively provide decentralized control, either each node must have a common set of information to allow execution of an identical control algorithm, or nodes defer to the control signals of other nodes without internal analysis for optimality. A model of semi-decentralized control is also known, in which dispersed supernodes are nominated as master, with other topologically nearby nodes remaining as slave nodes. In the pure peer network, relatively complete information conveyance to each node is required, imposing a relatively high overhead. In a master-slave (or supernode) architecture, increased reliance on a single node trades-off reliability and robustness (and other advantages of pure peer-to-peer networks) for efficiency. A supernode within a cellular zone may be selected for its superior capability, or perhaps is at a central location or is immobile.

Once each control node (node or supernode) has an estimate of network topology, the next step is to optimize network channels. According to VCG theory, each agent has an incentive to broadcast its truthful value or value function for the scarce resource, which in this case, is control over communications physical layer, and or access to information. This communication can be consolidated with the network discovery transmission. Each control node then performs a combinatorial solution to select the optimum network configuration from the potentially large number of possibilities, which may include issues of transmit power, data rate, path, timing, reliability and risk criteria, economic and virtual economic costs, multipath and redundancy, etc., for the set of simultaneous equations according to VCG theory (or extensions thereof). This solution should be consistent between all nodes, and the effects of inconsistent solutions may be resolved by collision sensing, and possibly an error/inconsistency detection and correction algorithm specifically applied to this type of information. Thus, if each node has relatively complete information, or accurate estimates for incomplete information, then each node can perform the calculation and derive a closely corresponding solution, and verify that solutions reported by others are reasonably consistent to allow or promote reliance thereon.

As part of the network mapping, communications impairment and interference sources are also mapped. GPS assistance may be particularly useful in this aspect. Where network limitations are caused by interfering communications, the issue is a determination of a strategy of deference or competition. If the interfering communication is continuous or unresponsive, then the only available strategy is competition. On the other hand, when the competing system uses, for example, a CSMA system, such as 802.11, competition with such a communication simply leads to retransmission, and therefore ultimately increased network load, and a deference strategy may be more optimal, at least and until it is determined that the competing communication is incessant. Other communications protocols, however may have a more or less aggressive strategy. By observation of a system over time, its strategies may be revealed, and game theory permits composition of an optimal strategy to deal with interference or coexistence. It is noted that this strategy may be adopted adaptively by the entire ad hoc network, which may coordinate deference or competition as determined optimal.

The optimization process produces a representation of optimal network architecture during the succeeding period. That is, value functions representing bids are broadcast, with the system then being permitted to determine an optimal real valuation and distribution of that value. Thus, prior to completion of the optimization, potentially inconsistent allocations must be prevented, and each node must communicate its evaluation of other node's value functions, so that the optimization is performed on a normalized economic basis. This step may substantially increase the system overhead, and is generally required for completion of the auction. This valuation may be inferred, however, for intermediate nodes in a multihop network path, since there is little subjectivity for nodes solely in this role, and the respective value functions may be persistent. For example, the valuation applied by a node to forward information is generally independent of content and involved party.

A particular complication of a traffic information system is that the nature of the information held by any node is private to that node (before transmission), and therefore the valuation is not known until after all bids are evaluated. Thus, prior to completion of optimization, each node must communicate its evaluation of other nodes' value functions, so that the optimization is performed on an economic basis. This required step substantially increases the system overhead. This valuation may be inferred, however, for transit nodes in a multihop network path.

As discussed above, may of the strategies for making the economic markets more efficient may be employed either directly, or analogy, to the virtual economy of the ad hoc network. The ability of nodes to act as market maker and derivative market agents facilitates the optimization, since a node may elect to undertake a responsibility (e.g., transaction risk), rather than relay to others, and therefore the control/administrative channel chain may be truncated at that point. If the network is dense, then a node which acts selfishly will be bypassed, and if the network is sparse, the node may well be entitled to gain transactional profit by acting as a principal and trader, subject to the fact that profits will generally be suboptimal if pricing is too high or too low.

After the network architecture is defined, compensation is paid to those nodes providing value or subjected to a burden (including foregoing communication opportunity) by those gaining a benefit. The payment may be a virtual currency, with no specific true value, and the virtual currency system provides a convenient method to flexibly tax, subsidize, or control the system, and thus steer the virtual currency to a normalized extrinsic value. In a real currency system, external controls are more difficult, and may have unintended consequences. A hybrid economy may be provided, linking both the virtual and real currencies, to some degree. This is especially useful if the network itself interfaces with an outside economy, such as the cellular telephony infrastructure (e.g., 2G, 2.5G, 3G, 4G, proposals for 5G, WiFi (802.11x) hotspots, WiMax (802.16x), etc.)

Using the protocol communication system, each node transmits its value function (or change thereof), passes through communications from neighboring nodes, and may, for example transmit payment information for the immediate-past bid for incoming communications.

Messages are forwarded outward (avoiding redundant propagation back to the source), with messages appended from the series of nodes. Propagation continues for a finite number of hops, until the entire community has an estimate of the state and value function of each node in the community. Advantageously, the network beyond a respective community may be modeled in simplified form, to provide a better estimate of the network as a whole. If the propagation were not reasonably limited, the information would be stale by the time it is employed, and the system latency would be inordinate. Of course, in networks where a large number of hops are realistic, the limit may be time, distance, a counter or value decrement, or other variable, rather than hops. Likewise, the range may be adaptively determined, rather than predetermined, based on some criteria.

After propagation, each node evaluates the set of value functions for its community, with respect to its own information and ability to forward packets. Each node may then make an offer to supply or forward information, based on the provided information. In the case of multihop communications, the offers are propagated to the remainder of the community, for the maximum number of hops, including the originating node. At this point, each node has a representation of the state of its community, with community edge estimates providing consistency for nodes with differing community scopes, the valuation function each node assigns to control over portions of the network, as well as a resolved valuation of each node for supplying the need. Under these circumstances, each node may then evaluate an optimization for the network architecture, and come to a conclusion consistent with that of other members of its community. If supported, node reputation may be updated based on past performance, and the reputation applied as a factor in the optimization and/or externally to the optimization. As discussed above, a VCG-type auction is employed as a basis for optimization. Since each node receives bid information from all other nodes within the maximum node count, the VCG auction produces an optimized result.

As discussed above, by permitting futures, options, derivatives, insurance/indemnification/guaranties, long and short sales, etc., the markets may be relatively stabilized as compared to a simple set of independent and sequential auctions, which may show increased volatility, oscillations, chaotic behavior, and other features which may be inefficient.

Transmissions are preferably made in frames, with a single bidding process controlling multiple frames, for example a multiple of the maximum number of hops. Therefore, the bid encompasses a frame's-worth of control over the modalities. In the event that the simultaneous use of, or control over, a modality by various nodes is not inconsistent, then the value of the respective nodes may be summed, with the resulting allocation based on, for example, a ratio of the respective value functions. As a part of the optimization, nodes are rewarded not only for supporting the communication, but also for deferring their own respective communications needs. As a result, after controlling the resources, a node will be relatively less wealthy and less able to subsequently control the resources, while other nodes will be more able to control the resources. The distribution to deferred nodes also serves to prevent pure reciprocal communications, since the proposed mechanism distributes and dilutes the wealth to deferring nodes.

Another possible transaction between nodes is a loan, that is, instead of providing bandwidth per se, one node may loan a portion of its generator function or accumulated wealth to another node. Presumably, there will be an associated interest payment. Since the currency in the preferred embodiment is itself defined by an algorithm, the loan transaction may also be defined by an algorithm. While this concept is somewhat inconsistent with a virtual currency which declines in value over time and/or space, it is not completely inconsistent, and, in fact, the exchange may arbitrage these factors, especially location-based issues.

Because each node in the model presented above has complete information, for a range up to the maximum node count, the wealth of each node can be estimated by its neighbors, and payment inferred even if not actually consummated. (Failure of payment can occur for a number of reasons, including both malicious and accidental). Because each hop adds significant cost, the fact that nodes beyond the maximum hop distance are essentially incommunicado is typically of little consequence; since it is very unlikely that a node more than 5 or 10 hops away will be efficiently directly included in any communication, due to the increasing cost with distance, as well as reduction in reliability and increase in latency. Thus, large area and scalable networks may exist.

Communications are generally of unencrypted data. Assuming the network is highly loaded, this may allow a node to incidentally fulfill its data requirements as a bystander, and thus at low cost meet its needs, allowing nodes with more urgent or directed needs to both control and compensate the network. While this may reduce compensation to intermediaries and data sources, the improvements in efficiency will likely benefit the network as a whole in increase stability, since we assume that peak load conditions will occur frequently.

Enforcement of responsibility may be provided by a centralized system which assures that the transactions for each node are properly cleared, and that non-compliant nodes are either excluded from the network or at least labeled. While an automated clearinghouse which periodically ensures nodal compliance is preferred, a human discretion clearinghouse, for example presented as an arbitrator or tribunal, may be employed.

The Synthetic Economy

Exerting external economic influences on the system may have various effects on the optimization, and may exacerbate differences in subjective valuations. The application of a monetary value to the virtual currency substantially also increases the possibility of misbehavior and external attacks. On the other hand, a virtual currency with no assessed real value is self-normalizing, while monetization leads to external and generally irrelevant influences as well as possible external arbitrage (with potential positive and negative effects). External economic influences may also lead to benefits, which are discussed in various publications on non-zero sum games.

In order to provide fairness, the virtual currency (similar to the so-called "nuglets" or "nuggets" proposed for use in the Terminodes project) is self-generated at each node according to a schedule, and itself may have a time dependent value. L. Blazevic, L. Buttyan, S. Capkun, S. Giordiano, J.-P. Hubaux, and J.-Y. Le Boudec. Self-organization in mobile ad-hoc networks: the approach of terminodes. IEEE Communications Magazine, 39(6):166-174, June 2001; M. Jakobsson, J.P. Hubaux, and L. Buttyan. A micro-payment scheme encouraging collaboration in multi-hop cellular networks. In Proceedings of Financial Crypto 2003, January 2003; J.P. Hubaux, et al., "Toward Self-Organized Mobile Ad Hoc Networks: The Terminodes Project", IEEE Communications, 39(1), 2001. citeseer.ist.psu.edu/hubaux01toward.html; Buttyan, L., and Hubaux, J.-P. Stimulating Cooperation in Self-Organizing Mobile Ad Hoc Networks. Tech. Rep. DSC/citeseer.ist.psu.edu/buttyan01stimulating.html; Levente Buttyan and Jean-Pierre Hubaux, "Enforcing Service Availability in Mobile Ad-Hoc WANs" 1st IEEE/ACM Workshop on Mobile Ad Hoc Networking and Computing (MobiHOC citeseer.ist.psu.edu/buttyan00enforcing.html; L. Buttyan and J.-P. Hubaux. Nuglets: a virtual currency to stimulate cooperation in self-organized ad hoc networks. Technical Report DSC/2001, citeseer.ist.psu.edu/article/buttyan01nuglets.html; Mario Cagalj, Jean-Pierre Hubaux, and Christian Enz. Minimum-energy broadcast in all-wireless networks: NP-completeness and distribution issues. In The Eighth ACM International Conference on Mobile Computing and Networking (MobiCom 2002), citeseer.ist.psu.edu/ cagalj02minimumenergy.html; N. Ben Salem, L. Buttyan, J.P. Hubaux, and Jakobsson M. A charging and rewarding scheme for packet forwarding. In Proceedings of MobiHOC, June 2003. For example, the virtual currency may have a half-life or temporally declining value. On the other hand, the value may peak at a time after generation, which would encourage deference and short term savings, rather than immediate spending, and would allow a recipient node to benefit from virtual currency transferred before its peak value. This also means that long term hoarding of the currency is of little value, since it will eventually decay in value, while the system presupposes a nominal rate of spending, which is normalized among nodes. The variation function may also be adaptive, but this poses a synchronization issue for the network. An external estimate of node wealth may be used to infer counterfeiting, theft and failure to pay debts, and to further effect remediation.

The currency is generated and verified in accordance with micropayment theory. Rivest, R. L., A. Shamir, PayWord and MicroMint: Two simple micropayment schemes, also presented at the RSA '96 conference, http//theory.lcs.mit.edu/rivest/RivestShamirmpay.ps, citeseer.ist.psu.edu/rivest96payword.html; Silvio Micali and Ronald Rivest. Micropayments revisited. In Bart Preneel, editor, Progress in Cryptology—CT-RSA 2002, volume 2271 of Lecture Notes in Computer Science. Springer-Verlag, Feb. 18-22, 2002. citeseer.ist.psu.edu/micali02micropayments.html.

Micropayment theory generally encompasses the transfer of secure tokens (e.g., cryptographically endorsed information) having presumed value, which are intended for verification, if at all, in a non-real time transaction, after the transfer to the recipient. The currency is circulated (until expiration) as a token, and therefore may not be subject to immediate definitive authentication by source. Since these tokens may be communicated through an insecure network, the issue of forcing allocation of payment to particular nodes may be dealt with by cryptographic techniques, in particular public key cryptography, in which the currency is placed in a cryptographic "envelope" (cryptolope) addressed to the intended recipient, e.g., is encrypted with the recipient's public key, which must be broadcast and used as, or in conjunction with, a node identifier. This makes the payment unavailable to other than the intended recipient. The issue of holding the encrypted token hostage and extorting a portion of the value to forward the packet can be dealt with by community pressure, that is, any node presenting this (or other undesirable) behavior might be ostracized. The likelihood of this type of misbehavior is also diminished by avoiding monetization of the virtual currency. Further, redundant routing of such information may prevent single-node control over such communications.

This currency generation and allocation mechanism generally encourages equal consumption by the various nodes over the long term. In order to discourage excess consumption of bandwidth, an external tax may be imposed on the system, that is, withdrawing value from the system based on usage. Clearly, the effects of such a tax must be carefully weighed, since this will also impose an impediment to adoption as compared to an untaxed system. On the other hand, a similar effect use-disincentive may be obtained by rewarding low consumption, for example by allocating an advertising subsidy between nodes, or in reward of deference. The external tax, if associated with efficiency-promoting regulation, may have a neutral or even beneficial effect.

Each node computes a value function, based on its own knowledge state, risk profile and risk tolerance, and wealth, describing the value to it of additional information, as well as its own value for participating in the communications of others. The value function typically includes a past travel history, future travel itinerary, present location, recent communication partners, and an estimator of information strength and weakness with respect to the future itinerary. It may be presumed that each node has a standard complement of sensors, and accurately acquired descriptive data for its past travel path. Otherwise, a description of the available information is required. One advantage of a value function is that it changes little over time, unless a need is satisfied or circumstances change, and therefore may be a persistent attribute.

Using the protocol communication system, each node transmits its value function (or change thereof), passes through communications from neighboring nodes, and may, for example transmit payment information for the immediate-past bid for incoming communications.

Messages are forwarded outward (avoiding redundant propagation back to the source), with messages appended from the series of nodes. Propagation continues for a finite number of hops, until the entire community has an estimate of the state and value function of each node in the community. Advantageously, the network beyond a respective community may be modeled in simplified form, to provide a better estimate of the network as a whole.

After propagation, each node evaluates the set of value functions for its community, with respect to its own information and ability to forward packets. Each node may then make an offer to supply or forward information, based on the provided information. In the case of multihop communications, the offers are propagated to the remainder of the community, for the maximum number of hops, including the originating node. At this point, each node has a representation of the state of its community, with community edge estimates providing consistency for nodes with differing community scopes, the valuation function each node assigns to control over portions of the network, as well as a resolved valuation of each node for supplying the need. Under these circumstances, each node may then evaluate an optimization for the network architecture, and come to a conclusion consistent with that of other members of its community. If supported, node reputation may be updated based on past performance, and the reputation applied as a factor in the optimization and/or externally to the optimization. As discussed above, a VCG-type auction is employed as a basis for optimization. Since each node receives bid information from all other nodes within the maximum node count, the VCG auction produces an optimized result.

Transmissions are made in frames, with a single bidding process controlling multiple frames, for example a multiple of the maximum number of hops. Therefore, the bid encompasses a frame's-worth of control over the modalities. In the event that the simultaneous use of, or control over, a modality by various nodes is not inconsistent, then the value of the respective nodes may be summed, with the resulting allocation based on, for example, a ratio of the respective value functions. As a part of the optimization, nodes are rewarded not only for supporting the communication, but also for deferring their own respective needs. As a result, after controlling the resources, a node will be relatively less wealthy and less able to subsequently control the resources, while other nodes will be more able to control the resources. The distribution to deferred nodes also serves to prevent pure reciprocal communications, since the proposed mechanism distributes and dilutes the wealth to deferring nodes.

Because each node in the model presented above has complete information, for a range up to the maximum node count, the wealth of each node can be estimated by its neighbors, and payment inferred even if not actually consummated. (Failure of payment can occur for a number of reasons, including both malicious and accidental). Because each hop adds significant cost, the fact that nodes beyond the maximum hop distance are essentially incommunicado is typically of little consequence; since it is very unlikely that a node more than 5 or 10 hops away will be efficiently included in any communication, due to the increasing cost with distance, as well as reduction in reliability and increase in latency. Thus, large area and scalable networks may exist.

Typically, cryptography is employed for both authentication and to preserve privacy. External regulation, in a legal sense at least, is typically imposed by restrictions on hardware and software design, as well as voluntary compliance at risk of detection and legal sanction.

A synthetic economy affords the opportunity to provide particular control over the generator function, which in turn supports a hierarchy. In this scheme, each node controls the generator function at respectively lower nodes, and thus can allocate wealth among subordinates. If one assumes real time communications, then it is clear that the superordinate node can directly place bids on behalf of subordinates, thus effectively controlling its entire branch. In the absence of real time communications, the superordinate node must defer to the discretion of the subordinate, subject to reallocation later if the subordinate defects. If communications are impaired, and a set of a priori instructions are insufficient, then it is up to the subjective response of a node to provide deference.

It is noted that when sets of nodes "play favorites", the VCG auction will no longer be considered "strategyproof". The result is that bidders will assume bidding strategies that do not express their secret valuation, with the result being likely suboptimal market finding during the auction. This factor can be avoided if hierarchal overrides and group bidding play only a small role in the economy, and thus the expected benefits from shaded bidding are outweighed by the normal operation of the system. For example, by taxing transactions, over-valued bidding will be disincentivized, and by redistributing economic surplus to bystanders, the aggregate wealth of the controlling group will be mitigated.

A synthetic economy affords the opportunity to provide particular control over the generator function, which in turn provides particular advantages with respect to a hierarchal organization. In this scheme, each node has the ability to control the generator function at respectively lower nodes, and thus can allocate wealth among subordinates. If one assumes real time communications, then it is clear that the superordinate node can directly place bids on behalf of subordinates, thus effectively controlling its entire branch. In the absence of real time communications, the superordinate node must defer to the discretion of the subordinate, subject to reallocation later if the subordinate defects. If communications are impaired, and a set of a priori instructions are insufficient, then it is up to the subjective response of a node to provide deference. Thus, a node may transfer all or a portion of its generator function, either for a limited time or permanently, using feed-forward or feedback control. In this sense, the hierarchal and financial derivatives, options, futures, loans, etc. embodiments of the invention share a common theme.

It is noted that when sets of nodes "play favorites", the VCG auction will no longer be considered "strategyproof". The result is that bidders will assume bidding strategies that do not express their secret valuation, with the result being likely suboptimal market price finding during the auction. This factor can be avoided if hierarchal overrides and group bidding play only a small role in the economy, and thus the expected benefits from shaded bidding are outweighed by the normal operation of the system. On the other hand, the present invention potentially promotes competition within branches of a hierarchy, to the extent the hierarchy does not prohibit this. Between different branches of a hierarchy, there will generally be full competition, while within commonly controlled branches of a hierarchy, cooperation will be expected. Since the competitive result is generally more efficient, there will be incentive for the hierarchal control to permit competition as a default state, asserting control only where required for the hierarchal purpose.

Military Hierarchy

In a typical auction, each player is treated fairly; that is, the same rules apply to each player, and therefore a single economy describes the process. The fair auction therefore poses challenges for an inherently hierarchal set of users, such as a military organization. In the military, there is typically an expectation that "rank has its privileges". The net result, however, is a decided subjective unfairness to lower ranking nodes. In a mobile ad hoc network, a real issue is user defection or non-compliance. For example, where a cost is imposed on a user for participating in the ad hoc network, e.g., battery power consumption, if the anticipated benefit does not exceed the cost, the user will simply turn off the device until actually needed, to conserve battery power outside the control of the network. The result of mass defection will of course be the instability and failure of the ad hoc network itself. Thus, perceived fairness and net benefit is required to important for network success, assuming that defection or non-compliance remain possible.

On the other hand, in military systems, the assertion of rank as a basis for priority is not necessarily perceived as arbitrary and capricious, and is generally not perceived subjectively as such. Orders and communications from a central command are critical for the organization itself. Therefore, the difficulty in analyzing the application of a fair game to a hierarchal organization is principally a result of conceptualizing and aligning the individual incentives with those of the organization as a whole. Since the organization exists outside of the ad hoc network, it is generally not unrealistic to expect compliance with the hierarchal attributes both within and outside of the network.

An artificial economy provides a basis for an economically efficient solution. In this economy, each node has a generator function for generating economic units which are used in a combinatorial auction with other nodes. The economic units may have a declining value, so that wealth does not accumulate over long periods, and by implication, wealth accumulated in one region is not available for transfer in a distant region, since the transfer may be subject to latency and/or cost. Even if a low latency system is employed to transfer the value, an express spatially declining value function may also be imposed. The geographic decline may also be explicit, for example based on a GPS or navigational system. In other cases, nodal motility is valuable, and mobile nodes are to be rewarded over those which are stationary. Therefore, the value or a portion thereof, or the generator function, may increase with respect to relocations.

This scheme may be extended to the hierarchal case by treating each chain of command as an economic unit with respect to the generator function. At any level of the hierarchy, the commander retains a portion of the wealth generation capacity, and delegates the remainder to its subordinates. In the case of real-time communications, a commander may directly control allocation of the generator function at each time period. Typically, there is no real-time communications capability, and the wealth generator function must be allocated a priori. Likewise, wealth may also be reallocated, although a penalty is incurred in the event of an initial misallocation since the transfer itself incurs a cost, and there will be an economic competitive distortion, under which a node's subjective value of a resource is influenced by its subjective wealth. If a node is supplied with wealth beyond its needs, the wealth is wasted, since it declines in value and cannot be hoarded indefinitely. If a node is supplied with insufficient wealth, economic surplus through transactional gains are lost. Thus, each node must analyze its expected circumstances to retain or delegate the generator function, and to optimally allocate wealth between competing subordinates.

In any transaction, there will be a component which represents the competitive "cost", and a possible redistribution among nodes within a hierarchal chain. This redistribution may be of accumulated wealth, or of the generation function portion. In the former case, if the communication path fails, no further transfers are possible, while in the later case, the result is persistent until the transfer function allocation is reversed. It is also possible to transfer an expiring or declining portion of the generating function; however, this might lead a node which is out of range to have no ability to rejoin the network upon return, and thus act as an impediment to efficient network operation. As discussed above, one possibility is for nodes to borrow or load currency. In this case, a node deemed credit-worthy may blunt the impact of initially having insufficient wealth by merely incurring a transaction cost (including interest, if applied).

In practice, the bulk of the wealth generating function will be widely distributed, and not concentrated at the top of the hierarchy. If this is true, under most circumstances, the network will appear to operate according to a non-hierarchal or fair VCG model, but in some circumstances, normal operation may be usurped by nodes which have apparent excess wealth resulting from a superior wealth generator function. Typically, hierarchically superior nodes will use their ability to transfer wealth to themselves, or to recruit subordinates to cooperate, in order to directly or indirectly control the network resources. It is possible, however, for nodes within one branch of a hierarchy to conspire against nodes outside that branch, resulting in a different type of distortion. Since the ad hoc network typically gains by having a larger number of participating nodes, this type of behavior may naturally be discouraged. On the other hand, hierarchically superior nodes either retain, or more likely, can quickly recruit surrounding subordinates to allocate their wealth generating function and accumulated wealth to pass urgent or valuable messages.

Where expensive assets are employed, an actual transfer of wealth or the generator function to a single entity may be required. For example, a high level node might have access to a high power broadcast system, which interferes with other communications, or simply incurs a high cost to operate. Low level nodes might ordinarily be limited to cellular (i.e., short range, low power radio) wireless communications. In order for a low level node to control an expensive asset, the assent or cooperation of others may be required, for example by hierarchal superiors.

Since the network should be stable in the absence of command and control communications, a hierarchal superior should assure that subordinate nodes possess sufficient wealth and motivation to maintain ad hoc network operation. Insufficient wealth will tend to eliminate the advantage to nodal participation (and therefore encourage defection), unless payments from acting as intermediary are significant. Thus, a node with insufficient wealth generation function may potentially exhaust its resources, and be unavailable for ad hoc intermediary use, even for the benefit of the hierarchy.

On the other hand, an initial allocation of too much wealth will encourage high spending and less active participation as an intermediary. While it is possible in a military system to formulate an "engineered" solution which forces participation and eliminates defection, this solution does not gain the benefit of economic optimization and may have limited application outside of mandatory hierarchies.

Cellular Network Extension

Cellular Networks provide efficient coverage of large portions of the inhabited landmass. On the other hand, achieving complete coverage, including relatively uninhabited areas, may be cost inefficient or infeasible. On the other hand, there remains significant unmet demand for coverage of certain areas.

Generally, it is likely that a need for service arises within a few miles from the edge of a cellular network. That is, the fixed infrastructure is almost in reach. On the other hand, the infrastructure costs required to fill in gaps or marginally extend the network may be inordinately high, for the direct economic benefits achieved. At present, there is no effective means for remediating these gaps.

One problem arises in that the present networks generally have a threshold usage plan. All territory encompassed by a network is treated as fungible, and incurs the same cost. Likewise, usage of partner networks is also treated as fungible. Therefore, the incentive to extend network reach for any company is limited to the overall incentive for customers to defect to different networks, balanced against the increased cost of extending the network. It is in the context of this economic problem that a solution is proposed. Quite simply, in the same areas where the cellular infrastructure is insufficient and there is demand for service, it may be possible to implement a peer-to-peer network or multihop network to extend a cellular network system. In fact, if we presume that the coverage is absent, the network extension function may make use of the licensed cellular spectrum, thus making the ad hoc-cellular transceiver design more efficient, and eliminating extrinsic competing uses for the bandwidth. Likewise, this may be implemented in or as part of existing cellular network handsets, using common protocols. On the other hand, different spectrum and/or protocols may be employed, which may be licensed or unlicensed.

Various studies have shown that modeled multihop mobile ad hoc network architectures tend to have low efficiency in excess of three to five hops. This is due to node mobility and the probability of finding an end-to-end connection, mutual interference and competition for bandwidth in shared channel protocols, and the overhead of maintaining useful routing tables. If we take five hops as a reasonable maximum, and each transceiver has a 1000 meter range, then a 5 km maximum range extension is possible. It is believed that by extending the fringe of cellular networks by 3-5 km, a significant portion of the unmet demand for cellular service will be satisfied.

If we assume that a significant portion of the mobile nodes are power constrained (e.g., battery operated), that is, retransmission of packets imposes a power cost, then the stability of the mobile ad hoc network and cooperation with its requirements will depend on properly incentivizing intermediary nodes to allocate their resources to the network. Since this incentive is provided in a commercial context, that is, the cellular service is a commercial enterprise with substantial cash flow, a real economy with monetary incentives may be provided. Under such circumstances, it is relatively straightforward to allocate costs and benefits between the competing interests to achieve consistent and apparent incentives. On the other hand, the cost of this additional process must be commensurate with the benefits provided, or else the ad hoc network will become unreliable.

While the true economics of the costs and value functions for the participants are not defined, some estimates are available. The issue is: are users willing to pay for extended cellular reach? If so, do they value the benefits commensurate with the overall costs, including service fees, hardware, and ad hoc cooperative burdens? As such, care must be exercised to define competitive compensation or the business will be inefficient. Since this extension is driven by the cellular network operator, a suitable return on investment is mandated.

Many analyses and studies have concluded that voluntary ad hoc networks are efficient when the incentives to cooperate with the network goals are aligned and sufficient to incentivize users accordingly. If the reward for cooperation is near optimum, then the network will benefit by increased coverage and reliability, each node will benefit from increased utility, and intermediary nodes will specifically benefit through compensation. Due to the technical possibility for potential intermediaries to fail to either participate in network administration or operation, while taking advantage of the network as a beneficiary, the promotion of network availability as an incentive for cooperation is typically itself insufficient incentive to assure cooperation. The particular cost of the limited power resource for potential intermediaries makes non-cooperation a particularly important factor. On the other hand, the presumption of power cost as a critical factor may be accurate only in some circumstances: In many cases, a cheap power source is available, such as in a home or office, or in a vehicle, making other factors more important.

It is noted that, in a cellular telephone system, the reasonable acts of a user which might undermine the network are limited. Clearly, the user can choose a different network or provider. The user may turn off his phone or make it unavailable. The user may abuse the service contract, taking advantage of promotions or "free" access to the detriment of others. Notably, the user typically has no reasonable ability to reprogram the phone or alter its operation in accordance with the protocol, unless granted this option by the network operator. The user cannot reasonably compete or interfere with the licensed spectrum. While older analog cellular phones provided the user with an option to install power amplifiers and vehicle mount antennas, few current users employ these options.

If one limits the present system to a five hop distance from fixed cellular infrastructure (or more accurately, permits the system to deny service to nodes more than five hops away) then the routing requirements and node complexity may be substantially simplified. We also presume that each node has geolocation capability, and therefore can provide both its location and velocity vector. This is reasonable, since the FCC E911 mandate provides for geolocation of handsets within range of the cellular infrastructure, and GPS is a one significant and readily available option to provide this feature, independent of the cellular infrastructure.

The ad hoc communications can occur using a licensed or unlicensed band. For example, since we presume that nodes are beyond range of a fixed cellular tower (except the closest node), the ad hoc network may reuse licensed bandwidth in the uncovered region. The ad hoc communications may also occur in unlicensed spectrum, such as the 2.4 GHz ISM band, 5.8 GHz ISM band, DSRC band, or 900 MHz band.

In order to provide optimum compensation, two issues are confronted. First, the total compensation paid; and second, the distribution of payments between the intermediaries. The VCG auction is a known means for optimizing a payment which must be distributed between a number of participants.

In this case, each potential intermediary places a "bid". A multi-factorial optimization is performed to determine the lowest cost set which provides sufficient services.

In a cellular system, each subscriber typically purchases a number of minute units on a monthly recurring charge basis. Compensation might therefore be based on minutes or money. Since there is a substantial disincentive to exceed the number of committed minutes, providing a surplus of minutes may not provide a significant incentive, because the user will rarely exceed the committed amount. Monetary incentives, on the other hand, must be coupled to a higher monthly recurring fee, since the proposal would by unprofitable otherwise.

A more direct scheme provides an economy for multihop networks somewhat independent from the cellular system economy. That is, nodes that participate as intermediary, may also participate as a principal to the information communication, while those who abstain from intermediary activities are denied access to the network extension as a principal.

While, on a theoretical basis, optimization of both price and distribution would be considered useful, in a practical system, it may be useful to make simplifying presumptions and simplifications. For example, while a VCG auction may provide an optimal cost and distribution of compensation, in a commercial network, a degree of certainty may actually prove advantageous. For example, a fixed compensation per hop or per milliWatt-second may prove both fair and reasonable.

Likewise, a degree of certainty over cost would be beneficial over an "optimal" cost. On the other hand, fixed cost and fixed compensation are inconsistent in a revenue neutral system. Even if the cellular carrier subsidizes the extension operation, there is little rationale for making the usage at the fringe insensitive to cost, other than the relief from uncertainty, which will tend to increase fringe usage, and the scope of the subsidy cost.

As discussed above, there are methods drawn from financial models which may also serve to improve certainty and reduce perceived risk.

Therefore, it is realistic for a node requesting extension service to apply a value function to define a maximum payment for service. The payment is therefore dependent on system cost, alleviating the requirement for subsidy, but also dependent on need.

In the typical case, the load on the extension network will be low, since if demand were high, the fixed infrastructure would likely be extended to this region. On the other hand, there may be cases where demand is high, and therefore there is some competition for access to the network, leading to a need to arbitrate access.

In general, where economic demand is high, there is a tendency to recruit new sources of supply. That is, the system may operate in two modes. In a first, low demand mode, costs are based on a relatively simple algorithm, with a monetary cap. In a second mode, costs are competitive (and in excess of the algorithmic level), with compensation also being competitive. The surplus, in this case, would generally be allocated to the cellular carrier, since this represents the commercial profit of the enterprise. The first mode also serves another purpose; under lightly loaded conditions, the market may be thin, and therefore pricing unstable. Therefore, the imposition of fixed pricing leads to reduced pricing risk.

In the second mode, an intended user specifies his demand as a maximum price and demand function, that is, a bid based on, for example, a value of the communication. Generally, this would be set by the user in advance as a static value or relatively simple function representing the contextual value of the communication. The actual price may be, for example, the bid price less otherwise attributable discount under the first mode based on the maximum number of hops, etc. The intermediate nodes set forth their bids in the manner of a VCG auction, with each bid presumably exceeding the first mode compensation. The VCG optimization may be corrected for quality of service factors and anticipated network stability.

It is noted, as elsewhere herein, that the preferred bidding and optimization is performed automatically as a part of the protocol, and not under direct human control and supervision. Therefore, the automated processes may be defined to promote stability and cooperation by both the device and its owner with the network. In other cases, human involvement may be used, although thus will typically be quite inefficient and impose transactional expenses (opportunity costs) in excess of the underlying transaction value. The use therefore provides a set of explicit or implicit subjective criteria as a basis for the agent to act accordingly. An intermediary chooses its bid for providing packet forwarding services based on a number of factors, such as anticipated power cost, opportunity cost, etc.

Clearly, the economics of the system are substantially under the control of the cellular carrier, who may offer "plans" and "services" for their customers, thus providing an alternative to the usage-based bidding process, at least for some users. The VCG process, however, remains useful for compensating intermediaries.

The intermediary chooses its bid for providing packet forwarding services based on a number of factors, such as anticipated power cost, opportunity cost, etc. These bids are determined automatically, and therefore do not consume substantial human efforts.

Summary

Game theory is a useful basis for analyzing ad hoc networks, and understanding the behavior of complex networks of independent nodes. By presuming a degree of choice and decision-making by nodes, we obtain an analysis that is robust with respect to such considerations. The principal issues impeding deployment are the inherent complexity of the system, as well as the overhead required to continuously optimize the system. Determination of a set of simplifying presumptions to reduce protocol overhead and reduce complexity may improve performance. Hierarchal considerations can be imposed to alter the optimization of the system, which would be expected to provide only a small perturbation to the efficient and optimal operation of the system according to a pure VCG protocol. A marketplace auction with competition between potential buyers and potential sellers, and with the economic surplus distributed between parties which must defer to active participants, provides incentive to all affected parties, and therefore may provide a better result than a simple transfer between supply and demand elements only.

The ad hoc network does not exist in a vacuum. There are various competing interests seeking to use the same bandwidth, and technological superiority alone does not assure dominance and commercial success. Game theory may also be used as a tool to analyze the entities which seek to deploy ad hoc networks, especially where they compete.

First Embodiment

In a typical auction, each player is treated fairly; that is, the same rules apply to each player, and therefore a single economy describes the process. The fair auction therefore poses challenges for an inherently hierarchal set of users, such as a military organization, where rank is accompanied by privilege. The net result, however, is a decided apparent disadvantage to lower ranking agents, at least when viewed in light of constricted self-interest. The issues that arise are similar to the relating to "altruism", although not identical, and thus the game theoretic analysis of altruistic behavior may be imported for consideration, as appropriate.

In a mobile ad hoc communications network, a real issue is user defection or non-compliance. For example, where a cost is imposed on a user for participating in the ad hoc network, e.g., battery power consumption in a mesh radio network, if the anticipated benefit does not exceed the cost, the user will simply turn off or disable the device until actually needed. The result of mass defection will, of course, be the instability and failure of the ad hoc network itself, leading to decreased utility, even for those who gain an unfair or undue advantage under the system. Thus, perceived fairness and net benefit is required for network success, assuming that defection and/or non-compliance are possible.

On the other hand, in military systems, the assertion of rank as a basis for priority is not itself necessarily arbitrary or capricious. Orders and communications from a central command are critical for the organization itself, and thus the lower ranking agents gain at least a peripheral, if not direct benefit as their own chain of command employs their resources. Therefore, the difficulty in analyzing the application of a fair game paradigm to a hierarchal organization is principally a result of conceptualizing and aligning the individual incentives with those of the organization as a whole and the relationship between branches. Thus, in contradistinction to typical self-organizing peer-to-peer networks, a hierarchal network is not seen as self-organizing, at least in terms of the hierarchy, which is extrinsic to the formation of the communications network under consideration.

As discussed below, the "distortions" of the network imposed by the external hierarchy can be analyzed and accounted for by, for example, the concepts of inheritance and delegation. Thus, each branch of a hierarchy tree may be considered an object, which receives a set of characteristics from its root, and from which each sub-branch inherits the characteristics and adds subcharacteristics of, for example, specialization. It is noted that the hierarchy need not follow non-ambiguous or perfect rules, and thus there is no particular limit imposed that the hierarchy necessarily follow these formalisms. Rather, by analyzing those aspects of the hierarchy which comply with these formalisms in accordance therewith, efficiency is facilitated.

In establishing an economic system, a preliminary question is whether the system is microeconomic or macroeconomic; that is, whether the economy is linked to a real economy or insulated from it. One disadvantage of a real economy with respect to a peer relationship is that external wealth can override internal dynamics, thus diminishing the advantages to be gained by optimization, and potentially creating a perception of unfairness for externally less wealthy agents, at least unless and until the system accomplishes a wealth redistribution. An artificial economy provides a solution for a peer network in which each node has an equal opportunity to gain control over the ad hoc network, independent of outside influences and constraints. On the other hand, by insulating the network from external wealth redistribution, real efficiency gains may be unavailable. Therefore, both types of economies, as well as hybrids, are available. Thus, as discussed in more detail below, a "fair" initial (or recurring) wealth distribution may be applied, which may be supplemented with, and/or provide an output of, external wealth. The rules or proportion of external influence may be predetermined, adaptive, or otherwise.

In accordance with the proposed artificial economy, each node has a generator function for generating economic units, which are then used in a transaction (e.g., an auction) with other nodes to create a market economy, that is, each node has a supply and demand function, and acts as a source or sink for a limited resource. In some cases, nodes may have only supply or demand functions, or a degree of asymmetry, but in this case, these are typically subject to an external economic consideration, and the artificial economy will be less effective in providing appropriate incentives. According to one implementation of this embodiment, the artificial economic units have a temporally and/or spatially declining value, so that wealth does not accumulate over long periods and/or cannot be transferred over large distances. The decline may be linear, exponential, or based on some other function. This creates a set of microeconomies insulated from each other. Where distant microeconomies must deal with each other, there is a discount. This architecture provides a number of advantages, for example, by decreasing the influence of more spatially and temporally distant effects, the scope of an optimization analysis may be relatively constrained, while reducing the amount of information which must be stored over time and/or carried over distance in order to permit an optimization. Likewise, since the economy is artificial, the discount need not be recouped within the scope of the system; that is, conservation of capital is not required. In the same manner, a somewhat different incentive structure may be provided; that is, economic units generated at one location and at one time may have a higher value at a different location and time; this may encourage reduced immediate use of the system resources, and relocation to higher valued locations. As discussed below, one embodiment of the invention permits trading of credits, and thus, for example, a user may establish a repeater site at an under-served location to gain credits for use elsewhere. Preferably, beyond a "near field" effect, the value does not continue to increase, since this may result in inflationary pressures, and undermine the utility of the system in optimally balancing immediate supply and demand at a particular location.

As can be seen, through modifications of the governing rules and formulae, the system can be incentivized to behave in certain ways, but care should be exercised since a too narrow analysis of the incentive might result in unintended long term or distant effects. To the extent that human behavior and subjective analysis is involved, care should also be exercised in applying a rationality assumption, since this is not always true. Rather, there may be applicable models for human irrational behavior that are better suited to an understanding of the network behavior in response to a perturbation.

The typical peer-to-peer ad hoc network may be extended to the hierarchal case by treating each branch (including sub-branches) within the chain of command as an economic unit with respect to the generator function. At any level of the hierarchy, the commander optionally retains a portion of the wealth generation capacity, and delegates the remainder to its subordinates. Therefore, the rank and hierarchal considerations are translated to an economic wealth (or wealth generation) distribution. One aspect of this system allows wealth transfer or redistribution, although in a real system, a time delay is imposed, and in the event of a temporally and/or spatially declining value, the transfer will impose a cost. Thus, an initial misallocation is undesired, and there will be an incentive to optimally distribute the wealth initially. Of course, if centralized control with low penalty is desired, it is possible to limit the penalty, if any, for wealth redistribution through appropriate rules, although the time for propagation through the network remains an issue, and blind nodes (i.e., those which do not have an efficient communication path, or have insufficient resources to utilize otherwise available paths through the hierarchy) may also lead to limitations on system performance.

In this system, there may be an economic competitive distortion, under which a node's subjective value of a resource is influenced by its then subjective wealth. If a node is supplied with wealth beyond its needs, the wealth is wasted, since it may decline in value and cannot be hoarded indefinitely. (In a network wealth model in which wealth could be hoarded indefinitely, small deviations from optimality and arbitrage opportunities may be exploited to create a perception of unfairness, thus, this is not preferred.) If a node is supplied with insufficient wealth, economic surplus through transactional gains are lost. Thus, each node must analyze its expected circumstances to retain or delegate the generator function, and to optimally allocate wealth between competing subordinates. Likewise, there may be a plurality of quasi-optimal states.

In any economic transaction, there is an amount that a seller requires to part with the resource, a price a buyer is willing to pay, and a surplus between them. Typically, in a two party transaction, the surplus is allocated to the party initiating the transaction, that is, the party initiating the transaction uses some discovery mechanism to find the minimum price acceptable by the buyer. In brokered or agent-mediated transactions, a portion of the surplus is allocated to a facilitator.

In accordance with one aspect of the present invention, compliance with the community rules, as well as an incentive to bid or ask a true private value is encouraged by distributing a portion of the transaction surplus to losing competitive bidders. While according to one proposal, this portion is allocated in accordance with their reported valuations, this creates a potential incentive for bidders who know they will not be winning bidders to overbid, and thereby gain an increased portion of the surplus. In order to reward honest reporting of private values, the reward function must penalize both overreporting and underreporting of private values. This circumstance occurs if, at each bid, there is a risk of winning commensurate with the bid, and thus the system is strategyproof. In order to achieve this circumstance, for example, a statistical noise or probability distribution may be added to the system, with an acceptance of a bid made a statistical process. This results in a "fuzzy" boundary on the bid value, although it may impose an inefficiency on the market since any deviation from the optimal market price represents a loss.

Another approach to minimizing strategic bidding is to impose a bid fee. That is, each bidder must offer a prepayment corresponding to a small portion of its bid, thereby disincentivizing bidding to lose. The winning bidder will then pay a second price plus the deposit bid. The sellers will receive their own lowest cost (or second cost) bid. Losing bidders will receive a payment in accordance with the value of their bid, less the bid deposit. In order to disincentivize strategic bidding, the average return to a bidder is less than the bid cost. In fact, a good target for the bidder deposit is the administrative cost of transacting the bidding negotiations. This, in turn, provides an incentive to keep the administrative overhead low, thus improving overall system performance, especially where the administrative communications compete with normal communications for bandwidth. In this circumstance, those bidding to win receive either the benefit of the transaction or a payment for deference, less the transactional fee. Those who are bidding strategically, in manner seeking to acquire the deference payment, must risk the transactional cost, and to gain substantially, must submit a relatively high bid. When the bids are "competitive", there is a substantial risk that the bid will be a winning bid, and thus incur the full bid cost. Thus, there is a disincentive to bidding a high value, but without an intent to win. Of course, the bid deposit may be a flat fee, or subject to a mathematical or adaptive function, rather than directly related to administrative cost.

The aggregated bid deposits may, for example, be awarded to a class who are optimally incentivized by the nature of this payment. For example, it may be awarded to those selling bandwidth, in a manner generally inversely proportional to the value of their ask, or, for example, based on allocations during the combinatorial (VCG) auction. This payment would then incentivize sellers to offer services at a low price, improving network availability.

Of course, there may be other classes within the auction population who may be taxed or subsidized, using value derived from the auction process.

In a strategyless auction, automated bidding is quite feasible, since the optimal bid is the computed value. For auctions in which a bidder does not have an incentive to bid its true private value, and thus must assume a strategic play, automated bidding becomes more of a challenge, but may also be automated.

In a strategy-less auction, a bidder cannot gain by bidding over or under its private value. If a bidder bids below its private value, it has a reduced chance of gaining the benefit of the transaction.

In an auction which is subject to strategic bidding, the strategy may be mitigated by imposing commensurate risks and costs to balance the perceived advantage toward zero.

In particular, the competitive bidders seeking to allocate a scarce resource for themselves receive compensation for deferring to the winning bidder in an amount commensurate with their reported value. Thus, sellers receive their minimum acceptable value, buyers pay their maximum valuation, the surplus is distributed to the community in a manner tending to promote the highest bids within the private value of the bidder. In a corresponding manner, the auction rules can be established to incentivized sellers to ask the minimum possible amount, above their reserve. For example, a portion of the surplus may be allocated to bidders in accordance with how close they come to the winning ask. Therefore, both incentives may be applied, for example with the surplus split in two, and half allocated to the bidder pool and half allocated to the seller pool. Clearly, other allocations or proportionations are possible.

The winning bidder and/or seller may be included within the rebate pool. This is particularly advantageous where for various reasons, the winning bidder is not selected. Thus, this process potentially decouples the bidding (auction) process and the resulting commercial transaction.

Because of transactional inefficiencies, human behavioral aspects, and a desire to avoid increased network overhead by "false" bidders seeking a share of the allocation pool without intending to win the auction, it may be useful to limit the allocation of the surplus pool to a subset of the bidders and/or sellers, for example the top three of one or both. This therefore encourages bidders and/or sellers to seek to be in the limited group splitting the pool, and thus incentivizes higher bids and lower asks. Of course, a party will have a much stronger incentive to avoid bidding outside its valuation bounds, so the risk of this type of inefficiency is small.

As discussed above, one embodiment of the invention provides a possible redistribution or wealth among nodes within a hierarchal chain. This redistribution may be of accumulated wealth, or of the generation function portion. Trading among hierarchally related parties is preferred, since the perceived cost is low, and the wealth can be repeatedly redistributed. In fact, it is because of the possibility of wealth oscillation and teaming that the declining wealth function is preferred, since this will tend to defeat closely related party control over the network for extended periods.

It is noted that, in a multihop mobile ad hoc network, if a communication path fail, no further transfers are possible, potentially resulting in stalled or corrupt system configuration. It is possible to transfer an expiring or declining portion of the generating function; however, this might lead a node which is out of range to have no ability to rejoin the network upon return, and thus act as an impediment to efficient network operation. Therefore, it is preferred that, in an artificial economy, each node has some intrinsic wealth generator function, so an extended period of inactivity, a node gains wealth likely sufficient to rejoin the network as a full participant.

In practice, in a typical military-type hierarchy, the bulk of the wealth generating function will be distributed to the lowest ranks with the highest numbers. Thus, under normal circumstances, the network will appear to operate according to a non-hierarchal (i.e., peer) model, with the distortion that not all nodes have a common generator function. On the other hand, hierarchically superior nodes either retain, or more likely, can quickly recruit surrounding subordinates to allocate their wealth generating function and accumulated wealth to pass urgent or valuable messages. Thus, if 85% of the wealth and network resources are distributed to the lowest-ranking members, then the maximum distortion due to hierarchal modifications is 15%.

One way that this allocation of wealth may be apparent is with respect to the use of expensive assets. Thus, a high level node might have access to a high power broadcast system or licensed spectrum, while low level nodes might ordinarily be limited to lower power transmission and/or unlicenced spectrum or cellular wireless communications. For a low level node to generate a broadcast using an expensive asset (or to allocate a massive amount of space bandwidth product), it must pass the request up through the chain of command, until sufficient wealth (i.e., authority) is available to implement the broadcast.

In fact, such communications and authorizations are quite consistent with the expectations within a hierarchal organization, and this construct is likely to be accepted within a military-type hierarchal organization.

Under normal circumstances, a superior would have an incentive to assure that each subordinate node possesses sufficient wealth to carry out its function and be incentivized to participate in the network. If a subordinate has insufficient initial wealth (or wealth generating function) allocation, it may still participate, but it must expend its internal resources to obtain wealth for participation toward its own benefit. This, in turn, leads to a potential exhaustion of resources, and the unavailability of the node for ad hoc intermediary use, even for the benefit of the hierarchy. An initial surplus allocation will lead to overbidding for resources, and thus inefficient resource allocation, potential waste of allocation, and a disincentive to act as an intermediary in the ad hoc network. While in a traditional military hierarchy, cooperation can be mandated, in systems where cooperation is perceived as contrary to the net personal interests of the actor, network stability may be poor, and defection in spite of mandate.

In a military system, it is thus possible to formulate an "engineered" solution which forces participation and eliminates defection; however, it is clear that such solutions forfeit the potential gains of optimality, and incentivizes circumvention and non-compliance. Further, because such a system is not "cost sensitive" (however the appropriate cost function might be expressed), it fails to respond to "market" forces.

Accordingly, a peer to peer mobile ad hoc network suitable for respecting hierarchal organization structures is provided. In this hierarchal system, the hierarchy is represented by an initial wealth or wealth generation function distribution, and the hierarchally higher nodes can reallocate wealth of nodes beneath themselves, exercising their higher authority. This wealth redistribution can be overt or covert, and if overt, the hierarchal orders can be imposed without nodal assent. In a covert redistribution, trust may be required to assure redistribution by a node to a grandchild node.

The wealth and its distribution can be implemented using modified micropayment techniques and other verifiable cryptographic techniques. This wealth can be applied to auctions and markets, to allocate resources. Various aspects of this system are discussed in more detail elsewhere in this specification.

In accordance with aspects of this embodiment, an example is provided. In this scenario, a vehicle traveling along a highway seeks traffic information 10-20 miles ahead on the road. The transceiver in the vehicle has a range of about 0.5 miles, meaning that, assuming maximum hop range, 20-40 hope would be necessary in each direction in order to fulfill a response to a request for information. If we further assume that the traffic density allows an average density of compatible transceivers of 1 per 0.05 miles$^2$, then it would appear that for each hop, a number of intermediaries would be possible. We further assume that each vehicle has a pair of antennas (which may operate on different frequencies), forward and backward looking, so that forward and backward communications are non-interfering. It is noted that, in operation, it is not a single vehicle that seeks information responding to a request; rather, it is likely that 2-25% of vehicles will seek information within a short period, especially of the cost of fulfilling a request is relatively low. We also assume that there is no common trigger event, such as an accident, which would provoke essentially all vehicles to request the same information, a circumstances that could be addressed through a multicast or broadcast.

If the vehicle sought to arrange a communication over the entire 10-20 miles in advance of communicating, this would require a multifactorial optimization likely involving over 100 transceivers, and if even one of the 20-40 intermediates fails, the entire communication fails. The administrative overhead for this process may not outweigh its advantages.

On the other hand, if we instead presume that the vehicle only optimize a path over a limited range or number of hops, e.g., 1 mile or 5 hops, then the optimization is facilitated and the administrative overhead reduced. On the other hand, this requires that vehicles or nodes at the fringe arrange for completion of the communication. It is here that the statistical aspects of the network architecture may be exploited to achieve efficiencies. Thus, in observing or participating in the network activities over a period of time, a node can model the behavior of nearby nodes, and determine a degree of risk with respect to the model. That node may then undertake the risk associated with its assessment of its environment, and communicate an offer to act as agent for completion of the communication, without explicitly communicating the details of the communication. Therefore, the originating node optimizes a local region ad hoc network, and then adopts an estimate of the network state beyond the edge of the local region.

Economically, the vehicle seeking the information broadcasts a bid or value function of its valuation of the resources it requires. This bid is propagated to the local region or beyond, and compared with the bids or value functions of other vehicles or nodes. A winning vehicle or node then assumes control over the minimum temporal-spatial-frequency channel required. As stated above, at the edge of the local region, nodes may act as proxies or agents, and undertake the risk of the more distant communication, adding a risk premium to their ask. The node with the lowest ask is selected as the agent or proxy. It is noted that the role of communication intermediary and proxy or agent is discrete, and therefore need not be a single element, though certain efficiencies are gained if this is the case. The agent or proxy must also conduct an auction for the next stage of the communication, in a process which is repeated until the destination node is included within the local region.

The proxy or agent undertakes the risk of the cost of the downstream communications, as well as the risk of non-payment, and thus may well charge a substantial premium over its actual risk-free cost. Therefore, the efficiency gained through the use of the agent or proxy derives from the administrative efficiencies gained, as well as comprehension that the risks are inherent, and must generally be undertaken by some element of the network. The incrementally added risks may be small, but are transferred. A node which promotes itself for acting as agent or proxy may do so because it has lower risks, costs or otherwise unproductive assets. For example, a cellular telephone carrier may choose to participate in the network, using its fixed infrastructure as a backup, or bypass. In that case, if the network fails, or is less efficient, it has the option of using its own facilities.

The agent or proxy therefore arbitrages the risk, based on its own knowledge of its local region which is different from the local region of the originator of the communication. There may be less competition for the role of arbitrageur, allowing it to claim a larger portion of the economic surplus. In fact, an arbitrageur may pre-acquire resources at a defined price, and resell them later at a profit. Thus, it is seen that economic efficiencies and increased profits for intermediaries are not inconsistent, where opportunities for reduction in inefficiencies exist.

Adding hierarchal element to this example, it is noted that certain risks are reduced when transactions are conducted between related entities. For example, if their respective wealth is interlinked, over the long term, the risk of non-payment is abated. Likewise, the risk of defection or non-compliance is reduced. Further, since it is presumed that the benefit function of related nodes is intertwined, actual costs may be reduced, since the communication itself is a counter-vailing benefit to the cost of a related node conveying the message or packet. Thus, there will likely be a preference for communications between more closely related nodes than between more distantly related or unrelated nodes. On the other hand, since wealth (virtual or real) itself is desirable, and inter-party transactions limit wealth gain opportunities, there will also be an incentive to conduct transactions with unrelated nodes for full value. As discussed above, in a hierarchy, a top level node is initially allocated the entire wealth and/or wealth generation function for its subordinates, which is then redistributed as appropriate or desired. The top level node will generally not maintain more wealth than required, since this is inefficient, and redistributions incur their own inefficiencies.

The economy is preferably virtual, employing arbitrary value credits generated using a cryptographic function. One possible exception is where external elements, such as cellular telephone carriers, are integrated into the system. Since these are real economy agents, there must be some interchange in value between credits and cash, unless the cellular carrier gains a benefit from the ad hoc network. One such possible benefit is extension of its fixed infrastructure to serve under-covered areas. Another possible benefit is the ability to provide information from the ad hoc network to more remote areas. A further benefit is the ability to use unlicensed spectrum for its activities in a standard and non-interfering manner.

In the virtual economy, each node has a physically and/or logically secure cryptographic module, which sequentially generates values which have a unique index number, and may be verified as to node and time of origin, and possibly chain of owners. A node receiving this value can therefore verify that it is authentic, its time of creation (and therefore amortization schedule), and as an audit trail, the chain of ownership. Each bid is also cryptographically secure and signed, so that if a node places a bid, and later fails to pay, a later investigation can be conducted to correctly account for the transaction, and possibly penalize wrongdoing. The payments for a communication are communicated after the transaction, in a cryptographic wrapper (cryptolope) destined for a target node. Since these are secure, the opportunity for theft is low, and there is little incentive for intentional delay of transmission by any intermediate. Further, these packets may be transmitted along redundant paths, to limit the ability of any one node to disrupt communications.

The ability of a node to spend the same value packet twice is limited by a number of factors. First, since each node has a defined generator function, if its spending exceeds its generation capacity, this will be apparent to nearby nodes. Second, since each packet has an index value, the other nodes may compare these values to make sure that they are not used more than once by any node, before they are transferred to another node. Since the value of the credit declines in value over time, indefinite period monitoring is not required.

In some instances, saving value may be an efficient strategy. In order to take advantage of these gains, special bank nodes may be established which have the ability to hoard credits and then reissue new credits when required. Typically, there will be no interest, and in fact there may be discount and delay. The net result of promoting savings will typically be a reduction in demand with respect to supply, thus increasing availability of resources. By allowing withdrawal of savings, periods of inflation and high peak demand is possible. Further, if the withdrawn wealth has the same amortization schedule as newly generated credits, an event which provokes a "run on the bank" may result in a rapid diminution of saved wealth, unless the immediate recipients bank the newly transferred wealth.

As is seen, many of the economic institutions of the real economy have equivalents in the virtual economy, and therefore may be employed in their traditional and known roles to improve efficiency where the self-organizing features of the network alone incur corresponding inefficiencies, thus creating opportunities. Where necessary, links to a real economy, in order to pay for capital investment, efforts, or compensate for risks, may be employed, however it is preferred that these links be attenuated in order to isolate the bulk of the ad hoc network from the influence of real-economy node wealth, and therefore to promote defection of those nodes who are disadvantaged thereby.

Second Embodiment

Multihop Ad Hoc Networks require cooperation of nodes which are relatively disinterested in the content being conveyed. Typically, such disinterested intermediaries incur a cost for participation, for example, power consumption or opportunity cost. Economic incentives may be used to promote cooperation of disinterested intermediaries. An economic optimization may be achieved using a market price-finding process, such as an auction. In many scenarios, the desire for the fairness of an auction is tempered by other concerns, i.e., there are constraints on the optimization which influence price and parties of a transaction. For example, in military communication systems, rank may be deemed an important factor in access to, and control over, the communications medium. A simple process of rank-based preemption, without regard for subjective or objective importance, will result in an inefficient economic distortion. In order to normalize the application of rank, one is presented with two options: imposing a normalization scheme with respect to rank to create a unified economy, or considering rank using a set of rules outside of the economy. One way to normalize rank, and the implicit hierarchy underlying the rank, is by treating the economy as an object-oriented hierarchy, in which each individual inherits or is allocated a subset of the rights of a parent, with peers within the hierarchy operating in a purely economic manner. The extrinsic consideration of rank, outside of an economy, can be denominated "respect", which corresponds to the societal treatment of the issue, rather than normalizing this factor within the economy, in order to avoid unintended secondary economic distortion. Each system has its merits and limitations.

An economic optimization is one involving a transaction in which all benefits and detriments can be expressed in normalized terms, and therefore by balancing all factors, including supply and demand, at a price, an optimum is achieved. Auctions are well known means to achieve an economic optimization between distinct interests, to transfer a good or right in exchange for a market price. While there are different types of auctions, each having their limitations and attributes, as a class these are well accepted as a means for transfer of goods or rights at an optimum price. Where multiple goods or rights are required in a sufficient combination to achieve a requirement, a so-called Vickrey-Clarke-Groves (VCG) auction may be employed. In such an auction, each supplier asserts a desired price for his component. The various combinations which meet the requirement are then compared, and the lowest cost combination selected. In a combinatorial supply auction, a plurality of buyers each seek a divisible commodity, and each bids its best price. The bidders with the combination of prices which is maximum is selected. In a commodity market, there are a plurality of buyers and sellers, so the auction is more complex. In a market economy, the redistribution of goods or services are typically transferred between those who value them least to those who value them most. The transaction price depends on the balance between supply and demand; with the surplus being allocated to the limiting factor.

Third Embodiment

A third embodiment of the invention, described below, represents a system which may employ a self-organizing network to convey information between mobile nodes. It is expressly understood that the concepts set forth above in the first and second embodiments are directly applicable, and each aspect of the third embodiment may be extended using the hierarchal principles and modifications, in a consistent manner, to achieve the advantages described herein. That is, while the third embodiment generally describes peer nodes, the extension of the systems and methods to non-peer nodes is specifically envisioned and encompassed.

This patent builds upon and extends aspects of U.S. Pat. No. 6,252,544 (Hoffberg), Jun. 26, 2001, and U.S. Pat. No. 6,429,812, Aug. 6, 2002, which are expressly incorporated herein by reference in its entirety. See, also, U.S. Pat. No. 6,397,141 (Binnig, May 28, 2002, Method and device for signaling local traffic delays), expressly incorporated herein by reference, which relates to a method and an apparatus for signaling local traffic disturbances wherein a decentralized communication between vehicles, which is performed by exchanging their respective vehicle data. Through repeated evaluation of these individual vehicle data, each reference vehicle may determine a group of vehicles having relevance for itself from within a maximum group of vehicles and compare the group behavior of the relevant group with its own behavior. The results of this comparison are indicated in the reference vehicle, whereby a homogeneous flow of traffic may be generated, and the occurrence of accidents is reduced.

One aspect of the invention provides a communications system, method and infrastructure. According to one preferred embodiment, an ad hoc, self organizing, cellular radio system (sometimes known as a "mesh network") is provided. Advantageously, high gain antennas are employed, preferably electronically steerable or phased array antennas, to provide efficient communications and to increase spatial communications bandwidth, both between nodes and for the system comprising a plurality of nodes communicating with each other. See, U.S. Pat. No. 6,507,739 (Gross, et al., Jan. 14, 2003), expressly incorporated herein by reference.

In general, time-critical, e.g., voice communications require tight routing to control communications latency. On the other hand, non-time critical communications generally are afforded more leeway in terms of communications pathways, including a number of "hops", retransmission latency, and out-of-order packet communication tolerance, between the source and destination or fixed infrastructure, and quality of communication pathway. Further, it is possible to establish redundant pathways, especially where communications bandwidth is available, multiple paths possible, and no single available path meets the entire communications requirements or preferences.

Technologies for determining a position of a mobile device are also well known. Most popular are radio triangulation techniques, including artificial satellite and terrestrial transmitters or receivers, dead reckoning and inertial techniques. Advantageously, a satellite-based or augmented satellite system, although other suitable geolocation systems are applicable.

Navigation systems are also well known. These systems generally combine a position sensing technology with a geographic information system (GIS), e.g., a mapping database, to assist navigation functions. Systems which integrate GPS, GLONASS, LORAN or other positioning systems into vehicular guidance systems are well known, and indeed navigational purposes were prime motivators for the creation of these systems.

Environmental sensors are well known. For example, sensing technologies for temperature, weather, object proximity, location and identification, vehicular traffic and the like are well developed. In particular, known systems for analyzing vehicular traffic patterns include both stationary and mobile sensors, and networks thereof. Most often, such networks provide a stationary or centralized system for analyzing traffic information, which is then broadcast to vehicles.

Encryption technologies are well known and highly developed. These are generally classified as being symmetric key, for example the Data Encryption Standard (DES), and the more recent Advanced Encryption Standard (AES), in which the same key is used for encryption as decryption, and asymmetric key cryptography, in which different and complementary keys are used to encrypt and decrypt, in which the former and the latter are not derivable from each other (or one from the other) and therefore can be used for authentication and digital signatures. The use of asymmetric keys allows a so-called public key infrastructure, in which one of the keys is published, to allow communications to be directed to a possessor of a complementary key, and/or the identity of the sender of a message to be verified. Typical asymmetric encryption systems include the Rivest-Shamir-Adelman algorithm (RSA), the Diffie-Hellman algorithm (DH), elliptic curve encryption algorithms, and the so-called Pretty Good Privacy (PGP) algorithm.

One embodiment of the invention provides a system that analyzes both a risk and an associated reliability. Another embodiment of the invention communicates the risk and associated reliability in a manner for efficient human comprehension, especially in a distracting environment. See, U.S. Pat. Nos. 6,201,493; 5,977,884; 6,118,403; 5,982,325; 5,485,161; WO0077539, each of which is expressly incorporated herein by reference, and the Uniden GPSRD (see Uniden GPSRD User's Manual, expressly incorporated herein by reference). See, also U.S. Pat. Nos. 5,650,770; 5,450,329; 5,504,482; 5,504,491; 5,539,645; 5,929,753; 5,983,161; 6,084,510; 6,255,942; 6,225,901; 5,959,529; 5,752,976; 5,748,103; 5,720,770; 6,005,517; 5,805,055; 6,147,598; 5,687,215; 5,838,237; 6,044,257; 6,144,336; 6,285,867; 6,340,928; 6,356,822; 6,353,679 each of which is expressly incorporated herein by reference.

According to this embodiment, a vehicle equipped with sensors, or acting as a probe, acquires information from its surroundings, and communicates them to other vehicles, either directly or through a number of hops. By advantageously employing advanced radio and communication technologies, efficient and reliable transfer video data over unlicensed spectrum may be supported, even multiple real-time streams over potentially conflicting channels.

Statistical Analysis

It is understood that the below analysis and analytical tools, as well as those known in the art, may be used individually, in sub-combination, or in appropriate combination, to achieve the goals of the invention. These techniques may be implemented in dedicated or reprogrammable/general purpose hardware, and may be employed for low level processing of signals, such as in digital signal processors, within an operating system or dynamic linked libraries, or within application software. Likewise, these techniques may be applicable, for example, to low level data processing, system-level data processing, or user interface data processing.

A risk and reliability communication system may be useful, for example, to allow a user to evaluate a set of events in statistical context. Most indicators present data by means of a logical indicator or magnitude, as a single value. Scientific displays may provide a two-dimensional display of a distribution, but these typically require significant user focus to comprehend, especially where a multimodal distribution is represented. Typically, the human visual input can best accommodate a three dimensional color input representing a set of bounded objects which change partially over time, and it is ergonomically difficult to present more degrees of freedom of information simultaneously. That is, the spatial image is not arbitrary, but represents bounded objects (or possibly fuzzy edges), and the sequence over time should provide transitions. User displays of a magnitude or binary value typically do not provide any information about a likelihood of error. Thus, while a recent positive warning of the existence of an event may be a reliable indicator of the actual existence of the event, the failure to warn of an event does not necessarily mean that the event does not exist. Further, as events age, their reliability often decreases.

The present invention therefore seeks to provide additional information which may be of use in decision-making, including a reliability of the information presented, and/or risk associated with that information, if true. These types of information are typically distinct from the objects themselves. In order to present these additional degrees of freedom of information within the confines of efficient human cognition, a new paradigm is provided. Essentially, the objects presented (which may be, for example, identifiers of events), are mapped or ranked by a joint function of risk and reliability. Typically, the joint function will adopt economic theory to provide a normalized cost function. Of course, the risk and reliability need not be jointly considered, and these may remain independent considerations for mapping purposes. Because of human subjective perception of risk and reliability, it may be useful to tune the economic normalized cost function for subjective considerations, although in other instances, an objective evaluation is appropriate and efficient.

In analyzing a complex data set for both time and space patterns, wavelets may be useful. While the discrete wavelet transform (DWT), an analogy of the discrete Fourier transform (DFT) may be employed, it is perhaps more general to apply arbitrary wavelet functions to the data set, and adopting mathematical efficiencies as these present themselves, rather than mandating that an efficient and predefined transform necessarily be employed.

See references listed in Transforms Appendix, each of which is expressly incorporated herein by reference.

One embodiment of the present invention thus advances the art by explicitly communicating reliability or risk information to the user. Therefore, in addition to communicating an event or predicted event, the system also computes or determines a reliability of the information and outputs this information. The reliability referred to herein generally is unavailable to the original detection device, though such device may generate its own reliability information for a sensor reading.

Therefore, one user interface embodiment according to this embodiment is improved by outputting information relating to both the event and a reliability or risk with respect to that information.

According to a preferred embodiment of the invention, a vehicle travel information system is provided, for example integrated with a vehicular navigation system. In a symmetric peer-to-peer model, each vehicle includes both environmental event sensors and a user interface, but the present invention is not dependent on both aspects being present in a device. As the vehicle travels, and as time advances, its context sphere is altered. For any context sphere, certain events or sensed conditions will be most relevant. These most relevant events or sensed, to the extent known by the system, are then output through a user interface. However, often, the nature or existence of relevant or potentially relevant event is unreliable, or reliance thereon entail risk.

In the case of a vehicle traveling along a roadway, there are two particular risks to analyze: first, that the recorded event may not exist (false positive), and second, that an absence of indication of an event is in error (false negative). For example, the degree of risk may be indicated by an indication of color (e.g., red, yellow green) or magnitude (e.g., a bar graph or dial).

In many cases, the degree of risk is calculable, and thus may be readily available. For example, if the event sensor is a detection of police radar, reliability may be inferred from a time since last recording of an event. If a car is traveling along a highway, and receives a warning of traffic enforcement radar from a car one mile ahead, there is a high degree of certainty that the traffic enforcement radar will actually exist as the vehicle proceeds along the highway. Further, if the traffic radar is in fixed location, there is a high degree of certainty that there is no traffic enforcement radar closer than one mile. On the other hand, if a warning of traffic radar at a given location is two hours old, then the risk of reliance on this information is high, and the warning should be deemed general and advisory of the nature of risks in the region. Preferably, as such a warning ages, the temporal proximity of the warning is spread from its original focus.

On the contrary, if the warning relates to a pothole in a certain lane on the highway, the temporal range of risk is much broader: even a week later, the reliability of the continued existence at that location remains high. However, over the course of a year, the reliability wanes. On the other hand, while there may be a risk of other potholes nearby, the particular detected pothole would not normally move.

The algorithm may also be more complex. For example, if a traffic accident occurs at a particular location, there are generally acceptable predictions of the effect of the accident on road traffic for many hours thereafter. These include rubbernecking, migrations of the traffic pattern, and secondary accidents. These considerations may be programmed, and the set of events and datapoints used to predict spatial and temporal effects, as well as the reliability of the existence of such effects. This, in turn, may be used to advise a traveler to take a certain route to a destination.

Eventually, the reliability of the information is inferred to be so low as to cause an expiration of the event, although preferably a statistical database is maintained to indicate geographic regional issues broadly.

Therefore, the system and method according to the present invention provides an output that can be considered "two dimensional" (or higher dimensional); the nature of the warning, and the reliability of the warning. In conjunction, the system may therefore output a reliability of an absence of warning. In order to conserve communications bandwidth, it is preferred that an absence of warning is inferred from the existence of a communications channel with a counterpart, along with a failure of a detection of an event triggering a warning. Alternately, such communications may be explicit.

The present invention can provide a mobile warning system having a user interface for conveying an event warning and an associated reliability or risk of reliance on the warning.

Preferably, the reliability or risk of reliance is assessed based on a time between original sensing and proximity. The reliability may also be based on the nature of the event or sensed condition. An intrinsic reliability of the original sensed event or condition may also be relayed, as distinct from the reliability or risk of reliance assuming the event or condition to have been accurately sensed.

In order to determine risk, often statistical and probabilistic techniques may be used. Alternately, non-linear techniques, such as neural networks, may be employed. In employing a probabilistic scheme, a sensor reading at time zero, and the associated intrinsic probability of error are stored. A model is associated with the sensor reading to determine a decay pattern. Thus, in the case of traffic enforcement radar, the half-life for a "radar trap" for K band radar being fixed in one location is, for example, about 5 minutes. Thereafter, the enforcement officer may give a ticket, and proceed up the road. Thus, for times less than three minutes, the probability of the traffic enforcement radar remaining in fixed position is high. For this same time-period, the probability that the traffic enforcement officer has moved up the road against the direction of traffic flow is low. A car following 3 miles behind a reliable sensor at 60 mph would therefore have a highly reliable indication of prospective conditions. As the time increases, so does the risk; a car following ten miles behind a sensor would only have a general warning of hazards, and a general indication of the lack thereof. However, over time, a general (and possibly diurnal or other cyclic time-sensitive variation) risk of travel within a region may be established, to provide a baseline.

It is noted that the risks are not limited to traffic enforcement radar or laser. Rather, the scheme according to the present invention is generalized to all sorts of risks. For example, a sensor may detect or predict sun glare. In this case, a model would be quite accurate for determining changes over time, and assuming a reliable model is employed, this condition could generally be accurately predicted.

Another example is road flooding. This may be detected, for example, through the use of optical sensors, tire drag sensors, "splash" sensors, or other known sensors. In this case, the relevant time-constant for onset and decay will be variable, although for a given location, the dynamics may be modeled with some accuracy, based on sensed actual conditions, regional rainfall, ground saturation, and particular storm pattern. Therefore, a puddle or hydroplaning risk may be communicated to the driver in terms of location, likely magnitude, and confidence.

It is noted that these three independent parameters need not all be conveyed to the user. For example, the geographic proximity to an event location may be used to trigger an output. Therefore, no independent output of location may be necessary in this case. In some cases, the magnitude of the threat is relevant, in other cases it is not. In many present systems (e.g., radar detection), threat magnitude is used as a surrogate for risk. However, it is well understood that there are high magnitude artifacts, and low magnitude true threats, and thus this paradigm has limited basis for use. The use of risk or confidence as an independent factor may be express or intermediate. Thus, a confidence threshold may be internally applied before communicating an event to the user. In determining or predicting risk or confidence, it may be preferred to provide a central database. Therefore, generally more complex models may be employed, supported by a richer data set derived from many measurements over an extended period of time. The central database may either directly perform the necessary computations, or convey an appropriate model, preferably limited to the context (e.g., geography, time, general environmental conditions), for local calculation of risk.

The incorporated references relate, for example, to methods and apparatus which may be used as part of, or in conjunction with the present invention. Therefore, it is understood that the present invention may integrate other systems, or be integrated in other systems, having complementary, synergistic or related in some way. For example, common sensors, antennas, processors, memory, communications hardware, subsystems and the like may provide a basis for combination, even if the functions are separate.

The techniques according to the present invention may be applied to other circumstances. Therefore, it is understood that the present invention has, as an object to provide a user interface harnessing the power of statistical methods. Therefore, it is seen that, as an aspect of the present invention, a user interface, a method of providing a user interface, computer software for generating a human-computer interface, and a system providing such a user interface, presents a prediction of a state as well as an indication of a statistical reliability of the prediction.

Within a vehicular environment, the statistical analysis according to the present invention may also be used to improve performance and the user interface of other systems. In particular, modern vehicles have a number of indicators and warnings. In most known systems, warnings are provided at pre-established thresholds. According to the present invention, a risk analysis may be performed on sensor and other data to provide further information for the user, e.g., an indication of the reliability of the sensor data, or the reliability under the circumstances of the sensor data as basis for decision. (For example, a temperature sensor alone does not indicate whether an engine is operating normally.)

Fourth Embodiment

The present example provides a mobile telecommunications device having a position detector, which may be absolute, relative, hybrid, or other type, and preferably a communications device for communicating information, typically location relevant information. The device may serve as a transmitter, transmitting information relevant to the location (or prior locations) of the device, a receiver, receiving information relevant to the location (or prospective location) of the device, or a composite.

In the case of a transmitter device or stand-alone device, a sensor is provided to determine a condition of or about the device or its context. This sensor may populate a map or mapping system with historical map data.

During use, a receiving device seeks to output location context-relevant information to the user, and therefore in this embodiment includes a human user interface. Typically, in a vehicle having a general linear or highly constrained type path, a position output is not a critical feature, and may be suppressed in order to simplify the interface. On the other hand, there are a number of navigation system user interfaces suitable for this application, which may be employed as necessary.

A relative position output, however, may be more appropriate, indicating a relative position (distance, time, etc.) with respect to a potential contextually relevant position. In addition, especially in systems where a plurality of different types of sensors or sensed parameters are available, the nature of the relevant context is also output. Further, as a particular feature of the present invention, a risk or reliability assessment is indicated to the user. This risk or reliability assessment is preferably statistically derived, although it may be derived through other known means, for example Boolean analysis, fuzzy logic, or neural networks.

In this case, risk indicates a parameter of an event, if it occurs, relating to a cost or impairment. Reliability relates to the probability that the event will occur, separate from the risk incurred if it did occur. While it is often possible to produce a composite parameter resulting from a reduction in a perceived cost of the risk based on its reliability or probability of occurrence, this composite eliminates useful or critical information.

For example, the device may provide weather information to the user. Through one or more of meteorological data from standard reporting infrastructure (e.g., NOAA, Accuweather®, etc.), mobile reporting nodes (e.g., mobiles devices having weather sensors), satellite data, and other weather data sources, a local weather map is created, preferably limited to contextual relevance. In most cases, this weather map is stored locally; however, if the quality of service for a communications link may be assured, a remote database system serving one or more devices may be provided. For example, a cellular data communications system may be used to communicate with the Internet or a service provider.

The mobile unit, in operation, determines its position, and, though explicit user input and/or inferential analysis, determines the itinerary or expected path of the device and time sequence. The device (or associated systems) then determines the available weather information for the route and anticipated itinerary (which may itself be dependent on the weather information and/or reaction thereto). This available information is then modeled, for example using a statistical model as described hereinabove, to predict the forthcoming weather conditions for the device or transporting vehicle.

The device then determines the anticipated conditions and relevance sorts them. In this case, both positive and negative information may be useful, i.e., a warning about bad weather, ice, freezing road surfaces, fog, sand-storms, rain, snow, sleet, hail, sun glare, etc., and an indication of dry, warm, well-illuminated road surfaces may both be useful information.

In addition, through the analysis, a number of presumptions and predictions are made, for example using a Markov chain. Therefore, while the system may predict a most likely state of affairs, this alone does not provide sufficient information for full reliance thereon. For example, the present road surface freezing conditions thirty miles ahead on a road may be a poor indicator of the road conditions when the device is at that position. In addition to changes in the weather, human action may be taken, such as road salt, sand, traffic, etc., which would alter the conditions, especially in response to a warning. On the other hand, a report of freezing road conditions one mile ahead would generally have high predictive value for the actual road conditions when the device is at that location, assuming that the vehicle is traveling in that direction. In each case, the risk is similar, but the reliability is different; a composite indication would possibly reduce the 30 mile warning below a noise threshold, even though it may be anticipated that this event would produce substantial traffic and residual delays, even of the event abated before the vehicle approached the respective zone of interest.

In many cases, there is too much raw information to effectively display to the user all relevant factors in making a reliability or risk determination. Thus, the device outputs a composite estimation of the reliability or risk, which may be a numeric or non-parametric value. This is output in conjunction with the nature of the alert and its contextual proximity. Likewise, a threshold function may be applied to squelch notifications of events with low probability, or of low risk, or both.

As stated above, there will generally be a plurality of events, each with an associated risk and/or reliability and respective location. The relevance of an event may be predicted based on the dynamics of the vehicle in which the device is transported and the nature of the event. Thus, if the vehicle requires 170 feet to stop from a speed of 60 MPH, a warning which might trigger a panic stop should be issued between 170-500 feet in advance. If the warning is triggered closer than 170 feet, preferably the warning indicates that the evasive maneuver will be necessary, rather than a panic stop. If the warning is given too far in advance, the triggering event may not even exist as the vehicle approaches, leading to a false alert. In that case, it is better to present an advisory rather than an action item.

In this case, the indication is dependent on a number of factors. First, there is the reliability of the data upon which the warning is based. Second, there is the reliability of the predictive model which extrapolates from, the time the raw data is acquired to the conjunction of the device and the location of the event. Third, there is an assessment of the relative risks of, responding to a false positive versus failing to respond to a false negative. Other risks may also be included in the analysis. Together, the composite risk is output, for example as a color indicator. Using, for example, a tricolor (red-green-blue) light emitting diode (LED) or bicolor LED (red-green), a range of colors may be presented to the user. Likewise, in an audio alert, the loudness or harmonic composition (e.g., harmonic distortion) of a tone or alert signal may indicate the risk or reliability. (In the case of loudness, preferably a microphone measures ambient noise to determine a minimum loudness necessary to indicate an alert).

The position detector is preferably a GPS or combined GPS-GLONASS receiver, although a network position detection system (e.g., Enhanced 911 type system) may also be employed. Preferably, the position detector typically achieves an accuracy of ±10 meters, and preferably provides redundant sensors, e.g., GPS and inertial sensors, in case of failure or error of one of the systems. However, for such purposes as pothole reporting, positional accuracies of 1 to 3 meters are preferred. These may be obtained through a combination of techniques, and therefore the inherent accuracy of any one technique need not meet the overall system requirement.

The position detector may also be linked to a mapping and/or navigation system and possibly a dead reckoning system, in order to pinpoint a position with a geographic landmark. Thus, while precise absolute coordinate measurements of position may be used, it may also be possible to obtain useful data at reduced cost by applying certain presumptions to available data. In an automotive system, steering angle, compass direction, and wheel revolution information may be available, thereby giving a rough indication of position from a known starting point. When this information is applied to a mapping system, a relatively precise position may be estimated. Therefore, the required precision of another positioning system used in conjunction need not be high, in order to provide high reliability position information. For example, where it is desired to map potholes, positional accuracy of 10 cm may be desired, far more precise than might be available from a normal GPS receiver mounted in a moving automobile. Systems having such accuracy may then be used as part of an automated repair system. However, when combined with other data, location and identification of such events is possible. Further, while the system may include or tolerate inaccuracies, it is generally desired that the system have high precision, as compensation for inaccuracies may be applied.

A typical implementation of the device provides a memory for storing events and respective locations. Preferably, further information is also stored, such as a time of the event, its character or nature, and other quantitative or qualitative aspects of the information or its source and/or conditions of acquisition. This memory may be a solid state memory or module (e.g., Flash memory), rotating magnetic and/or optical memory devices, or other known types of memory.

The events to be stored may be detected locally, such as through a detector for radar and/or laser emission source, radio scanner, traffic or road conditions (mechanical vehicle sensors, visual and/or infrared imaging, radar or LIDAR analysis, acoustic sensors, or the like), places of interest which may be selectively identified, itinerary stops, and/or fixed locations. The events may also be provided by a remote transmitter, with no local event detection. Therefore, while means for identifying events having associated locations is a part of the system as a whole, such means need not be included in every apparatus embodying the invention.

Radar detectors typically are employed to detect operating emitters of X (10.5 GHz), K (25 GHz) and Ka (35 GHz) radar emissions from traffic control devices or law enforcement personnel for detecting vehicle speed by the Doppler effect. These systems typically operate as superheterodyne receivers which sweep one or more bands, and detect a wave having an energy significantly above background. As such, these types of devices are subject to numerous sources of interference, accidental, intentional, and incidental. A known system, Safety Warning System (SWS) licensed by Safety Warning System L.C., Englewood Fla., makes use of such radar detectors to specifically warn motorists of identified road hazards. In this case, one of a set of particular signals is modulated within a radar band by a transmitter operated near the roadway. The receiver decodes the transmission and warns the driver of the hazard.

LIDAR devices emit an infrared laser signal, which is then reflected off a moving vehicle and analyzed for delay, which relates to distance. Through successive measurements, a sped can be calculated. A LIDAR detector therefore seeks to detect the characteristic pulsatile infrared energy.

Police radios employ certain restricted frequencies, and in some cases, police vehicles continuously transmit a signal. While certain laws restrict interception of messages sent on police bands, it is believed that the mere detection and localization of a carrier wave is not and may not be legally restricted. These radios tend to operate below 800 MHz, and thus a receiver may employ standard radio technologies.

Potholes and other road obstructions and defects have two characteristics. First, they adversely affect vehicles which encounter them. Second, they often cause a secondary effect of motorists seeking to avoid a direct encounter or damage, by slowing or executing an evasive maneuver. These obstructions may therefore be detected in three ways, first, by analyzing the suspension of the vehicle for unusual shocks indicative of such vents; second, by analyzing speed and steering patterns of the subject vehicle and possibly surrounding vehicles; and third, by a visual, ultrasonic, or other direct sensor for detecting the pothole or other obstruction. Such direct sensors are known; however, their effectiveness is limited, and therefore an advance mapping of such potholes and other road obstructions greatly facilitates avoiding vehicle damage and executing unsafe or emergency evasive maneuvers. An advance mapping may also be useful in remediation of such road hazards, as well.

Traffic jams occur for a variety of reasons. Typically, the road carries traffic above a threshold, and for some reason the normal traffic flow patterns are disrupted. Therefore, there is a dramatic slowdown in the average vehicle speed, and a reduced throughput. Because of the reduced throughput, even after the cause of the disruption has abated, the roadways may take minutes to hours to return to normal. Therefore, it is typically desired to have advance warnings of disruptions, which include accidents, icing, rain, sun glare, lane closures, road debris, police action, exits and entrances, and the like, in order to allow the driver to avoid the involved region or plan accordingly. Abnormal traffic patterns may be detected by comparing a vehicle speed to the speed limit or a historical average speed, by a visual evaluation of traffic conditions, or by broadcast road advisories. High traffic conditions are associated with braking of traffic, which in turn results in deceleration and the illumination of brake lights. Brake lights may be determined by both the specific level of illumination and the center brake light, which is not normally illuminated.

Deceleration may be detected by an optical, radar or LIDAR sensor for detecting the speed and/or acceleration state of nearby vehicles.

While a preferred embodiment of the present invention employs one or more sensors, broadcast advisories, including those from systems according to or compatible with the present invention, provide a valuable source of information relating to road conditions and information of interest at a particular location. Therefore, the sensors need not form a part of the core system. Further, some or all of the required sensors may be integrated with the vehicle electronics ("vetronics"), and therefore the sensors may be provided separately or as options. It is therefore an aspect of an embodiment of the invention to integrate the transceiver, and event database into a vetronics system, preferably using a digital vetronics data bus to communicate with existing systems, such as speed sensors, antilock brake sensors, cruise control, automatic traction system, suspension, engine, transmission, and other vehicle systems.

According to one aspect of the invention, an adaptive cruise control system is provided which, in at least one mode of operation, seeks to optimize various factors of vehicle operation, such as fuel efficiency, acceleration, comfort, tire wear, etc. For example, an automatic acceleration feature is provided which determines and/or implements a most fuel-efficient acceleration for a vehicle, for example by controlling throttle and transmission. Too slow an acceleration will result in increased time at suboptimal gear ratios, while too fast acceleration will waste considerable fuel. In addition, it is sometimes more efficient to vary operating speed than to maintain a constant speed, even if time is considered a cost factor. Actual operating efficiency may be measured during vehicle use, allowing an accurate prediction of fuel efficiency under dynamically changing conditions, such as acceleration. Vehicle sensors may assist in making a determination that optimum acceleration is safe; objects both in front and behind the vehicle may be sensed. If an object is in front of the vehicle, and the closing speed would predict a collision, then the acceleration is decreased, or even brakes applied. If an object is rapidly advancing from the rear, the acceleration may be increased in order to avoid impact or reduce speed differential. See, U.S. Pat. No. 6,445,308 (Koike, Sep. 3, 2002, Positional data utilizing inter-vehicle communication method and traveling control apparatus), U.S. Pat. No. 6,436,005 (Bellinger, Aug. 20, 2002, System for controlling drivetrain components to achieve fuel efficiency goals), U.S. Pat. No. 6,418,367 (Toukura, et al., Jul. 9, 2002, Engine transmission control system), expressly incorporated herein by reference.

Likewise, the operation of a vehicle may be optimized approaching a stop, such as a stop sign, red light, or the like. In this case, the system optimization may be more complex. In addition to fuel economy, wear on brakes, engine (especially if engine drag braking is employed), transmission, tires, suspension, time, accident-related risks, and the like, may also be included. In the case of a stop sign, the issue also arises with respect to a so-called "rolling stop". Such a practice provides that the vehicle does not actually stop, but reaches a sufficiently low speed that the driver could stop if required by circumstances. While this practice is technically considered a traffic violation, in many instances, it is both efficient and useful. For example, a stop line is often located behind an intersection, with impaired visibility. Thus, the vehicle might come to a complete stop, begin to accelerate, and then find that the intersection is not clear, and be forced to stop again. One particular reason for a rolling stop is the storage of energy in the vehicular suspension during acceleration and deceleration. As the vehicle comes to a stop, the springs and shock absorbers of the suspension undergo a damped oscillation, which is relatively comfortable, and destabilizes the vehicle and its contents. To the extent that a rolling stop is safe, efficient and illegal, a change in law is advocate.

According to one aspect of the present invention, the driver may locate a deceleration target and/or a target speed. The vehicle navigation system may assist, recording an exact location of a stop line, geographic (hills, curves, lane marker locations, etc.), weather conditions (ice, sand, puddles, etc.) and other circumstances surrounding the vehicle. Other vehicles obstructions or pedestrians, etc. may also be identified and modeled. Using models of the various components, as well as cost functions associated with each, as well as subjective factors, which may include vehicle occupant timecost and comfort functions, an optimal acceleration or deceleration profile may be calculated. The system may therefore express control over throttle, brakes, transmission shifts, clutch, valve timing, suspension controls, etc., in order to optimize vehicle performance. Of course, a fail-safe and dead-man override would generally be provided to ensure that the vehicle operator endorses the automated control operation.

See U.S. Pat. Nos. (expressly incorporated herein by reference): U.S. Pat. Nos. 6,503,170; 6,470,265; 6,445,308; 6,292,743; 6,292,736; 6,233,520; 6,230,098; 6,220,986; 6,202,022; 6,199,001; 6,182,000; 6,178,377; 6,174,262; 6,098,016; 6,092,014; 6,092,005; 6,091,956; 6,070,118; 6,061,003; 6,052,645; 6,034,626; 6,014,605; 5,990,825; 5,983,154; 5,938,707; 5,931,890; 5,924,406; 5,835,881; 5,774,073; 6,442,473; 4,704,610; 5,712,632; 5,973,616; and 6,008,741.

The radio used for the communications subsystem can be radio frequency AM, FM, spread spectrum, microwave, light (infrared, visible, UV) or laser or maser beam (millimeter wave, infrared, visible), or for short distance communications, acoustic or other communications may be employed. The system preferably employs an intelligent transportation system (ITS) or Industrial, Scientific and Medical (ISM) allocated band, such as the 915 MHz, 2.4 MHz, 5.8 GHz or DSRC band. (The 2.350-2.450 GHz band corresponds to the emission of microwave ovens, and thus the band suffers from potentially significant interference). The 24.125 GHz band, corresponding to K-band police radar, may also be available; however, transmit power in this band is restricted, e.g., less than about 9 mW. The signal may be transmitted through free space or in paths including fiber optics, waveguides, cables or the like. The communication may be short or medium range omnidirectional, line of sight, reflected (optical, radio frequency, retroreflector designs), satellite, secure or non-secure, or other modes of communications between two points, that the application or state-of-the-art may allow. The particular communications methodology is not critical to the invention, although a preferred embodiment employs a spread spectrum microwave transmission.

A particularly preferred communications scheme employs steerable high gain antennas, for example a phased array or mechanically steered directional antenna, which allows a higher spatial reuse of communications bands and higher signal to noise ratio that an omnidirectional antenna.

A number of Dedicated Short Range Communications (DSRC) systems have been proposed or implemented in order to provide communications between vehicles and roadside systems. These DSRC systems traditionally operate in the 900 MHz band for toll collection, while the FCC has recently made available 75 MHz in the 5.850-5.925 GHz range for such purposes, on a co-primary basis with microwave communications, satellite uplinks, government radar, and other uses. However, spectrum is also available in the so-called U-NII band, which encompasses 5.15-5.25 GHz (indoors, 50 mW) and 5.25-5.35 (outdoors, 250 mW). A Japanese ITS ("ETC") proposal provides a 5.8 GHz full duplex interrogation system with a half duplex transponder, operating at about 1 megabit per second transmission rates.

In August 2001, the DSRC standards committee (ASTM 17.51) selected 802.11a as the underlying radio technology for DSRC applications within the 5.850 to 5.925 GHz band. The IEEE 802.11a standard was modified, in a new standard referred to as 802.11a R/A (roadside applications) to meet DSRC deployment requirements, and includes OFDM modulation with a lower data rate, 27 MBS for DSRC instead of 54 MBS for 802.11a.

Proposed DSRC applications include:

Emergency Vehicle Warning—Currently, emergency vehicles only have sirens and lights to notify of their approach. With DSRC, the emergency vehicle can have the traffic system change traffic lights to clear traffic along its intended route. Also, this route information can be broadcast to other cars to provide user/vehicle specific directions to reduce collisions.

Traffic congestion data can be exchanged between vehicles. On-coming traffic exchanges information on traffic status ahead so that vehicle navigation systems can dynamically provide the best route to a destination.

An industry standard interoperable tolling platform could expand the use of toll systems or processing payments at parking lots, drive-through establishments (food, gas), etc.

Safety applications could benefit from use of DSRC. The DSRC automaker consortium (DaimlerChrysler, GM, Ford, Toyota, Nissan, & VW) are seeking ways to enhance passenger safety with DSRC communications. For example, in a typical collision, a car has only 10 milliseconds to tighten seatbelts, deploy airbags, etc. If an additional advance warning of 5 milliseconds was provided, one could tighten seatbelts, warm-up the airbags, etc. to prepare the car for collision. Using radar, GPS data, etc. a car can determine that a collision is imminent, and it can then notify the car about to be hit to prepare for collision.

It is noted that the present technology has the capability for streamlining transportation systems, by communicating traffic conditions almost immediately and quickly allowing decisions to be made by drivers to minimize congestion and avoid unnecessary slowdowns. A particular result of the implementation of this technology will be a reduction in vehicular air pollution, as a result of reduced traffic jams and other inefficient driving patterns. To further the environmental protection aspect of the invention, integration of the database with cruise control and driver information systems may reduce inefficient vehicle speed fluctuations, by communicating to the driver or controlling the vehicle at an efficient speed. As a part of this system, therefore, adaptive speed limits and intelligent traffic flow control devices may be provided. For example, there is no need for fixed time traffic lights if the intersection is monitored for actual traffic conditions. By providing intervehicle communications and identification, such an intelligent system is easier to implement. Likewise, static speed limits may be eliminated in favor of a system which employs intelligence to optimize the traffic flow patterns based on actual existing conditions and safe and reasonable limits, rather than a static set of rules which are applied universally and without intelligence. See:

ASTM E2213-02—Standard Specification for Telecommunications and Information Exchange Between Roadside and Vehicle Systems—5 GHz Band Dedicated Short Range Communications (DSRC) Medium Access Control (MAC) and Physical Layer (PHY) Specifications (This standard, ASTM E2213-02—Standard Specification for Telecommunications and Information Exchange Between Roadside and Vehicle Systems—5 GHz Band Dedicated Short Range Communications (DSRC) Medium Access Control (MAC) and Physical Layer (PHY) Specifications, describes a medium access control layer (MAC) and physical layer (PHY) specification for wireless connectivity using dedicated short-range communications (DSRC) services. This standard is based on and refers to the Institute of Electrical and Electronics Engineers (IEEE) standard 802.11 (Wireless LAN Medium Access Control and Physical Layer specifications), and standard 802.11a (Wireless LAN Medium Access Control and Physical Layer specifications High-Speed Physical Layer in the 5 GHz band). This standard is an extension of IEEE 802.11 technology into the high-speed vehicle environment. It contains the information necessary to explain the difference between IEEE 802.11 and IEEE 802.11a operating parameters required to implement a mostly high-speed data transfer service in the 5.9-GHz Intelligent Transportation Systems Radio Service (ITS-RS) band or the Unlicensed National Information Infrastructure (UNII) band, as appropriate).

ANSI X3.38-1988 (R1994)—Codes—Identification of States, the District of Columbia, and the Outlying and Associated Areas of the United States for Information Interchange ASTM PS111-98—Specification for Dedicated Short Range Communication (DSRC) Physical Layer Using Microwave in the 902 to 928 MHz Band ASTM PS105-99—Specification for Dedicated Short Range Communication (DSRC) Data Link Layer: Medium Access and Logical Link Control CEN Draft Document: prENV278/9/#65 Dedicated Short Range Communication (DSRC)—Application Layer (Layer 7)

IEEE Std 1489-1999—Standard for Data Dictionaries for Intelligent Transportation Systems—Part 1: Functional Area Data Dictionaries GSS Global Specification for Short Range Communication. The platform for Interoperable Electronic Toll Collection and Access Control ISO 3166-1:1997—Codes for the representation of names of countries and their subdivisions—Part 1: Country codes ISO 3779:1983—Road vehicles—Vehicle identification numbering (VIN)—Content and structure ISO/IEC 7498-1:1994—Information technology—Open Systems Interconnection—Basic Reference Model: The Basic Model ISO 7498-2:1989—Information processing systems—Open Systems Interconnection—Basic Reference Model—Part 2: Security Architecture ISO/IEC 7498-3:1997—Information technology—Open Systems Interconnection—Basic Reference Model: Naming and addressing ISO/IEC 7498-4:1989—Information processing systems—Open Systems Interconnection—Basic Reference Model—Part 4: Management framework ISO 3780:1983—Road vehicles—World manufacturer identifier (WMI) code ISO/IEC 8824-1:1995—Information technology—Abstract Syntax Notation One (ASN.1): Specification of basic notation ISO/IEC 8825-2:1996—Information technology—ASN.1 encoding rules: Specification of Packed Encoding Rules (PER)

ISO TC204 WG15 Committee Of Japan TICS/DSRC—DSRC Application Layer High Data Rate mobile environment ASTM E2158-01—Standard Specification for Dedicated Short Range Communication (DSRC) Physical Layer Using Microwave in the 902-928 MHz Band ASTM PS 105-99—Standard Provisional Specification for Dedicated Short Range Communication (DSRC) Data Link Layer IEEE Std 1455-1999—Standard for Message Sets for Vehicle/Roadside Communications IEEE Std 802.11-1999—Information Technology—Telecommunications and information exchange between systems—Local and metropolitan area networks—Specific requirements—Part 11: Wireless LAN Medium Access Control and Physical Layer specifications IEEE Std 802.11a-1999—Information Technology—Telecommunications and information exchange between systems—Local and metropolitan area networks—Specific requirements—Part 11: Wireless LAN Medium Access Control and Physical Layer specifications: High Speed Physical Layer in the 5 GHz band Each of which is expressly incorporated herein in its entirety.

It is noted that the present technology has the capability for streamlining transportation systems, by communicating traffic conditions almost immediately and quickly allowing decisions to be made by drivers to minimize congestion and avoid unnecessary slowdowns. A particular result of the implementation of this technology will be a reduction in vehicular air pollution, as a result of reduced traffic jams and other inefficient driving patterns. To further the environmental protection aspect of the invention, integration of the database with cruise control and driver information systems may reduce inefficient vehicle speed fluctuations, by communicating to the driver or controlling the vehicle at an efficient speed. As a part of this system, therefore, adaptive speed limits and intelligent traffic flow control devices may be provided. For example, there is no need for fixed time traffic lights if the intersection is monitored for actual traffic conditions. By providing intervehicle communications and identification, such an intelligent system is easier to implement. Likewise, the 55 miles per hour speed limit that was initially presented in light of the "oil crisis" in the 1970's, and parts of which persist today even in light of relatively low petroleum pricing and evidence that the alleged secondary health and safety benefit is marginal or non-existent, may be eliminated in favor of a system which employs intelligence to optimize the traffic flow patterns based on actual existing conditions, rather than a static set of rules which are applied universally and without intelligence.

The communications device may be a transmitter, receiver or transceiver, transmitting event information, storing received event information, or exchanging event information, respectively. Thus, while the system as a whole typically involves a propagation of event information between remote databases, each system embodying the invention need not perform all functions.

In a retroreflector system design, signal to noise ratio is improved by spatial specificity, and typically coherent detection. An interrogation signal is emitted, which is modulated and redirected back toward its source, within a relatively wide range, by a receiver. Thus, while the receiver may be "passive", the return signal has a relatively high amplitude (as compared to nonretroreflective designs under comparable conditions) and the interrogator can spatially discriminate and coherently detect the return signal. Both optical and RF retroreflector systems exist. This technique may also be used to augment active communications schemes, for example allowing a scanning or array antenna to determine an optimal position or spatial sensitivity or gain, or a phase array or synthetic aperture array to define an optimal spatial transfer function, even in the presence of multipath and other types of signal distortion and/or interference.

According to one embodiment of the invention, a plurality of antenna elements are provided. These may be, for example, a set of high gain antennas oriented in different directions, or an array of antennas, acting together. Accordingly, the antenna structure permits a spatial division multiplexing to separate channels, even for signals which are otherwise indistinguishable or overlapping. For example, this permits a single antenna system to communicate with a plurality of other antenna systems at the same time, with reduced mutual interference. Of course, these communications channels may be coordinated to further avoid overlap. For example, the communications band may be subdivided into multiple channels, with respective communications sessions occurring on different channels. Likewise, a plurality of different bands may be simultaneously employed, for example 802.11g (2.4 GHz), 802.11a (5.4 GHz), and 802.11a R/A (5.9 GHz). In another embodiment, a mechanically scanning high gain antenna may provide directional discrimination. Such an antenna may be, for example, a cylindrical waveguide electromagnetically reflective at one end, having a diameter corresponding to the wavelength of the band, and with a probe extending about half-way into the cylinder perpendicularly to its axis, at about a quarter wavelength from the reflective end. Likewise, a so-called "Pringles Can Antenna", which has been termed a Yagi design, and known modifications thereof, have been deemed useful for extending the range of 802.11b communications.

According to one embodiment, a radome may be provided on the roof of a vehicle, having therein an antenna array with, for example, 4-64 separate elements. These elements, are, for example, simple omnidirectional dipole antennas. The size and spacing of the antenna elements is generally determined by the wavelength of the radiation. However, this distance may be reduced by using a different dielectric than air. For example, see U.S. Pat. No. 6,452,565, expressly incorporated herein by reference. See, also antenova.com (Antenova Ltd., Stow-cum-Quy, Cambridge, UK).

A preferred radome also includes GPS antenna, as well as cellular radio antenna (IS-95, PCS, GSM, etc.).

In a preferred embodiment, the communications device employs an unlicensed band, such as 900 MHz (902-928 MHz), FRS, 49 MHz, 27 MHz, 2.4-2.5 GHz, 5.4 GHz, 5.8 GHz, etc. Further, in order to provide noise immunity and band capacity, spread spectrum RF techniques are preferred.

As appropriate, multiple-input multiple-output (MIMO) antenna radio technologies may be employed to increase channel bandwidth, though in a mobile system the benefits of this technology may be limited.

In one embodiment, communications devices are installed in automobiles. Mobile GPS receivers in the vehicles provide location information to the communications devices. These GPS receivers may be integral or separate from the communications devices. Event detectors, such as police radar and laser (LIDAR) speed detectors, traffic and weather condition detectors, road hazard detectors (pot holes, debris, accidents, ice, mud and rock slides, drunk drivers, etc.), traffic speed detectors (speedometer reading, sensors for detecting speed of other vehicles), speed limits, checkpoints, toll booths, etc., may be provided as inputs to the system, or appropriate sensors integrated therein. The system may also serve as a beacon to good Samaritans, emergency workers and other motorists in the event of accident, disablement, or other status of the host vehicle.

It is noted that at frequencies above about 800 MHz, the transmitter signal may be used as a part of a traffic radar system. Therefore, the transmitted signal may serve both as a communications stream and a sensor emission. Advantageously, an electronically steerable signal is emitted from an array. Reflections of the signal are then received and analyzed for both reflection time coefficients and Doppler shifts. Of course, a radar may use static antennas and/or mechanically scanning antennas, and need not completely analyze the return signals.

Functions similar to those of the Cadillac (GM) On-Star system may also be implemented, as well as alarm and security systems, garage door opening and "smart home" integration. Likewise, the system may also integrate with media and entertainment systems. See, U.S. Pat. Nos. 6,418,424; 6,400,996; 6,081,750; 5,920,477; 5,903,454; 5,901,246; 5,875,108; 5,867,386; 5,774,357, expressly incorporated herein by reference. These systems may reside in a fixed location, within the vehicle, or distributed between fixed and mobile locations. The system may also integrate with a satellite radio system, and, for example, the satellite radio antenna may be included in the antenna system for other communication systems within the vehicle.

The memory stores information describing the event as well as the location of the event. Preferably, the memory is not organized as a matrix of memory addresses corresponding to locations, e.g., a "map", but rather in a record format having explicitly describing the event and location, making storage of the sparse matrix more efficient and facilitating indexing and sorting on various aspects of each data record. Additional information, such as the time of the event, importance and nature of the event, expiration time of the event, source and reliability of the event information, and commercial and/or advertising information associated with the event may be stored. The information in the memory is processed to provide a useful output, which may be a simple alphanumeric, voice (audible) or graphic output of the telecommunications system. In any case, the output is preferably presented in a sorted order according to pertinence, which is a combination of the abstract importance of the event and proximity, with "proximity" weighted higher than "importance". Once a communication or output cycle is initiated, it may continue until the entire memory is output, or include merely output a portion of the contents, for example the contextually relevant portion having a risk and/or reliability exceeding a threshold.

Typically, a navigation system includes a raster "map" of geographic regions, which is further linked to a database of features, geocoded to the map. Alternately, the map may itself be a set of geocoded features, without a raster representation. Various events and features defined by the sensors provided by the present system, or received through a communications link, may therefore be overlaid or integrated into the geocoded features. Advantageously, all of the geocoded features are separately defined from the static geography, and therefore may be separately managed and processed. For example, geologic features are persistent, and absent substantial human activity or natural disaster, are persistent. Other features, such as roads, attractions, and other conditions, are subject to change periodically. Each geocoded feature (or indeed, any feature or event, whether geocoded or not) may be associated with a timeconstant representing an estimated life; as the time since last verification increases, the probability of change also increases. This may be used to provide a user with an estimation of the reliability of the navigation system, or indeed any output produced by the system. It is noted that the timeconstant may also be replaced with an expression or analysis which is a function of time, that is, to account for diurnal, weekly, seasonal, annual, etc. changes. Such expression or analysis need not be repetitive; for example, after an abnormality in traffic flow, traffic patterns tend to remain distorted for a long period (e.g., hours) after the abnormality is corrected, or after a driver passes the abnormality; this distortion is both temporally and spatially related to the original abnormality, and may be statistically estimated. Chaos, fractal and/or wavelet theories may be particularly relevant to this analysis, and employed as desired to analyze or present the data.

In outputting information directly to a human user, thresholds are preferably applied to limit output to events which are of immediate consequence and apparent importance. For example, if the communications device is installed in a vehicle, and the information in the memory indicates that a pothole, highway obstruction, or police radar "trap" is ahead, the user is informed. Events in the opposite direction (as determined by a path or velocity record extracted from the position detector) are not output, nor are such events far away. On the other hand, events such as road icing, flooding, or the like, are often applicable to all nearby motorists, and are output regardless of direction of travel, unless another communications device with event detector indicates that the event would not affect the local communications device or the vehicle in which it is installed.

According to one embodiment of the invention, relevance of information and information reliability are represented as orthogonal axes. For each set of facts or interpretation (hypothesis) thereof, a representation is projected on the plane defined by these two axes. This representation for each event generally takes the form of a bell curve, although the statistics for each curve need not be Gaussian. The area under the superposed curves, representing the constellation of possible risks or relevances, are then integrated, starting with relevance=1.00 (100%), proceeding toward relevance=0.00 (0%). As the area under a given peak exceeds a threshold, which need not be constant, and indeed may be a function of relevance or reliability, and/or subjective factors, the event is presented as a warning output to the user. This method ensures that the output includes the most relevant events before less relevant events, but excluding those events with low reliability. Using a dynamic threshold, highly relevant events of low reliability are presented, while low relevance events of even modest reliability are suppressed. It is possible for the threshold to exceed 1.0, that is, a complete suppression of irrelevant events, regardless of reliability.

Alternately, the event projection into the relevance-reliability plane may be normalized by a function which accounts for the desired response function, with a static threshold applied.

The reason why the determination employs an integration of a stochastic distribution, rather than a simple scalar representation of events, is that this allows certain events with broad distributions, but a mean value below than of another event with a narrower distribution, to be ranked ahead, as being more significant. This has potentially greater impact for events having decidedly non-normal distributions, for example with significant kurtosis, skew, multimodality, etc., and in which a mean value has no readily interpretable meaning.

The present invention therefore provides a method, comprising receiving a set of facts or predicates, analyzing the set of facts or predicates to determine possible events, determining, from the possible events, a relevance to a user and associated statistical distribution thereof, and presenting a ranked set of events, wherein said ranking is dependent on both relevance and associated statistical distribution. The associated statistical distribution, for example, describes a probability of existence of an associated event, and the relevance comprises a value function associated with that event if it exists, wherein said ranking comprises an analysis of probability-weighted benefits from each event to an overall utility function for the user. The ranking may comprises a combinatorial analysis of competing sets of rankings.

It is therefore apparent that each set of events, that is, a set of facts or factual predicates, or conclusions drawn therefrom, are represented as a distribution projected into a relevance-reliability plane. On the abscissa, relevance has a scale of 0 to 1. At zero relevance, the information is considered not useful, whereas at a relevance value approaching 1, the information is considered very relevant. Since the determination of relevance is generally neither exact nor precise, there is an associated reliability, that is, there is a range of possibilities and their likelihoods relating to a set of presumed facts. The various possibilities sum to the whole, which means that the area under the curve (integral from 0 to 1 of the distribution curve) should sum to 1, although various mathematical simplifications and intentional or unintentional perturbations may alter this integrated area. Relevance requires a determination of context, which may include both objective and subjective aspects. Communicated relevance information typically should be determined with respect to the requestor, not the requestee, although in certain circumstances, the requestee (possibly with adjustments) may serve as a proxy for the requestor. There are a number of methods for weighting higher relevances above lower relevances. One way is to determine a transfer function which masks the normalized distribution with a weighting function. This may be a simple linear ramp, or a more complex function. As discussed above, a numeric integration from 1 to 0, with a respective decision made when the integral of a "curve" representing an event exceeds a threshold, allowing multiple decisions to be ranked, is another possibility.

Using a hierarchal analysis, this process may occur at multiple levels, until each significant hypothesis is analyzed, leaving only putative hypothesis which are insignificant, that is, with sufficient external information to distinguish between the respective possibilities. In order to simplify the output set, redundancy is resolved in favor of the most specific significant hypothesis, while insignificant hypotheses are truncated (not presented). As the number of significant hypotheses becomes in excess of a reasonable number (which may be an adaptive or subjective determination), related hypotheses (either by the nature of the events or the nature of an anticipated responses) may be grouped. Relatedness of hypotheses may be determined based on commonality of factual predicates, resulting user action, or other commonality. That is, the grouping may be the same as, or different from, the hierarchy of the analysis.

It is also noted that the projection need not be in the relevance-reliability plane. Rather, the analysis is intended to present useful information: that which represents information having a potential materiality to the user, and which has significance in a statistical sense. Therefore, a data analysis which does not purely separate relevance and reliability, but nevertheless allows a general balancing of these issues, may nevertheless be suitable.

Referring now to the aforementioned auction for control of bandwidth, in which a bidder communicates a value function which must be resolved by the recipient, this type of relevance-reliability analysis may be used to normalize utility functions between respective bidders. To determine a cost, a local set of events or factual predicates are analyzed with respect to a received context. The various hypotheses are projected onto a relevance-reliability plane. With respect to each bidder, the projection of each event is normalized by that bidder's conveyed utility or valuation function. It is useful to maintain the stochastic distribution representation for each event, since this facilitates application of the bidder valuation utility function. The winning bidder is the bidder with the highest normalized integration of the event representation in the relevance-reliability projection plane.

Advantageously, according to an embodiment of the present invention, output information is presented to the user using a statistical and/or probabilistic analysis of both risk and reliability. Risk is, for example, the estimated quantitative advantage or disadvantage of an event. In the case of competing risks, a cost function may be employed to provide a normalized basis for representation and analysis. While the risk is generally thought of as a scalar value, there is no particular reason why this cannot itself be a vector or multiparameter function, such as a mean and standard deviation or confidence interval. Reliability is, for example, the probability that the risk is as estimated. Likewise, the reliability may also be a scalar value, but may also be a complex variable, vector or multiparameter function.

Since a preferred use of the risk and reliability estimates is as part of a user interface, these are preferably represented in their simplest forms, which will typically take a scalar form, such as by projection from a high dimensionality space to a low dimensionality space, or an elimination or truncation of information which is predicted to be of low usefulness in a decision-making process. However, where the risk, or risk profile, cannot be simply represented, or such representation loses significant meaning, a higher dimensionality representation may be employed. For human user interfaces, graphic displays are common, which generally support two-dimensional graphics, representing three dimensional distributions, for example, x, y, and brightness or color. Using a time sequence of graphic elements, one or more additional dimensions may be represented. Likewise, some graphic displays are capable of representing depth, and thus support an additional degree of freedom. Therefore, it can be seen that the risk and reliability are not intrinsically limited to scalar representations, and where the quantity and quality of the information to be presented warrants, a higher dimensionality or additional degrees of freedom may be presented.

In a voice output system, a sequence of information may be output, trading immediacy and semantic complexity for information content. Complex sounds or other grammars may also be employed, especially where the relevance has a short time-constant.

According to one embodiment of the invention, risk and reliability are separately output to the user. It is understood that both risk and reliability may be output in an integral or interrelated form as well. For example, a driver might wish to employ a radar detector. A traditional radar detector emits a signal indicative of signal type and signal strength. Based on these emissions, the driver decides on a course of action. Ideally, the driver responds immediately (if necessary) to the first detected signal, even if this is of low signal strength or potentially an artifact. On the other hand, the system according to the present invention may analyze the reliability of the detected signal as an indicator of risk. For example, on a highway, an X band radar signal directed from in front of the vehicle, which commences at relatively high signal strength, and which occurs in a location having a past history of use as a location for monitoring traffic speeds for enforcement purposes, and which was recently confirmed (e.g., within the past 5 minutes) as being an active traffic enforcement site, would be deemed a high reliability signal. On the other hand, on the same highway, if a continuously emitted (or half-wave 60 Hz emission from a microwave oven) X band signal is detected, in a location where such a signal is consistently detected by other drivers, and none is cited for violation of traffic laws, then this detection would be considered a low reliability detection of a risk or traffic enforcement radar. While a threshold of reliability may be applied, and thus a "squelch" applied to the risk output, preferably, the reliability signal is presented separately. When risk and reliability are both high, for example, an enhanced alert may be presented. When risk is high but reliability low, an indication may be nevertheless presented to the user for his analysis. This scheme would assist the user in dealing with statistical aberrations, as well as intentional masking of conditions. For example, a traffic enforcement radar system may be intentionally used in an area of normal interference with radar detectors; the system according to the present invention would present an alert to the user of this possibility.

Such analysis is not limited to radar detectors. For example, a bridge may be likely to freeze (i.e., become slippery) under certain conditions. Some of these conditions may be detected, such as local weather, past precipitation, and the like. Indeed, recent road sand and salt may also be accounted for. However, uncertainty remains as to the actual road surface conditions, which may change over the course of a few minutes. Therefore, the system according to the present invention may determine the risk, i.e., slippery road conditions, and the reliability of its determination. This reliability may be estimated from actual past experience of the system in question, as well as from other systems including appropriate sensors, for which data is available.

According to the present invention, to risk tolerance, or more properly stated, the reliability-adjusted risk tolerance of a user may be used to "normalize" or otherwise adjust the outputs of the system. Thus, for example, an emergency vehicle may take higher risks than would normally be acceptable. Clearly, if there is a 100% probability that the vehicle will skid on black ice on the road ahead, this risk would be unacceptable for any rational driver seeking to continue driving. On the other hand, an ambulance driver on an urgent call may be willing to undertake a 5% risk that the road is slippery, while a normal driver might be willing to accept only a 1% risk. The ambulance driver, in the above example, generally takes a number of risks, and caution must be balanced to assure that the goals are met, and indeed that risks are not increased as a result of undue caution. For example, driving at a slow speed increases the risk that the vehicle will be rear-ended, or that the driver will fall asleep during the trip. Even pulling over the side of the road does not eliminate risk to zero, so it is important to do a comparative risk analysis.

The risk/reliability analysis is not limited to driving condition alerts. For example, the system may be used to advise the user regarding the need for preventive maintenance or repair. The system may also be used as part of an entertainment system: What is the likelihood that a channel will broadcast an undesired commercial within the next minute? Should a recording stored in memory be purged in favor of a new recording? What radio station will be most acceptable to the set of occupants of the vehicle?

In some cases, therefore, the risk/reliability analysis may be used by an automated system, and need not be presented directly to the user; in other instances, the set of information is for presentation to the user.

Another aspect of the invention involves a method for presentation of a multidimensional risk profile to a user. According to prior systems, a "risk" is presented to a user as a binary signal, modulated binary signal, and/or a scalar value. A signal type (e.g., band, SWS code, etc. for a radar detector, temperature, wind speed, wind direction, barometric pressure and trend, for a weather gauge) may also be expressed. Accordingly, as set of orthogonal scalar values is presented representing different parameters. Certainly, graphic representations of mean and standard deviation are well known; however, the reliability aspect of the present invention is not analogous to a simple standard deviation—it typically represents something qualitatively different. For example, a determination of the magnitude of the risk variable carries its own standard deviation, which, though a possible element of a reliability determination, does not address the issue of how the measured parameter (with its own statistical parameters of measurement) relates to the underlying issue, or the impact of the underlying issue on the recipient. In some cases, there with be a direct relationship and near 100% correlation between the measured parameter and risk variable; in other cases, the measured parameter has poor correlation with the risk variable, and further analysis is necessary.

The system preferably ages event data intelligently, allowing certain types of events to expire or decrease in importance. A traffic accident event more than 12 hours old is likely stale, and therefore would not be output, and preferably is purged; however, locations which are the site of multiple accidents may be tagged as hazardous, and the hazard event output to the user as appropriate.

A temporal analysis may also be applied to the event data, and therefore diurnal variations and the like accounted for. Examples of this type of data include rush hour traffic, sun glare (adjusted for season, etc.), vacation routes, and the like.

Thus, user outputs may be provided based on proximity, importance, and optionally other factors, such as direction, speed (over or under speed limit), time-of-day, date or season (e.g., sun glare), freshness of event recordation, and the like.

According to the present invention, a stored event may be analyzed for reliability. Such reliability may be determined by express rules or algorithms, statistically, or otherwise, generally in accordance with particular characteristics of the type of event. Thus, even where a detected value, at the time of measurement, has a high reliability for indicating an event or condition, over time the reliability may change.

U.S. Pat. No. 6,175,803 (Chowanic, et al., Ford Global Technologies, Inc.), expressly incorporated herein by reference in its entirety, relates to a telematics system which employs routing criteria which include a statistical risk index. The route and associated risks may be output together, and a risk-minimized route may be automatically selected.

According to a preferred embodiment, audio and/or visual warnings are selectively provided. In this case, a warning of only a single event is provided at any given time. Typically, a visual alert indicator illuminates, and an initial tone alert indicates the nature of an urgent warning. The visual indicator also outputs a strength or proximity of the alert. Typically, these basic indicators are illuminated red, because this color is societally associated with alerts, and this causes less constriction of the iris of the eye at night. A separate visual indicator, such as a bar graph, meter, or color coded indicator (e.g., bicolor or tricolor light emitting diode) provides a separate reliability or risk of reliance indication. After acoustically indicating the nature and strength or proximity of the warning, an acoustic indication of reliability or risk of reliance may be enunciated. The visual reliability or risk of reliance indicator may be constantly active, while the warning indicator is preferably selectively active when an alert is present.

Typically, alerts will be classified by category, and a separate algorithm applied to determine the appropriate reliability factor, for example an exponential decay. As updated information is received or becomes available, this replaces presumably less reliable older data as a basis for a reliability determination. The system may also anticipate a geographic change in location of the event, for example a traffic enforcement officer in motion, or a traffic jam, along with reliability information for the prediction.

When multiple alerts are simultaneously active, low priority alerts are suppressed, and the active higher-priority alerts alternate. Priority of alerts, in this case, may be determined based on the nature of the alert, contextual proximity, the reliability of the measurement of the alert, the reliability of reliance on the recorded information, and a comparison of the respective alerts and potential interaction.

At any time, there will likely be a number "issues" to be analyzed. In order to provide an efficient user interface, these issues are analyzed to determine urgency or importance, and only those which meet criteria are particularly presented. For example, the fact that the fuel gauge reads half-full is not normally a cause for particular alert. However, if the vehicle is passing a gas station which has a relatively low price, the alert may be welcome. Without further information, these facts together reach a sufficient importance to produce an alert. See, U.S. Pat. No. 6,484,088 (Reimer, Nov. 19, 2002, Fuel optimization system with improved fuel level sensor), expressly incorporated herein by reference. That is, the risk (need for fuel; capacity to purchase additional fuel; distance to next gas station and margin of safety given present fuel supply; etc.), ands the reliability (fuel price predicted to be cheaper than other fuel along predicted vehicle path before urgent need for fuel; etc.), together meet a "threshold" (which, of course, may be particularly dynamic in nature). Additional information, however, may reduce the importance of this information below a threshold level; for example, the present trip is time critical; the same gas station is predicted to be passed a number of times before the fuel tank is empty; other stations predicted to be passed have lower prices; pricing is anticipated to be more advantageous at a later time (e.g., gas sale on Monday; anticipated trip to another locale with lower gas prices; etc.), etc. Thus, the set of facts including available information is analyzed, for example using Bayesian techniques, Hierarchal Markov Models or other techniques, to predict the importance to the user. Each of these facts or predicates, or sets of facts and/or predicates, of course, has its own estimated reliability, and thus the overall conclusion is thereby limited. Accordingly, this reliability of the logical conclusion is output along with the conclusion itself.

With sufficient facts or predicates available, there may be competing outputs, both relating to fuel use, conservation, and refill strategies and otherwise. Thus, the system must compare the competing prospective outputs to determine which are actually presented. It may be useful in such circumstances to compute a cost function for presenting this data. In this way, for example, an advertiser or other external influence maybe permitted to impact the overall analysis, e.g., presentation of data though the user interface. This cost function may also balance driving conditions: for example, when stopped at a traffic light, less urgent messages may be presented with lower risk of driver distraction. The user interface typically supports only a limited amount of information to be conveyed, and ergonomics may further limit the amount of information. Thus, the issue of screening information for presentation to the user typically arises.

The cost function is analogous to a utility function, which may be perturbed or modified based on subjective factors. As such, automated negotiations are possible based on bidder and auctioneer contexts, and predetermined and/or adaptive parameters. By communicating complex, non-normalized information, and allowing an ex post facto reduction in dimensionality or degrees of freedom, greater efficiency may be obtained.

In choosing which information to present, a preferred embodiment according to the present invention analyzes the risk and reliability, to produce a composite weight or cost, which may then be compared with other weights or costs, as well as a dynamic threshold, which may be separately analyzed or implemented as a part of a cost function. Taking a simple case first, information which is immediately applicable, represents a high degree of risk, and which is reliable, is presented with a highest weighting. If the same indication is unreliable, then the presentation is deweighted. A high risk with a low reliability would compete with a low risk with high reliability for presentation through the user interface. As previously discussed, a cost function may be used to factor in external or artificial considerations as well.

If the risk or reliability changes as a function of time, and this is the significant temporal relationship, then these factors may be changed updated, and the user interface modified according to a present condition. In some cases, the presentation relating to an event need not be continuous. That is, as a result of presentation to the user, the cost function is dynamically modified, and the event is not again represented until the cost function exceeds the presentation threshold. The change in cost function may indeed be purely a function of time, or take into consideration dynamically changing variables. For example, if a traffic jam is ten minutes ahead on the road (using predicted travel speeds), and there are a number of opportunities within the path leading toward the traffic to circumvent it, the urgency of taking a detour is low. As the time until the traffic decreases, or as the last opportunities for detour are approaching, any decision by the user become critical. This required decision is, in this case, the risk. On the other hand, the traffic may be caused by a traffic light or other temporary obstruction. Therefore, the reliability of the risk indication will depend on an analysis of the surrounding circumstances and the likelihood that the predicted risk will be the actual risk. Time, in this case, is not clearly independent of the other factors, and therefore need not represent an independent output to the user. It is noted that such analysis of risk and reliability may be facilitated by a wavelet domain transform, which need not be a discrete wavelet transform (DWT), although the binary decomposition properties of this transform may prove convenient or advantageous in various circumstances. In particular, the purpose of the transform is not necessarily a storage or computation-efficient representation; rather, the purpose is to significantly separate degrees of freedom to simplify the statistical and probabilistic analysis. It is also noted that the particular wavelets may be complex, high dimensionality, asymmetric functions, and need not be wavelets of a traditional kind used in image or generic data compression.

It may also be useful to transform the data into various domains, such as time, frequency, wavelet, alternate iterated function system, or the like, for filtering and denoising. Preferably, adaptive thresholds are employed, although in many instances the filtering may be performed in a context-independent manner. On the other hand, where appropriate, the filtering may be context sensitive, that is, the modifications of the data set during the filtering are dependent on a calculated risk, reliability, or relevance, or other parameter. Further analysis may be performed either in the transform domain, inverse transform to the original representation, or using a different transform.

It is also possible to employ a fractal (iterated function system) analysis and/or transform of the data. In this case, a function within a space, of any dimensional order, is decomposed into a representation of a set of components, which may include continuous functions (wavelet) or discontinuous functions (geometric shape), each of which may be translated, scaled only any axis, and amplitude scaled. Indeed, where convenient, the function within a space may be decomposed into a plurality of separate representations. Thus, according to one example, a number of feature-specific decompositions may be applied where appropriate. In the case of non-linear functions, it may be possible to decompose the function into a linear component and a non-linear component, wherein a relatively simplified non-linear component may be subjected to a type-specific analysis. Thus, it is understood that even relatively complex and seemingly intractable problems may be addressed. It is further noted that incalculable aspects of a fact or predicate net may be represented within the context of a reliability variable. As such, a network is analyzed, and to the extent possible, numeric analysis applied to reduce the result to low-dimensionality terms. The predicted magnitude or potential magnitude of the residual function or the uncertainty bounds may then be estimated, resulting in a contribution to the reliability output. Of course, the reliability estimate need be limited to unknowns, and may also represent a contribution from an analytical technique which produces a calculated uncertainty.

In a typical process, a data set, which may include a plurality of dimensions, is first processed to reduce noise. For example, error correction and detection algorithms may be applied to eliminate spurious data or correct data which has been corrupted. This process may also include a subprocess for eliminating intentional spurious data, for example, data communicated by a malfeasant, or data generated automatically in a random or pseudorandom manner to make the entire dataset unavailable as a source of forensic evidence. This is discussed in more detail, below. The data may also be filtered or denoised using one or more various algorithms, especially where the data is obtained continuously from local sensors. Preferably, one or more model-based or content relevant algorithms are employed to optimally process data or portions of data. This later function may be consolidated with a feature extractor to correlate data with patterns which likely indicate a known event, to classify the signal.

A multidimensional hidden Markov tree (HMT) analysis may be used to process the data. A known principal component analysis (PCA) may, for example, precede the HMT, to reduce the dimensionality of the data matrix by extracting the linear relationship between the variables and decorrelating the cross correlation in the data matrix. The hidden Markov tree is a statistical model governing the wavelet coefficients, and exploiting its tree structure in the time-frequency domain. Each wavelet coefficient is modeled as a Gaussian mixture with a hidden state variable. See, Detection and Classification of Abnormal Process Situations Using Multi-dimensional Wavelet Domain Hidden Markov Trees (Nov. 9, 2000), Amid Bakhtazad, www.chem.eng.usyd.edu.au/events/poster_2000/present6/ppframe.htm In order to prevent a data transmission from being used as self-incriminating evidence, steps may be taken to undermine the reliability of any single piece of data within a data set. According to one possibility, a random or pseudorandom process may be used to corrupt the database. This may take the form of modifications of existing records and/or generation of phantom or spurious records. Typically, such corruptions are made in such manner that a corresponding filter in a receiving unit, with high reliability, will be able to nearly, but not absolutely, "uncorrupt" the data. However, without knowledge of the actual corruption parameters, which are not transmitted, the reconstruction is statistical and not lossless. Therefore, with high reliability, the content of the database is communicated, but not in such manner that anyone could opine that individual data within the database is real. For example, a database with GPS and chronology will necessarily include data which may be used to derive the speed of the vehicle. When that speed is in excess of the speed limit, a transmission or retention of the data may be used as an admission of transgression of speed limit laws. Using a known filter scheme implemented at the receiver, an algorithm at the transmitter may operate on the data to corrupt that data in such manner that the receiver will likely correct the data. By applying a parameter at the transmitter, the reliability of the received data can be controlled. The transmitter may, for example, determine that 25% of the data is to be corrupted, and 1% corrupted in such manner that the receive filter does not accurately reconstruct the data. However, the corrupt 1% may be distributed such that 99% is flagged as spurious, based on, for example, excess or negative speeds, non-monotonic travel, etc. Thus, 0.01% of the corrupt data is conveyed without being caught, a statistic which is likely less than other, non-intentional corrupting influences. Each of these parameters may be independently controlled at the transmitter. Likewise, it is even possible for these corrupting parameters to be transmitted, alerting the receiver that the data may be suspect. Again, since these are statistical processes, no single data point would have evidentiary reliability.

Using various cryptographic techniques, such as public key infrastructure (PKI), it may also be possible to secretly synchronize the internal filters of the communicating devices, to maintain high reliability of user alerts, while masking the data itself. Thus, using secure hardware and appropriate software techniques, all or most of the corruptions may be corrected or eliminated. For example, the transmitter uses a pseudorandom noise generator to control a corruption of data to be transmitted. Information related to the cryptographic key used to initialize the pseudorandom noise generator is securely conveyed to the receiver, for example using a Kerberos, Diffie-Hellman key exchange, El Gamal key exchange, or other type of cryptographic key negotiation. The receiver then initializes its own corresponding pseudorandom noise generator to generate a synchronized stream, allowing it to decorrupt the data. Clearly, various techniques, including those known in the art, may be combined to remedy weaknesses of any given scheme. Preferably, a plurality of different algorithms are available, should one or more prove broken.

See, Matthew Crouse and Robert Nowak and Richard Baraniuk, "Wavelet-Based Statistical Signal Processing Using Hidden Markov Models", Proceedings ICASSP-97 (IEEE International Conference on Acoustics, Speech and Signal Processing), IEEE Transactions on Signal Processing, 1997, and cited references, expressly incorporated herein by reference. See, also, B. Vidakovic, Wavelet-based nonparametric Bayes methods, Technical Report, ISDS, Duke University., Merlise Clyde, and Heather Desimone and Giovanni Parmigiani, Prediction Via Orthogonalized Model Mixing, Journal of the American Statistical Association, 91(435):1197 (1996); Katrin Keller, Souheil Ben-Yacoub, and Chafic Mokbel, Combining Wavelet-domain Hidden Markov Trees with Hidden Markov Models, IDIAP-RR 99-14 (1999), expressly incorporated herein by reference.

See, also, Attoor Sanju Nair, Jyh-Charn Liu, Laurence Rilett and Saurabh Gupta, "Non-Linear Analysis of Traffic Flow," the 4th International IEEE conference on Intelligent Transportation systems, Oakland Calif., Aug. 25-29, 2001, (accepted), expressly incorporated herein by reference.

In like manner, additional dimensions of analysis may be added, resulting in further modifications of a cost function.

Urgency is a subset of relevance. Relevance may also be treated as an independent factor; that is, not included within risk or reliability. For example, a fact representing a risk may be known with high certainty, for example, a weather condition on a road: this fact, however, has low relevance if the car is parked in a covered garage. Thus, according to an aspect of the invention, the relevance may be considered an independent variable. Typically, in this case, the risk and reliability are together analyzed to determine a cost function; the cost function is then filtered using a relevance criteria (which, for example, produces a modified cost function), and typically sorted or ranked by weight. This relevance therefore replaces a simple threshold with respect to making ultimate decisions regarding information presentation to the user. Relevancy may be determined by explicit input from the user, implicit user input, collaborative processes, statistical analysis of other user under like circumstances, or the like. It is noted that the cost function may be personalized for each user.

In some cases, a dimensionless cost function is too simplistic, and leads to results which fail to convey useful information to the user; in those cases, sets of outputs may be presented based on one or more criteria, or an estimated composite function. Therefore, it is understood that a complex "cost function" or utility function, resulting in an output having various degrees of freedom, may be employed.

Preferably, the system according to the present invention is integrated with a vehicular telematics system, thus providing access to various vehicle data, in addition to environmental data. However, it is not so limited, and may be used in any type of man-machine interface wherein complex data is to be presented to a user for human consideration.

It is noted that, in some instances, a fact or predicate set may possibly represent a plurality of different events. In this case, it may sometimes be useful to group these events together. This is particularly the case if the nature of the alert and likely response to the alert by the user is similar, regardless of the particular event giving rise to the sensor readings. In that case, the risks, reliabilities, and relevance are aggregated in an appropriate fashion, for example vector summed or composite magnitude, and an aggregate cost function output, along with a generic alert. This generic alert may then be subdivided into its components, for example in a lower-hierarchal level user interface output. In this manner, a set of possible events, none of which would exceed an alert threshold individually, may together exceed the threshold and indeed receive a high ranking.

Another way of analyzing this situation is that the system may analyze the available data at a number of hierarchal levels. At each level, the risk, reliability and optionally relevance is determined, and the result stored. The user interface may then select events based on redundancy and generic alerts, superseding the particular ranking of events at a homogeneous level of analysis. For example, data indicating stopped traffic ahead may be consistent with an accident, stop light, or construction. These may be divided into normal events (with low risk) (traffic light) and abnormal events (with high risk)(accident or construction). The former would not generally issue an alert, unless a suitable bypass is available that would be efficient. The later, on the other hand, would likely generate an alert. The available information may not be able to distinguish between an accident and construction, and indeed, the individual probabilities of these may be insignificant. However, together, the probabilities may be significant. Likewise, since these are two alternative, generally inconsistent possibilities, the reliability of each will be greatly reduced. Grouped together, however, their joint reliability is estimated to be about the remaining likelihood after the traffic light is accounted for, with high reliability. With respect to relevance, each of these events would have similar relevance, which would be high, assuming the stopped traffic is along the itinerary of the vehicle. Thus, a composite alert of "abnormal stopped traffic 1 mile ahead; reliability 33%" would be a useful compromise to maintain an efficient user interface while conveying the useful information. Of course, the underlying system should generally still compute the probabilities, reliability and relevance for each possibility, since this analysis may yield more useful information and provide better guidance to the user.

The ranking may, for example, employ a combinatorial analysis of a set of rankings based on a self-consistent probability-weighted utility of each event within a ranked set. That is, if various events are mutually inconsistent, then a ranking is limited by a presumption of the existence of one event, and competing hypotheses are established as different rankings. In a rigorous sense, the utility may be determined by a mathematical integration of the appropriate function, although in many instances either the data will be represented as a field which can be simply summed, or simplifying presumptions may be applied to make the evaluation tractable.

According to an aspect of the invention, a user transmits a relevance or cost function to corresponding other users, which then calculate the most useful information to transmit based on the circumstances of the intended recipient. Likewise, a plurality of users may exchange their respective relevance or cost functions. This relevance or cost function is, for example, a current position, immediate itinerary, and any other particular relevance factors. Such other factors might include heavy load, urgent transit, travel preferences, or the like. Upon receipt, the device of the other corresponding user then calculates relevance and/or cost functions using its local data set based on the received parameters. This calculation is then used as a filter to determine a priority of data to be transmitted. As the time available for transmission grows, the amount of information transmitted may be complete. For example, two cars traveling adjacent on a highway or parked near each other may conduct a complete data exchange. When optimizing the broadcast of data based on a plurality of user's relevance or cost functions, a weighting may be applied which balances the maximum good for the many with the urgent needs of the few. Likewise, accommodations may be made for anticipated duration of communication for the respective users, and the availability of packet forwarding and secondary retransmission.

Since all devices share a common transmission medium, it is generally useful to compute a cost function for use of the shared medium as well, allowing peers access to the medium after the marginal utility for the current user has declined. Access to the shared medium may also be allocated on a round robin or other "fair" basis, especially when demand is highest. Each device preferably monitors all local transmissions, since these will likely include data of some relevance to each device. Likewise, by monitoring such transmissions, one device may make presumptions as to the state of the local database of another device (especially given a knowledge of its present position and path), and therefore avoid redundant transmissions of data. Likewise, in such a peer to peer network, a voting scheme may be instituted, allowing the peer with the "best" data, i.e., the data which is most reliable, most accurate, most recent, most detail, or other criteria to transmit with higher priority.

Known packet data broadcast protocols may be used to convey the information. Likewise, known peer-to-peer techniques and protocols may be used to communicate, or control communications, between peers.

According to another aspect of the invention, a user may broadcast or transmit a specific query for information, using as at least a part of the query a relevance or cost function. Recipients of the broadcast or transmission then execute a search of their database based on the received query, and respond accordingly. This query may be a broad or narrow request for information, and thus need not result in a complete exchange of data.

In order to optimally allocate communications bandwidth, users within an area may engage in a local auction, that is, each user bids for use of the shared medium, with those deferred and the supplier of information receiving credits. An accounting for these credits may, for example, take place each time a device connects with a central database, for example, using a "hotspot" or other access to the Internet. These credits may, for example, be converted into economic values. In like manner, advertisers may also bid for access to users, with users, for example, receiving credit for receipt of advertising. Such bidding may be on an individual or group basis. Typically, advertising will be relevant, for example as a location-based output, but need not be.

It is also possible to conduct auctions or otherwise account for control of the communications medium using a zero-sum temporal averaging. That is, each user has an a priori equal right to access. As a user takes advantage of that access, its rights decrease, until exhausted. Over time, rights are added, and accrued rights expire. For example, rights may have a half-life of 5 minutes, with a regression to a predetermined value. As more users compete for control over the medium, cost increases. Suppliers of information may receive partial credits from the consumer. Value transmission may take place using a modified micropayment scheme, for example a variant of Agora Micropayment Protocol, "Agora: A Minimal Distributed Protocol for Electronic Commerce", Eran Gabber and Abraham Silberschatz, Bell Laboratories or MPTP, Micro Payment Transfer Protocol (MPTP) Version 0.1, W3C Working Draft 22 Nov. 1995, www.w3.org/pub/WWW/TR/WD-mptp-951122.

Thus, within a cell, each user is a primary recipient, a secondary recipient, a supplier, or undefined. A primary recipient bids for access and control of the medium, i.e., the communications band. This bid takes the form of a cell identification (i.e., the controlling user's location and itinerary), as well as an economic function representing the required information and valuation thereof by the user. The bids are broadcast and each recipient calculates an actual value for the bid using its own database and the relevance function. The calculated economic values, filtered by the recipient databases, are then broadcast, and the highest actual valuation is deemed winner. A negotiation then occurs between the bidder and the holder of the valued information, for payment for the transmission, and other bidders receive a lesser value as a concession. Secondary recipients of the information also pay for the information, based on their respective bids, with a redistribution to the other bidders as a concession. Devices which are not active bidders have no economic effect, although these may accumulate and use transmitted information from others. Thus, an economic redistribution occurs efficiently, while optimally allocating scarce bandwidth.

In general, the auction parameters may be too complex for interactive user entry. Rather, the user cost function itself represents the user valuation, and therefore is usable as a bidding function. In the cost function, both subjective and objective values are observed. With respect to objective values, the relationship of a user context and an event known by the recipient provides a relevance, and therefore the objective valuation. This objective valuation is then warped by user subjective factors. Some users may be quite willing to pay more for a better quality of service. At least a portion of this value is distributed to other users; this system allows even those with low valuation to access the network, since these deferred users will accumulate credits. In some cases, the credits may be provided with cash value (i.e., an ability of a user to extract cash proceeds from the system), while in other cases, these credits are limited to use with the system, with no redemption rights. The use of a central authority for the purchase of usage credits therefore allows a profit incentive for the authority responsible for the system. A user may therefore express a higher valuation by purchasing units from an authority, or by providing value to other users of the system, which may, for example, require enhanced hardware purchases to include more and/or better sensors of various conditions.

A negotiation or auction may also include external elements, such as fixed infrastructure. In this case, the scarce resource is, for example, the right of way. Elements of the fixed infrastructure which are subject to negotiation include traffic lights, draw bridges, railroad crossings, etc. Typically, such infrastructure systems have low intelligence. By employing communications with interested parties, a more efficient outcome may be predicted as compared to "fair", though unintelligent decisions. Thus, competing drivers may bid for a right of way or green light. The traffic signal may be arbiter of the negotiation, or merely recipient of the defined result. In some instances, the negotiation is free of cost, for example, a traffic light with but one car approaching and no hazards surrounding. In this case, the signal allows the driver to pass, unobstructed. In another instance, a large amount of traffic may be present, seeking to pass through an intersection. All of the vehicles seeking to pass present "bids" for the right, with bids representing common interests or outcomes pooled. The aggregate bids are then compared for action. In this case, the transaction may have no economic impact, but rather the utility functions may be relatively non-subjective. For example, emergency vehicles may have a non-subjectively determined high valuation, cars driving toward the intersection with a present state of traffic flow control in their favor at a medium valuation, and stopped traffic with a low valuation. As the duration of the stop increases, a delay factor increases the valuation for the stopped traffic to compensate, allowing or forcing the signal to change. The objective criteria used in this circumstance (which may, for example, be defined by a municipality or traffic engineer) may include optimization of pollution, energy efficiency, effects of traffic flow on other intersections, speed control, and other considerations.

It is noted that, since external elements communicate using the same communications system, and indeed various communications systems may share the same band, the concept of bidding for use of the shared or scarce resource may transcend a given communications purpose, and, other than communicating using a common protocol for the bidding and auction process, other users of the band need not communicate public information.

A user may also provide a subjective element to a context, for example, a driver may be in a rush or be late for a meeting.

This may be explicitly input by the user, as a factor which adjusts the cost function higher, or may be derived implicitly from observation of user behavior. Likewise, a driver may be in no particular rush, and therefore place a low relevance to information which might be of particular benefit to allow him to travel faster.

Thus, in a purely fair system, each user is allocated a "fair" chance for access to the scarce bandwidth resource, and bids using equally distributed credits to compensate those users deferred, and particularly those users who provide useful information. A user bids using a cost function, representing the maximum value of the resource to that user. Using known auction theory, for example, the cost to the winning bidder may be the price bid by the second-highest bidder. Of course, other known auction types may be employed. The cost function may be automatically generated by a user based on available funds, likely future required use of the funds, a relevance or context which allows for adaptive bidding based on the value of the information to be provided, and user-subjective factors. The actual normalized bid is resolved by the respective recipients, which then broadcast the results. The maximum value bidder then controls the scarce bandwidth resource until the bid-for communication is completed or exhausted. In order to avoid inefficient reauction overhead, a periodic auction may be conducted, with all bidders placed in a queue.

Clearly, in real world situations, a number of additional distortions will take place. Bidders may become unavailable prior to completion of a communication. Interference may require retransmission.

As discussed above, each "limited resource" may be subject to auction. Preferably, a spatial division multiplexing scheme is employed, wherein each band has one or more frequency channels. High gain, directional antennas are employed, such that there is a high degree of frequency reuse within a local area. However, there will be a statistical degree of competition for the frequencies. In addition, there will be competition from other competing uses for the band, which may also engage in an auction scheme for access. Typically, by efficiently negotiating an auction between all users of the resource (i.e., the overhead for negotiation is negligible as compared to the actual usage), overall throughput and capacity will be increased.

For example, each system may include 8-16 transceivers or the ability to conduct 8-16 communication sessions simultaneously. In the former case, 8-16 directional antennas having relatively low overlap are arrayed in different directions, providing a physical separation. In the later case, a phased array or synthetic aperture antenna system electronically defines 8-16 independent apertures, also with low overlap. Each spatial domain aperture and its associated coverage area represents a different resource which may be allocated. Therefore, multiple simultaneous negotiations may occur simultaneously. Each aperture may be a separate radio, with packets routed there-between, or the radios may be coordinated.

It is also noted that the communications system may be used not only for packet data communications between peers, but also as a real time communication system for data streams, such as voice communications. In this case, handoffs may be necessary between various nodes in order to assure continuous end-to-end communications. Such handoffs and multiple hop communications may be predicted in advance and pre-negotiated. Such communications predictions may, indeed, involve multiple systems, such as various cellular carriers and protocols, 802.11 hot spots, and a mobile ad-hoc network with sporadic links to fixed infrastructure. This, in turn, allows a balancing of competitive uses for the resources, quality of service, cost, and reliability. For example, by providing a mobile ad-hoc supplementation for a fixed cellular infrastructure, the incidence of dropped calls and service unavailability may be reduced. Likewise, cellular carriers may allocate their infrastructure build-outs and capital investments where the return on investment will be maximum. On the other hand, cellular users in such regions may employ other users to act as repeaters for extending the effective range of their equipment. In this case, the compensation and/or negotiation therefore for use of the system may come, in whole, or in part, from the fixed infrastructure provider. On the other hand, if the system is sponsored by the fixed infrastructure carrier, then the repeater services hosted by each node may be at no incremental cost to the fixed service provider.

This later possibility provides an interesting opportunity. Since the fixed cellular infrastructure providers generally own licensed spectrum, the implementation of repeater or ad hoc services between mobile units may be coordinated centrally, with mobile-to-mobile communications using cellular channels, which may be time domain (TDMA), frequency domain (FDMA), code division (CDMA and related systems), or other type of band-sharing scheme in accordance with the more global standards generally established for these services. Typically, mobile-to-mobile communications use omnidirectional antennas, and packet data communications may use excess system capacity, e.g., capacity not presently being used for voice or other toll or real-time service. The fixed infrastructure my also provide coordination of information communication services, local buffering, ad multicast f information of general interest.

It is therefore clear that the present invention may comprise both disruptive and incremental technologies, and the underlying business model may therefore be modified to suit.

A particular issue which is advantageously addressed during the design phase is the security of the system against "hackers" or malfeasants. This may be dealt with by providing a central database of authorized users, with peer reporting of accounting and apparent abuse. If a user is suspected of abuse, its access rights may be extinguished. This, in turn, will at least prevent the user from engaging in auctions, and, if transmissions are encrypted or otherwise secure, may prevent eavesdropping on normal communications streams. This same result may be imposed on a user who exhausts his credits, although it is preferred that a user who is otherwise in compliance with normal regulations be permitted to receive communications and indeed to gain new credits by transmitting useful information.

Since the system is a packet data system, similar to in many respects, and possibly an extension of, the Internet, various known Internet security paradigms may be applied and employed.

While it is often useful to engage in fair auctions or games, it is also possible to engage in unfair auctions. For example, since there may be external financial requirements for maintenance of the system, these may be paid by subscription fees, or subsidized by advertisers. The advertiser may transmit its own cost function, and bid for presentation to given users, or engage in a broadcast for all users. In this case, more valuable users will gain more credits, and therefore have more control over the network. This is not "fair", but the distortions implicit in this technique may be tolerable. Likewise, a bidder may purchase credits, but typically this purchase will be consumed by the service operator, and not paid to the users as a whole. However, presumably, this will on the whole reduce normal service pricing for all users. Indeed, various promotional techniques may be used to distort allocation of bandwidth, without departing from the general scope of the invention.

It is noted that this implicit auction process, wherein a user bids a utility function rather than a normalized economic value, is a distinct part of the invention, applicable to a plurality of contexts and environments, well beyond telematics. Likewise, the concept of bidding for quality of service to control a shared resource, against competing users, is also applicable to other contexts, notably peer-to-peer networks, other shared transmission medium networks, and queues.

In order to define a user's subjective preferences, value functions, and the like, a number of methods may be employed. Certainly, express and explicit inputs may be received from a user. Likewise, a user model may be constructed by observation of the user. A user may be classified as a member of a group having common preferences, and then the preferences associated with the group may serve as a proxy for the user himself. This is called a collaborative profile, the basis for a collaborative filter. In order to classify a user into a group, personality tests and/or common attributes may be employed. According to a particular aspect of the invention, a user may be classified by game play. By using game theory, irrational or subjective user biases may be revealed. By using games, a user's utility function valuation may be assessed. Likewise, risk tolerance and demand for immediate gratification can be determined. Further, game theory in the form of wagering may also assist in determining economic normalizations. Games, especially with the results augmented by collaborative profiling, may through a limited number of iterations, elicit relatively detailed information. Indeed, through inter-relation with commercial sponsorship (or state associated lotteries), the economic incentives and risks of the game may be made quite real.

Fifth Embodiment

In communicating data to another communications device, typically it is desired to transmit (or exchange) all of the memory or all of a "public" portion of the memory, with the received information sorted and processed by the receiving unit and relevant information persistently stored in the memory. After exchange, conflicts may be resolved by a further exchange of information. An error detection and correction (EDC) protocol may be employed, to assure accurate data transmission.

Since the communication bandwidth is necessarily limited, and the communications channels subject to noise and crowding, it is often important to prioritize transmissions. It is noted that, without a complete communication of the memory, it is difficult to determine which events a communications partner is aware of, so that an initial communication may include an identification of the partners as well as recent encounters with other partners, to eliminate redundant communications, where possible. Vehicles traveling in the same direction will often be in close proximity longer than vehicles traveling in opposite directions. Further, the information of relevance to a vehicle traveling in the same direction will differ from the information of relevance to a vehicle traveling in the opposite direction. Thus, in addition to an identification of the communications device, the recent path and proposed path and velocity should also be exchanged. Based on this information, the data is prioritized and sorted, formatted and transmitted. Since the communications channel will likely vary in dependence on distance between partners, the communications protocol may be adaptive, providing increased data rate with decreasing distance, up to the channel capacity. Further, when the vehicles are relatively close, a line-of-sight communications scheme may be implemented, such as infrared (e.g., IRdA), while at larger distances (and/or for all distances) a spread spectrum 915 MHz, 2.4 GHz or 5.825 GHz RF communications scheme implemented.

Where multiple communications devices are present within a common communications region, these may be pooled, allowing transmissions from one transmitter to many receivers. In addition, within a band, multiple channels may be allocated, allowing multiple communications sessions. In this case, a single arbitration and control channel is provided to identify communications devices and communications parameters. Preferably, a communications device has the capability to monitor multiple channels simultaneously, and optionally to transmit on multiple channels simultaneously, where channel congestion is low. The channels are typically frequency division. Where such frequency division channels are defined, communications may be facilitated by so-called "repeaters", which may itself be a mobile transceiver according to the present invention. Preferably, such a repeater unit itself monitors the data stream, and may even process the data stream based on its internal parameters before passing it on.

In order to assure data integrity and optimize data bandwidth, both forward and retrospective error correction are applied. Data is preferably packetized, with each packet including error detection and correction information. Successful receipt of each packet is acknowledged on a reverse channel, optionally interspersed with corresponding data packets traveling in the reverse direction (e.g., full duplex communications). Where the data error rate (raw or corrected) is unacceptably high, one or more "fallback" modes may be implemented, such as reduced data rates, more fault tolerant modulation schemes, and extended error correction and detection codes. Transmitter power may also be modulated within acceptable limits.

A central repository of event data may be provided, such as on the Internet or an on-line database. In this case, event information may be administered remotely, and local storage minimized or eliminated.

Communications with the central database may be conducted through cellular infrastructure, wired or wireless local area network hotspots, or in other communications bands and other communications schemes.

Where primary event information storage is remote from the device, preferably local storage is based on an itinerary (route) and frequently traveled areas, with less frequently traveled and not prospectively traveled routes stored remotely. This allows consolidated update of memory by a large number of sources, with statistical error detection and correction of errant event information. The itinerary information may be programmed in conjunction with a GPS system and mapping/navigation software.

According to one embodiment of the invention, a plurality of functions are integrated into a single device, a sensor or detector for sensor emissions, for example speed control devices, a human computer interface, a computer system including processor, memory, and operating system, geospatial positioning device, and wireless communication system. Preferably, the system supports accessory inputs and outputs, which may be through wired or wireless means. The human computer interface preferably includes both a graphic display and a natural language (e.g., voice) interface. The computer system preferably possesses sufficient machine intelligence to filter outputs based on relevance and context, as well as interpret inputs as usable commands.

Data communications over a wireless link, for communicating between vehicles, preferably is highly compressed and fault tolerant. For digital data, this typically requires error detection and correction codes, while for data representing analog information, the information may be encoded such that more important information is transmitted in a more robust manner than less important information. For example, image information may be communicated in a hierarchally compressed manner, with higher order information transmitted in a manner less susceptible to interference and signal fading than lower order information.

The digital data may be compressed, for example, using a dictionary lookup, run length encoding, and/or model-based vector quantization method. Thus, since transceivers in accordance with this embodiment will typically be within 2000 meters from each other, relative position may be relayed in an offset format, with a grid size based on GPS precision and required accuracy, e.g., about 50-100 meters. The encoding may be adaptive, based, for example, on stored map information, with information representation density highest on traveled routes and lower in desolate areas. Thus, a sort of differential-corrected positional coding may be established between units.

By integrating functions, efficiencies are achieved. Thus, a single central processor, memory, program store and user interface may suffice for all functions. Further, the power supply and housing are also consolidated. While GPS and telecommunication antennas may be maintained as distinct elements, other portions of the system may also be integrated. In a device intended for vehicular applications, the GPS and other functions may be available to other vehicular systems, or the required data received from other systems.

Communication between communications devices may employ unlicensed spectrum or licensed spectrum, and may communicate between mobile units or between mobile and fixed resources. For example, excess capacity of a traditional cellular system may be used for inter-vehicle communications. Thus, the system may include or encompass a typical cellular (AMPS, IS-136, IS-95, CDPD, PCS and/or GSM) type telecommunications device, or link to an external telecommunications device.

Even where the cellular telephony infrastructure is not involved, mobile hardware may be reused for the present invention. For example, digital or software defined cellular telephone handsets may permit programmed use outside the normal cellular system protocols.

According to the present invention, messages may be passed between a network of free roving devices. In order to maintain network integrity, spurious data should be excluded. Thus, in order to prevent a "hacker" or miscreant (e.g., overzealous police official) from intentionally contaminating the dispersed database, or an innocent person from transmitting corrupted data, the ultimate source of event data is preferably recorded. When corrupt or erroneous data is identified, the source may then also be identified. The identity of the corrupting source is then transmitted or identified, for example to other radios or to a central database, whereupon, units in the field may be programmed to ignore the corrupt unit, or to identify its location as a possible event to be aware of. Further, assuming the hardware of the corrupted unit remains operational, a code may be transmitted to it deactivating it or resetting or reprogramming it.

Preferably, data is transmitted digitally, and may be encrypted. Encryption codes may be of a public-key/private key variety, with key lookup and/or certificate verification, either before each data exchange, or on a global basis with published updates. In fact, corrupt or unauthorized units may be deactivated by normal and authorized units within the network, thus inhibiting "hacking" of the network. Communications may be metered or otherwise controlled externally, with charges assessed based on usage factors. As discussed above, units may bid for control over the transmission medium, and an accounting may take place either between corresponding units, with a central database, or both. Thus, a subscription based system is supported.

Techniques corresponding to the Firewire (IEEE 1394) copy protection scheme may be implemented, and indeed the system according to the present invention may implement or incorporate the IEEE 1394 interface standard. The IEEE 1394 key management scheme may be useful for implementing subscription schemes and for preventing tampering.

One way to subsidize a subscription-based system is through advertising revenue. Therefore, the "events" may also include messages targeted to particular users, either by location, demographics, origin, time, or other factors. Thus, a motel or restaurant might solicit customers who are close by (especially in the evening), or set up transponders along highways at desired locations. Travelers would then receive messages appropriate to time and place. While the user of the system according to the present invention will typically be a frequent motorist or affluent, the system may also provide demographic codes, which allow a customized response to each unit. Since demographic information is personal, and may indicate traveler vulnerability, this information is preferably not transmitted as an open message and is preferably not decodable by unauthorized persons. In fact, the demographic codes may be employed to filter received information, rather than to broadcast interests.

Commercial messages may be stored in memory, and therefore need not be displayed immediately upon receipt. Further, such information may be provided on a so-called "smart card" or PC Card device, with messages triggered by location, perceived events, time and/or other factors. In turn, the presentation of commercial messages may be stored for verification by an auditing agency, thus allowing accounting for advertising fees on an "impression" basis.

The communications device may also receive data through broadcasts, such as using FM sidebands, paging channels, satellite transmission and the like. Thus, locationally or temporally distant information need not be transmitted between mobile units. Satellite radio systems may also be integrated.

While low power or micropower design is desirable, in an automobile environment, typically sufficient power is continuously available to support sophisticated and/or power hungry electronic devices; thus, significant design freedom is provided to implement the present invention using available technologies.

Sixth Embodiment

Figure 8:
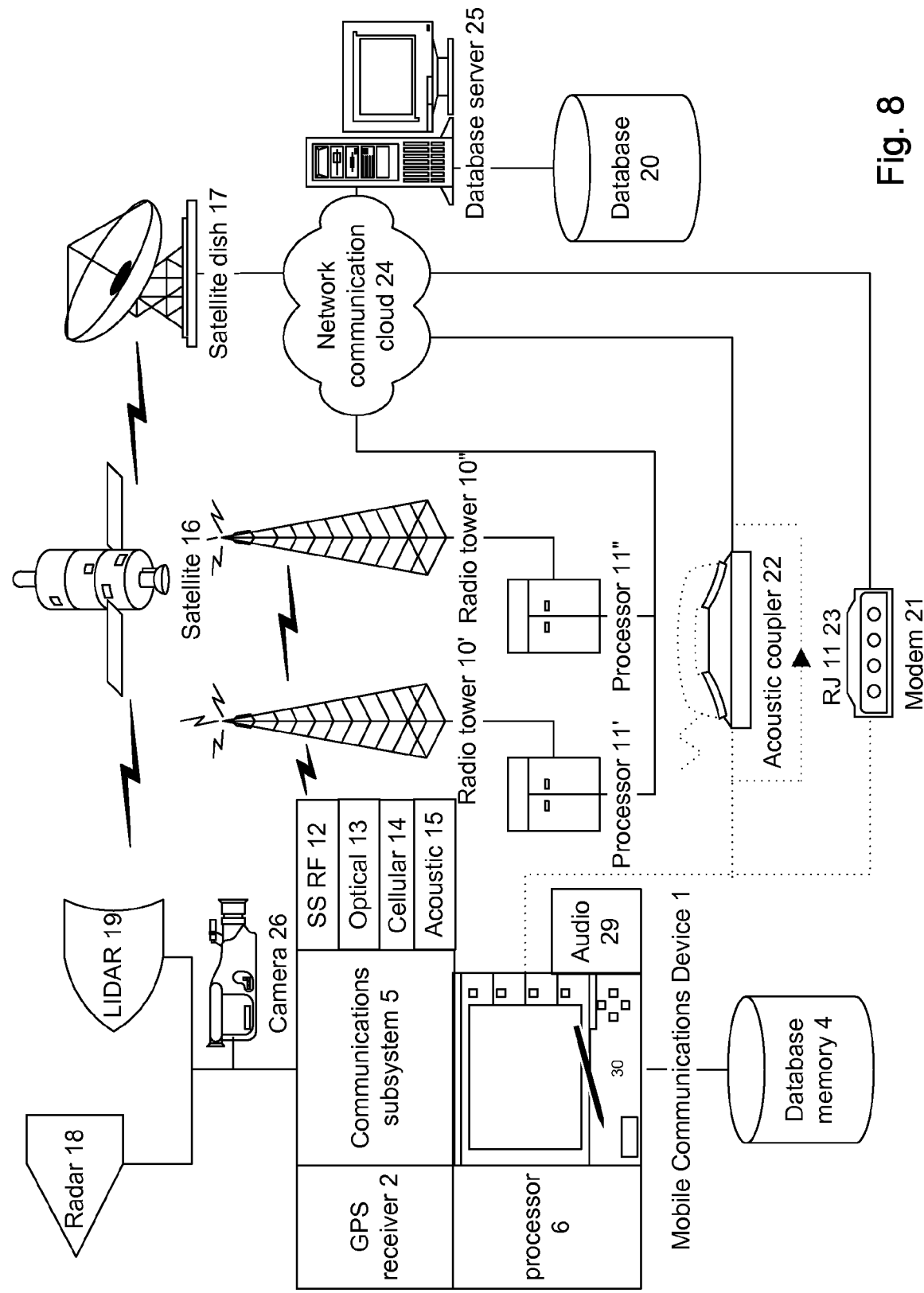
FIG. 8 shows a block diagram of a preferred embodiment of a communications system according to the present invention.
Figure 9:
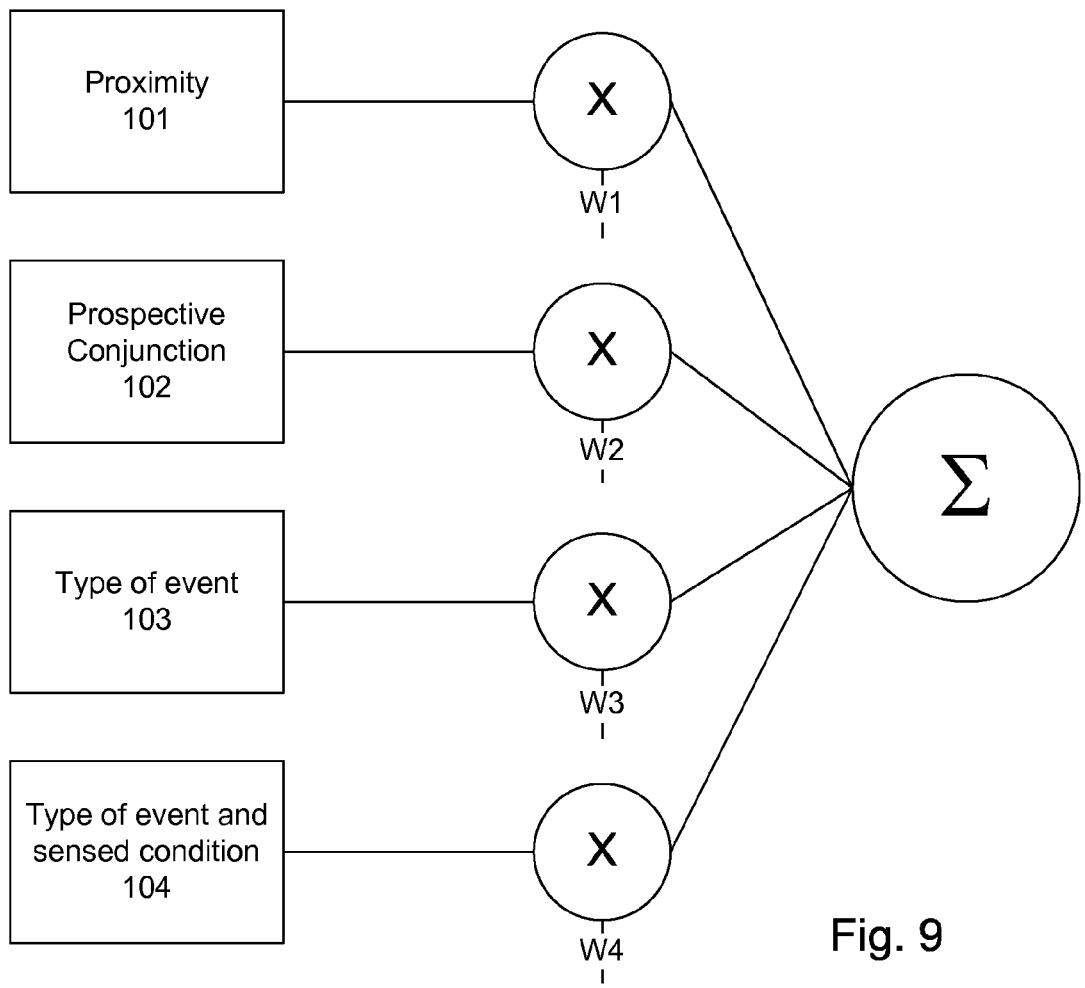
FIG. 9 is a schematic diagram showing the prioritization scheme.
Figure 10:
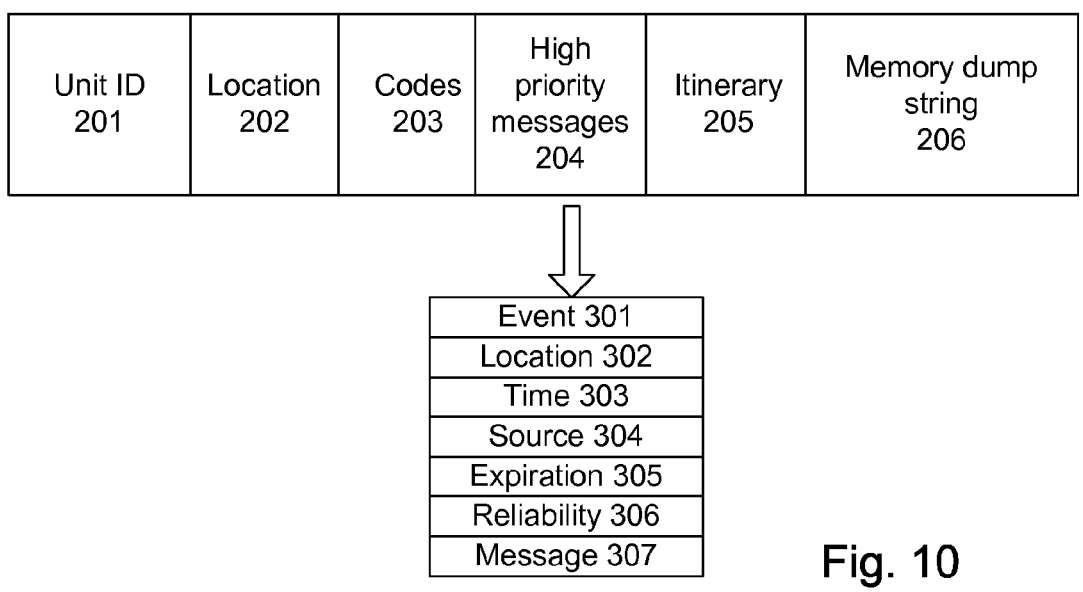
FIG. 10 is a block diagram representing a message format.

FIG. 8 shows a block diagram of a communications device embodiment of the present invention. The mobile communications device 1 includes a location sensing system 2, producing a location output 3; a memory 4, for example storing a set of locations and associated events, a telecommunications subsystem 5, for example communicating event and location information between a remote system and the memory 4; and a processor 6, for example processing the location output in conjunction with the stored locations and associated events in the memory 4, to determine a priority thereof.

The location sensing system 2 may include a known GPS receiver, which produces data that is analyzed by the processor 6. In an alternate embodiment, the GPS receiver includes its own processor and outputs coordinate positions, e.g., Cartesian coordinates, latitude and longitude, to the communications device processor 6, e.g., through a serial port or data bus, such as PC card, Universal serial Bus (USB), Firewire (IEEE 1394), peripheral connect interface (PCI), or other bus, such as that present within an automobile for communication of signals between subsystems. The location sensing system 5 may also determine a position based on the GLONASS system, LORAN, inertial reference, cellular base stations 10', 10", triangulation with fixed radio sources, such as FM radio and television stations, environmental markers and/or transponders, or the like. The location system may also be network based, for example relying on a cellular network to produce georeferenced position information.

The communications subsystem 5 is, for example, an 802.11g wireless Ethernet local area network system, having a router and switch controlling communications between 8 separate spatially distinct channels, defined by a "smart antenna". These spatially distinct channels are agile and having an aperture capable of being steered in real time to adjust for a change in relative position and orientation. The router and switch permit forwarding of packets received through one channel to another, as well as local communications control. The radio transceiver 12, operates in the unlicensed 2.4 GHz band, according to FCC regulations for this type of equipment. The system may alternately or additionally communicate in other unlicensed bands, such as 27 MHz, 49 MHz, FRS band, 900 MHz, 5.4 GHz, 5.8-5.9 GHz using various known modulation schemes and data communication protocols. Further, licensed radio bands may also be used, including FM radio sidebands (88-108 MHz), television PRO channel, cellular telephony channels, DECT, PCS and GSM channels, and the like. Likewise, satellite systems 16, 17 may be used to communicate with the mobile communications device 1. Thus, for example, instead of direct communication between mobile units, the existing cellular telephony 10', 10" infrastructure may be used to provide intercell, local, and/or regional communications between units, controlled by cellular telephone switching processors 11', 11". These communications may be given a lower priority than voice communications on the cellular telephone network, and therefore may use otherwise excess bandwidth, thus allowing reduced costs and reduced user fees or subscription rates.

The memory 4 may be of any standard type, for example, one or more of static random access memory, dynamic random access memory, ferroelectric memory, magnetic domain memory (e.g., diskette, hard disk), non-volatile semiconductor memory (e.g., UV-EPROM, EEPROM, Flash, non-standard electrically erasable programmable non-volatile memory), optically readable memory (e.g., R-CDROM, RW-CDROM, R-DVD, DVD-RAM, etc.), holographic memory, and the like. Preferably, common memory devices, such as EDO, SDRAM, RIMM, DDR, are employed, at least for a volatile portion of the memory, allowing simple upgrades and industry standard compatibility.

While the preferred embodiment includes a radio frequency transceiver for transmitting event data and receiving event data, embodiments are also possible which either transmit or receive the relevant data, but not both. For example, regulations may limit certain transmissions or relevant event sensors, e.g., radar detectors in trucks. In these cases, a receive-only embodiment may be appropriate. Further, while radio frequency communications are preferred, due to their range, data capacity and availability, optical communications systems 13, e.g., infrared LED's and laser diodes, acoustic communication 15, passive backscatter communications (employing an RF transceiver such as the spread spectrum transceiver 12), and the like may also be employed in conjunction or in substitution of a radio frequency system. Optical communication systems 13 may employ various detectors, including optical homodyne detectors, or other coherent optical detectors, or other types of optical sensors, such as PIDs, CCDs, silicon photodiodes, and the like.

Under some circumstances, a wired or dedicated link between units may be appropriate. For example, a central database 20 may provide consolidated and reliable data. The relevant portion of the database 20 may be downloaded by telephone through a modem 21, either through a physical connection 23 (e.g., POTS or ISDN, line), through a broadband Internet connect, or other network 24, to a database server 25. The memory 4 of the mobile unit may also be uploaded to the central database 20, after processing by the database server 25, during the same connection or session.

Thus, according to the present invention, the public switched telephone network 24 may be involved both during intermittent mass data communications with a central database 20, and also using, for example, cellular telephony 14, for the normal operation of the system (e.g., communications between mobile units).

As discussed above, general access to and control over the communications channel may be arbitrated on a bid and auction basis, as appropriate to avoid contention.

The processor 6 analyzes the information stored in memory 4 to provide a prioritized output. Thus, the memory may store information relating to a relatively large number of events, without overwhelming the capacity of a human user or communications partner. Priority may be based on a number of factors, including proximity of a stored location to a sensed location or a spatial-temporal proximity of a stored location to a loci of an itinerary 101, a prospective conjunction 102 of a sensed location with a stored location, a type of event 103, a type of event and a sensed condition associated with the mobile communications device 104, or other factors or a combination of factors. Neural networks, fuzzy logic and/or traditional logic paradigms may also be employed to prioritize the outputs. These logical paradigms are provided in known manner, and, especially in the case of neural network-based systems, a training aspect may be supplied with the system to allow it to adapt to the preferences and capabilities of the user. Thus, for a human user, events which are forthcoming and important are output, while past events and those in the distant future, if at all, are low priority. On the other hand, for communications with other devices, the prioritization is primarily in consideration of the fact that the communication between units may be only short lived; therefore, the data is communicated in order to priority, preferably of the recipient device. In an adaptive device, if the user believes that the information from the device is inappropriate, a simple input is provided, which is later analyzed to alter the information presentation algorithm. Likewise, if an information alert retrospectively turns out to be erroneous is a predictable manner, i.e., relating to a route not taken, the system may internally adjust the algorithm without user input.

In order to sort the priorities, the intended recipient may, for example, identify itself 201 and communicate its location 202 an itinerary or intended or prospective path 205. High priority messages 204 and various codes 203 may be interspersed through the communication string. The transmitting unit then outputs data 206 in order of the computed or predicted importance of the event and the time before the recipient encounters the event. Static events, such as fixed location radar emission sources, which may, for example, indicate a source for interference with a radar detector, or a speed detection/control device, may be transmitted as well. In the case where there is contention for the band, the communications session is limited by the scope of the authorization for use of the band. Where there is no contention, the duration of the communications channel will generally control the amount of information communicated.

Therefore, it is noted that the present invention provides a means for mapping events and for analyzing their significance. Thus, this embodiment does not merely rely on processed sensor outputs to supply information to the user; rather, sensor outputs may be filtered based on past experience with the particular location in question. If a particular user does not have direct experience with a location, then the experience of others at that location may be substituted or combined to improve analysis of the sensor signal. Therefore, the signal analysis from the sensor need not be subjected to a relatively high threshold to avoid false alarms. A low threshold is acceptable because other information is employed to determine the nature of the physical elements that give rise to the event and sensor activation.

It is noted that, in the case of "false alarms", the response of the unit is to detect the event, e.g., radar signal, correlate it with a stored "false alarm" event, and suppress an alarm or modify the alarm signal. Thus, information stored in memory and/or transmitted between units, may signify an important alarm or a suppression of an erroneous alarm. In this context is apparent that the integrity of the database structure, especially from corruption by the very sources of alarms which are intended to be detected, is important. To the extent that the environment responds to the existence and deployment of the system according to the present invention, for example by detecting transmissions between units to identify and locate units, and thereby alter the nature of an event to be detected, the present system may also be adaptive, in terms of its function and signature spectral patterns. In one aspect, the system may flash memory or flash memory modules, which controls system operation. Therefore, periodically, the system operation may be altered. The communications may selectively occur on a plurality of bands, using a plurality of protocols. Thus, for example, the system may have tri-band capability, e.g., 900 MHz, 2.4 GHz and 5.8-5.9 GHz. The mapping feature of the present invention may also be used to identify the locations of such monitoring sites. The system may also mask its transmissions as other, more common types of transmissions or environmental sources of emissions. A direct sequence spread spectrum technique maybe employed that is difficult to detect without knowing the spread spectrum sequence seed. Of course, an aspect of the present invention is open communications, which as a matter of course are not securely encrypted and which would identify the transponder and its location. This problem may be addressed, in part, relying on laws which prevent unauthorized eavesdropping and unauthorized interception and decryption of communications, unauthorized "copying" of copyright works and defeating of copy protection schemes thereof, control over availability of authorized transceivers, and patent protection of the design and implementation. According to one embodiment of the invention, channel use and control is established over a first channel, which may be out of band with respect to the normal communications channel. Preferably, this control channel is longer-range and more robust than the data communications channel, permitting control to precede normal communications capability, and providing enhanced recover and network reconfiguration capabilities.

According to one embodiment, all communications are direct sequence spread spectrum over a wide band, with medium to high security codes, e.g., 10 bits or greater length chip sequence and 12 bits or greater data encryption, and more preferably 16 bit or greater chip sequence and 16 bit or greater data encryption. The chip sequence of the control and arbitration channel, which should be available to all compatible units, may be adaptive or changing, for example following a formula based on time, location, and/or an arbitrary authorization code provided with a subscription update. Further, the chip sequence may vary based on selective availability (SA) deviancies in GPS data, or based on the identity of satellites in view of the receiver. While such information might be available to "pirates", miscreants, hackers and scofflaws, the algorithm for generating the chip sequence might be held as confidential, and thus the system unusable without specific authorization and incompatible with equipment without such algorithm. Such systems employing secure encryption with open access have been employed in satellite television (General Instrument VideoCipher II) and the like. It is noted that, in order to mask a message in a spread spectrum signal, multiple active channels may be employed, one or more of which transmits the desired data and the remainder transmitting noise or masking data.

Employing 2.4 or 5.8-9 GHz communications bands, data rates of 54-108 megabits per second (MBPS) are possible, although lower rates, such as 0.5-1.0 MBPS may be preferred to gain range, reduce loss due to interference or adverse communications conditions and maintain availability of simultaneous communications on multiple channels within the band in a small geographic area.

Where mobile devices are traveling parallel and at similar speeds, or both are stopped, an extended communications session may be initiated. In this case, the data prioritization will be weighted to completely exchange a public portion of the database, although emphasis will still be placed on immediately forthcoming events, if anticipated. On the other hand, where computed or user-input trajectories indicate a likely brief encounter, the immediate past events are weighted most heavily.

In order to analyze temporal or spatial relevance, the memory 4 preferably stores an event identifier 301, a location 302, a time of detection of an event 303, a source of the event information 304, an encoding for a likely expiration of the event 305, a reliability indicator for the event 306, and possibly a message associated with the event 307 including other information. These data fields may each be transmitted or received to describe the event, or selectively transmitted based on the nature of the event or an initial exchange between units specifying the information which will be communicated. Other types of relevance may also be accounted for, as discussed above.

For example, in a radar detector embodiment, mobile police radar "traps" are often relocated, so that a particular location of one event should not be perpetuated beyond its anticipated or actual relevance. In this case, expirations may be stored, or calculated based on a "type" of event according to a set of rules. False alarms, due to security systems, traffic control and monitoring systems, and the like, may also be recorded, to increase the reliability any warnings provided.

Likewise, traffic jams often resolve after minutes or hours, and, while certain road regions may be prone to traffic jams, especially at certain hours of the day and/or days of the week, abnormal condition information should not persist indefinitely.

The preferred embodiment according to the present invention provides an event detector, which, in turn is preferably a police radar 18 and LIDAR 19 detector. Other detected events may include speed of vehicle, traffic conditions, weather conditions, road conditions, road debris or potholes, site designation, sources of radio signals or interference or false alarms for other event detectors, and particular vehicles, such as drunk drivers or unmarked police cars (possibly by manual event input). The event detector may include, for example, a sensor, such as a camera 26, which may analyze traffic control indicia (such as speed limits, cautions, traffic lights). The event may also include a commercial message or advertisement, received, for example from a fixed antenna beside a road, which, for example, is stored as the message 307. Such a commercial message 307 may be presented immediately or stored for future output. The received message, whether commercial or not, may be a static or motion graphic image, text or sound message. The user output of the system 27 may thus be visual, such as a graphic or alphanumeric (text) display, indicator lights or LED's 28, audible alerts or spoken voice through an audio transducer 29.

The camera is, for example, a color or infrared charge coupled device (CCD) or complementary metal oxide silicon field effect transistor (CMOS) imager, having resolution of 0.3 to 13 megapixels. Image communication may be, for example H.261 or H.263+, using H.323 or H.324 protocol, or MPEG-4. The imager may also be incorporated as part of a mobile videoconferencing system, although a dual imager system (one for imaging persons and the other for imaging road conditions) may be implemented. Other ITU standards, e.g., T.120, may be employed for data communications, although the particular nature of the data communications channel(s) may compel other communications protocols.

In order to maintain the integrity of the database stored in memory 4, 20, it may be useful to store the originator of a record, i.e., its source 304. Thus, if event information from that origin is deemed unreliable, all records from that source may be purged, and future messages ignored or "flagged". As stated above, even the proximity of an unreliable or modified unit may be detrimental to system operation. Therefore, where the location of such a unit is known, other units in proximity may enter into a silent mode. Further, normal units may transmit a "kill" message to the unreliable unit, causing it to cease functioning (at least in a transmit mode) until the problem is rectified or the unit reauthorized.

The unit is preferably tamper-proof, for example, codes necessary for unit activation and operation are corrupted or erased if an enclosure to the unit is opened. Thus, techniques such as employed in the General Instrument VideoCipher II and disclosed in Kaish et al., U.S. Pat. No. 4,494,114, may be employed.

The communications subsystem preferably employs an error correction/error detection protocol, with forward error correction and confirmation of received data packet. The scheme may be adaptive to the quality of the communication channel(s), with the packet length, encoding scheme, transmit power, bandwidth allocation, data rate and modulation scheme varied in an adaptive scheme to optimize the communication between units. In many cases, units engaged in communication will exchange information bidirectionally. In that case, a full duplex communication protocol is preferred; on the other hand, where communication is unidirectional, greater data communication rates may be achieved employing the available bandwidth and applying it to the single communication session.

In some instances, it may be desired to maintain privacy of communications. In that case, two possibilities are available; spread spectrum communications, preferably direct sequence spread spectrum communications is employed, to limit eavesdropping possibilities. Second, the data itself may be encrypted, using, for example, a DES, PGP, elliptic keys, or RSA type encryption scheme. Keys may be supplied or exchanged in advance, negotiated between partners, or involve a public key-private key encryption algorithm. For example, the spread spectrum communications chip sequence may be based on an encrypted code. Ultrawideband (UWB) communications techniques may also be employed.

In order to provide flexibility in financing the communications devices, the commercial messages 307 discussed above may be employed. Further, by circulating authorization tokens or codes 203, a subscription service may be provided. Thus, in a simplest subscription scheme, the communications device has a timer function, which may be a simple clock or GPS referenced. The user must input an authorization code periodically in order for the device to continue operating. Thus, similarly to satellite television receivers and some addressable cable television decoders, failure to provide the authorization code, which may be entered, e.g., by telephone communication or through a keypad 30, renders the device temporarily or permanently inoperative. In order to reduce the burden of reauthorizations, the authorization codes or tokens may be passed through the communications "cloud" 24, so that devices 1, if used, will eventually receive the authorization data. Conversely, a code 203 may be circulated which specifically deactivates a certain device 1, for example for non-payment of the subscription fee or misuse of the device (e.g., in an attempt to corrupt other users databases). The authorization process is preferably integral to the core operation of the system, making bypassing authorization difficult.

Where a number of communications devices are in proximity, a multi-party communication session may be initiated. For example, the communications subsystem may have simultaneous multi-channel capability, allowing each unit to transmit on a separate channel or use a shared channel. Where the number of channels or channel capacity is insufficient, units may take turns transmitting event information on the same channel (e.g., according to estimated priority), or time division multiplex (TDM) the channel(s). Preferably, the communication scheme involves a number of channels within a band, e.g., 1 common control channel and 24 data communications channels. Since some communication sessions may be relatively short, e.g., limited to a few seconds, a data communications channel preferably has a maximum capacity of tens of kilobits per second or higher. In some cases, hundreds of kilobits, or megabit range bandwidths are achievable, especially with a small number of channels (e.g., one channel). For example, so-called third generation (3G) cellular communications protocols may be employed.

Thus, for example, an 802.11g or 802.11n compatible spread spectrum transceiver operating in the 2.4 GHz band might have a usable bandwidth of 10-108 megabits per second, even while sharing the same band with other transceivers in close proximity. Where necessary, directional antennas, or phased arrays may be employed to provide spatial discrimination.

The system preferably has advanced ability to detect channel conditions. Thus, where communications are interrupted by physical limitations in the channel, the impairment to the communications channel is detected and the communications session paused until the impairment abates. This, in turn, will allow other units, which might not be subject to the impairment, to use the same channel during this interval. The channel impairment may be detected by a feedback protocol between communications partners, or by means of symmetric antennas and communications systems, by which an impairment of a received signal may be presumed to affect the transmitted signal as well. The latter requires a high degree of standardization of equipment design and installation for effectiveness.

It is particularly noted that, where the events to be detected and the communications subsystem operate in the same band, structures may be shared between the communications and event detection systems, but this also increases the possibilities for interference.

As one embodiment of the invention, the processor may be provided as a standard personal digital assistant (PDA) with a PC Card or PCMCIA slot for receiving a standard GPS receiver and another standard PC Card slot for receiving an 802.11b/g/a/ R/A module. The PDA, in turn has memory, which may include random access memory, flash memory, and rotating magnetic memory (hard disk), for example. The PDA has a processing system which is capable of running applications written in general purpose, high level languages such as C. The PDA may operate under a standard operating system, such as Microsoft Windows CE, XP, Palm OS, Linux, or a proprietary operating system. A software application written in a high level language can normally be ported to run in the PDA processing system. Thus, the basic elements of the hardware platform are all available without customization. In a preferred embodiment, an event sensor is provided, such as a police radar and laser speed detection equipment system (e.g., "radar detector") is provided. This may employ a modified commercially available radar detector, to produce a serial data stream or parallel signal set. For example, radar detectors providing an alphanumeric display often transmit data to the display controller by means of a serial data signal. This signal may be intercepted and interfaced with a serial port or custom port of the PDA.

Optionally, the GPS Smart Antenna is "differential-ready" to apply differential GPS (DGPS) error correction information to improve accuracy of a GPS determined location. The application program for the PDA may be provided in a semiconductor memory cartridge or stored on hard disk.

The PDA 30 includes the processing system, including a microprocessor, memory, precoded program instructions and data stored in memory, a microprocessor bus for addresses, data, and control, an interrupt bus for interrupt signals, and associated hardware, operates in a conventional manner to receive digital signals, process information, and issue digital signals. A user interface in the PDA includes a visual display or audible output to present signals received from the processing system to a user, a user entry system to issue signals from the user to the processing system. The user interface may include one or more push keys, toggle switches, proximity switches, trackballs, joysticks or pressure sensitive keys, a touch-sensitive display screen, microphones or a combination of any of the above used together or with other similar type user input methods. The PDA sends digital signals representing addresses, data, and commands to the memory device and receives digital signals representing instructions and data from the memory. A PDA interface electrically connects the processing system to a GPS Smart Antenna. If the PDA and GPS are not integrated, a preferred interface comprises a computer standard low to medium speed serial data interface, such as RS-232, RS-422, or USB (1.0, 1.1, 2.0), IEEE-1394, Bluetooth (especially if the communications system operates in another band), through a cabled interface for connection to the GPS Smart Antenna.

The GPS Smart Antenna system includes a GPS receiver antenna to receive GPS satellite signals from GPS satellite transmitters, a GPS frequency downconverter to downconvert the approximately 1.575 GHz frequency of the L1 GPS satellite signals to a lower frequency (LF) signal that is suitable for digital processing, and to issue the LF to a GPS processor. The GPS processor demodulates and decodes the LF signal and provides location information for at least one of (i) location of the GPS antenna, (ii), GPS satellite pseudoranges between the GPS satellites and the GPS antenna, (iii) rate of change of location of the GPS antenna, (iv) heading of the GPS antenna, and (v) time to a GPS interface. Optionally, the GPS Smart Antenna and GPS processor are differential-ready. An optional input select switch, controlled by the GPS processor upon a request from the PDA, allows a single serial interface to receive either a control signal from the PDA or a DGPS error correction signal from an optional DGPS radio-wave receiver. Alternately, a DGPS-type system may be coordinated between multiple mobile receivers, top provide high relative position accuracy, even where the absolute position accuracy is low. Since the event position calculations are based on the relative position frame, the effect is to accurately position the events with respect to the vehicle.

The user device may display, for example, map features according to a coordinate system such as latitude and longitude. The display may also include an indication of the location of the GPS receiver, an itinerary, proposed route, and indications of the location of various events. By correlating the GPS with a stored map, the absolute location of the vehicle may be determined by map matching techniques. In accordance with the present invention, these events are derived from the event detector or the memory. Other communications devices may also be located on the display.

The user entry system has both touchscreen keys and press keys in the present embodiment. With a touchscreen, a user enters a request by touching a designated portion overlying a visual display with his finger (or soft pointer, such as a plastic pen). The touchscreen senses the touch and causes a digital signal to be sent to the processing system indicating where the touch was made. Switches such as rotary switches, toggle switches, or other switches can equally well be applied. An advantage of the touchscreen is that a label or a placement of the touchscreen, and a corresponding function of the touchscreen, may be changed by the computer controlling the display any number of times without changing electrical or mechanical hardware. In the present embodiment, zoom keys may be employed change scale and resolution of a map on the display. Zooming in decreases the scale, so that the map is viewed with greater resolution over a lesser area of the map. Zooming out increases the scale, so that a greater area of the map is viewed with lesser resolution. A map orientation key selects an orientation of a direction on the map with a direction on the visual display, for example, orientations of north up or current ground track up. It is noted that these map functions are generally known, and known techniques may be generally applied for such map functions. According to the present invention, in addition to normal map functions, the event data may be overlayed on the map to provide additional dimensions of display data. Further, by providing these data, which are dynamic, the map system becomes useful even to travelers who are well aware of the geography and layout of the region being traveled.

One communications scheme, a 900 MHz spread spectrum communications system, operates as follows. The RF receiver demodulates the signal using known techniques, which may include superheterodyne and zero-IF techniques. Thus, in a frequency hopping embodiment, the demodulator tracks the hop frequency sequence. In a direct sequence spread spectrum embodiment, the demodulator provides the appropriate pseudorandom code sequence to demodulate the received signal. Time synchronization may be effected by using the timing functions of the GPS receiver. The demodulated signal is then decoded into messages, which are typically digital bitstreams. The receiver may be process a plurality of signals simultaneously, allowing multiple signals to be received simultaneously.

Seventh Embodiment

Ad hoc networks are a good candidate for analysis and optimization according to game theory. A multihop ad hoc network requires a communication to be passed through a disinterested node. The disinterested node incurs a cost, thus leading to a disincentive to cooperate. Meanwhile, bystander nodes must defer their own communications. By understanding the decision analysis of the various nodes in a network, it is possible to define a system which, in accordance with game theory, provides a benefit or incentive to promote cooperation and network reliability and stability. The incentive, in economic form, may be charged to the node(s) benefiting from the communication, and is preferably based on a value of the benefit received. This network optimization employs a modified combinatorial (VCG) auction, which optimally compensates those burdened by the communication, while charging the benefiting participants. Equilibrium usage and headroom may be influenced by deviating from a zero-sum condition. The mechanism seeks to define fairness in terms of market value, providing probable participation benefit for all nodes, leading to network stability.

The present example describes the application of game theory concepts to the arbitration of access to bandwidth in an ad hoc communications network, more particularly to network including mobile nodes. According to applicable elements of game theory, an agent makes a decision to cooperate with a system having established rules, or to circumvent it. Likewise, cheating, i.e., adopting behavior contrary to an expected nor, may be an option, and can be analyzed in the context of a decision. Therefore, a game theoretic approach addresses the situation where the operation of an agent which has freedom of choice, allowing optimization on a high level, considering the possibility of alternatives to a well designed system. According to game theory, the best way to ensure that a system retains compliant agents, is to provide the greatest anticipated benefit, at the least anticipated cost, compared to the alternates.

Mobile ad hoc networks encompass multihop networks, which, by their nature, require participation of disinterested nodes to operate. Technically, however, the multihop scenario is not intrinsic, since it is reasonable to presume that in some networks, all nodes are within range of each other. Each scenario poses a classic game theory issue to each node: why defer to other nodes if no direct benefit is obtained? The multihop network adds the further issue of: why participate in communications between other nodes if no direct benefit is obtained? We discuss a set of mechanisms, incentives and rationales as a framework for analyzing node behavior and optimization, and seeks to respond to these issues by proposing appropriate incentives to promote network efficiency and stability.

The application of game theory to ad hoc networks has been addressed in various forms to date. In general, there is a divergence between approaches which define a real-world system, with all of its complexity, and required functionality, and those which seek to mathematically tractable model having a definite set of rules and presumptions leading to a comprehensible and useful result.

An ad hoc network is a wireless network which does not require fixed infrastructure or centralized control. The terminals in the network cooperate and communicate with each other, in a self organizing network. In a multihop network, communications can extend beyond the scope of a single node, employing neighboring nodes within the scope, to forward messages. In a mobile ad hoc network, constraints are not placed on the mobility of nodes, that is, they can relocate within a time scale which is short with respect to the communications, thus requiring consideration of dynamic changes in network architecture.

Ad hoc networks pose control issues with respect to contention, routing and information conveyance. There are typically tradeoffs involving equipment size, cost and complexity, protocol complexity, throughput efficiency, energy consumption, and "fairness" of access arbitration. Other factors may also come into play.

Game theory studies the interactions of multiple independent decision makers, each seeking to fulfill their own objectives. Game theory encompasses, for example, auction theory and strategic decision-making. By providing appropriate incentives, a group of independent actors may be persuaded, according to self-interest, to act toward the benefit of the group. That is, the selfish individual interests are aligned with the community interests. In this way, the community will be both efficient and the network of actors stable and predictable. Of course, any system wherein the "incentives" impose too high a cost, themselves encourage circumvention. In this case, game theory also addresses this issue.

Cooperative Problems in Ad Hoc Networks

To understand why game theory is applicable the control over ad hoc networks, consider the analogy of a classroom. The teacher acts as a central authority and arbitrator to ensure decorum. The teacher recognizes one student at a time for public communication. This is an example of centralized control. If there were no teacher to recognize a student, pandemonium would result, unless a suitable process of self-organization is established, which obtains cooperation dictating common rules, adopted according to mutual incentives.

Now, suppose one student wishes to send a note across the room. Presumably, there are multiple paths to the destination. But how can the student be sure that the note will be forwarded? How does one know which neighbor to handoff to? Suppose that forwarding the note imposes a burden, such as the risk of being caught and sanctioned? Consider the possibility, after conclusion of negotiations for forwarding, a student fails to fulfill his assumed responsibility?

It is therefore clear that the issues of subjective and objective costs and benefits, distance, complexity, and reliability, are therefore interrelated, and there may be practical restraints on achieving theoretical system capacity.

The game theoretic solution is to link an incentive or benefit to the desired behavior, to promote cooperation of each agent with note forwarding, on a rational basis. The ultimate payoff should be borne by the student receiving the benefit. Thus, by linking benefits to costs, a stable society is achieved, approaching a desirable equilibrium.

In order to incentivize the intermediaries, a student could compensate them by taping dimes to the note, instructing each forwarding student to remove one dime (the packet purse model). Alternately, the recipient may be expected to pay for the transmission through an acknowledgement message with attached value (the packet trade model). However, how do we know that the first recipient will not remove all the money and throw away the note? How can the intermediaries ensure, in the packet trade model, that the recipient will eventually pay? How does the responsible party know how much must be paid? These models also require stability of the route during the process, and imply a priori knowledge of the route. This approach does not permit variations in compensation, e.g., some students might accept a nickel, and others in a critical position, might require a quarter. In cases of unreliable routes, should the originator send two notes by alternate paths, or attempt to pay more for a single reliable delivery?

Even with imposition of a traffic sensitive cost, one node of the network may seek to send an inordinate number of messages, resulting in congestion. A node in a critical location may become wealthy, and its fees rise, leading to instability. Likewise, in a virtual construct, what does one use as currency? We see that consideration must be given to keeping traffic below capacity, since highly loaded networks often have decreased efficiency.

Game Theory

Game theory is the study of the interaction of independent agents, in an environment where there are rules, decisions, and outcomes. Game theory defines the theoretical basis for strategy, as well as providing a framework for analyzing real-world actors. Game theory may be applied to automated systems, providing a basis for the analysis and optimization of such systems. Aspects of game theory have been applied to telecommunications, for example to optimize network routing, and has quality of service implications. Communications resources may be treated as utilities, and auctions have been applied to the optimization of allocation of utility resources.

Each game has a set of rules or constraints, under which the agents operate. "Cheating", if permitted at all, is modeled as an available decision of an agent to comply with other constraints. Therefore, the game is valid as a model only for the rules and constraints considered. Each decision maker pursues a goal, and may take into account their knowledge or expectations of the other decision makers' behavior. According to game theory, rationality leads to optimality, and therefore analyzing the game and acting logically in accordance with the rules leads to the best outcome.

It is conceptually simple for an automated system to act rationally. That is, given a set of facts and circumstances, the rational analysis is fixed and obtainable. On the other hand, humans acting on purely mental consideration may deviate from rationality. For example, humans exhibit a broad range of risk tolerance, which is not directly explained by rational analysis. It is noted that risk tolerance, and other aspects of behavior, have been modeled, and as such, can themselves be treated scientifically and rationally. In fact, game theory expressly recognizes that agents may express private values which are not rationally explained, and that by understanding these values, a strategic advantage is obtained. Thus, while rationality is assumed as an optimum strategy for each entity, real entities have imperfect estimates of payoff and risk, and indeed may miscalculate or misconstrue the circumstances. Such perturbations may be compensated, under certain circumstances, by way of various parameters added to the modeling equation.

Game theory is typically encompassed in the study of economics, since a self-interested node will always try to increase its wealth, and all other concepts may be considered in terms of their subjective economic costs and benefits. Game theory can be used not only to analyze a defined game, but also to define a game having a desired outcome, i.e., to optimize a set of rules and constraints. The preferences of a node can be expressed either with a utility function, or with preference relations, ranking various consequences.

Games can be divided into noncooperative and cooperative games. In cooperative games, the joint actions of groups are analyzed, i.e. what is the outcome if a group of players cooperate. In noncooperative games, the actions of the single players are considered. The cooperative game model may be used to analyze heterogeneous ad hoc networks. In strategic games, decisions are made at the commencement of the game. In extensive games, decisions may be made interactively. The strategic game model is suitable for representing simple real life events such as a sealed bid auction. A progressive bid auction may be modeled as an extensive game.

Games can also be divided according to their payoff structures. A game is called zero-sum game if the sum of the utilities is constant in every outcome. Zero-sum games are considered strictly competitive games. For example, an auction is a zero sum game, since the buyer pays the seller, with no other gains or losses incurred. If the players are fully informed about each other's moves, the game has perfect information. Only extensive games consider the issue of perfect information. In games with complete information the utility function of each player is known. In a game with incomplete information, the privacy of a player's utility function is held as a strategic advantage.

Pareto efficiency exists if there is no other outcome that would make all players better off. An equilibrium is a result of the optimization of the individual players, but does not imply that the result is "good" or globally optimum. The solution of a strategic game is a Nash equilibrium. Every strategic game with finite number of players, each with a finite set of actions, has an equilibrium point. This Nash equilibrium is a point from which no single player wants to deviate unilaterally. When a game is played, the rationality assumption will force the game into a Nash equilibrium outcome. If the outcome is not a Nash equilibrium, at least one player would gain a higher payoff by choosing another action. If there are multiple equilibriums, more information on the behavior of the players is needed to determine the outcome of the game.

In the strategic and extensive games, the solution of a game is a complete set of strategies that achieve a Nash equilibrium. In cooperative games, the solution comprises the subsets of players or coalitions from which no member has an incentive to break away. Cooperative games can be divided between games in which the coalition is free to internally distribute a payoff (transferable payoff), and those in which the payoff is personal to coalition members (non-transferable payoff). A dominant strategy is one in which the same decision is made based on the various different rational strategies an agent may adopt.

To better understand game theory, it is useful to consider simple games. In one game, called the prisoner's dilemma, two criminals are arrested and charged with a crime. The police do not have enough evidence to convict the suspects, unless at least one confesses. They are not able to communicate. If neither confesses, they will be convicted of a minor crime and sentenced for one month. If one confesses, and the other does not, the confessing one will be given immunity and released and the other will be sentenced for nine months. If both confess, both will be sentenced for six months.

Another famous game is the battle of the sexes. A couple is going to spend an evening out. She wishes to attend the opera and he wishes to attend a hockey match, but each gains a benefit of the other's company.

In the prisoner's dilemma, all the outcomes except (Confess; Confess) are Pareto efficient. In the battle of the sexes, an outcome in which husband and wife attend different events are not Pareto efficient. The outcome (Confess; Confess) is the equilibrium, while outcome (Don't confess; Don't confess) results in higher payoff for both the criminals, but it is not an equilibrium because both the players have an incentive to deviate from it. In the battle of the sexes, the pure strategy equilibrium points are (Opera; Opera) and (Hockey; Hockey). There is also a third Nash equilibrium with mixed strategies, in which both choose their preferred option with probability 2:3. The prisoner's dilemma is a good example of a sub-optimal equilibrium. Both players would gain a higher payoff by playing (Don't confess; Don't confess).

Another example of game theory is the so-called tragedy of the commons. In this game, a set of farmers live in a community with a grass-filled square. Each farmer is confronted with a decision as to whether to acquire another goat, which eats grass in the square. So long as the benefit of having the goat is in excess of the personal detriment of that goat's grass consumption, it is a dominant strategy to acquire the goat, even though the necessary result of all farmers acting rationally is the loss, to all, of the benefits of the square.

In computer networks, issues arise as the demand for communications bandwidth approaches the theoretical limit. Under such circumstances, the behavior of nodes will affect how close to the theoretical limit the system comes, and also which communications are permitted. The well known collision sense, multiple access (CSMA) protocol allows each node to request access to the network, essentially without cost or penalty, and regardless of the importance of the communication. While the protocol incurs relatively low overhead and may provide fully decentralized control, under congested network conditions, the system may exhibit instability, that is, a decline in throughput as demand increases, resulting in ever increasing demand on the system resources and decreasing throughput. According to game theory, the deficit of the CSMA protocol is that it is a dominant strategy to be selfish and hog resources, regardless of the cost to society, resulting in "the tragedy of the commons."

Game theory is most readily applied in the optimization of communications routes through a defined network, to achieve the best surplus allocation. The problems of determining the network topology, and conducting the communications themselves, are also applications of game theory. Since the communications incidental to the network access arbitration require consideration of some of the same issues as the underlying communications, elements of game theory apply correspondingly. Due to various uncertainties, the operation of the system is stochastic. This presumption, in turn, allows estimation of optimality within an acceptable margin of error, permitting simplifying assumptions and facilitating implementation.

In an ad hoc network used for conveying real-time information, as might be the case in a telematics system, there are potentially unlimited data communication requirements, and network congestion is almost guaranteed. Therefore, using a CSMA protocol as the paradigm for basic information conveyance is destined for failure, unless there is a disincentive to network use. On the other hand, a system which provides more graceful degradation under high load, sensitivity to the importance of information to be communicated, and efficient utilization of the communications medium would appear more optimal.

One way to impose a cost which varies in dependence on the societal value of the good or service, is to conduct an auction, which is a mechanism to determine the market value of the good or service, at least between the auction participants. In an auction, the bidder seeks to bid the lowest value, up to a value less than or equal to his own private value (the actual value which the bidder appraises the good or service, and above which there is no surplus), that will win the auction. Since competitive bidders can minimize the gains of another bidder by exploiting knowledge of the private value attached to the good or service by the bidder, it is generally a dominant strategy for the bidder to attempt to keep its private value a secret, at least until the auction is concluded, thus yielding strategies that result in the largest potential gain. Auction strategies become more complex when the bidder himself is not a consumer or collector, but rather a reseller. In this case, the private value of the bidder is influenced by the perception of the private value of other bidders, and thus may change over the course of the auction in a successive price auction. On the other hand, in certain situations, release or publication of the private value is a dominant strategy, and can result in substantial efficiency, that is, honesty in reporting the private value results in the maximum likelihood of prospective gain.

A so-called Vickrey-Clarke-Groves, or VCG, auction, is a type of auction suitable for bidding, in a single auction, for the goods or services of a plurality of offerors, as a unit. In the classic case, each bidder bids a value vector for each available combination of goods or services. The various components and associated ask price are evaluated combinatorially to achieve the minimum sum to meet the requirement. The winning bid set is that which produces the maximum value of the accepted bids, although the second (Vickrey) price is paid. In the present context, each offeror submits an ask price (reserve) or evaluatable value function for a component of the combination. If the minimum aggregate to meet the bid requirement is not met, the auction fails. If the auction is successful, then the set of offerors selected is that with the lowest aggregate bid, and they are compensated that amount.

The surplus, i.e., gap between bid and ask, is then available to compensate the deferred bidders. This surplus is distributed proportionately to the original bid value for the bidder, thus further encouraging an honest valuation of control over the resource.

The network is such that, if any offeror asks an amount that is too high, it will be bypassed. Since the bidder pays the second highest price, honesty in bidding the full private value is encouraged. VCG auctions have found application in providing segment links to route goods, or information in a network. In defining the goods and services that are the subject of the auction, it is possible to value the non-interference of a competitor; that is, a competitor is both a buyer and seller in the sale multi-good auction, with the purchase and sale being inconsistent combinations.

The traditional VCG auction, is postulated as being optimal for allocation of multiple resources between agents. It is "strategyproof" and efficient, meaning that it is a dominant strategy for agents to report their true valuation for a resource, and the result of the optimization is a network which maximizes the value of the system to the agents. Game theory also allows an allocation of cost between various recipients of a broadcast or multicast. That is, the communication is of value to a plurality of nodes, and a large set of recipient nodes may efficiently receive the same information. This allocation from multiple bidders to multiple sellers is a direct extension of VCG theory, and a similar algorithm may be used to optimize allocation of costs and benefit.

Ad Hoc Networks

In an ad hoc network, there is no central authority controlling network operation, and there is typically a presumption that some nodes cannot directly communicate with others, leading to a requirement for communication intermediaries to forward packets, i.e., a multihop architecture. A mobile ad hoc network adds the further presumption that nodes are not stationary, and therefore a route discovery mechanism is required.

In order to determine the network architecture state, each node must broadcast its existence, and, for example, a payload of information including its identity, location, itinerary (navigation vector) and possibly an "information value function" and/or "information availability function". Typically, the system operates in a continuous state, so that, after stabilization, it is reasonable to estimate of the present state based on the prior state information. In a system with mobile nodes, the mobility may be predicted, or updates provided as necessary. Using an in-band or out-of-band propagation mechanism, this information must propagate through a sphere of influence or to a network edge, which may be physically or artificially defined. Nodes may be presumed to operate with a substantially common estimation of network topology, and therefore only deviations from previously propagated information need be propagated. Of course, a mechanism should be provided for initialization and in case a new node joins the network. If such estimates were accurate, the network could then be modeled similarly to a non-mobile network, with certain extensions. On the other hand, typical implementations will present substantial deviations between actual network architecture and predicted network architecture, requiring substantial fault tolerance in the fundamental operation of the protocol and system.

If we presume that there is a spatial or temporal limit to relevance, for example, 5 miles or 10 hops, or 1 to 5 minutes, then the network state propagation may be so limited. Extending the network to encompass a large number of nodes, will necessarily reduce the tractability of the optimization, although this may also produce substantial benefits, especially if the hop distance is relatively short with respect to the desired communication range. Each node may therefore impose a local estimate of relevance as a filter on communications, especially arbitration communications. This consideration is accommodated by communicating, from each node, an update to all other nodes within its network relevance boundary, and a state variable which represents an estimate of relevant status beyond the arbitrarily defined boundary. The boundary estimate is advantageous in order to ensure long range consistency. On a practical note, assuming a cost is incurred by employing the ad hoc network, which scales with the number of hops, then at some point, especially considering the latency and reliability issues of ad hoc networks with a large number of hops, it is more efficient to employ cellular communications or the like. On the other hand, making the ad hoc network suitable and reliable for 100 hop communications will necessarily impede communications over a much smaller number of hops, thus disincentivizing the more reasonable uses of the network.

For example, the propagation of network state and other protocol-level information may conveniently occur over a finite number of hops, for example 5-10, in an outward direction, a condition which may be assessed by GPS assistance. For each hop, a relatively simple protocol, such as a collision sense-multiple access (CSMA) protocol, may be employed, with each node propagating information according to a set of rules. (It is noted that, since this communication is not "limitless" in contrast to bulk or streaming real-time sensor data, CSMA may be an appropriate and efficient protocol).

An example of the application of game theory to influence system architecture arises when communications latency is an issue. A significant factor in latency is the node hop count. Therefore, a system may seek to reduce node hop count by using an algorithm other than a nearest neighbor algorithm, bypassing some nodes with longer distance communications. In analyzing this possibility, one must not only look at the cost to the nodes involved in the communication, but also the cost to nodes which are prevented from simultaneously accessing the network. As a general proposition, the analysis of the network must include the impact of each action, or network state, on every node in the system, although simplifying presumptions may be appropriate where information is unavailable, or the anticipated impact is trivial.

Known and well analyzed routing models proposed for forwarding of packets in ad hoc networks. These include Ad Hoc On-Demand Distance Vector (AODV) Routing, Optimized Link State Routing Protocol (OLSR), Dynamic Source Routing Protocol (DSR), and Topology Dissemination Based on Reverse-Path Forwarding (TBRPF). In most scenarios analyzed to date, the performance metrics studied were power consumption, end-to-end data throughput and delay, route acquisition time, percentage out-of-order delivery, and efficiency. A critical variable considered in many prior studies is power cost, presuming a battery operated transceiver with finite available power. There can be significant differences in optimum routing depending on whether node has a transmit power control, which in turn controls range, and provides a further control over network topology. Likewise, steerable antennas, antenna arrays, and other forms of multiplexing provide further degrees of control over network topology. Note that the protocol-level communications are preferably broadcasts, while information conveyance communications are typically point-to-point. Prior analyses typically presume a single transceiver, with a single antenna, and thus use an omni-directional antenna, with in-band protocol data, for all communications. The tradeoff made in limiting system designs according to these presumptions should be clear.

Routing protocols in ad hoc networks typically employ three strategies: flooding, proactive routing, and reactive routing. Flooding protocols broadcast packets to all the nodes in the network, while the remaining protocols do not. In proactive routing, the protocol maintains route information all the time, while in reactive routing, a route is discovered only when needed. All or some of these strategies may be employed simultaneously. Flooding typically consumes too much bandwidth and energy to be efficient, as compared to more sophisticated strategies. However, in cases with very high mobility, the flooding protocols best ensure that the transmission reaches its destination.

In proactive routing, each node stores and updates routing information constantly. The routing tables can be updated based on perceived changes in the network topology. Therefore, a new transmission can start immediately without a route discovery delay. However, the constant exchange of routing information adds overhead to the protocol. OLSR and TBRPF protocols use proactive routing. The overhead traffic of a proactive routing protocol increases as the mobility of the nodes increases, since the routing information needs to be updated in shorter intervals.

In reactive routing, when a node wishes to transmit, it starts a route discovery process in order to find a path to the receiver. The routes remain valid until the route is no longer needed. AODV and DSR protocols use reactive routing. In the AODV protocol, to find a route to a receiver, a terminal broadcasts a route request message containing the address of the receiver and the lifespan of the message. Terminals receiving the message add their address to the packet and forward it if the lifespan is not exhausted. If a receiver or a terminal knowing the route to the receiver receives the route request message, it sends a route reply back to the requester. If the sender does not receive a route reply before a timeout occurs, it sends another route request with a longer lifespan. The use of sequential route requests with incremental increases in timeout allows a mapping of the network by hop count.

In order for an ad hoc network to be effective, the nodes need to cooperate. This cooperation comes at a cost. In power constrained systems, for example, the cost is battery consumption. In other scenarios, the network utilization is itself a burden. The various nodes must cooperate in both arbitration and control, e.g., route discovery and optimization, and the information forwarding itself. In fact, participation in the route discovery, without notice that the node will fail to forward information packets, has been shown in studies to be more detrimental to the network than simply abstaining entirely.

It is the general self-interest of a node to conserve its own resources, maintain an opportunity to access resources, while consuming whatever resource of other nodes as it desires. Clearly, this represents the "tragedy of the commons", in which selfish individuals fail to respect the very basis for the community they enjoy, and a network of rational nodes operating without significant incentives to cooperate would likely fail. On the other hand, if donating a node's resources generated an associated benefit to that node, while consuming network resources imposed a cost, stability and reliability can be achieved. So long as the functionality is sufficient to meet the need, and the economic surplus is "fairly" allocated, that is, the cost incurred is less than the private value of the benefit, and that cost is transferred as compensation to those burdened in an amount in excess of their incremental cost, adoption of the system should increase stability. In fact, even outside of these bounds, the system may be more stable than one which does not tax system use nor reward altruistic behavior. While the system is a zero sum system, and over time, the economic effects will average out, in any particular instance, the incentive for selfish behavior by a node will be diminished.

The concepts of node misbehavior and maliciousness, and competing networks consuming the same resources, are also addressed by aspects of game theory. For example, an ad hoc network may defer to or compete with an interfering network, and the decision of which strategy to adopt is within the province of game theory. The particularities of agent misbehavior or hacking are also encompassed by Game Theory, and real implementations must necessarily consider these issues. Sometimes, the solution to these issues is technological, but in others, the reaction of other nodes to discovery of misbehavior may be sufficient to discourage it. The intent is to formulate a system which is sufficiently robust and advantageous as to disincentivize non-compliance and non-cooperation, that is, the inherent advantages of compliance with the system architecture exceed the anticipated benefits of the alternative.

One way to remedy selfish behavior is to increase the cost of acting this way, that is, to impose a cost or tax for access to the network. In a practical implementation, however, this is problematic, since under lightly loaded conditions, the "value" of the communications may not justify a fixed cost which might be reasonable under other conditions, and likewise, under heavier loads, critical communications may still be delayed or impeded. Note that where the network includes more nodes, the throughput may increase, since there are more potential routes and overall reliability may be increased, but the increased number of nodes will likely also increase network demand. A variable cost, dependent on relative "importance", may be provided, and indeed, as alluded to above, this cost may be market based, in the manner of an auction. In a multihop network, such an auction is complicated by the requirement for a distribution of payments between the chain of nodes, with each node having potential alternate demands for its cooperation. The VCG auction mechanism excludes nodes which ask too high a price, and the auction itself may comprise a value function encompassing reliability, latency, quality of service, or other non-economic parameters, in economic terms.

The network may further require compensation to nodes which must defer communications because of inconsistent states, such as in order to avoid interference or duplicative use of an intermediary node, and which take no direct part in the communication. It is noted that the concept of the winner of an auction paying the losers is at first difficult to contemplate, but on further analysis quite logical. This upsets the normal analysis, since the possibility of a payment from the winner to the loser alters the allocation of economic surplus between the bidder, seller, and others. Likewise, while the cost to the involved nodes may be real, the cost to the uninvolved nodes may be subjective. Clearly, it would appear that involved nodes should generally be better compensated than uninvolved nodes, although a formal analysis remains to be performed.

In a more general sense, the underlying presumption is that the network provides competitive access to the physical transport medium, and that cooperation with the protocol provides significant advantages over competition with it. Clearly, the issues of commercial success and market dominance are much more complex and not capable of being accurately modeled according to known paradigms; on the other hand, a system providing rational benefits will be more likely to succeed than one with irrational benefits or ill defined explicable benefits. Under normal circumstances, a well developed ad hoc network system can present as a formidable coordinated competitor for access to contested bandwidth by other systems, while within the network, high valued communications may receive priority. Thus, a node presented with a communications requirement is presented not with the simple choice of participate or abstain, but rather whether to participate in an ad hoc network with predicted stability and mutual benefit, or one with the possibility of failure due to selfish behavior, and non-cooperation. Even in the absence of a present communication requirement, a network which rewards cooperative behavior may be preferable to one which simply expects altruism.

After the network architecture is defined, compensation is paid to those nodes providing value or subjected to a burden (including foregoing communication opportunity) by those gaining a benefit. The payment may be a virtual currency, with no specific true value, although the virtual currency system provides a convenient method to tax, subsidize, or control the system, and thus apply a normalized extrinsic value.

Game theory also encompasses the concept of that each node may have an associated "reputation" in the community. This reputation may be evaluated as a parameter in an economic analysis, or applied separately. This reputation may be anecdotal or statistical. In either case, if access to resources and payments are made dependent on reputation, nodes will be incentivized to maintain a good reputation, and avoid generating a bad reputation. Therefore, by maintaining and applying the reputation in a manner consistent with the community goals, the nodes are compelled to advance those goals in order to benefit from the community. Game theory distinguishes between good reputation and bad reputation. Nodes may have a selfish motivation to assert that another node has a bad reputation, while it would have little selfish motivation, absent collusion, for undeservedly asserting a good reputation. On the other hand, a node may have a selfish motivation in failing to reward behavior with a good reputation.

The virtual currency and reputation may be considered orthogonal, since the status of a node's currency account provides no information about the status of its reputation.

Published Ad Hoc Network Examples

By no way a comprehensive list of published applications of game theory to the control of ad hoc networks, below are discussed a number of prominent examples.

The Terminodes project includes many of the features described above. This project proposes a method to encourage cooperation in ad hoc networks that is based on a virtual currency called nuglets. Each node contains a tamper-proof hardware module which handles the nuglets. When a node forwards a packet it extracts nuglets from the payload. In order to make a transmission, the sender appends nuglets needed to forward the packet through the network to its destination. However, a central node probably likely accumulates excess nuglets, hence it has less value for additional nuglets, leading to lower incentive for network activity. Peripheral nodes may possess insufficient nuglets to support their needs. However, the system appears to achieve a balance over time, assuming random node movement. The Terminodes project is notable for the depth and completeness of its analysis, as well as the progress made toward implementation.

Crowcroft et al. present a traffic-sensitive pricing model. Compensation for packet forwarding is responsive to both required energy consumption and local congestion at a node. This mechanism both enforces cooperation and balances traffic loads to avoid congestion. Stabilization of price and node wealth occurs in static networks.

The Confidant protocol detects node misbehavior and routes traffic around the misbehaving nodes, to isolate them from the network. Misbehavior of neighboring nodes is broadcast to the network by observing nodes. A trust record is used to evaluate the validity of a report, thus disincentivizing misbehavior in the reporting process. The reputation information is applied by a path manager define a route and rejects access requested by misbehaving nodes.

The Core protocol is similar to Confidant; each node maintains reputation information, which is updated based on both observation and third party report. A threshold function is applied to limit access by nodes based on their reputation, resulting in isolation.

Michiardi et al. analyze whether it is optimal to join or defect from an ad hoc network, based on node utility function, payoff share, cost of cooperation, number of cooperating nodes, etc.

Srinivasan et al. apply game theory to model an ad hoc network at a connection level, providing a complicated extended game model. Before a user can transmit, all the nodes along the defined route must accept the relay request. Energy consumption of terminals is restricted by an expected lifetime of batteries, that is, the nodes are modeled as being power constrained. A normalized acceptance rate, a proportion of successful and attempted relays through a node, as observed by neighboring nodes, is sought to be maximized.

Urpi et al. model an ad hoc network at packet level. The model is based on an estimate of neighboring nodes, the remaining energy of node, and various packet traffic metrics. The payoff of the model is simply the access to packet forwarding, weighted by energy cost, provided to a node.

Noncooperative game theory offers a basis for analyzing Internet traffic, wherein each user tries to independently maximize its quality of service. The network operator focuses on maximizing network performance as a whole. Thus, in this case, different players adopt different roles, with different value functions. Game theory may thus by applied to optimize routing, flow control, queuing disciplines and traffic pricing. While ad hoc network routing is similar to the Internet, there are also significant differences. In an ad hoc network, routes may be inconsistent.

Nagle studied the concept of fairness in queuing in packet switches. In a first in-first out queue, a selfish node may saturate the queue with requests. Nagle proposes, as a solution, distinct queues for each source with a round-robin scheduler, providing a fair queuing scheme, which encourages keeping the user's queue as short as possible.

Game theory has also been applied on flow control. Each user tries to maximize its utility, defined by the ratio of average throughput and average delay. It has been shown that a unique Nash equilibrium exists in such a system, which converges to an equilibrium point. The nodes seek to both maximize their own quality of service, but also the fairness of resource allocation, resulting in a Pareto efficient solution.

ALOHA is a wireless CSMA protocol using time division multiplexing. Transmission probabilities are a design specification of the system, but if a player uses a higher probability, his throughput will likely increase, leading to a misbehavior incentive. The selfish system appears to perform no better than a centrally controlled (non-CSMA) system, and performance typically drops by half. A pricing mechanism may be incorporated, thus taxing users for their bandwidth demands.

An extensive analysis of the subject of the application of game theory to the control of ad hoc networks, including both an extensive review of the literature, and new analysis, is provided in the master's Thesis of Juha Leino, entitled "Applications of Game Theory in Ad Hoc Network", Helsinki University Of Technology (2003). Leino modeled the interaction between one node and the rest of the network as an extensive game. The networks were presumed to be energy constrained, and the nodes to be selfish, with the result stated as the amount of contribution the network can request from a node. Leino modeled nodes with power constrained, power adaptive, omnidirectional transceivers, each of which have a uniform communication demand on the network.

When a node connects to an ad hoc network, it gains both benefits and obligations. The other nodes forward its traffic, hence it can save energy and reach nodes outside its own transmission range, as compared to a single hop transmission. Correspondingly, the node should participate in the network functions like the route discovery and traffic forwarding that consume the resources of the node, in addition to the basic communications themselves. In order to find participation in the network advantageous, the node has gain greater benefits greater than the obligations imposed. This, of course, may be modeled as a game. The node seeks to minimize energy consumption, and the network seeks to ensure its functionality. The decision of the node is to cooperate or to defect.

In one of Leino's models, he requires that reward of forwarding needs to be proportional to the energy consumed when the packet is forwarded. He analyzes the situation of both a honest node and a cheating node, i.e., one that uses the network's resources without full participation in the network overhead. He concluded that if a node has an opportunity to cheat, it adversely affects the network far more than mere defection. Leino also analyzed whether, under his presumptions, a group of honest nodes will voluntarily aggregate as an ad hoc network, or would prefer to remain as a set of independent uncooperative actors, without benefit of multihop transmissions. He concludes that under his presumptions, in some networks, there are nodes which have detrimental involvement in the ad hoc network, and if all such "loser" nodes refuse to participate, the network may collapse. The proportion of losers drops with minimum energy routing, since the average cost is lowered, making gains from participation more likely. There are also networks with no losers, and these provide gains to all participants. Loser nodes tend to be in the center of the network, rather than the periphery.

Real Time Telematics Information Communication

Mobile, self organizing, ad hoc communications networks have been proposed for telematics systems, for cellular network extension, long range (multihop) traffic information communication, and short range collision avoidance systems.

Telematics is a recently applied term that now encompasses radio transmitters or receivers in vehicles. Three basic schemes exist: wide area broadcast communication, where all relevant nodes are presumed to be within the same communication zone (e.g., satellite radio, RDDS receivers, etc.); cellular communications, where an array of fixed-position low power transceivers contiguously blanket a territory, providing various zones which allow multiplexing within a band; and mesh network communications, which allow ad hoc formation of a communications infrastructure, optionally linking to various fixed infrastructure.

Telematics systems may be used for many purposes, for example, real time traffic information (RTTI), which in an extreme case may involve communication of live video streams. In a more modest system, various sensors may provide road and traffic data, as well as weather and incident information. In other words, the appetite of such a system for bandwidth is potentially limitless, unless constraints are imposed. On the other hand, RTTI is typically not power constrained, since it is vehicle based rather than hand-held, and therefore the cost of using the system will focus more on competition for bandwidth (the limited physical transport layer (PHY) resource) than power consumed in communications. Likewise, communications latency is not critical, unless full duplex voice communications are supported. It is noted that parked vehicles may also be involved in network communications, and the frequency band may be shared with portable communicators with self-contained power sources, making the economic cost of communications and power consumption a potential factor for some nodes, leading to split strategies.

Likewise, especially for voice communications, interfacing with the fixed infrastructure through cellular telephone towers or 802.11 hotspots may impose additional economic constraints on the system. Telematics systems typically include a GPS geolocation system, which may be of great use in mapping nodes for routing navigation functions. Indeed, the telematics system may be integrated within a navigation system and/or entertainment system. This is relevant to the extent that one considers the incremental cost of the hardware and its market placement.

The system is designed to operate over a wide range of node densities, from city rush hour traffic to rural highways. Due to a perceived incompatibility of a RTTI system with cellular infrastructure business models, as well as inconsistent availability of cellular coverage of roadways, the architecture is designed as a decentralized control, with incidental involvement of the cellular networks, except for voice communications outside of the mobile ad hoc network. This decentralized control introduces a substantial level of complexity, since it must account for rapidly changing network architecture, various types of channel impairments, hidden nodes, and temporal and spatial distance issues, and interference.

In defining the system, both the available hardware, costs and purposes for use must be considered. Desirable characteristics of a telematics system include real time telematics information communication, multihop voice communication forwarding, decentralized control, and to the extent possible, user privacy. The hardware may include multichannel directional smart antennas, out-of-band signaling and control, complex and sophisticated computational resources, to provide efficient utilization of an unlicensed or shared band.

That is, it is clear that a system that provides an omnidirectional antenna system with in band signaling and control, is inefficient as compared to a system which directs its transmitted energy only in the direction of the intended target, and does not intrude on a high capacity physical transport medium with relatively low information content signaling packets.

In a real time telematics ad hoc network with potentially unlimited data communication requirements, network congestion is almost guaranteed, in a continuous network of mobile nodes. RF interference issues will likely prevent network capacity from scaling with node density. Therefore, an alternate to CSMA was sought that provided more graceful degradation under high load, sensitivity to the importance of information to be communicated, and efficient utilization of the communications medium.

In order to optimize the network, additional information is employed, although this imposes a burden of increased protocol overhead, complexity, and potential loss privacy. One way to remedy selfish behavior is to increase the cost of acting this way, that is, to impose a cost for access to the network. In a practical implementation, however, this is problematic, since under lightly loaded conditions, the "value" of the communications may not justify a fixed cost which might be reasonable under other conditions, and likewise, under heavier loads, critical communications may still be delayed or impeded. Therefore, a variable cost, dependent on relative "importance", may be imposed. In determining this relative importance, a market evaluation, requires a comparison, termed an auction, is employed. In a multihop network, such an auction is complicated by the requirement for distributing payments among the chain of nodes along the route, with each node having potential alternate demands for its cooperation and resources. According to a more sophisticated analysis, one must also compensate nodes not directly involved in the communication for their deference.

In a scenario involving a request for information, the auction is complicated by the fact that the information resource content is unknown to the recipient, and therefore the bid is blind, that is, the value of the information to the recipient is indeterminate. However, game theory supports the communication of a value function or utility function, which can then be evaluated at each node possessing information to be communicated, to normalize its value. Fortunately, it is a dominant strategy in a VCG auction to communicate a truthful value. In this case, a value function may instead be communicated, which can then be evaluated at each node possessing information to be communicated. In a mere request for information conveyance, such as the transport nodes in a multihop network, or in a cellular network infrastructure extension model, the bid may be a true (resolved) value, since the information content is not the subject of the bidding; rather it is the value of the communications per se, and the bidding node can reasonably value its bid.

In a cellular network infrastructure extension model, the bid may represent a resolved value, since the information content is not the subject of the bidding; rather it is the value of the communications per se. In the case of voice, however, the communications are bidirectional and enduring, thus raising quality of service and handoff issues.

Game theory is most readily applied in the optimization of communications routes through a defined network, to achieve the best economic surplus allocation. That is, the problem of determining the network topology, and the communications themselves, are ancillary, though real, applications of game theory. Since the communications incidental to the arbitration require consideration of some of the same issues as the underlying communications, corresponding elements of game theory may apply at both levels of analysis. Due to various uncertainties, the operation of the system is stochastic. This presumption, in turn, allows estimation of optimality within a margin of error, simplifying implementation as compared to a rigorous analysis without regard to statistical significance.

The VCG auction is postulated as being optimal for allocation of multiple resources between agents. It is "strategyproof" and efficient, meaning that it is a dominant strategy for agents to report their true valuation for a resource, and the result of the optimization is a network which maximizes the value of the system to the agents.

Game theory also allows an allocation of cost between various recipients of a broadcast or multicast. That is, in many instances, telematic information is of value to a plurality of nodes, and a large set of recipient nodes may efficiently receive the same information. This allocation is a direct extension of VCG theory.

The preferred method for acquiring an estimate of the state of the network is through use of a proactive routing protocol. Thus, in order to determine the network architecture state, each node must broadcast its existence, and, for example, a payload of information including its identity, location, itinerary (navigation vector) and "information value function". Typically, the system operates in a continuous state, so that it is reasonable to commence the process with an estimate of the state based on prior information. Using an in-band or out-of-band propagation mechanism, this information must propagate to a network edge, which may be physically or artificially defined. If all nodes operate with a substantially common estimation of network topology, only deviations from previously propagated information need be propagated.

CSMA is proposed for the protocol-related communications because it is relatively simple and robust, and well suited for ad hoc communications in lightly loaded networks. An initial node transmits using an adaptive power protocol, to achieve an effective transmit range of somewhat less than about two times the estimated average inter-nodal distance. This distance therefore promotes propagation to a set of neighboring nodes, without unnecessarily interfering with communications of non-neighboring nodes and therefore allowing this task to be performed in parallel. Neighboring nodes also transmit in succession, providing sequential and complete protocol information propagation over a relevance range.

If we presume that there is a spatial limit to relevance, for example, 5 miles or 10 hops, then the network state propagation may be so limited. Extending the network to encompass a large number of nodes will necessarily reduce the tractability of the optimization. Each node has a local estimate of relevance. This consideration is accommodated, along with a desire to prevent exponential growth in protocol-related data traffic, by receiving an update from all nodes within a node's network relevance boundary, and a state variable which represents an estimate of relevant status beyond the arbitrarily defined boundary. The propagation of network state may thus conveniently occur over a finite number of hops, for example 5-10.

Under conditions of relatively high nodal densities, the system may employ a zone strategy, that is, proximate groups of nodes are is treated as an entity for purposes of external state estimation, especially with respect to distant nodes or zones. Such a presumption is realistic, since at extended distances, geographically proximate nodes may be modeled as being similar or inter-related, while at close distances, and particularly within a zone in which all nodes are in direct communication, internode communications may be subject to mutual interference, and can occur without substantial external influence. Alternately, it is clear that to limit latencies and communication risks, it may be prudent to bypass neighboring nodes, thus trading latency for power consumption and overall network capacity. Therefore, a hierarchal scheme may be implemented to geographically organize the network at higher analytical levels, and geographic cells may cooperate to appear externally as a single entity.

A supernode within a zone may be selected for its superior capability, or perhaps a central location. The zone is defined by a communication range of the basic data interface for communications, with the control channel having a longer range, for example at least double the normal data communications range. Communications control channel transmitters operate on a number of channels, for example at least 7, allowing neighboring zones in a hexagonal tiled array to communicate simultaneously without interference. In a geographic zone system, alternate zones which would otherwise be interfering may use an adaptive multiplexing scheme to avoid interference. All nodes may listen on all control channels, permitting rapid propagation of control information.

In order to effective provide decentralized control, either each node must have a common set of information to allow execution of an identical control algorithm, or nodes defer to the control signals of other nodes without internal analysis for optimality. A model of semi-decentralized control is also known, in which dispersed "supernodes", are nominated as master, with other topologically nearby nodes remaining as slave nodes. In the pure peer network, complete information conveyance to each node is required, imposing a relatively high overhead. In a master-slave (or supernode) architecture, increased reliance on a single node trades-off reliability and robustness (and other advantages of pure peer-to-peer networks) for efficiency. A supernode within a cellular zone may be selected for its superior capability, or perhaps is at a central location or is immobile.

Once each control node (node or supernode) has an estimate of network topology, the next step is to optimize network channels. According to VCG theory, each agent has an incentive to broadcast its truthful value or value function for the scarce resource, which in this case, is control over communications physical layer, and or access to information. This communication can be consolidated with the network discovery transmission. Each control node then performs a combinatorial solution for the set of simultaneous equations according to VCG theory (or extensions thereof). This solution should be consistent between all nodes, and the effects of inconsistent solutions may be resolved by collision sensing, and possibly an error/inconsistency detection and correction algorithm specifically applied to this type of information.

As part of the network mapping, communications impairment and interference sources are also mapped. GPS assistance may be particularly useful in this aspect. Where interference is caused by interfering communications, the issue is a determination of a strategy of deference or competition. If the interfering communication is continuous or unresponsive, then the only available strategy is competition. On the other hand, when the competing system uses, for example, a CSMA system, such as 802.11, competition with such a communication simply leads to retransmission, and therefore ultimately increased network load, and deference strategy may be more optimal (dominant), at least and until it is determined that the competing communication is incessant. Other communications protocols, however may have a more or less aggressive strategy. By observation of a system over time, its strategies may be revealed, and game theory permits composition of an optimal strategy.

The optimization process produces a representation of an optimal network architecture during the succeeding period. That is, value functions representing bids are broadcast, with the system then being permitted to determine an optimal real valuation and distribution of that value. Thus, prior to completion of the optimization, potentially inconsistent allocations must be prevented, and each node must communicate its evaluation of other node's value functions, so that the optimization is performed on a normalized economic basis. This step may substantially increase the system overhead, and is generally required for completion of the auction. This valuation may be inferred, however, for transit nodes in a multihop network path, since there is little subjectivity for nodes solely in this role, and the respective value functions may be persistent. For example, the valuation applied by a node to forward information is generally content and involved party independent.

A particular complication of a traffic information system is that the nature of the information held by any node is private to that node (before transmission), and therefore the valuation is not known until after all bids are evaluated. Thus, prior to completion of optimization, each node must communicate its evaluation of other nodes' value functions, so that the optimization is performed on an economic basis. This required step substantially increases the system overhead. This valuation may be inferred, however, for transit nodes in a multihop network path.

After the network usage is defined, compensation is paid to those nodes providing value or subjected to a burden (including foregoing communication opportunity) by those gaining a benefit. The payment is generally of a virtual currency, with no specific true value, although the virtual currency system provides a convenient method to tax the system.

Exerting external economic influences on the system may have various effects on the optimization, and may exacerbate differences in subjective valuations. The application of a monetary value to the virtual currency substantially also increases the possibility of misbehavior and external attacks. On the other hand, a virtual currency with no assessed real value is self-normalizing, while monetization leads to external and generally irrelevant influences as well as possible arbitrage. External economic influences may also lead to benefits, which are discussed in various papers on non-zero sum games.

In order to provide fairness, the virtual currency (similar to the so-called "nuglets" or "nuggets" proposed for use in the Terminodes project) is self-generated at each node according to a schedule, and itself may have a time dependent value. For example, the virtual currency may have a half-life or temporally declining value. On the other hand, the value may peak at a time after generation, which would encourage deference and short term savings, rather than immediate spending, and would allow a recipient node to benefit from virtual currency transferred before its peak value. This also means that long term hoarding of the currency is of little value, since it will eventually decay in value, while the system presupposes a nominal rate of spending, which is normalized among nodes. The variation function may also be adaptive, but this poses a synchronization issue for the network. An external estimate of node wealth may be used to infer counterfeiting, theft and failure to pay debts, and to further effect remediation.

The currency is generated and verified in accordance with micropayment theory. Micropayment theory generally encompasses the transfer of secure tokens (e.g., cryptographically endorsed information) having presumed value, which are intended for verification, if at all, in a non-real time transaction, after the transfer to the recipient. The currency is circulated (until expiration) as a token, and therefore is not subject to immediate authentication by source. Since these tokens may be communicated through an insecure network, the issue of forcing allocation of payment to particular nodes may be dealt with by cryptographic techniques, in particular public key cryptography, in which the currency is placed in a cryptographic "envelope" addressed to the intended recipient, e.g., is encrypted with the recipient's public key, which must be broadcast and used as, or in conjunction with, a node identifier. This makes the payment unavailable to other than the intended recipient. The issue of holding the encrypted token hostage and extorting a portion of the value to forward the packet can be dealt with by community pressure, that is, any node presenting this (or other undesirable) behavior might be ostracized. The likelihood of this type of misbehavior is also diminished by avoiding monetization of the virtual currency.

This currency generation and allocation mechanism generally encourages equal consumption by the various nodes over the long term. In order to discourage consumption of bandwidth, an external tax may be imposed on the system, that is, withdrawing value from the system base on usage. Clearly, the effects of such a tax must be carefully weighed, since this will also impose an impediment to adoption as compared to an untaxed system. On the other hand, a similar effect use-disincentive may be obtained by rewarding low consumption, for example by allocating an advertising subsidy between nodes, or in reward of deference. In a model telematics system, an audio and/or visual display provides a useful possibility for advertising and sponsorship; likewise, location based services may include commercial services.

Each node computes a value function, based on its own knowledge state, risk profile and risk tolerance, and wealth, describing the value to it of additional information, as well as its own value for participating in the communications of others. The value function typically includes a past travel history, future travel itinerary, present location, recent communication partners, and an estimator of information strength and weakness with respect to the future itinerary. It may be presumed that each node has a standard complement of sensors, and accurately acquired descriptive data for its past travel path. Otherwise, a description of the available information is required. One advantage of a value function is that it changes little over time, unless a need is satisfied or circumstances change, and therefore may be a persistent attribute.

Using the protocol communication system, each node transmits its value function (or change thereof), passes through communications from neighboring nodes, and may, for example transmit payment information for the immediate-past bid for incoming communications.

Messages are forwarded outward (avoiding redundant propagation back to the source), with messages appended from the series of nodes. Propagation continues for a finite number of hops, until the entire community has an estimate of the state and value function of each node in the community. Advantageously, the network beyond a respective community may be modeled in simplified form, to provide a better estimate of the network as a whole.

After propagation, each node evaluates the set of value functions for its community, with respect to its own information and ability to forward packets. Each node may then make an offer to supply or forward information, based on the provided information. In the case of multihop communications, the offers are propagated to the remainder of the community, for the maximum number of hops, including the originating node. At this point, each node has a representation of the state of its community, with community edge estimates providing consistency for nodes with differing community scopes, the valuation function each node assigns to control over portions of the network, as well as a resolved valuation of each node for supplying the need. Under these circumstances, each node may then evaluate an optimization for the network architecture, and come to a conclusion consistent with that of other members of its community. If supported, node reputation may be updated based on past performance, and the reputation applied as a factor in the optimization and/or externally to the optimization. As discussed above, a VCG-type auction is employed as a basis for optimization. Since each node receives bid information from all other nodes within the maximum node count, the VCG auction produces an optimized result.

Transmissions are made in frames, with a single bidding process controlling multiple frames, for example a multiple of the maximum number of hops. Therefore, the bid encompasses a frame's-worth of control over the modalities. In the event that the simultaneous use of, or control over, a modality by various nodes is not inconsistent, then the value of the respective nodes may be summed, with the resulting allocation based on, for example, a ratio of the respective value functions. As a part of the optimization, nodes are rewarded not only for supporting the communication, but also for deferring their own respective needs. As a result, after controlling the resources, a node will be relatively less wealthy and less able to subsequently control the resources, while other nodes will be more able to control the resources. The distribution to deferred nodes also serves to prevent pure reciprocal communications, since the proposed mechanism distributes and dilutes the wealth to deferring nodes.

Because each node in the model presented above has complete information, for a range up to the maximum node count, the wealth of each node can be estimated by its neighbors, and payment inferred even if not actually consummated. (Failure of payment can occur for a number of reasons, including both malicious and accidental). Because each hop adds significant cost, the fact that nodes beyond the maximum hop distance are essentially incommunicado is typically of little consequence; since it is very unlikely that a node more than 5 or 10 hops away will be efficiently included in any communication, due to the increasing cost with distance, as well as reduction in reliability and increase in latency. Thus, large area and scalable networks may exist.

Typically, cryptography is employed for both authentication and to preserve privacy. External regulation, in a legal sense at least, is typically imposed by restrictions on hardware and software design, as well as voluntary compliance at risk of detection and legal sanction.

Conclusion

The use of game theory as a basis for analyzing ad hoc networks provides a basis for understanding the behavior of complex networks of independent nodes. By presuming a degree of choice and decision-making by nodes, we obtain an analysis that is robust with respect to such considerations.

The principal issues impeding deployment are the inherent complexity of the system, as well as the overhead required to continuously optimize the system. Further work will allow a determination of a set of simplifying presumptions to reduce protocol overhead and reduce complexity.

The ad hoc network does not exist in a vacuum. There are various competing interests seeking to use the same bandwidth, and technological superiority alone does not assure dominance and commercial success. Game theory may also be used as a tool to analyze the entities which seek to deploy ad hoc networks, especially where they compete.

The present invention therefore provides an automated negotiation for control of a set of resources by competing bidders and offerors, comprising receiving, from each of a plurality of bidders, a utility function representing a value to the bidder to obtain of a set of resources, receiving, from each of a plurality of offerors, a utility function representing a value to the offeror to relinquish a set of resources, computing a set of successful bids from the plurality of bidders and plurality of offers, a successful bid comprising a matching of a maximum aggregate value of the sets of resources to the bidders and a minimum aggregate value of the sets of resources to the offerors, wherein the maximum aggregate value of bids equals or exceeds the minimum aggregate value of offers; and receiving for each set of resources from a bidder placing a respective successful bid a Vickrey price, and paying to for each set of resources to an offeror of a respective successful bid each its offer price, with any surplus being allocated to bidders based on a value bid. The bidder utility function may be evaluated based on private information of an offeror, and communicated as a normalized value.

It is noted that in an auction for a synthetic economic value generated by a generation function, the payment may be by currency or the ability to generate currency. That is, an agent may transfer to another agent the micropayment or the ability to generate a micropayment, both within the auction or outside of it. Normally, the valuation of the ability to generate synthetic currency would be discounted from the future value by a subjective discount rate dependent on the recipient. In other cases, it may be expedient to apply an objective discount rate which is calculable without requiring substantial communications (or even any communications) with each agent. Thus, each agent can anticipate its future communication needs and target sufficient resources at the appropriate time to meet that need, while leaving for other agents the communication resources when these are not needed.

Eighth Embodiment

According to a further aspect of the invention, it is desired to understand the subjective risk aversion profile of a person. Risk-aversion is a significant deviation from rationality which can be quantified and understood, and further a calculus is available for applying the risk aversion to normalize systems in which rationality is presumed. Accordingly, the method comprises presenting a game for play by a person, wherein the payoff of the game is real and beneficial to the person. That is, the incentive and risk must be real, with some limits on the ability to extrapolate beyond the scope of risk presented. The person is then sufficiently observed during the game play to comprehend a risk aversion profile of the user. Typically, the game is automated, but this is not required, and, in fact, a competition between two or more players is possible. This scenario is generally quite beneficial where the stakes of the game are identical or similar to the risk aversion personality attribute sought to be defined. The comprehended risk aversion profile may then be used to modify a rationality expectation for the person. The modified rationality expectation may then be applied to optimize an interaction with the person outside of the game play environment.

This process is particularly useful for creating a user-agent to act on behalf of the user, in a manner commensurate with a subjective profile of the user, or to subjectivize a presentation of risk data to a user. For example, in the probability based user interface discussed above, the event-probability map may be analyzed based on the subjective risk tolerance of the user, and the output optimized accordingly. This method may also be applied for optimally pairing a user with another person or process, based on compatibility.

There has thus been shown and described novel communications devices and systems and methods which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

APPENDICES

The following resources, each of which is expressly incorporated herein by reference, provides a basis for understanding aspects of the invention and has implications for the design, control, and analysis of systems and networks, and the method of operation thereof.

Other Patents by Inventor Hereof

The following patents are expressly incorporated herein by reference: U.S. Pat. Nos. 6,865,825, 6,850,252, 6,791,472, 6,640,145, 6,429,812, 6,418,424, 6,400,996, 6,252,544, 6,230,501, 6,081,750, 5,920,477, 5,903,454, 5,901,246, 5,875,108, 5,867,386, and 5,774,357.

Telematics References

On the Propagation of Long-Range Dependence in the Internet—Veres, Kenesi, Molnár. (2000) galahad.elte.hu/~vattay/cikkeim/vmkv.pdf Anthill: A Framework for the Development of Agent-Based.—Babaoglu, Meling. (2002) www.cs.unibo.it/babaoglu/papers/icdcs02.pdf Automatic Web Page Categorization by Link and Context.—Attardi, Gulli. (1999) aure.iei.pi.cnr.it/~fabrizio/Publications/THAI99/THAI99.ps Distributed Interactive Media—Mauve (2000) www.informatik.uni-mannheim.de/informatik/pi4/publications/library/Mauve2000d.ps.gz Weak Bisimulation for Fully Probabilistic Processes—Baier, Hermanns (1999) web.informatik.uni-bonn.de/I/papers/acta_inf.ps Structured Multimedia Authoring—Hardman, van Rossum, Bulterman (1993) www.cwi.nl/ftp/CWIreports/CST/CS—R9304.ps.Z Solving the modeling problems of object-oriented languages.—Aksit, Tekinerdogan (1998) trese.cs.utwente.nl/aop-ecoop98/papers/Aksit.pdf Group Communication in Differentiated Services Networks—Bless, Wehrle (2001) www.tm.uka.de/~bless/IQ2001-ds_multicast.pdf Ad Hoc Relay Wireless Networks over Moving Vehicles on Highways—Chen, Kung, Vlah (2001) www.eecs.harvard.edu/~htk/publication/2001-mobihoc-ckv.pdf A Framework for Generating Network-Based Moving Objects—Brinkhoff (2002) www.fh-wilhelmshaven.de/oow/institute/iapg/personen/brinkhoff/paper/GeoInformatica2002.pdf The Amsterdam Hypermedia Model: extending hypertext.—Hardman, Bulterman. (1993) www.cwi.nl/ftp/CWIreports/CST/CS-R9306.ps.Z On functional equivalence of certain fuzzy controllers and.—Koczy, Tikk, Gedeon (2000) www.mft.hu/publications/tikk/tikk3.pdf Specification of a Service Management Architecture.—Mayerl, Nochta. (2000) www.cooperation-management.de/publikationen/paper/usm2000-mayerl-nochta.pdf Agent-mediated Electronic Commerce: Scientific and Technological.—Sierra (2001) www.iiia.csic.es/~sierra/articles/2001/RoadmapAMEC/Roadmap.ps On the Integration of IR and Databases—de Vries, Wilschut (1999) www.cs.utwente.nl/~arjen/Pics/ds8_short.ps.gz Towards a Harmonization of UML-Sequence Diagrams and MSC—Rudolph, Grabowski, Graubmann (1999) www.itm.mu-luebeck.de/publications/SDL99-Harmonization.ps.gz Logarithmic Time Cost Optimal Parallel Sorting is Not Yet Fast in.—Natvig (1996) www.idi.ntnu.no/~lasse/publics/SC90.ps CMIFed: A Presentation Environment for Portable.—van Rossum. (1993) www.cwi.nl/ftp/CWIreports/CST/CS-R9305.ps.Z Requirements of Traffic Telematics to Spatial Databases—Brinkhoff (1999) www.fh-oldenburg.de/iapg/personen/brinkhof/SSD99.pdf A Task-Specific Ontology for the Application and.—Shahar, Miksch, Johnson www-smi.stanford.edu/pubs/SMI_Reports/SMI-96-0649.pdf Practical Considerations in Building a Multi-Lingual.—Business Letters John acl.ldc.upenn.edu/W/W97/W97-0906.pdf BPP: A Protocol for Exchanging Pricing Information.—Oberle, Ritter, Wehrle www.tm.uka.de/~wehrle/pubs/2001_07_HPSR01_BPP.pdf An Open Architecture for Evaluating Arbitrary Quality of Service.—Wehrle (2001) www.tm.uka.de/~wehrle/pubs/2001_06_ICN01_KIDS.pdf Improving the performance of TCP on guaranteed bandwidth.—Ritter, Wehrle, Wolf www.tm.uka.de/~wehrle/pubs/2001_02_KIVS01_GR_TCP.pdf Efficient Image Compression of Medical Images Using the Wavelet—Transform And Fuzzy rtsimage.di.uoa.gr/publications/euro00-1.pdf Advanced Mechanisms for Available Rate Usage in ATM.—Bless, Holzhausen. www.tm.uka.de/~wehrle/pubs/2001_04_ICATM01_AvRateUsage.pdf An Extensible Agent Architecture for a Competitive.—Hoen, Bohte. www.cwi.nl/~hoen/publications/SEN-R0217.ps Elements of an Open Framework for Pricing in the Future.—Gerke, Ritter. www.tm.uka.de/~wehrle/pubs/2000_09_Qofis00_Pricing.pdf Traffic Priorization and Differentiation with Active Queue.—Walter, Wehrle (2002) www.tm.uka.de/~wehrle/pubs/2002_09_ICTSM02_AF_AR.pdf A Simulation Suite for Internet Nodes with the Ability to.—Wehrle, Reber, Kahmann www.tm.uka.de/~wehrle/pubs/2001_01_CNDS01_Sim.pdf Image Compression Using the Wavelet Transform—On Textural Regions of Interest rtsimage.di.uoa.gr/publications/euro98.pdf Towards Better Support of Transaction Oriented.—Bless, Holzhausen. www.tm.uka.de/~bless/QofIS2001-qf-online.pdf User feedback on the use of public key certificates—Klobucar (2001) www.e5.ijs.si/staff/tomaz/erk2001.pdf Using Realistic Internet Topology Data for Large Scale Network.—Bless www.tm.uka.de/~bless/omnet ws_2002-1.pdf The Trust Factor in the Virtual Enterprise.—Mobile Broadband Service paula.oulu.fi/Publications/Submited/ICE2000f.pdf User and Session Mobility in a Plug-and-Play Network.—Mazen Malek Shiaa www.item.ntnu.no/~plugandplay/publications/eunice2002.pdf Dynamic Aggregation of Reservations for Internet Services—Bless www.tm.uka.de/~bless/ictsm10-daris.pdf
Advanced Service Creation Using—Distributed Object Technology www.ee.surrey.ac.uk/Personal/G.Pavlou/Publications/Journal-papers/Adam-02b.pdf
Semantics and Verification of UML Activity Diagrams for Workflow.—Eshuis (2002) wwwhome.cs.utwente.nl/~eshuis/thesis-hyperlinks.pdf
be cited as a National Research Council report.—The Four Way www7.nationalacademies.org/CSTB/wp_geo armstrong.pdf
Support Specification and Selection in TAPAS—Aagesen, Anutariya, Shiaa, Helvik www.item.ntnu.no/~plugandplay/publications/euniceCap2002.pdf
Profiling and Internet Connectivity in Automotive.—Cilia, Hasselmeyer. www.cs.ust.hk/vldb2002/VLDB2002-papers/S33P08.pdf
MIETTA—A Framework for Uniform and Multilingual Access to—Structured Database www.xtramind.com/~holger/paper/ira100.pdf
Definition And Utilisation Of OMG IDL TO TTCN-3 MAPPINGS—Ebner, Yin, Li www.itm.mu-luebeck.de/publications/idltottcn3mapping.pdf
Campiello—New user interface approaches for community.—Antonietta Grasso Michael (1998) wwwll.informatik.tu-muenchen.de/publications/pdf/Grasso1998a.pdf
SDL and MSC Based Test Generation for Distributed.—Grabowski, Koch. (1998) www.itm.mu-luebeck.de/publications/SDL99-DistributedTesting.ps.gz
Autolink—A Tool for Automatic Test Generation from.—Koch, Grabowski. (1998) www.itm.mu-luebeck.de/publications/A-98-05/Report-A-98-05.ps.gz
PATROCLOS: A Flexible and High-Performance Transport Subsystem—Braun (1994) www.iam.unibe.ch/~braun/lit/vanc_p.ps.gz
Multilingual Generation and Summarization of Job.—Somers, Black. (1997) sskkii.gu.se/Tree/Reports/anlp97/ANLP.paper.ps
Real-time TTCN for testing real-time and multimedia systems—Walter, Grabowski (1997) www.itm.mu-luebeck.de/publications/IWTCS98RT/IWTCS98-RT-TTCN.ps.gz
Applying SAMSTAG to the B-ISDN protocol SSCOP—Grabowski, Scheurer, Dai. (1997) www.itm.mu-luebeck.de/publications/IWTCS97SSCOP/IWTCS97-SSCOP.ps.gz
A Continuously Available and Highly Scalable.—Hvasshovd. (1991) www.idi.ntnu.no/IDT/grupper/DB-grp/tech_papers/hpts91.ps
A Modular VLSI Implementation Architecture for.—Braun, Schiller. (1994) www.iam.unibe.ch/~braun/lit/vanc_bsz.ps.gz
Transportation modelling methods and advanced transport telematics.—Toint (1993) thales.math.fundp.ac.be/pub/reports/TR92-24.ps
Impact of ATM ABR Control on the Performance of TCP-Tahoe and.—Feng, Ghosal networks.cs.ucdavis.edu/~ghosal/globecom/globecom_paper.ps
Detecting Opportunities for Parallel Observations on the.—Michael Lucks Space (1992) www.stsci.edu/public/sst/poms/poms.ps
Expression Of Interest—Network Of Excellence www.ctit.utwente.nl/internal/info-programmes/IST/EoI-NoE/eHealth.pdf
Optimisation of trapezoidal membership functions in a fuzzy rule—System By The www.univ-savoie.fr/labos/lamii/Busefal/Documents/85-05.pdf
A Framework For Video Modelling—Petkovic, Jonker (2000) www.cwi.nl/~acoi/DMW/documents/./world/innsb.ps
An Architecture For Reverse Charging In The Internet—Sprenkels, Parhonyi, Pras. (2000) wwwsnmp.cs.utwente.nl/nm/research/results/publications/sprenkels/sprenkelsram-reverse-charging.pdf
Behavior of a Bayesian Adaptation Method for.—Fredouille, Mariéthoz. (2000) ftp.idiap.ch/pub/marietho/publications/AdaptICASSP2000_IRR02.ps.gz
Software Process Modeling and Evolution in EPOS—Jaccheri, Larsen, Conradi (1992) www.idt.unit.no/~epos/Papers/capri-final.ps
Individual Management of Personal Reachability in.—Reichenbach. (1997) www.inf.tu-dresden.de/~hf2/publ/1997/RDFR_971FIPSec.pdf
A Generic Software Component Framework for Distributed.—Batteram, Idzenga (1997) www.trc.nl/events/ecscw97oogp/papers batteram.pdf
Efficient Partitioning of Sequences—Olstad, Manne (1995) www.ii.uib.no/~fredrikm/fredrik/papers/efficient.ps
Integrated Video Archive Tools—Hjelsvold, Langorgen, Midtstraum. (1995) www.idt.ntnu.no/IDT/grupper/DB-grp/tech_papers/ACM-MM95.ps
MULINEX: Multilingual Web Search and Navigation—Joanne Capstick Abdel (1998) speech.ftw.at/~gor/pub/twlt98/mulinex-twlt98.pdf
A Non-Interleaving Semantics for MSC—Heymer (1998) www.itm.mu-luebeck.de/publications/ANIS/ANIS.ps.gz
An Overview Of The Cave Project Research.—Bimbot, Hutter. (1998) www.ubilab.org/publications/print_versions/pdf/bim98.pdf
Cross Language Retrieval with the Twenty-One system—Wessel Kraaij (1998) trec.nist.gov/pubs/trec6/papers/twentyone.ps
Verifying Business Processes using SPIN—Janssen, Mateescu, Mauw. (1998) ftp.win.tue.nl/pub/techreports/sjouke/spin98.ps.Z
Implementation of a Parallel Transport Subsystem on a.—Braun, Schmidt (1993) www.telematik.informatik.uni-karlsruhe.de/~schmidt/schmidt_hpdc93.ps.gz
Uniform Versioning: The Change-Oriented Model—Munch, Larsen, Gulla. (1993) www.idt.unit.no/~bjornmu/cov-scm4.ps
Architectural Considerations for Personal Mobility In—The Wireless Internet www.item.ntnu.no/~plugandplay/publications/PWC2002.pdf
Synchronization In Ad Hoc Networks Based On UTRA TDD—Ebner, Rohling, Halfmann, Lott (2002) www.et2.tu-harburg.de/Mitarbeiter/Ebner/PIMRC02_Ebner.pdf
Pervasive Privacy with Identity Management—Jendricke, Kreutzer, Zugenmaier www.teco.edu/~philip/ubicomp2002ws/organize/identity.pdf
Formalising Hinting in Tutorial Dialogues—Tsovaltzi, Matheson (2002) www.ltg.ed.ac.uk/edilog/papers/185.pdf
TimedTTCN-3—A Real-Time Extension For TTCN-3—Dai, Grabowski, Neukirchen www.itm.mu-luebeck.de/publications/timedttcn3.pdf
Mapping CORBA IDL to TTCN-3 based on IDL to TTCN-2 mappings—Ebner (2001) www.itm.mu-luebeck.de/publications/FBT2001/fbt2001_ebner.pdf
Mobile Identity Management—Jendricke, Kreutzer, Zugenmaier ftp.informatik.uni-freiburg.de/documents/reports/report178/report00178.ps.gz Causal Reasoning In A Medical-Knowledge Based System www.newcastle.edu.au/school/design-comm-info/staff/gibbon/ecis98.ps A Secure Web-based Medical Digital Library—Architecture Based On thalis.cs.unipi.gr/~jpap/medical.pdf IPv6 Autoconfiguration in Large Scale Mobile Ad-Hoc Networks—Kilian Weniger Martina www.iponair.de/publications/Weniger-EuroWireless02.pdf Serviceware Framework For Developing 3g Mobile-Services Sahin Albayrak (2002) www.ssgrr.it/en/ssgrr2002w/papers/37.pdf Traffic Control methods For High Speed-Packet Switched Networks (2002) hsnlab.ttt.bme.hu/~molnar/files/pch2002.pdf The Impact Of Filtering On Spatial Continuous Queries—Brinkhoff (2002) www.fh-wilhelmshaven.de/oow/institute/iapg/personen/brinkhoff/paper/SDH2002.pdf On the Generation of Time-Evolving Regional Data—Tzouramanis. (2002) delab.csd.auth.gr/papers/GEO02tvm.pdf A dynamic service delivery framework based on the OSGi model—Vos, Buytaert, Buytaert (2002) www.ssgrr.it/en/ssgrr2002w/papers/165.pdf Applying bacterial algorithm to optimise trapezoidal.—Botzheim, Hamori, Kóczy (2001) www.mft.hu/hallg/200106.pdf Deadlock Probability in Unrestricted Wormhole Routing Networks—Folkestad, Roche (1997) ftp.cs.ucla.edu/techreport/1997-reports/970008.ps.Z The Infostations Challenge: Balancing Cost and—Ubiquity In Delivering www.winlab.rutgers.edu/~ryates/papers/ieeepc6b.ps A Proposal for a Combination of Compression and Encryption—Lutz Vorwerk Thomas www.informatik.uni-trier.de/~vorwerk/publics/perth.ps Mobility Management In Plug And Play Network—Architecture Mazen Malek (2002) www.item.ntnu.no/~plugandplay/publications/smartnet2002.pdf Adaptive Importance Sampling Simulation Of Queueing Networks—de Boer www.informs-cs.org/wsc00papers/086.PDF Ics—Forth—Erich Leisch Stelios (1999) www.ics.forth.gr/ICS/acti/cmi_hta/publications/papers/1999/hector_solutions/hector_solutions.pdf Co-Evolution of Bargaining Strategies in a Decentralized.—Eymann (2001) www.iig.uni-freiburg.de/~eymann/publications/TEymann01.pdf VBR Video Source Characterization And A Practical.—Cselényi, Molnár hsnlab.ttt.bme.hu/~molnar/files/VBRtelsys.ps.gz An approach to dynamic reconfiguration of.—Almeida, Wegdam. (2001) www.cs.utwente.nl/~alme/cvitae/sbrc2001-final-footnote.pdf www.ub.utwente.nl/webdocs/ctit/1/0000004f.pdf A GSM/GPS Receiver With a Bandpass Sigma-Delta Analog.—Müller, Boehm, Hentschel (1999) www.ifn.et.tu-dresden.de/MNS/veroeffentlichungen/1999/Mueller_T_EUW_99.pdf An Intelligent Educational Metadata Repository—Bassiliades, Kokkoras. (2002) www.csd.auth.gr/%7Elpis/publications/crc-chapter1.pdf Messor: Load-Balancing through a Swarm of Autonomous Agents—Montresor, Meling, Babaoglu (2002) www.cs.unibo.it/babaoglu/papers/ap2p02.pdf Exact trade-off between approximation accuracy and.—Tikk, Baranyi www.mft.hu/publications/baranyi/baranyi2.pdf On the Queue Tail Asymptotics for General Multifractal Traffic—Molnar, Dang, Maricza hsnlab.ttt.bme.hu/~molnar/files/ifipnw02.pdf Feature Ranking Based On Interclass Separability For Fuzzy.—Tikk, Gedeon (2000) www.mft.hu/publications/tikk/tikk8.pdf Public Key Certificate Revocation Schemes—Arnes (2000) www.pvv.ntnu.no/~andrearn/certrev/thesis/CertRevThesis_29Feb2000.ps.gz Competitive market-based allocation of consumer attention.—Bohte, Gerding. (2001) www.cwi.nl/ftp/CWIreports/SEN/SEN-R0131.ps.Z Towards Adaptive, Resilient and Self-Organizing.—Montresor, Meling. www.elet.pohmi.it/Users/DEI/Sections/CompEng/GianPietro.Picco/ntw02-p2p/papers/18.pdf Stability of interpolative fuzzy KH controllers—Tikk, Joó. (2002) www.mft.hu/publications/tikk/tikk4.pdf Comprehensive analysis of a new fuzzy rule interpolation method—Tikk, Baranyi (2000) www.mft.hu/publications/tikk/tikk2.pdf Design and Use of Clinical Ontologies:—Curricular Goals For www-smi.stanford.edu/pubs/SMI_Reports/SMI-1999-0767.pdf Toward Standardization of Electronic Guideline.—Elkin, Peleg, Lacson. (2000) www-smi.stanford.edu/pubs/SMI_Reports/SMI-2001-0865.pdf Extracting Information for Automatic Indexing of Multimedia Material—Saggion. (2002) parlevink.cs.utwente.nl/projects/mumis/documents/mumis-lrec2002.pdf Investigation of a new alpha-cut based fuzzy.—Baranyi, Tikk, Yam. www.mft.hu/publications/tikk/tikk11.pdf The Evolution of Jini' Technology—In Telematics By wwws.sun.com/software/jini/whitepapers/PsiNapticTelematics.pdf Desktop Synchronous Distance Learning Application—Enhanced With Efficient ru6.cti.gr/Publications/645.pdf; ru6.cti.gr/Publications/904.pdf Adaptive compression of DICOM-image data—Hludov, Engel, Meinel www.informatik.uni-trier.de/~meinel/papers/tes_2.ps Telematic Tools to Support Group Projects in Higher Education—Jan Van Der www.ub.utwente.nl/webdocs/ctit/1/00000004.pdf A Receiver-initiated WDM Multicast Tree Construction Protocol.—Ip Dense Mode www.ub.utwente.nl/webdocs/ctit/1/00000032.pdf AUTOLINK—A Tool for the Automatic and.—Schmitt, Koch. (1997) 141.83.21.121/publications/ALASA/SchmKochGraHog.ps.gz The Term Processor Generator Kimwitu—van Eijk, Belinfante, Eertink. (1997) wwwtios.cs.utwente.nl/kimwitu/tacas97.ps.gz Security Engineering of Lattice-Based Policies—Bryce (1997) set.gmd.de/~kuehnhsr/CWASAR/D06.1.ann5.ps.gz A scheme for adaptive biasing in importance sampling—Heegaard (1997) www.idt.unit.no/~poulh/publications/IS-adaptive.ps www.item.ntnu.no/~poulh/publications/adapt-scheme-abstract.ps Towards the Industrial Use of Validation.—Ek, Grabowski. www.itm.mu-luebeck.de/publications/A-97-03/SDL-Forum-97.ps.gz A Browser for a Versioned Entity-Relationship Database—Gulla (1992) www.idt.unit.no/~epos/Papers/browser.ps The Eternal Resource Locator: An Alternative Means of.—Vaclav www.usenix.org/publications/library/proceedings/ec98/full_papers/anderson/anderson.pdf A Continuously Available and Highly Scalable.—Hvasshovd. (1991) www.idi.ntnu.no/IDT/grupper/DB-grp/tech_papers/hpts91.ps A Parallel Implementation of XTP on Transputers—Braun, Zitterbart (1991) www.iam.unibe.ch/~braun/lit/lcnl6_xtp.ps.gz Stublets: A Notion for Mobility-Aware Application Adaption—Dietmar Kottmann Christian (1996) ftp.diku.dk/diku/distlab/wmr96/sommer.ps.gz ATM Traffic Measurements and Analysis on a Real Testbed—Molnár, Cselenyi. (1996) hsnlab.ttt.bme.hu/~molnar/files/itc2.ps.gz A CORBA Platform for Component Groupware—Hofte, van der Lugt, Bakker (1996) www.telin.nl/publicaties/1996/ozchi96.pdf The European Web Index: An Internet Search Service for.—Lundberg, Ardö. (1996) www.lub.lu.se/desire/radar/reports/D3.12/D3.12.v1.0.ps Results Of The CEO Project WWW Management—Hazewinkel, Van Hengstum, Pras (1996) wwwsnmp.cs.utwente.nl/nm/research/results/publications/pras/WWW.pdf Towards Integrated QoS Management—Schmidt, Zitterbart (1995) www.telematik.informatik.uni-karlsruhe.de/~schmidt/schmidt_hipp94.ps.gz On engineering support for business process modelling.—Franken, de Weger. (1996) wwwhome.cs.utwente.nl/~pires/publications/bpr96.pdf Optimization of Spatial Joins Using Filters—Veenhof, Apers, Houtsma (1995) wwwis.cs.utwente.nl:8080/isdoc/confpaper/veenhof.BNCOD95.accepted.ps.gz Software Architecture of Ubiquitous Scientific Computing.—Tzvetan Drashansky (1995) www.cs.purdue.edu/homes/saw/publications/95/ubiq-pses.ps Wavefront implementation of Self Organizing Maps on RENNS—Gaute Myklebust (1995) www.idt.unit.no/~gautemyk/icdsp95.ps On the Enterprise Modelling of an—Educational Information. www.ub.utwente.nl/webdocs/ctit/1/0000002f.pdf VBR Video Source Characterization And A Practical.—Cselenyi, Molnár hsnlab.ttt.bme.hu/~molnar/files/VBRtelsys.ps.gz Use of the CANTOR system for collaborative learning in.—Hans Andersen Verner newmedia.colorado.edu/cscl/270.pdf Jgroup/ARM: A Distributed Object Group Platform.—Meling, Montresor. www.CS.UniBO.it/babaoglu/papers/jgroup-arm.pdf Validation of the Open Service Access API for UMTS.—Maarten Wegdam Dirk-Jaap arch.cs.utwente.nl/publications/papers/proms01-osa-lncs22130210.pdf A Hyperlink-Proposal Mechanism to Exemplify Cognitive.—Haffner, Roth, Meinel www.informatik.uni-trier.de/~ meinel/papers/Paper02.ps Digital Signatures For Automobiles?!—Gollan, Meinel www.informatik.uni-trier.de/~meinel/papers/DigitalSignaturesAuto02.pdf Designing Safe Smart Home Systems for Vulnerable People—Dewsbury, Taylor www.smartthinking.ukideas.com/_DIRC.pdf Providing X.509-based user—Access Control To ftp.polito.it/pub/security/papers/sec98/sec98.ps.gz Seeing Speech In Space And Time: Psychological And.—Ruth Campbell Department www.asel.udel.edu/icslp/cdrom/vol3/1008/a1008.pdf The Process of Designing Appropriate Smart Homes: Including.—Guy Dewsbury Bruce www.smartthinking.ukideas.com/Dewsbury_et_al_Appropriate_design_of_smart_homes.pdf Transparent Dynamic Reconfiguration for CORBA—Almeida, Wegdam, van. (2001) www.cs.utwente.nl/~alme/cvitae/doa01.pdf Dissemination of Mutable Sets of Web Objects—Buchholz, Goebel, Schill, Ziegert (2001) wwwrn.inf.tu-dresden.de/~buchholz/askom/PDCS2001.pdf How to Support the Negotiation of Service Level Agreements.—Köppel, Böning, Abeck (1999) www.cooperation-management.de/publikationen/paper/isas99_Abeck-Boening-Koeppel.pdf PAMINA: A Certificate Based Privilege Management System—Nochta, Ebinger, Abeck (2002) www.isoc.org/isoc/conferences/ndss/02/proceedings/papers/nochta.pdf Modeling IT Operations to Derive Provider Accepted Management.—Abeck, Mayerl (1999) www.cooperation-management.de/publikationen/paper/im99_abeck-mayerl.pdf On deriving rules for nativised pronunciation in.—Trancoso, Viana. (1999) www.l2f.inesc.pt/documents/papers/Trancoso99b.pdf A CANDLE to light the way?—Sebastian Abeck Jodok www.cooperation-management.de/publikationen/paper/ACandletoLightTheWay.pdf Internet Agents for Telemedicine Services—Mea, Roberto, Conti, Di. (1999) www.telemed.uniud.it/papers/VDM-MI99.pdf Supporting Secure and Transparent Delegation in the CORBA.—Zoltn Nochta Taufiq (2001) www.cooperation-management.de/publikationen/paper/pwc2001_nrr_cr.pdf The adaptation and use of a WWW-based coursemanagement system.—De Boer, Collis (2000) www.ub.utwente.nl/webdocs/ctit/1/00000059.pdf Evaluation of Mobile Agent Systems with Respect to Failure.—Otto Wittner October www.item.ntnu.no/~ottow/papers/failsemMASreport.pdf Proactive Services in a Distributed Traffic Telematics.—Gura, Held, Kaiser www.informatik.uni-ulm.de/rs/projekte/core/ProctiveServ.pdf TCP over GPRS—Performance Analysis—Manner (1999) www.cs.helsinki.fi/u/jmanner/papers/Thesis-Manner.ps Ip Over Wavelength-Routed Access Networks—Marcos Rogrio Salvador wwwctit.cs.utwente.nl/~salvador/Eunice99.pdf Increasing Retrievability and Reusability of Learning.—Hiddink Van Der www.ub.utwente.nl/webdocs/ctit/1/00000056.pdf Experiences from Development of Home Health Care Applications.—Leili Lind Erik ftp.imt.liu.se/pub/bildb/MIpapers/524_LIND.PDF A Review of Parallel Implementations of Backpropagation.—Torresen, Tomita www.ifi.uio.no/~jimtoer/chp2.ps ESCORT: Towards Integration in Intersection Control—Andrea Savigni Filippo (2000) www.cs.ucl.ac.uk/staff/A.Savigni/papers/2000_jubilee_escort_roma.pdf Usability Field-Test Of A Spoken Data-Entry System—Marcello Federico And poseidon.itc.it:7117/~ssi/DITELO/papers/ICASSP99_1.ps FLAMINGO: A Packet-switched IP over WDM Metro Optical Network—Dey Koonen Geuzebroek (2001) wwwctit.cs.utwente.nl/~salvador/NOC2001.pdf Real-time test specification with TTCN-3—Dai, Grabowski, Neukirchen (2001) www.itm.mu-luebeck.de/publications/FBT2001/Abstract fbt01neukdai.pdf A System for Uniform and Multilingual Access to Structured.—Xu, Netter, Stenzhorn (2000) www.cs.ust.hk/acl2000/Demo/04_xu.pdf Corpus-driven learning of Event Recognition Rules—Roberto Basii Maria www.dcs.shef.ac.uk/~fabio/ML4IE/2.PS.gz Web-Support for Activating Use of Theory in Group-Based Learning—Jan Van Der www.ub.utwente.nl/webdocs/ctit/1/0000005a.pdf Automated Generation of Category-Specific Thesauri for.—Attardi, Di Marco. (1998) faure.iei.pi.cnr.it/~fabrizio/Publications/TR0698.ps The use of CMC in applied social science training—Interim Report Merja www.stir.ac.uk/schema/deliverables/D5.3.pdf The IT-Potential Of Haptics—Touch access for people with.—Sjöström (1999) www.certec.lth.se/doc/touchaccess/TouchAccess.pdf An All-Optical WDM Packet-Switched Network Architecture.—Marcos Rogrio Salvador (2001) wwwctit.cs.utwente.nl/~salvador/ICN2001.pdf An Adaptive, Collaborative Environment to Develop.—Vizcano. oreto.inf-cr.uclm.es/personas/avizcaino/itsenv.ps The HyperMuseum Theme Generator System: Ontology based.—Stuer, Meersman, De. (2001) www.archimuse.com/mw2001/papers/stuer/stuer.html wise.vub.ac.be/Download/Papers/stuerMW2001.pdf Failure Semantics of Mobile Agent Systems Involved in.—Otto Wittner Carsten (1999) www.item.ntnu.no/~ottow/papers/failsemNIK99.pdf Cross-Entropy Guided Mobile Agents Finding Cyclic Paths in.—Wittner, Helvik (2002) www.item.ntnu.no/~wittner/aamas2002_submitted.pdf Cross Entropy Guided Ant-like Agents Finding Dependable.—Wittner, Helvik (2002) www.item.ntnu.no/~wittner/cec2002.pdf Using Information Flow Control to Evaluate Access.—Mantel, Schairer. www.dfki.de/~schairer/publications/report00159.ps.gz Network Architecture of a Packet-switched WDM LAN/MAN—Dey Koonen And (2000) wwwctit.cs.utwente.nl/~salvador/LEOS2000.pdf Specification and Validation of a Real-Time Parallel.—de Farias, Pires. (1997) www.ub.utwente.nl/webdocs/ctit/1/00000066.pdf Mobile Ip: Security Application—Tuquerres, Salvador, Sprenkels ntrg.cs.tcd.ie/htewari/papers/MobileIP-Sec.pdf M3POC: a multimedia multicast transport protocol for cooperative.—Owezarski www.laas.fr/~owe/PUBLIS/99525.ps.gz User Interfaces for All—Kobsa, (eds.) (1999) www.gmd.de/publications/report/0074/Text.pdf Supporting PIM-SM in All-Optical Lambda-Switched Networks—Marcos Rogrio Salvador (2001) wwwctit.cs.utwente.nl/~salvador/SBRC2001.pdf Managing Distributed Personal Firewalls with Smart.—Haffner, Roth, Heuer. www.informatik.uni-trier.de/~meinel/papers/Managing01.ps FINAL REPORT: LAURIN laurin.uibk.ac.at/—Version November Author germanistik.uibk.ac.at/laurin/reports/finalrep01.pdf Some Implications of MSC, SDL and TTCN Time Extensions.—Hogrefe, Koch. (2001) www.itm.mu-luebeck.de/publications/DH_BK_HN_2001_SDLForum/sdlforum2001.pdf Supporting IP Dense Mode Multicast Routing Protocols in.—Marcos Rogerio Salvador (2000) wwwctit.cs.utwente.nl/~salvador/OPTICOMM2000.pdf Report on the course for Technology Teachers WWW Course of.—Jyrki Pulkkinen And telematics.ex.ac.uk/T3/0/downloads/d13-1.pdf A Multi-DSP Laboratory Course—Rinner, Schneider, Steger, Weiss www.iti.tu-graz.ac.at/de/people/schneider/papers/rinner98.pdf Modularity—A Concept For New Neural Network Architectures—Schmidt, Bandar (1998) www.comp.lancs.ac.uk/~albrecht/pubs/pdf/schmidt_csa_irbid_1998.pdf Supporting IP Dense Mode Multicast Routing in All-Optical.—Marcos Rogrio Salvador (2001) wwwctit.cs.utwente.nl/~salvador/ONM2001.pdf Dagstuhl Seminar on Ubiquitous Computing—September The International (2001) www.inf.ethz.ch/vs/events/dag2001/intro/DagstuhlIntroductions.pdf A Framework For Video Modelling—Centre For Telematics www.cs.utwente.nl/~milan/docs/innsb.ps Conceptual Stage in Designing Multimedia for Tele Learning—Kommers (2001) www.ub.utwente.nl/webdocs/ctit/1/00000060.pdf Signed Preservation Of Online References—Heuer, Losemann, Meinel www.informatik.uni-trier.de/~meinel/papers/webnet00b.ps Chapter 7 Implementation of Backpropagation Neural.—Jim Torresen Department www.ifi.uio.no/~jimtoer/chp3.ps TIMe at a glance—Braek, Gorman, Haugen, Melby. www.sintef.no/time/report.pdf Executive Summary—The Vision Of www.it.bton.ac.uk/research/seake/knowledge.pdf Supporting the Travelling Tradition: A report on the work.—Ken Marks Department (2000) ui4all.ics.forth.gr/i3SD2000/Marks.PDF Circuits and Systems—Benini, De Micheli, Macii, Maloberti www.nd.edu/~stjoseph/newscas/CASMagvollnol.pdf Enterprise Modelling For An Educational Information.—Ing Widya Cees (2001) wwwhome.cs.utwente.nl/~widya/webpapers/iceis2001_205.pdf Telematics For Group-Based Learning: Simplicity Versus.—van der Veen, Collis. www.ub.utwente.nl/webdocs/ctit/1/00000057.pdf Research Report 1997-1999—Department Of Computer (1997) www.cs.ucy.ac.cy/Research/archives/rr97-99.ps Translation Resources, Merging Strategies and Relevance.—Djoerd Hiemstra Wessel janus.cs.utwente.nl/~hiemstra/papers/clefl.pdf An Information System for Long-distance Cooperation in Medicine.—Kosch, al. (2000) www.ii.uib.no/para2000/program/jacek.ps Next Generation Internet in Europe—Published By The www.infowin.org/ACTS/ANALYSYS/PRODUCTS/THEMATIC/NGI/ngi_in_europe.pdf R. Mu~noz, M. Saiz-Noeda, A. Su arez and M. Palomar—Grupo De Investigaci (2000) gplsi.dlsi.ua.es/gplsi/articulos/a2000/mt2000.ps Lazy Users and Automatic Video Retrieval Tools in (the) Lowlands—The Lowlands Team carol.wins.uva.nl/~cgmsnoek/pub/trec10video.pdf Remote MIB item look-up service—Pras, Boros, Helthuis (2002) www.simpleweb.org/nm/research/results/publications/pras/2002-04-noms.pdf Use Of Real And Contaminated Speech For Training Of A.—Matassoni Omologo And (2001) poseidon.itc.it:7117/~ssi/SHINE/ps/eurospeech01.ps.gz Extending the Data Storage Capabilities of a Java-based.—Clemens Cap Nico wwwiuk.informatik.uni-rostock.de/~maibaum/docs/maibtune.ps Towards Precision Tools For ATM Network Design, Dimensioning.—Molnár, al. hsnlab.ttt.bme.hu/~molnar/files/peripol.ps.gz Fair Bandwidth Allocation of a Wireless Base Station—Gyorgy Mikl'os Traffic hsnlab.ttt.bme.hu/~molnar/files/iqwim99.ps.gz Forecasting the Success of Telecommunication Services in.—Detlef Schoder. (2000) www.iig.uni-freiburg.de/telematik/forschung/publikationen/pubfiles/Sc2000.pdf A General Fractal Model of Internet Traffic—Molnar hsnlab.ttt.bme.hu/~molnar/files/multifractalLCN.pdf Correlations in ATM Cell Streams Exposed to Cell Delay Variation—Molnár, Blaabjerg hsnlab.ttt.bme.hu/~molnar/files/hung1.ps.gz A General Traffic Control Framework in ATM Networks—Fodor, Marosits, Molnár (1996) hsnlab.ttt.bme.hu/~molnar/files/gtf.ps.gz NAVIGATION IN CYBERSPACE Using Multi-Dimensional Scaling.—Schoder Institut Fur (1999) www.iig.uni-freiburg.de/telematik/forschung/publikationen/pubfiles/Sc1999a.pdf Performance Measurement Tool for Packet Forwarding Devices—Tam As Kovacshazy www.mit.bme.hu/~khazy/publications/imtc2001_3472.pdf Benefits of a Universal Security Framework—Report By Arnd (2000) www.iig.uni-freiburg.de/telematik/forschung/publikationen/pubfiles/We2000f.pdf Methods for Computing B-ISDN Link Blocking Probabilities—Molnár, Blaabjerg hsnlab.ttt.bme.hu/~molnar/files/link.ps.gz Inter-organizational Networking of Small and.—Framework And. (1999) www.iig.uni-freiburg.de/telematik/forschung/publikationen/pubfiles/EgEn1999.pdf Using Objects and Patterns to Implement Domain Ontologies—Guizzardi, Falbo, Filho (2001) wwwhome.cs.utwente.nl/~guizzard/jbcs.pdf Highly Secure Low-cost Computers—Arnd Weber Today's (2000) www.iig.uni-freiburg.de/telematik/forschung/publikationen/pubfiles/We2000e.pdf On Modeling and Shaping Self-Similar ATM Traffic—Andor Moln'ar And hsnlab.ttt.bme.hu/~molnar/files/itc97.ps.gz Pitfalls in Long Range Dependence Testing and Estimation—Molnar, Dang hsnlab.ttt.bme.hu/~molnar/files/pitfalls.pdf.gz Distributed Fair Bandwidth Allocation of a Wireless Base.—Gyorgy Miklos Traffic (2000) hsnlab.ttt.bme.hu/~molnar/files/netw00.ps.gz Highly Secure Low-cost PDA-phones—Weber (2000) www.iig.uni-freiburg.de/telematik/forschung/publikationen/pubfiles/We2000d.pdf Sharing Telematics Courses—The CANDLE project—Aiko Pras Centre (2001) www.simpleweb.org/nm/research/results/publications/pras/2001-09-04-eunice.pdf A Prototype for an Agent-based Secure Electronic.—Padovan, Sackmann. (2001) www.iig.uni-freiburg.de/telematik/forschung/projekte/e_sicherheit/comet/publikationen/PaSaEyPi2001.pdf On Measurements of Multimedia Traffic in ATM Networks—Cselényi. hsnlab.ttt.bme.hu/~molnar/files/icomt.ps.gz Advanced Generation Tool of Application's Network Trafic—Petroczi, Molnar hsnlab.ttt.bme.hu/~molnar/files/agentant.ps.gz On Burst And Correlation Structure of Teletraffic Models—Molnár, Miklós hsnlab.ttt.bme.hu/~molnar/files/ilkley97.ps.gz Scaling Analysis of IP Traffic Components—Molnar, Dang (2000) hsnlab.ttt.bme.hu/~molnar/files/itcssip00.ps.gz A System for Supporting Cross-Lingual Information Retrieval—Capstick, al. (1999) speech.ftw.at/~gor/pub/ipm/mulinex-ipm99.pdf Spatiotemporal Segmentation and Tracking of Objects for.—Kompatsiaris, Strintzis (2000) egnatia.ee.auth.gr/~ikom/CSVT2000.pdf Region-Based Color Image Indexing And Retrieval—Ioannis Kompatsiaris Evagelia (2001) egnatia.ee.auth.gr/~ikom/icip2001.pdf Kompatsiaris—And Michael Strintzis egnatia.ee.auth.gr/~ikom/ICIP00.pdf th IFLA Council and General Conference Aug. 16-25, 2001—Code Number Division www.ifla.org/IV/ifla67/papers/161-165e.pdf Agent-Mediators In Media-On-Demand Eletronic Commerce—Joo Paulo Andrade wwwhome.cs.utwente.nl/~guizzard/mod-amec-cuba.pdf A Web-based Distributed Environment to Support Teleteaching.—Ch Bouras Computer ru6.cti.gr/Publications/261.pdf Web-Enabled Distance Education Environment—Bouras, Lampsas, Bazaios. (1998) ru6.cti.gr/Publications/296.pdf ID-No. of presentation: t3a01391—Authors Christos Bouras ru6.cti.gr/Publications/279.pdf Usability meets Security—The Identity-Manager as your.—Jendricke, Markotten (2000) www.acsac.org/2000/papers/90.pdf Deployment Scenarios of DVEs in Education—Bouras Computer Technology ru6.cti.gr/Publications/324.pdf Trends: Training Educators Through Networks And.—Christos Bouras Computer (1996) ru6.cti.gr/Publications/439.pdf On-Demand Hypermedia/Multimedia Service over.—Bouras, Kapoulas. (1996) ru6.cti.gr/Publications/358.pdf Tele-working services from the Greek PTT—Christos Bouras Vaggelis (1999) ru6.cti.gr/Publications/322.pdf HIPPOCRATES: A Tool for Distance Education—Bouras Fotakis Kapoulas ru6.cti.gr/Publications/305.pdf A Platform for the Implementation of the Services.—Bouras, Gkamas. (1998) ru6.cti.gr/Publications/259.pdf Training Centres: An Architecture for the Realisation.—Christos Bouras Computer ru6.cti.gr/Publications/292.pdf In-Service Training through ODL Environments: From User.—Bouras Lampsas Spirakis ru6.cti.gr/Publications/275.pdf Distributed Learning Environment using Advanced Services.—Ch Bouras Computer (1999) ru6.cti.gr/Publications/453.pdf Routing Management Application Based On Mobile Agents On.—Anglica Reyes Ernesto wwwtgs.cs.utwente.nl/eunice/summerschool/papers/paper9-2.pdf Quality Of Service Monitoring In Ip Networks By Using.—Tams Varga Andrs wwwtgs.cs.utwente.nl/eunice/summerschool/papers/paper4-3.pdf Issues on QoS based Routing in the Integrated Services.—Gbor Rtvri Department wwwtgs.cs.utwente.nl/eunice/summerschool/papers/paper4-1.pdf Usability Research in a Housing Fair: Problems and.—Sajaniemi, Tossavainen (1995) csjoensuu.fi/pub/Reports/A-1995-7.ps.gz Tele-Education/-Co-Operation Pilot—Pilot Study Plan www.cg.its.tudelft.nl/~charles/publications/MESH_Report_D213.pdf CAVE—Speaker verification in bank and telecom services—Lindberg, Blomberg, Melin ftp.ling.umu.se/pub/phonum/phonum4/65.ps The Catallaxy as a new Paradigm for the Design of.—Eymann, Padovan, Schoder (2000) www.iig.uni-freiburg.de/telematik/forschung/publikationen/pubfiles/EyPaSc2000.pdf Internet Accounting—Pras, van Beijnum, Sprenkels. (2001) www.simpleweb.org/nm/research/results/publications/pras/internet-accounting.pdf EWI Search and User Interface Functions—Ardö, Cao, Lundberg, Roslund. www.lub.lu.se/combine/docs/D34_search_ui.ps Algebras and Automata for Timed and Stochastic Systems—D'Argenio wwwhome.cs.utwente.nl/~dargenio/dissertation/dissertation.ps.gz Characterizing Video Coding Computing in Conference Systems—By Tuquerres Tuquerre www.ub.utwente.nl/webdocs/ctit/1/0000004d.pdf A Model to Evaluate Certificate Revocation—Forn Castro Department (2000) www-mat.upc.es/~jforme/jf_SCI2000_1.pdf Dublin Bus Tracking Service—Design and implementation of a.—Fallon (2000) ftp.cs.tcd.ie/pub/tech-reports/reports.00/TCD-CS-2000-47.pdf Integrating Different Strategies for Cross-Language.—Buitelaar, Netter, Xu www.dfki.de/lt/mietta/mietta-twlt.ps Integrating Trading and Load Balancing for Efficient.—Thiβen, Neukirchen (2000) www.itm.mu-luebeck.de/publications/DT_HN_2000ITaLBfEMoSiDS/USM2000.pdf Junction Point Aspect: A Solution to Simplify Implementation of.—Berger (2000) micado.project.free.fr/Publi/ecoop2000.ps.gz Csaba Antal—Jzsef Molnr Sndor www.cs.kau.se/~soren/dk-doc/documentstore/cc_fp.ps GRAVE Cave General Video Client—Wasskog (1995) www.idi.ntnu.no/grupper/db/report_diplomas/il_myggo/diplom.ps.Z Z39.50 Application programmer's Interface SYSTEM.—Document No Document ftp.ddb.de/pub/dbvosi/ses_v3.ps.gz Hardware Implementation of a Secure Bridge in Ethernet.—Forn Soriano Mels www-mat.upc.es/~jforme/jif_GLOBECOM93.pdf Performance Evaluation of Strategies for Integration.—Queija, van den Berg. (1999) www.cwi.nl/ftp/CWIreports/PNA/PNA-R9903.ps.Z Inverse Multiplexing for ATM. Operation.—Aguilar-Igartua. (1999) marley.upc.es/pub/articles/icatm99.pdf An integrated solution for secure communications over B-ISDN—Forn Mels Department www-mat.upc.es/~jforme/jf_CMS96.pdf Web Representation with Dynamic Thumbnail—Schmid www.comp.lancs.ac.uk/computing/users/sschmid/Yuforic/YuforicExtAbstr.ps Distributed educational multimedia databases: design, production.—Hiddink (1998) wwwhome.ctit.utwente.nl/~hiddinkg/professional/papers/romy/romy.ps Sojourn Times in Non-Homogeneous QBD Processes with Processor.—Queija (1999) www.cwi.nl/ftp/CWIreports/PNA/PNA-R9901.ps.Z A guided tour through LGM—How to generate spoken.—Krahmer, Landsbergen. www.ipo.tue.nl/homepages/ekrahmer/Pubs/lgm.ps Verifying a Smart Design of TCAP—Arts, van Langevelde (1999) www.cwi.nl/ftp/CWIreports/SEN/SEN-R9910.ps.Z Securing Multimedia Applications over B-ISDN—Jordi Forn Mels www-mat.upc.es/~jforme/jf_PROMS96.pdf Teaching and learning with the WWW in the undergraduate.—Oliver, Omari, Cowan elrond.scam.ecu.edu.au/oliver/docs/96/AUSWEB2d.pdf Toward a Standard for Guideline Representation: an.—Domenico Pisanelli Aldo saussure.irmkant.rm.cnr.it/onto/publ/amia99/amia99.pdf Time Domain MLE of the Parameters of FBM Traffic—Vidács, Virtamo (1999) keskus.tct.hut.fi/tutkimus/com2/publ/fbm2.pdf Artificial Coordination—Simulating Organizational.—Eymann, Padovan, Schoder (1998) www.iig.uni-freiburg.de/~padovan/publications/cefes98.pdf REMOT—A Project to Remotely Monitor and Control Scientific—Experiments Pucillo Oat www.aps.anl.gov/icalepcs97/paper97/p235.pdf Performability Analysis of Markov Reward Models with Rate and.—Andor Acz And (1999) webspn.hit.bme.hu/~telek/cikkek/racz99a.ps.gz Analysis of the Completion Time of Markov Reward Models.—Mikl'os Telek Andr'as webspn.hit.bme.hu/~telek/cikkek/tele98b.ps.gz A New Method for Spectral Shaping Coding—Peter Amos Aszl'o webspn.hit.bme.hu/~telek/cikkek/vamo98a.ps.gz MRMSolve: A Tool for Transient Analysis of Large Markov.—Rácz, Tóth, Telek webspn.hit.bme.hu/~telek/cikkek/racz00f.ps.gz Managing Services in Distributed Systems by Integrating.—Thiβen, Neukirchen (2000) www.itm.mu-luebeck.de/publications/ISCC2000/ISCC2000.pdf.gz Conformance Testing with TTCN—Schieferdecker, Grabowski (2000) www.itm.mu-luebeck.de/publications/I_J=2000_CTwT/Telektronnikk4_2000_CTandTTCN.pdf Analysis and Modelling of Collaborative Learning Interactions—Workshop Notes (2000) collide.informatik.uni-duisburg.de/~martin/publication/Muehlenbrock-ECAI-2000.pdf Aligning IT and Organization in the MediaSite project—Iacucci, Axelsson (2000) iris23.htu.se/proceedings/PDF/20final.PDF Enriching Textual Documents with Time-codes from Video.—van der Sluis, de Jong (2000) 133.23.229.11/~ysuzuki/Proceedingsall/RIAO2000/Wednesday/37CP1.ps Modular Automated Transport—Frequently Asked Questions (FAQ)—Schweizer (2000) circwww.epfl.ch/staff/jo-erg/mat/docs/faq/faq.ps The CIMI Profile Release 1.0H—Profile For Cultural www.cimi.org/public_docs/HarmonizedProfile/CIMIProfile10H.pdf Real-Time Traffic Simulation of the German Autobahn Network—Rickert, Wagner, Gawron (1996) www.zpr.uni-koeln.de/~mr/documents/PASA_96.ps.gz Analysis of a Distributed Wireless Fair Scheduling Scheme—Miklós hsnlab.ttt.bme.hu/~molnar/files/itcssmob00.ps.gz CAC Algorithm Based on Advanced Round Robin Method for QoS.—Marosits, Molnár hsnlab.ttt.bme.hu/~molnar/files/iscc01.pdf.gz Link Capacity Sharing Between Guaranteed—and Best Effort.—Rácz, Telek webspn.hit.bme.hu/~telek/cikkek/racz01a.ps.gz Quality of Service on the Internet: Evaluation of the.—Elisabete Reis Elreis (2001) dragao.co.it.pt/conftele2001/proc/pap101.pdf A MixDemonstrator for teaching Security in the Virtual.—Jendricke, Rannenberg www.scis.cowan.edu.au/research/wise/WISEIProceedings/pdf/jendricke.pdf Fair Allocation Of Elastic Traffic For A Wireless Base Station—Gyorgy Miklos Traffic (1999) hsnlab.ttt.bme.hu/~molnar/files/globe99.ps.gz Cell Delay Variation in an ATM Multiplexer—Molnár, Blaabjerg hsnlab.ttt.bme.hu/~molnar/files/cdvsnew.ps.gz Supporting All Service Classes in ATM: A Novel.—Marosits. (1999) hsnlab.ttt.bme.hu/~molnar/files/info99.ps.gz The Impact Of Long Range Dependence On Cell Loss In An.—Vidacs, Molnar, Gordos (1998) hsnlab.ttt.bme.hu/~molnar/files/globe98.ps.gz Investigation of Fractal Properties in Data Traffic—Dinh, Molnár. hsnlab.ttt.bme.hu/~molnar/files/jc98.ps.gz Performance Evaluation of a General Traffic Control.—Marosits. hsnlab.ttt.bme.hu/~molnar/files/ipccc99.ps.gz The Demand for Stored Value Payment Instruments—Ingo Pippow Detlef (2001) www.iig.uni-freiburg.de/telematik/forschung/projekte/e_sicherheit/comet/publikationen/PiScho2001.pdf On The Effects Of Non-Stationarity In Long-Range Dependence Tests—Trang Dinh And hsnlab.ttt.bme.hu/~molnar/files/trendeff.ps.gz Bottlenecks on the Way Towards Fractal Characterization of.—Andor Moln'ar Attila hsnlab.ttt.bme.hu/~molnar/files/pmccn97.ps.gz Multimedia Databases in Education—Gerrit Hiddink Centre wwwhome.ctit.utwente.nl/~hiddinkg/professional/papers/dolls97.ps Content-based video retrieval—Petkovic (2000) www.edbt2000.uni-konstanz.de/phd-workshop/papers/Petkovic.pdf Adaptive Optimisation of Importance Sampling for.—Heegaard (1996) www.idi.ntnu.no/~poulh/publications/nts13a.ps Factors of reuse of Units of Learning Material—Gerrit Hiddink Centre wwwhome.ctit.utwente.nl/~hiddinkg/professional/papers/reuse.ps Multilateral Security A concept and examples for balanced security—Rannenberg (2000) csrc.nist.gov/nissc/2000/proceedings/papers/202ra.pdf Educational Multimedia Databases: Past and Present—Gerrit Hiddink Centre wwwhome.ctit.utwente.nl/~hiddinkg/professional/papers/systems.ps Resource-limited information retrieval in Web-based.—Daan Velthausz And (1997) www.trc.nl/publicaties/1997/reslim/resource-limited.pdf CRL supported a smart redesign of a real-life protocol—Thomas Arts Email extranet.telin.nl/dscgi/ds.py/Get/File-8309/fmics99.ps.Z Convergence In The Digital Age—Table Of Content ftp.cordis.lu/pub/libraries/docs/proceedings.pdf Using Automated Assistance Systems—Putting The Driver Into Focus—Reichardt (1998) www.daimler-benz.com/research/events/pdf/IV980240.PDF The Cave-Wp4 Generic Speaker Verification System—Jaboulet, KOOLWAAIJ. (1998) www.ubilab.org/publications/print_versions/pdf/jab98.pdf Field Test Of A Calling Card Service Based On.—den Os, Boves. www.ubilab.org/publications/print_versions/pdf/den97.pdf Distributed Electronic Commerce Systems—Sonja Zwil Er ftp.cs.umass.edu/pub/net/pub/hgschulz/i96/zwissler.ps.gz Needed Services For Network Performance Evaluation—Dung Dinh Luong gollum.ttt.bme.hu/~luong/tools/atmi-p.ps Link Proposals with Case-Based Reasoning Techniques—Haffner, Roth, Heuer. www.ti.fhg.de/conferences/200011171414080.ps Remote Access to Medical Records via the Internet: Feasibility.—Pj Lees Ce (1999) www.ics.forth.gr/ICS/acti/cmi_hta/publications/papers/1999/cic99/lees_cic99.pdf Partial Methods Versus End-to-End Measurements—Dung Dinh Luong gollum.ttt.bme.hu/~luong/tools/ifip.ps The Role of Packet-dropping Mechanisms in QoS Differentiation—Goncalo Quadros Antonio (2000) www-.dei.uc.pt/~ boavida/papers/2000icon.pdf Component-Based Groupware Tailorability using Monitoring.—de Farias, Diakov (2000) amidst.ctit.utwente.nl/publications/cscw_cbg2000.pdf Modeling of Time and Document Aging for Request.—Haffner, Roth, Engel. (2000) www.ti.fhg.de/conferences/200009211730520.ps Mpeg-4 Authoring Tool For The Composition Of 3D.—Daras. (2001) egnatia.ee.auth.gr/~ikom/ISCAS2001.pdf Disambiguation Strategies for Cross-language Information.—Djoerd Hiemstra And (1999) www.cs.utwente.nl/~hiemstra/papers/ecdl99.ps the IFLA Council and General Conference Aug. 16-25, 2001—Code Number Division www.ifla.org/IV/ifla67/papers/161-165e.pdf CANDLE: an European E-Education project to . . . —Batlogg, al. (2000) www.ssgrr.it/en/ssgrr2000/papers/164.pdf State-dependent M/G/1 Type Queueing Analysis for.—Altman. (2000) www.cwi.nl/ftp/CWIreports/PNA/PNA-R0005.ps.Z Continuous Queries within an Architecture for Querying.—Brinkhoff, Weitkämper (2001) www.fh-wilhelmshaven.de/oow/institute/iapg/personen/brinkhoff/paper/SSTD2001.pdf The Distribution And Partitioning Scheme Of The.—Jiménez. ches.ing.ula.ve/INVESTIGACION/ARTICULOS/TANIA/SIM-71.ps.gz An Architecture For Video On Demand Agent-Mediated.—Almeida, Guizzardi. wwwhome.cs.utwente.nl/~guizzard/vod-amec-workcomp99.pdf Reusing Multi-Media Components: A Catalogue Implementation—Steinmann, Shearer www.fernuni-hagen.de/DVT/Publikationen/Papers/emmsec.pdf Multiagent Systems—Instructor Prof Dh 136.159.122.221/seminar/enmf619_02/enmf02.pdf Twenty-One at CLEF-2000: Translation resources, merging.—Djoerd Hiemstra Wessel www.iei.pi.cnr.it/DELOS/CLEF/twentyon.pdf Papabiles—Torday, Bierlaire (2001) rosowww.epfl.ch/mbi/strc-papabiles.pdf Using Objects and Patterns to Implement Domain Ontologies—Guizzardi, Filho (2001) wwwhome.cs.utwente.nl/~guizzard/SBES2001vf.pdf Decision Support Systems from a Health Informatics Perspective—Nykanen (2000) acta.uta.fi/pdf/951-44-4897-9.pdf NetTrouble: A TTS for Network Management—Lus Santos Pedro www.dei.uc.pt/~psimoes/papers/its98.pdf Results and experience from the application of a common.—Antonis Bouras. (1998) ru6.cti.gr/Publications/318.pdf The Information and Communication Technologies In Education—Christos Bouras Computer ru6.cti.gr/Publications/289.pdf Internet Protocols for Synchronous Distance Learning—Ch Bouras Computer (2000) ru6.cti.gr/Publications/431.pdf The Euro in the Electronic Purse—Allard, Alyankian, Ankri, Collin. (2000) www.eurosmart.com/download/WhitePaper.pdf Monitoring Extensions for Component-Based Distributed.—Diakov, van Sinderen. (2000) amidst.ctit.utwente.nl/publications/proms2000.pdf The Q-bit Scheme—Congestion Avoidance Using (1992) gatekeeper.dec.com/pub/doc/sigcomm/ccr/archive/1992/apr92/qbit.ps.Z Performance of a Parallel Transport Subsystem Implementation—Torsten Braun Institute www.iam.unibe.ch/~braun/lit/hpcs93.ps.gz Towards Dynamic Composition of Hybrid Communication Services—Floch, Braek (2000) www.item.ntnu.no/~jacf/paper/smarnett2000.pdf Optimising the Operation of the World Wide Web in.—Hadjiefthymiades. www.cs.auc.dk/~tryfona/papers/cacher-el.ps Generating Test Cases for Infinite System Specifications—Stefan Heymer And www.itm.mu-luebeck.de/publications/GTCfISS/HeymerGrabowski.ps.gz Computational Perspectives on Discourse and Dialogue—Bonnie Lynn Webber www.dai.ed.ac.uk/daidb/people/homesbonnie/handbook.ps.gz Virtual Universities—Ebner, Hogrefe (1999) www.itm.mu-luebeck.de/publications/VFH/ebner_hogrefe_waki99.ps.gz Compensation methods to support generic graph editing: A case.—Even, Spelt wwwhome.cs.utwente.nl/~seven/ECOOPWS.pdf Towards the Generation of Distributed Test Cases Using Petri.~Heymer, Grabowski www.itm.mu-luebeck.de/publications/FBT99/fbt99.ps.gz Test Case Specification with Real-Time TTCN—Walter, Grabowski www.itm.mu-luebeck.de/publications/TCSwRTTTCN/WalterGrabowski.ps.gz Scientific Approaches and Techniques for Negotiation.—Gerding, van Bragt. www.cwi.nl/projects/TA/reports/negotiation.ps Towards an Integrated Test Methodology for Advanced.—Grabowski, Walter www.itm.mu-luebeck.de/publications/tcs99.ps.gz TTCN-3—A new Test Specification Language for Black-Box Testing.—Grabowski (2000) www.itm.mu-luebeck.de/publications/ttcn3/Grabowski.pdf.gz Test Architectures for Distributed Systems—State of the Art and.—Walter (1998) www.itm.mu-luebeck.de/publications/IWTCS98TA/IWTCS98Testarchitectures.ps.gz Asbru: A Task-Specific, Intention-Based, and.—Miksch, Shahar, Johnson ftp.ifs.tuwien.ac.at/pub/publications/mik_keml97.pdf Protocol Specifications—Written By Jacob cmc.dsv.su.se/select/SEL-prot-spec-v11-jp-991009.pdf Towards The Third Edition Of TTCN—Grabowski, Hogrefe (1999) www.itm.mu-luebeck.de/publications/iwtcs99.ps.gz A Framework for the Specification of Test Cases for.—Walter, Grabowski (1999) www.itm.mu-luebeck.de/publications/Walter-Crabowski-JIST99/jist.ps.gz Verification of Compensation Requirements for the SEPIA.—Even, Spelt (1998) wwwhome.cs.utwente.nl/~seven/CTIT-TR-98-25.pdf Cote de Resyste—Conformance Testing Reactive www-tios.cs.utwente.nl/Docs/projects/cote-de-resyste/stw.ps Long Cycles and Long Paths in the Kronecker Product of a.—Jha, Agnihotri, al. (1995) www.cs.jhu.edu/~rajesh/ps/cta.ps Tutorial on Message Sequence Charts (MSC '96)—Rudolph, Grabowski, Graubmann (1996) www.itm.mu-luebeck.de/publications/MSC96/dis-tutorial.ps.gz The Standardization of Core INAP CS-2 by ETSI—Grabowski, Hogrefe (1999) www.itm.mu-luebeck.de/publications/CS2-Standardization.ps.gz On The Design Of The New Testing Language TTCN-3—Grabowski, Wiles, Willcock. (2000) www.itm.mu-luebeck.de/publications/New_TTCN3/GrabowskiEtAll.pdf.gz omVR—A Safety Training System for a Virtual Refinery—Haller, Kurka, Volkert. www.gup.uni-linz.ac.at:8001/staff/kurka/docs/ismcr99.pdf Senior Online—Telematics De Report cmc.dsv.su.se/sol/sol-transfer-spec.pdf Formal Methods and Conformance Testing—or—What are we.—Heymer, Grabowski www.itm.mu-luebeck.de/publications/FBT98/FBT98.ps.gz A Theorem Prover-Based Analysis Tool for Object-Oriented Databases—Spelt, Even (1999) wwwhome.cs.utwente.nl/~ seven/CTIT-TR-98-22.pdf Chemistry in Action: Discovering the Behaviour of a Network.~Heymer, Grabowski (1998) www.itm.mu-luebeck.de/publications/A-98-18/Report-A-98-18.ps.gz ERP in the e-commerce era—Luttighuis, Biemans extranet.telin.nl/dscgi/ds.py/Get/File-2092/baanUSP.pdf Business-Driven Design of Transaction Services—Biemans, Janssen, Luttighuis. (1999) extranet.telin.nl/dscgi/ds.py/Get/File-664/ICE.pdf Modelling organisations—Wetering (1999) extranet.telin.nl/dscgi/ds.py/Get/File-2902/modellingV2.pdf On Wrapping Query Languages and Ecient XML Integration—Vassilis Christophides Sophie (2000) www.oasis-open.org/cover/vassilisQueryWrap.pdf MESH Release 2 implementation at CTIT—Diakov, van Sinderen, Koprinkov amidst.ctit.utwente.nl/publications/ctit_tr99-08.pdf EUROgatherer: a Personalised Gathering and Delivery.—Amato, Straccia, Thanos (2000) faure.iei.pi.cnr.it/%7Estraccia/download/papers/SCI2000/SCI2000.pdf Frameworks for protocol implementation—Barbosa, Pires, van Sinderen (1998) wwwhome.cs.utwente.nl/~sinderen/publications/sbrc98.pdf See, also U.S. Pat. No. 4,706,086 (November, 1987 Panizza 340/902), and U.S. Pat. No. 5,428,544 (June, 1995 Shyu 701/117), U.S. Pat. No. 6,473,688 (Kohno, et al., Oct. 29, 2002, Traffic information transmitting system, traffic information collecting and distributing system and traffic information collecting and distributing method), U.S. Pat. No. 6,304,758 (October, 2001, Iierbig et al., 701/117); U.S. Pat. No. 6,411,221 (January, 2002, Horber, 701/117); U.S. Pat. No. 6,384,739 (May, 2002, Robert, Jr., 701/117); U.S. Pat. No. 6,401,027 (June, 2002, Xa et al., 701/117); U.S. Pat. No. 6,411,889 (June, 2002, Mizunuma et al., 701/117), U.S. Pat. No. 6,359,571 (Endo, et al., Mar. 19, 2002, Broadcasting type information providing system and travel environment information collecting device); U.S. Pat. No. 6,338,011 (Furst, et al., Jan. 8, 2002, Method and apparatus for sharing vehicle telemetry data among a plurality of users over a communications network); U.S. Pat. No. 5,131,020 (July, 1992, Liebesny et al., 455/422); U.S. Pat. No. 5,164,904 (November, 1992, Sumner, 701/117); U.S. Pat. No. 5,539,645 (July, 1996, Mandhyan et al., 701/119); U.S. Pat. No. 5,594,779 (January, 1997, Goodman, 455/4);

U.S. Pat. No. 5,689,252 (November, 1997, Ayanoglu et al., 340/991); U.S. Pat. No. 5,699,056 (December, 1997, Yoshida, 340/905); U.S. Pat. No. 5,864,305 (January, 1999, Rosenquist, 340/905); U.S. Pat. No. 5,889,473 (March, 1999, Wicks, 340/825); U.S. Pat. No. 5,919,246 (July, 1999, Waizmann et al., 701/209); U.S. Pat. No. 5,982,298 (November, 1999, Lappenbusch et al., 340/905); U.S. Pat. No. 4,860,216 (August, 1989, Linsenmayer, 342/159); U.S. Pat. No. 5,302,955 (April, 1994, Schutte et al., 342/59); U.S. Pat. No. 5,809,437 (September, 1998, Breed, 701/29); U.S. Pat. No. 6,115,654 (September, 2000, Eid et al., 701/34); U.S. Pat. No. 6,173,159 (January, 2001, Wright et al., 455/66); and Japanese Patent Document Nos. JP 9-236650 (September, 1997); 10-84430 (March, 1998); 5-151496 (June, 1993); and 11-183184 (July, 1999), each of which is expressly incorporated herein by reference. See also: Martin E. Liggins, II, et al., "Distributed Fusion Architectures and Algorithms for Target Tracking", Proceedings of the IEEE, vol. 85, No. 1, (XP-002166088) January, 1997, pp. 95-106; D. M. Hosmer, "Data-Linked Associate Systems", 1994 IEEE International Conference on Systems, Man, and Cybernetics. Humans, Information and Technology (Cat. No. 94CH3571-5), Proceedings of IEEE International Conference on Systems, Man and Cybernetics, San Antonio, Tex., vol. 3, (XP-002166089) (1994), pp. 2075-2079.

Neural Networks References www.inference.phy.cam.ac.uk/mackay/Bayes_FAQ.html
www-2.cs.cmu.edu/Groups/AI/html/faqs/ai/neural/faq.html
www.cs.stir.ac.uk/~lss/NNIntro/InvSlides.html
dir.yahoo.com/Science/Engineering/Electrical_Engineering/Neural_Networks/
www.aist.go.jp/NIBH/~b0616/Links.html
www.creative.net.au/~adrian/mirrors/neural/
www.fi.uib.no/Fysisk/Teori/NEURO/neurons.html
aass.oru.se/~tdt/ann/faq/FAQ.html
www.cis.hut.fi/~jari/research.html
www.eg3.com/WebID/elect/neur~net/blank/overview/a-z.htm
directory.google.com/Top/Computers/Artificial_Intelligence/Neural_Networks/
directory.google.com/Top/Computers/Artificial_Intelligence/Neural_Networks/FAQs,_Help,_and_Tutorials/
dmoz.org/Computers/Artificial_Intelligence/Neural_Networks/
dmoz.org/Computers/Artificial_Intelligence/Neural_Networks/FAQs,_Help,_and_Tutorials/
www.cs.qub.ac.uk/~J.Campbell/myweb/book/nn.html
www.cere.pa.cnr.it/IDAschool/lectures/neural.html
cognet.mit.edu/MITECS/Entry/jordan2
www.faqs.org/faqs/ai-faq/neural-nets/part1/preamble.html
zhanshou.hypermart.net/thesis.htm
www.links999.net/hardware/neural.html
www-ra.informatik.uni-tuebingen.de/links/neuronal/welcome_e.html
www.cogneuro.ox.ac.uk/links/ann.html
faculty.cs.tamu.edu/choe/resources/
www.galaxy.com/galaxy/Engineering-and-Technology/Electrical-Engineering/Neural-Networks/
mu.dmt.ibaraki.ac.jp/yanai/neu/faq/
bubl.ac.uk/link/n/neuralnetworks.htm
www.webopedia.com/TERM/n/neural_network.html
www.ie.ncsu.edu/fangroup/neural.dir/indexneural.html
www.geneticprogramming.com/AI/nn.html
www.cs.utk.edu/~yarkhan/neural_networks.html
www.physiol.ox.ac.uk/~ket/nn.html
www.aaai.org/AITopics/html/neural.html
www.inference.phy.cam.ac.uk/mackay/itprnn/book.html
www.hh.se/staff/nicholas/NN_Links.html
xpidea.com/products/neurovcl/neuroabout.htm
www.msm.ele.tue.nl/research/neural/
homepages.goldsmiths.ac.uk/nikolaev/Nnets.htm
www.triumf.ca/project ETA/neural_network.html
personal.bgsu.edu/~suny/nn.html
www.icmc.sc.usp.br/~andre/ann_links.html
www.stud.ntnu.no/~hirpa/links/AI_links.htm
it.umary.edu/Library/research/www_subjects/neural_networks.html
cindy.cis.nctu.edu.tw/NN/NN5/www.html
www.public.iastate.edu/~acl/links/links.html
www.cs.cf.ac.uk/User/O.F.Rana/neural.html
www.cs.unr.edu/~bebis/CS791S/
www.geocities.com/fastiland/NNwww.html
cns-web.bu.edu/pub/snorrason/bookmarks/neural.html
www.open.brain.riken.go.jp/~cao/index_work.html
svr-www.eng.cam.ac.uk/research/neural/other_neural_net_sites.html R. O. Duda and P. E. Hart. Pattern Classication and Scene Analysis. Wiley, New York, 1973.

S. Ripley, "Pattern Recognition and Neural Networks", Statistics, 33, 1065-1076. Ripley, B. D., 1996: Pattern Recognition and Neural Networks. Cambridge: University Press., 1996, citeseer.ist.psu.edu/ripley96complements.html, and cited references:

Aha, D. W., Kibler, D. & Albert, M. K. (1991) Instance-based learning algorithms. Machine Learning 6(1), 37-66.

Ali, K. M. & Pazzani, M. J. (1995) On the link between error correlation and error reduction in decision tree ensembles. Technical Report 95-38, Department of Information and Computer Science, University of California at Irvine.

Almond, R. G. (1995) Graphical Belief Modeling. London: Chapman & Hall. ISBN 0-412-06661-0. [Despite the date, this book was actually published in May 1996].

Angluin, D. & Valiant, L. G. (1979) Fast probabilistic algorithms for Hamiltonian circuits and matchings. Journal of Computer and System Sciences 18, 155-193.

Anthony, M. & Shawe-Taylor, J. (1993) A result of Vapnik with applications. Discrete Applied Mathematics 47, 207-217. [Erratum (1994) 52, 211 (the proof of theorem 2.1 is corrected)].

Arbib, M. A. (ed.) (1995) The Handbook of Brain Theory and Neural Networks. Cambridge, Mass.: MIT Press. ISBN 0-262-01148-4.

Atkeson, C. G. (1991) Using locally weighted regression for robot learning. In Proceedings of the IEEE Conference on Robotics and Automation (Sacremento, Calif., 1991), pp. 958-963. IEEE Press.

Auer, P., Holte, R. C. & Maass, W. (1995) Theory and application of agnostic PAC-learning with small decision trees. In Proceedings of the Twelfth International Conference on Machine Learning, pp. 21-29. San Francisco: Morgan Kaufmann. Also NeuroCOLT Technical Report NC-TR-96-034 (February 1996).

Bartlett, P. L. & Williamson, R. C. (1996) The VC dimension and pseudodimension of two-layer neural networks with discrete inputs. Neural Computation 8(3), 625-628.

Benveniste, A., M'etivier, M. & Priouret, P. (1990) Adaptive Algorithms and Stochastic Approximations. Berlin: Springer.

Bratko, I. & Muggleton, S. (1995) Applications of inductive logic programming. Communications of the Association for Computing Machinery 38(11), 65-70.

Breiman, L. (1994) Bagging predictors. Technical Report 421, Department of Statistics, University of California at Berkeley.

Breiman, L. (1996a) Bagging predictors. Machine Learning.

Breiman, L. (1996b) The heuristics of instability in model selection. Annals of Statistics.

Breiman, L. (1996c) Bias, variance and arcing classifiers. Technical report, Department of Statistics, University of California at Berkeley.

Brodley, C. E. & Utgoff, P. E. (1995) Multivariate decision trees. Machine Learning 19, 45-77.

Buntine, W. & Niblett, T. (1992) A further comparison of splitting rules for decision-tree induction. Machine Learning 8, 75-86.

Burnell, L. & Horvitz, E. (1995) Structure and chance: Melding logic and probability for software debugging. Communications of the ACM 38(3), 31-41, 57.

Catlett, J. (1991) On changing continuous attributes into ordered discrete attributes. In Proceedings of the European Working Session on Learning—EWSL-91, ed. Y. Kodratoff, pp. 164-178. Berlin: Springer.

Cesa-Bianchi, M., Freund, Y., Helmbold, D. P., Haussler, D., Schapire, R. E. & Warmuth, M. K. (1993) How to use expert advice. In Proceedings of the Twenth-Fifth ACM Symposium on the Theory of Computing (San Diego, Calif., 1993), pp. 382-391. New York: ACM Press.

Cesa-Bianchi, M., Freund, Y., Helmbold, D. P., Haussler, D., Schapire, R. E. & Warmuth, M. K. (1996) How to use expert advice. Journal of the ACM.

Cortes, C. & Vapnik, V. (1995) Support-vector networks. Machine Learning 20, 273-297.

Cost, S. & Salzberg, S. (1993) A weighted nearest neighbor algorithm for learning with symbolic features. Machine Learning 10, 57-78.

Cover, T. M. (1968) Capacity problems for linear machines. In Pattern Recognition, ed. L. Kanal, pp. 283-289. Thompson.

Craven, M. W. & Shavlik, J. W. (1996) Extracting tree-structured representations of trained networks. In Touretzky et al. (1996), pp. 24-30. ISBN 0-262-20107-0.

Dasarathy, B. V. (ed.) (1991) Nearest Neighbor (NN) Norms: NN Pattern Classification Techniques. Los Alamitos, Calif.: IEEE Computer Society Press.

Dougherty, J., Kohavi, R. & Sahami, M. (1995) Supervised and unsupervised discretization of continuous features. In Proceedings of the Twelfth International Conference on Machine Learning, eds A. Prieditis & S. Russell, pp. 194-202. San Francisco: Morgan Kaufmann.

Drucker, H. (1996) Fast decision tree ensembles for optical character recognition. In Proceedings of the Fifth Annual Symposium on Document Analysis and Information Retrival.

Drucker, H. & Cortes, C. (1996) Boosting decision trees. In Touretzky et al. (1996), pp. 479-485. ISBN 0-262-20107-0.

Drucker, H., Schapire, R. & Simard, P. (1993) Boosting performance in neural networks. International Journal of Pattern Recognition and Artificial Intelligence 7(4), 705-719.

Drucker, H., Cortes, C., Jaeckel, L. D., LeCun, Y. & Vapnik, V. (1994) Boosting and other ensemble methods. Neural Computation 6(6), 1289-1301.

Edwards, D. (1995) Introduction to Graphical Modelling. Springer.

Elomaa, T. & Rousu, J. (1996) Finding optimal multi-splits for numerical attributes in decision tree learning. NeuroCOLT Technical Report Series NC-TR-96-041, Department of Computer Science, University of Helsinki.

Fayyad, U. M. & Irani, K. B. (1993) Multi-interval discretization of continuous-valued attributes in decision tree generation. In Proceedings of the Thirteenth International Joint Conference on Artificial Intelligence (Chambery, France, 1993), pp. 1022-1027. San Francisco: Morgan Kaufmann.

Freund, Y. (1990) Boosting a weak learning algorithm by majority. In Proceedings of the Third Workshop on Computational Learning Theory, pp. 202-216. Morgan Kaufmann.

Freund, Y. (1995) Boosting a weak learning algorithm by majority. Information and Computation 121(2), 256-285.

Freund, Y. & Schapire, R. E. (1995) A decision-theoretic generalization of on-line learning and an application to boosting. In Proceedings of the Second European Conference on Computational Learning Theory, pp. 23-37. Springer.

Freund, Y. & Schapire, R. E. (1996a) Game theory, on-line prediction and boosting. In Proceedings of the Ninth Annual Conference on Computational Learning Theory.

Freund, Y. & Schapire, R. E. (1996b) Experiments with a new boosting algorithm. In Proceedings of the Thirteenth International Conference on Machine Learning.

Friedman, J. H. (1994) Flexible metric nearest neighbor classification. Technical report, Department of Statistics, Stanford University.

Fukunaga, K. & Flick, T. E. (1984) An optimal global nearest neighbor metric. IEEE Transactions on Pattern Analysis and Machine Intelligence 6, 314-318. [Reprinted in Dasarathy (1991)].

Fulton, T., Kasif, S. & Salzberg, S. (1995) Efficient algorithms for finding multi-way splits for decision trees. In Proceedings of the Twelfth International Conference on Machine Learning, eds A. Prieditis & S. Russell, pp. 244-251. San Francisco: Morgan Kaufmann.

Fung, R. & Del Favarro, B. (1995) Applying Bayesian networks to information retrieval. Communications of the ACM 38(3), 42-48, 57.

Hampson, S. E. & Volper, D. J. (1986) Linear function neurons: structure and training. Biological Cybernetics.

Hastie, T. & Tibshirani, R. (1996a) Discriminant adaptive nearest neighbor classification and regression. In Touretzky et al. (1996), pp. 409-415. ISBN 0-262-20107-0.

Hastie, T. & Tibshirani, R. (1996b) Discriminant adaptive nearest neighbor classification. IEEE Transactions on Pattern Analysis and Machine Intelligence 18, 607-618.

Heath, D., Kasif, S. & Salzberg, S. (1993) Learning oblique decision trees. In Proceedings of the Thirteenth International Joint Conference on Artificial Intelligence (Chambery, France, 1993), pp. 1002-1007. San Francisco: Morgan Kaufmann.

Heckerman, D. & Wellman, M. P. (1995) Bayesian networks. Communications of the ACM 38(3), 26-30.

Heckerman, D., Breese, J. S. & Rommelse, K. (1995) Decision-theoretic troubleshooting. Communications of the ACM 38(3), 49-57.

Helmbold, D. P. & Schapire, R. E. (1995) Predicting nearly as well as the best pruning of a decision tree. In Proceedings of the Eight Annual Conference on Computational Learning Theory, pp. 61-68. New York: ACM Press.

Helmbold, D. P. & Schapire, R. E. (1996) Predicting nearly as well as the best pruning of a decision tree. Machine Learning.

Ho, T. K. (1995) Random decision forests. In Proceedings of the Third International Conference on Document Analysis and Recognition, pp. 278-282. IEEE Computer Society Press.

Hochreiter, S. & Schmidhuber, J. (1995) Simplifying neural nets by discovering flat minima. In Tesauro et al. (1995), pp. 529-536. ISBN 0-262-20104-6.

Hochreiter, S. & Schmidhuber, J. (1996) Flat minima. Neural Computation.

Holte, R. C. (1993) Very simple classification rules perform well on most commonly used datasets. Machine Learning 11, 63-91.

Hoffgen, K.-U., Simon, H.-U. & Van Horn, K. S. (1995) Robust trainability of single neurons. Journal of Computer and System Sciences 50(1), 114-125.

Karpinski, M. & Macintyre, A. (1995a) Bounding VC-dimension of neural networks: Progress and prospects. In Proceedings of the Second European Conference on Computational Learning Theory (Barcelona, Spain), ed. P. Vitanyi, number 904 in Lecture Notes in Artificial Intelligence, pp. 337-341. Berlin: Springer.

Karpinski, M. & Macintyre, A. (1995b) Polynomial bounds for VC dimension of sigmoidal neural networks. In Proceedings of the Twenty-Seventh Annual ACM Symposium on Theory of Computing (Las Vegas), pp. 200-208. ACM Press.

Koiran, P. & Sontag, E. D. (1996) Neural networks with quadratic VC dimension. In Touretzky et al. (1996), pp. 197-203. ISBN 0-262-20107-0.

Kooperberg, C., Bose, S. & Stone, C. J. (1996) Polychotomous regression. Journal of the American Statistical Association.

Krogh, A. & Vedelsby, J. (1995) Neural network ensembles, cross validation, and active learning. In Tesauro et al. (1995), pp. 231-238. ISBN 0-262-20104-6.

Langley, P. (1996) Elements of Machine Learning. San Francisco: Morgan Kaufmann.

Langley, P. & Simon, H. A. (1995) Applications of machine learning and rule induction. Communications of the ACM 38(11), 54-64.

Lauritzen, S. L. (1996) Graphical Models. Oxford: Clarendon Press. ISBN 0-19-852219-3.

Ljung, L., Pflug, H. & Walk, H. (1992) Stochastic Approximation and Optimization of Random Systems. Berlin: Birkhauser.

Lowe, D. G. (1995) Similarity metric learning for a variable-kernel classifier. Neural Computation 7(1), 72-85.

Maass, W. & Tur'an, G. (1994) How fast can a threshold gate learn? In Computational Learning Theory and Natural Learning Systems: Constraints and Prospects, eds S. J. Hanson, G. A. Drastal & R. L. Rivest, volume I, pp. 381-414. MIT Press.

Marchand, M., Golea, M. & Rujan, P. (1990) A convergence theorm for sequential learning in two-layer perceptrons. Europhysics Letters 11, 487-492.

Muroga, S. (1965) Lower bounds of the number of threshold functions and a maximum weight. IEEE Transactions on Electronic Computers 14, 136-148.

Muroga, S., Toda, I. & Takasu, S. (1961) Theory of majority decision elements. Journal of the Franklin Institute 271, 376-418.

Murthy, S. K., Kasif, S., Salzberg, S. & Beigel, R. (1993) OC1: randomized induction of oblique decision tress. In Proceedings of the Eleventh National Conference on Artificial Intelligence (Washington, D.C., 1993), pp. 322-327. AAAI Press. ISBN 0-262-51071-5.

Murthy, S. K., Kasif, S. & Salzberg, S. (1994) A system for the induction of oblique decision trees. Journal of Artificial Intelligence Research 2, 1-33.

Oliver, J. J. & Hand, D. J. (1995) On pruning and averaging decision trees. In Machine Learning: Proceedings of the Twelfth International Conference, pp. 430-437. Morgan Kaufmann.

Parberry, I. (1994) Circuit Complexity and Neural Networks. Cambridge, Mass.: MIT Press. ISBN 0-262-16148-6.

Parrondo, J. M. R. & Van der Broeck, C. (1993) Vapnik-Chervonenkis bounds for generalization. J. Phys. A 26, 2211-2223.

Przytula, K. W. & Prasanna, V. K. (1993) Parallel Digital Implementation of Neural Networks. Englewood Cliffs, N.J.: Prentice Hall.

Quinlan, J. R. (1996a) Bagging, boosting, and C4.5. In Proceedings of the Fourteenth National Conference on Artificial Intelligence. Menlo Park, Calif.: AAAI Press.

Quinlan, J. R. (1996b) Improved use of continuous attributes in C4.5. Journal of Artificial Intelligence Research 4, 77-90.

Rachlin, J., Kasif, S., Salzberg, S. & Aha, D. (1994) Towards a better understanding of memory-based and Bayesian classifiers. In Proceedings of the Eleventh International Conference on Machine Learning (New Brunswick, N.J.), pp. 242-250.

Sakurai, A. (1993) Tighter bounds of the VC-dimension of three-layer networks. In Proceedings of the 1993 World Congress on Neural Networks, volume 3, pp. 540-543. Hillsdale, N.J.: Erlbaum.

Schapire, R. E. (1990) The strength of weak learnability. Machine Learning 5(2), 197-227.

Shafer, G. (1996) Probabilistic Expert Systems. Number 67 in CBMS-NSF Regional Conference Series in Applied Mathematics. Philadelphia, Pa.: SIAM. ISBN 0-89871-373-0.

Shlien, S. (1990) Multiple binary decision tree classifiers. Pattern Recognition 23(7), 757-763.

Short, R. D. & Fukunaga, K. (1980) A new nearest neighbor distance measure. In Proceedings of the Fifth IEEE International Conference on Pattern Recognition (Miami Beach, 1980), pp. 81-86. Los Alamitos, Calif.: IEEE Computer Society Press.

Short, R. D. & Fukunaga, K. (1981) The optimal distance measure for nearest neighbor classification. IEEE Transactions on Information Theory 27, 622-627. [Reprinted in Dasarathy (1991)].

Stone, C. J., Hansen, M., Kooperberg, C. & Truong, Y. K. (1997) Polynomial splines and their tensor products in extended linear modeling. Annals of Statistics.

Tesauro, G., Touretzky, D. S. & Leen, T. K. (eds) (1995) Advances in Neural Information Processing Systems 7. Proceedings of the 1994 Conference. Cambridge, Mass.: MIT Press. ISBN 0-262-20104-6.

Touretzky, D. S., Moser, M. C. & Hasselmo, M. E. (eds) (1996) Advances in Neural Information Processing Systems 8. Proceedings of the 1995 Conference. Cambridge, Mass.: MIT Press. ISBN 0-262-20107-0.

Utgoff, P. E. (1989) Perceptron trees: a case study in hybrid concept representations. Connection Science 1(4), 377-391.

Valentin, D., Abdi, H., O'Toole, A. J. & Cottrell, G. (1994) Connectionist models of face processing: A survey. Pattern Recognition 27, 1208-1230.

Vapnik, V. N. (1995) The Nature of Statistical Learning Theory. New York: Springer.

Vapnik, V. N. (1996) Statistical Learning Theory. New York: Wiley.

Wahba, G., Wang, Y., Gu, C., Klein, R. & Klein, B. (1996) Smoothing spline anova for exponential families, with application to the wisconsin epidemiological study of diabetic retinopathy. Annals of Statistics 23(6), 1865-1895.

Waltz, D. (1990) Memory-based reasoning. In Natural and Artificial Parallel Computation, eds M. Arbib & J. Robinson, pp. 251-276. Cambridge, Mass.: MIT Press.

Wang, L. & Oja, E. (1993) Image compression by MLP and PCA neural networks. In Proceedings of the Eight Scandinavian Conference on Image Analysis (Tromso, Norway), pp. 1317-1324.

Werbos, P. (1987) Learning how the world works. In Proceedings of the IEEE Conference on Systems, Man and Cybernetics, pp. 320-310. New York: IEEE Press.

Werbos, P. J. (1995) Backpropagation: Basics and new developments. pp. 134-139 of Arbib (1995).

Willems, F. M. J., Shtarkov, Y. M. & Tjalkens, T. J. (1993) Context tree weighting: A sequential universal source coding procedure for FSMX sources. In Proceedings of the 1993 IEEE International Symposium on Information Theory, p. 59. IEEE Press.

Willems, F. M. J., Shtarkov, Y. M. & Tjalkens, T. J. (1995) The context-tree weighting method: Basic properties. IEEE Transactions on Information Theory pp. 653-664.

Wavelets References

Introductions to Wavelets

G. Kaiser, "A Friendly Guide to Wavelets"

C. S. Burrus and R. A. Gopinath, "A Tutorial Overview of Wavelets, Filter Banks and Interrelationships"

R. A. DeVore and B. J. Lucier, "Wavelets"

T. Edwards, "Discrete Wavelet Transforms: Theory and Application."

E. Gootman and M. Wickerhauser, "Elementary Wavelets."

A. Graps, "An Introduction To Wavelets."

C. Heil and D. Walnut, "Continuous and Discrete Wavelet Transforms."

B. Jawerth and W. Sweldens, "An Overview of Wavelet Based Multiresolution Analysis". An abstract is also available.

J. Lewalle, "Tutorial on Wavelet Analysis of Experimental Data"

P. Schröder and W. Sweldens, "Building Your Own Wavelets at Home." An abstract is also available.

G. Strang, "Wavelets."

G. Strang "Wavelets and dilation equations: a brief introduction."

C. Torrence and G. P. Compo, "A Practical Guide to Wavelet Analysis, with Significance and Confidence Testing."

B. Vidakovic, "Wavelets for Kids," also part 2.

E. Tolkova, "Orthogonal Wavelets Construction."

Y. Meyer, Wavelets: Algorithms and Applications, Society for Industrial and Applied Mathematics, Philadelphia, 1993, pp. 13-31, 101-105.

G. Kaiser, A Friendly Guide to Wavelets, Birkhauser, Boston, 1994, pp. 44-45.

General Theory

L. Andersson, N. Hall, B. Jawerth and G. Peters, "Wavelets on Closed Subsets of the Real Line"

P. Auscher, G. Weiss and M. V. Wickerhauser, "Local Sine and Cosine Bases of Coifman and Meyer and the Construction of Smooth Wavelets"

C. Basdevant and V. Perrier, "Besov Norms in Terms of Continuous Wavelet Transforms and Application to Structure Functions."

B. E. Bassil, G. J. Dickson and D. M. Monro, "Orthonormal Wavelets With Balanced Uncertainty".

G. Beylkin and N. Saito, "Multiresolution Representations using the Autocorrelation Functions of Compactly Supported Wavelets."

G. Beylkin and N. Saito, "Wavelets, their Autocorrelation Functions and Multiresolution Analysis of Signals."

G. Beylkin and B. Torrésani, "Implementation of Operators via Filter Banks, Autocorrelation Shell and Hardy Wavelets."

A. G. Bruce, H. Gao and D. Ragozin, "Non-smooth Wavelets: Graphing Functions Unbounded on Every Interval."

C. Cabrelli, C. Heil, and U. Molter, "Accuracy of Lattice Translates of Several Multidimensional Refinable Functions."

R. C. Calderbank, I. Daubechies, W. Sweldens and B. Yeo "Wavelet Transforms that Map Integers to Integers." There is also an uncompressed version.

D. Chen, "Extended Families of Cardinal Spline Wavelets."

D. Chen, "Spline Wavelets of Small Support."

D. Chen, "Characterization of Biorthogonal Cardinal Spline Wavelet Bases."

D. Chen, "Cardinal Spline Wavelets", dissertation. Also part 2, part 3, part 4, part 5 and part 6.

S. Chen and D. Donoho, "Atomic Decomposition by Basis Pursuit."

A. Cohen, W. Dahmen and R. DeVore, "Multiscale Decompositions on Bounded Domains."

J. Cohen, "The Foot Problem in Wavelet Packet Splitting." A Mathematica notebook converted to Postscript.

J. Cohen, "Schauder Basis for [0,1]". A Mathematica notebook converted to Postscript.

J. Cohen, "The Littlewood-Paley-Stein Wavelet." A Mathematica notebook converted to Postscript.

J. Cohen, "Battle-Lemarie Wavelets." A Mathematica notebook converted to Postscript.

J. Cohen, "The Daubechies Minimum Phase Wavelets." A Mathematica notebook converted to Postscript.

J. Cohen, "Meyer Wavelets." A Mathematica notebook converted to Postscript.

R. Coifman and M. V. Wickerhauser, "Entropy-Based Algorithms for Best Basis Selection"

R. Coifman and M. Wickerhauser, "Best-adapted Wave Packet Bases."

R. Coifman, "Numerical Harmonic Analysis."

R. Coifman, Y. Meyer and M. Wickerhauser, "Size Properties of Wavelets Packets."

R. Coifman and Y. Meyer, "Orthonormal Wave Packet Bases."

R. Coifman and M. V. Wickerhauser, "Wavelets and Adapted Waveform Analysis"

R. Coifman, Y. Meyer and M. Wickerhauser, "Adapted Wave Form Analysis, Wavelet Packets and Applications."

D. Colella and C. Heil, "Matrix Refinement Equations: Existence and Accuracy."

S. Dahlke, W. Dahmen, E. Schmitt and I. Weinreich, "Multiresolution Analysis and Wavelets on $S^2$ and $S^3$."

W. Dahmen, "Stability of Multiscale Transformations."

W. Dahmen and C. A. Micchelli, "Biorthogonal Wavelet Expansions."

G. Davis, S. Mallat and Z. Zhang, "Adaptive Nonlinear Approximations."

G. Davis, "Adaptive Nonlinear Approximations."

G. Davis, S. Mallat and Z. Zhang, "Adaptive Time-Frequency Approximations with Matching Pursuits."

I. Daubechies and W. Sweldens, An abstract is also available.

C. deBoor, R. DeVore and R. Amos, "On the Construction of Multivariate (Pre)Wavelets."

R. L. deQueiroz, "On Lapped Transforms."

M. Girardi and W. Sweldens, "A New Class of Unbalanced Haar Wavelets That Form an Unconditional Basis for Lp on General Measure Spaces." An abstract is also available.

S. Haykin and S. Mann, "The Chirplet Transform: A New Signal Analysis Technique Based on Affine Relationships in the Time-Frequency Plane." This about 3.5 MB.

C. Heil, G. Strang and V. Strela, "Approximation By Translates of Refinable Functions."

C. Heil and G. Strang, "Continuity of the Joint Spectral Radius: Application to Wavelets."

B. Jawerth and W. Sweldens, "Biorthogonal Smooth Local Trigonometric Bases." An abstract is also available.

B. Jawerth and W. Sweldens, "Weighted Multiwavelets on General Domains."

M. K. Kwong and P. T. Peter Tang, "W-Matrices, Nonorthogonal Multiresolution Analysis and Finite Signals of Arbitrary Length."

G. Leaf, J. M. Restrepo and G. Schlossnagle, "Periodized Daubechies Wavelets."

J. Lippus, "Wavelet Coefficients of Functions of Generalized Lipschitz Classes."

S. Mallat and Z. Zhang, "Matching Pursuit with Time-Frequency Dictionaries."

E. J. McCoy, D. B. Percival and A. T. Walden, "On the Phase of Least-Asymmetric Scaling and Wavelet Filters."

R. Piessens and W. Sweldens, "Wavelet Sampling Techniques." An abstract is also available.

J. Shen and G. Strang, "The zeros of the Daubechies polynomials."

J. Shen and G. Strang, "Asymptotics of Daubechies Filters, Scaling Functions and Wavelets."

M. J. Shensa, "An Inverse DWT for Nonorthogonal Wavelets"

W. Sweldens, "Compactly Supported Wavelets which are Biorthogonal to a Weighted Inner Product." An abstract is also available.

W. Sweldens, "The Lifting Scheme: A Custom-Design Construction of Biorthogonal Wavelets." An abstract is also available.

W. Sweldens, "The Lifting Scheme: A Construction of Second Generation Wavelets." An abstract is also available.

B. Suter and X. Xia, "Vector Valued Wavelets and Vector Filter Banks."

C. Taswell, "Wavelet Transform Algorithms for Finite Duration Discrete-Time Signals."

C. Taswell, "Near-Best Basis Selection Algorithms with Non-Additive Information Cost Functions."

K. Urban, "On Divergence-Free Wavelets."

R. O. Wells Jr., "Recent Advances in Wavelet Technology"

M. V. Wickerhauser, "Entropy of a Vector Relative to a Decomposition."

M. V. Wickerhauser, "Lectures on Wavelet Packet Algorithms"

M. V. Wickerhauser, "Smooth Localized Orthonormal Bases"

C. Zarowski, "Notes on Orthogonal Wavelets and Wavelet Packets"

V. Zavadsky, "Multiresolution Approximations of Banach Spaces."

V. Zavadsky, "Wavelet Approximation of Sampled Functions."

B. G. Sherlock and D. M. Monro, "On the Space of Orthonormal Wavelets."

M. Vetterli and C. Herley, "Wavelets and Filter Banks: Theory and Design," IEEE Transactions on Signal Processing, Vol. 40, 1992, pp. 2207-2232.

Frame Decompositions

J. Benedetto, C. Heil, and D. Walnut, "Differentiation and the Balian-Low Theorem."

O. Christensen and C. Heil, "Perturbations of Banach Frames and Atomic Decompositions."

D. M. Healy, Jr. and S. Li, "On Pseudo Frame Decompositions and Discrete Gabor Expansions."

S. Li, "General Frame Decompositions, Pseudo-Duals and Applications for Weyl-Heisenberg Frames."

S. Li, "On Dimension Invariance of Discrete Gabor Expansions."

M-Band Wavelets and Filter Banks

C. S. Burrus and R. A. Gopinath, "On the Correlation Structure of Multiplicity M Scaling Functions"

C. S. Burrus and R. A. Gopinath, "Wavelets and Filter Banks"

C. S. Burrus and R. A. Gopinath, "Unitary FIR Filter Banks and Symmetry"

C. S. Burrus and R. A. Gopinath, "Theory of Modulated Filter Banks and Modulated Wavelet Tight Frames"

C. S. Burrus and R. A. Gopinath, "Factorization Approach to Time-Varying Unitary Filter Bank Trees and Wavelets"

C. Herley, "Boundary Filters for Finite-Length Signals and Time-Varying Filter Banks."

P. Steffen, P. Heller, R. A. Gopinath and C. S. Burrus, "The Theory of Regular M-Band Wavelets"

Wavelets and General Signal Processing

M. Vetterli and J. Kovacevic, "Wavelets and Subband Coding", Prentice Hall, 1995.

D. E. Ashpis and J. Lewalle, "Transport in bypass transition: mapping the active time scales using wavelet techniques"

D. E. Ashpis and J. Lewalle, "Demonstration of wavelet techniques in the spectral analysis of bypass transition data"

C. Basdevant, V. Perrier and T. Philipovitch, "Wavelet Spectra Compared to Fourier Spectra."

J. P. Bonnet, J. Lewalle and M. N. Glauser, "Coherent Structures: Past, Present and Future."

G. Buresti, J. Lewalle & P. Petagna, "Wavelet statistics and the near-field structure of coaxial jets"

C. S. Burrus and R. A. Gopinath, "Wavelet-Based Lowpass/Bandpass Interpolation"

C. S. Burrus, R. A. Gopinath and J. E. Odegard, "Design of Linear Phase Cosine Modulated Filter Banks for Subband Image Compression"

S. Cabrera, V. Krienovich and O. Sirisaengtaksin, "Wavelets Compress Better Than All Other Methods: A 1-D Theorem."

S. Cabrera, V. Krienovich and O. Sirisaengtaksin, "Wavelet Nerual Networks are Optimal Approximators for Functions of One Variable."

R. Carmona, W. L. Hwang and B. Torresani, "Characterization of Signals by the Ridges of Their Wavelet Transforms."

R. Carmona, W. L. Hwang and B. Torresani, "Multi-Ridge Detection and Time-Frequency Reconstruction."

R. Coifman, "Adapted Multiresolution Analysis, Computation, Signal Processing and Operator Theory"

R. Coifman, Y. Meyer, S. Quake and M. Wickerhauser, "Signal Processing and Compression with Wave Packets."

R. Coifman, Y. Meyer and M. V. Wickerhauser, "Wavelet Analysis and Signal Processing"

P. Crane, H. Higuchi and J. Lewalle, "On the structure of two-dimensional wakes behind a pair of flat plates"

M. Goldburg, "Applications of Wavelets to Quantization and Random Process Representations." About 1.1 MB.

D. M. Healy, Jr., J. Lu and J. B. Weaver, "Signal Recovery and Wavelet Reproducing Kernels."

D. M. Healy, Jr., J. Lu, J. B. Weaver and Y. Xu, "Noise Reduction With Multiscale Edge Representation and Perceptual Criteria."

D. M. Healy, Jr. and J. Lu, "Contrast Enhancement via Multiscale Gradient Transformations."

W. Hwang and S. Mallat, "Singularity Detection and Processing with Wavelets."

B Jawerth, Y. Liu and W. Sweldens, "Signal Compression with Smooth Local Trigonometric Bases." An abstract is also available.

M. M. Lankhorst and M. D. van der Laan, "Wavelet-Based Signal Approximation with Genetic Algorithms."

J. Lewalle, K. Read and M. T. Schobeiri, "Effect of unsteady wake-passing frequency on boundary layer transition—experimental investigation and wavelet analysis"

J. Lewalle, S. J. Murphy and F. W. Peek, "Wavelet analysis of olfactory nerve response to stimulus"

J. Lewalle, "Wavelet analysis of experimental data: some methods and the underlying physics"

G. Strang, "Eigenvalues of (!2)H and convergence of the cascade algorithm."

G. Strang, "Creating and comparing wavelets."

A. R. Tate, "Pattern Recognition Analysis of in vivo Magnetic Resonance Spectra"

D. Donoho, "Nonlinear Wavelet Methods for Recovery of Signals, Densities, and Spectra from Indirect and Noisy Data," Different Perspectives on Wavelets, Proceeding of Symposia in Applied Mathematics, Vol 47, 1. Daubechies ed. Amer. Math. Soc., Providence, R.I., 1993, pp. 173-205.

Wavelets and Image Processing

E. Adelson and E. Simoncelli, "Subband Image Coding with Three-tap Pyramids."

E. H. Adelson, W. T. Freeman, D. J. Heeger and E. P. Simoncelli, "Shiftable Multi-Scale Transforms."

E. H. Adelson and E. P. Simoncelli, "Subband Transforms."

V. R. Algazi, R. R. Estes and J. Lu, "Comparison of wavelet image coders using the Picture Quality Scale (PQS)."

M. Bhatia, W. C. Karl, and A. S. Willsky, "A Wavelet-Based Method for Multiscale Tomographic Reconstruction."

M. Bhatia, W. C. Karl, and A. S. Willsky, "Using Natural Wavelet Bases and Multiscale Stochastic Models for Tomographic Reconstruction."

M. Louys, J. L. Starck, S. Mei, F. Bonnarel, and F. Murtagh, "Astronomical Image Compression."

M. Louys, J. L. Starck and F. Murtagh, "Lossless Compression of Astronomical Images."

F. Murtagh and J. L. Starck, "Wavelets and Multiscale Transforms in Massive Data Sets."

F. Murtagh and J. L. Starck, "Image Processing through Multiscale Analysis and Measurement Noise Modeling."

J. L. Starck and F. Murtagh, "Multiscale Entropy Filtering."

J. L. Starck and F. Murtagh, "Image Filtering by Combining Multiple Vision Models".

F. Murtagh, "Wedding the Wavelet Transform and Multivariate Data Analysis."

F. Murtagh and J. L. Starck, "Pattern Clustering based on Noise Modeling in Wavelet Space."

G. Zheng, J. L. Starck, J. G. Campbell and F. Murtagh, "Multiscale Transforms for Filtering Financial Data Streams."

M. Morehart, F. Murtagh and J. L. Starck, "Multiresolution Spatial Analysis."

F. Murtagh, J. L. Starck and M. W. Berry, "Overcoming the Curse of Dimensionality in Clustering by means of the Wavelet Transform."

R. A. Carmona, R. D. Frostig and W. L. Hwang, "Wavelet Analysis for Brain Function Imaging."

A. Chambolle, R. A. DeVore, N. Lee, and B. J. Lucier, "Nonlinear Wavelet Image Processing: Variational Problems, Compression, and Noise Removal through Wavelet Shrinkage."

H. Chao and P. Fisher, "An Approach of Fast Integer Reversible Wavelet Transforms for Image Compression."

R. A. DeVore and B. J. Lucier, "Fast Wavelet Techniques for Near-Optimal Image Processing"

B. Deng, B. D. Jawerth, G. Peters and W. Sweldens, "Wavelet Probing for Compression Based Segmentation". An abstract is also available.

J. Fan and A. Laine, "An Adaptive Approach for Texture Segmentation by Multi-Channel Wavelet Frames".

W. T. Freeman and E. P. Simoncelli, "The Steerable Pyramid: A Flexible Architecture for Multi-Scale Derivative Computation."/C Source Code (75k)

A. Grzeszczak, M. K. Mandal, S. Panchanathan and T. Yeap, "VLSI Implementation of Discrete Wavelet Transform."

O. Guleryuz, M. T. Orchard and Z. Xiong, "A DCT-based Embedded Image Coder."

D. M. Healy, Jr., J. Lu and J. B. Weaver, "Contrast Enhancement of Medical Images Using Multiscale Edge Representation."

C. Heil, P. N. Heller, G. Strang, V. Strela, and P. Topiwala, "Accuracy of Lattice Translates of Several Multidimensional Refinable Functions."

C. Herley, M. T. Orchard, K. Ramchandran and Z. Xiong, "Flexible Tree-structured Signal Expansions for Compression Using Time-Varying Filter Banks."

M. L. Hilton, B. D. Jawerth and A. Sengupta, "/Compressing Still and Moving Images with Wavelets" with figure.

P. Kovesi, "Image Features from Phase Congruency"

B. Lin, "Wavelet Phase Filter for Denoising Tomographic Image Reconstruction"

M. K. Mandal, T. Aboulnasr and S. Panchanathan, "Image Indexing Using Moments and Wavelets."

M. K. Mandal, E. Chan, X. Wang and S. Panchanathan, "Multiresolution Motion Estimation Techniques for Video Compression."

M. K. Mandal, S. Panchanathan and T. Aboulnasr, "Choice of Wavelets for Image Compression."

D. M. Monro and B. G. Sherlock, "Psychovisually Tuned Wavelet Fingerprint Compression".

D. M. Monro and B. G. Sherlock, "Optimised Wavelets for Fingerprint Compression".

P. Moulin, "A Multiscale Relaxation Algorithm for SNR Maximization in 2-D Nonorthogonal Subband Coding."

M. T. Orchard, Z. Xiong and Y. Zhang, "A Simple Deblocking Algorithm for JPEG Compressed Images Using Overcomplete Wavelet Representations."

M. T. Orchard, K. Ramchandran and Z. Xiong, "Wavelet Packets Image Coding Using Space-Frequency Quantization."

M. T. Orchard, K. Ramchandran and Z. Xiong, "Space-frequency Quantization for Wavelet Image Coding."

H. Pan, "Uniform Full-Information Image Matching Using Complex Conjugate Wavelet Pyramids", with figures.

H. Pan, "General Stereo Image Matching Using Symmetric Complex Wavelets," presented at SPIE Conference: Wavelet Applications in Signal and Image Processing, VI. Denver, August 1996, Published in SPIE Proceedings, vol. 2825.

P. Schröder and W. Sweldens, "Spherical wavelets: Efficiently representing functions on the sphere." An abstract is also available.

P. Schröder and W. Sweldens, "Spherical Wavelets: Texture Processing." An abstract is also available.

J. A. Solomon, J. Villasenor, A. B. Watson and G. Y. Yang, "Visual Thresholds For Wavelet Quantization Error."

V. Strela, P. Heller, G. Strang, P. Topiwala and C. Heil, "The application of multiwavelet filter banks to signal and image processing."

Y. Wang, "Image representations using multiscale differential operators."

Y. Wang and S. L. Lee, "Scale-space derived from B-splines."

G. Weiss, "Time-Frequency and Time-Scaling Methods in Signal and Image Processing"

M. Wickerhauser, "Picture Compression by Best-Basis Subband Coding."

M. V. Wickerhauser, "High-Resolution Still Picture Compression"

Z. Xiong, "Representation and Coding of Images Using Wavelets."

D. M. Monro and B. G. Sherlock, "Space-Frequency Balance in Biorthogonal Wavelets."

Xuejun Li, "Low Bit Rate Wavelet Image and Video Coding Algorithm and Software."

The FBI Wavelet Fingerprint Compression Standard

J. N. Bradley and C. M. Brislawn, "Proposed First-Generation WSQ Bit Allocation Procedure"

J. N. Bradley and C. M. Brislawn, "The Wavelet/Scalar Quantization Compression Standard for Digital Fingerprint Images."

J. Bradley, C. Brislawn and T. Hopper, "WSQ Gray-Scale Fingerprint Image Compression Specification."

J. Bradley, C. Brislawn and T. Hopper, "The FBI Wavelet/ Scalar Quantization Standard for Gray-Scale Fingerprint Image Compression" with figures.

C. M. Brislawn, "Classification of Nonexpansive Symmetric Extension Transforms for Multirate Filter Banks"

C. M. Brislawn, "Fingerprints Go Digital"

C. M. Brislawn, "Preservation of Subband Symmetry in Multirate Signal Coding."

"The FBI Wavelet/Scalar Quantization Fingerprint Image Compression Standard."

Wavelets and Speech Processing

E. Wesfreid and M. V. Wickerhauser, "Adapted Local Trigonometric Transforms and Speech Processing"

M. Wickerhauser, "Acoustic Signal Compression with Wavelets Packets."

Wavelets and Ordinary Differential Equations

G. Beylkin, "On Wavelet-based Algorithms for Solving Differential Equations."

B Jawerth and W. Sweldens, "Wavelet Multiresolution Analyses Adapted for the Fast Solution of Boundary Value Ordinary Differential Equations." An abstract is also available.

P. Monasse and V. Perrier, "Ondelettes sur l'Intervalle pour la Prise en Compte de Conditions aux Limites."

A. Rieder, "Semi-Algebraic Multi-level Methods Based on Wavelet Decompositions I: Application to Two-Point Boundary Problems"

W. C. Shann and J. C. Xu, "Galerkin-wavelet Methods for Two Point Boundary Value Problems."

Wavelets and Partial Differential Equations

G. Kaiser, "Complex-Distance Potential Theory and Hyperbolic Equations"

A. Averbuch, G. Beylkin R. R. Coifman and M. Israeli, "Multiscale Inversion of Elliptic Operators."

E. Bacry, S. Mallat and G. Papanicolaou, "A Wavelet Based Space-Time Adaptive Numerical Method for Partial Differential Equations"

G. Beylkin and N. Coult, "A Multiresolution Strategy for Reduction of Elliptic PDE's and Eigenvalue Problems."

G. Beylkin and J. H. Keiser, "On the Adaptive Numerical Solution of Nonlinear Partial Differential Equations in Wavelet Bases."

D. M. Bond and S. A. Vavasis, "Fast Wavelet Transforms for Matrices Arising From Boundary Element Methods."

T. Chan, W. Tang and W. Wan, P. Charton and V. Perrier, "Factorisation sur Bases d'Ondelettes du Noyeau de la Chaleur et Algorithmes Matriciels Rapides Associes."

P. Charton and V. Perrier, "Towards a Wavelet Based Numerical Scheme for the Two-Dimensional Navier-Stokes Equations."

P. Charton and V. Perrier, "A Pseudo-Wavelet Scheme for the Two-Dimensional Navier-Stokes Equations."

S. Dahlke and A. Kunoth, "Biorthogonal Wavelets and Multigrid."

S. Dahlke and I. Weinreich, "Wavelet-Galerkin Methods: An Adapted Biorthogonal Wavelet Basis."

S. Dahlke and I. Weinreich, "Wavelet Bases Adapted to Pseudo-Differential Operators."

W. Dahmen and A. Kunoth, "Multilevel Preconditioning."

W. Dahmen, A. Kunoth and K. Urban "A Wavelet-Galerkin Method for the Stokes-Equations," also full version with pictures.

R. Glowinski, T. Pan, R. O. Wells, Jr. and X. Zhou, "Wavelet and Finite Element Solutions for the Neumann Problem Using Fictitious Domains"

R. Glowinski, A. Rieder, R. O. Wells, Jr. and X. Zhou, "A Wavelet Multigrid Preconditioner for Dirichlet Boundary Value Problems in General Domains."

R. Glowinski, A. Rieder, R. O. Wells, Jr. and X. Zhou, "A Preconditioned CG-Method for Wavelet-Galerkin Discretizations of Elliptic Problems"

F. Heurtaux, F. Planchon and M. V. Wickerhauser, "Scale Decomposition in Burgers' Equation"

A. Jiang, J. H. Keiser, "On I. Wavelet Based Approach to Numerical Solution on Nonlinear Partial Differential Equations and II. Nonlinear Waves in Fully Discrete Dynamical Systems."

A. Kunoth, "Multilevel Preconditioning—Appending Boundary Conditions by Lagrange Multipliers."

G. Leaf and J. M. Restrepo, "Wavelet-Galerkin Discretization of Hyperbolic Equations."

J. Lewalle, "Wavelet Transforms of some Equations of Fluid Mechanics"

J. Lewalle, "Energy Dissipation in the Wavelet-Transformed Navier-Stokes Equations"

J. Lewalle, "On the effect of boundary conditions on the multifractal statistics of incompressible turbulence"

J. Lewalle, "Diffusion is Hamiltonian".

D. Lu, T. Ohyoshi and L. Zhu, "Treatment of Boundary Conditions in the Application of Wavelet-Galerkin Method to a SH Wave Problem"

P. Monasse and V. Perrier, "Orthonormal Wavelet Bases Adapted for Partial Differential Equations with Boundary Conditions."

A. Rieder and X. Zhou, "On the Robustness of the Damped V-Cycle of the Wavelet Frequency Decompositions Multigrid Method"

A. Rieder, R. O. Wells, Jr. and X. Zhou, "A Wavelet Approach to Robust Multilevel Solvers for Anisotropic Elliptic Problems."

A. Rieder, R. O. Wells, Jr. and X. Zhou, "On the Wavelet Frequency Decomposition Method"

K. Urban, "A Wavelet-Galerkin Algorithm for the Driven-Cavity-Stokes-Problem in Two Space Dimensions."

O. V. Vasilyev and S. Paolucci, "A Dynamically Adaptive Multilevel Wavelet Collocation Method for Solving Partial Differential Equations in a Finite Domain."

O. V. Vasilyev and S. Paolucci, "Thermoacoustic Wave Propagation Modeling Using a Dynamically Adaptive Wavelet Collocation Method."

O. V. Vasilyev and S. Paolucci, "A Fast Adaptive Wavelet Collocation Algorithm for Multi-Dimensional PDEs." with figures.

O. V. Vasilyev, S. Paolucci and M. Sen, "A Multilevel Wavelet Collocation Method for Solving Partial Differential Equations in a Finite Domain."

O. V. Vasilyev, Y. Y. Podladchikov and D. A. Yuen, "Modeling of Compaction Driven Flow in Poro-Viscoelastic Medium Using Adaptive Wavelet Collocation Method." with figures.

O. V. Vasilyev, D. A. Yuen and S. Paolucci, "The Solution of PDEs Using Wavelets." with figures.

O. V. Vasilyev, D. A. Yuen and Y. Y. Podladchikov, "Applicability of Wavelet Algorithm for Geophysical Viscoelastic Flow." with figures.

R. O. Wells, Jr. and X. Zhou, "Wavelet Solutions for the Dirichlet Problem"

R. O. Wells, Jr. and X. Zhou, "Wavelet Interpolation and Approximate Solution of Elliptic Partial Differential Equations"

R. O. Wells, Jr. and X. Zhou, "Representing the Geometry of Domains by Wavelets with Applications to Partial Differential Equations"

R. O. Wells, Jr., "Multiscale Applications of Wavelets to Solutions of Partial Differential Equations"

Wavelets and Numerical Analysis

G. Beylkin, R. Coifman and V. Rokhlin, "Fast Wavelet Transforms and Numerical Algorithms I."

G. Beylkin, "On the Representation of Operators in Bases of Compactly Supported Wavelets."

G. Beylkin, "On the Fast Algorithm for Multiplication of Functions in the Wavelet Bases."

G. Beylkin, "Wavelets and Fast Numerical Algorithms." Lecture notes for an AMS short course, 1993.

G. Beylkin, "Wavelets, Multiresolution Analysis and Fast Numerical Algorithms." Draft of INRIA lectures, May 1991.

G. Beylkin and M. E. Brewster, "A Multiresolution Strategy for Numerical Homogenization."

P. Charton and V. Perrier, "Products Rapides Matrices-Vecteur en Bases d'Ondelettes: Application a la Resolution Numerique d'Equation aux Derivees Partielles."

P. Charton, "Produits de Matrices Rapides en Bases d'Ondelettes: Application a la Resolution Numerique d'Equation aux Derivees Partielles."

N. H. Getz, "A Fast Discrete Periodic Wavelet Transform." An associated toolbox of Matlab routines is also available.

L. Jameson, "On the Spline-Based Wavelet Differentiation Matrix."

L. Jameson, "On the Differention Matrix for Daubechies-Based Wavelets on an Interval."

L. Jameson, "On the Daubechies-Based Wavelet Differentiation Matrix."

L. Jameson, "On the Wavelet Optimized Finite Difference Method."

Figure 5:
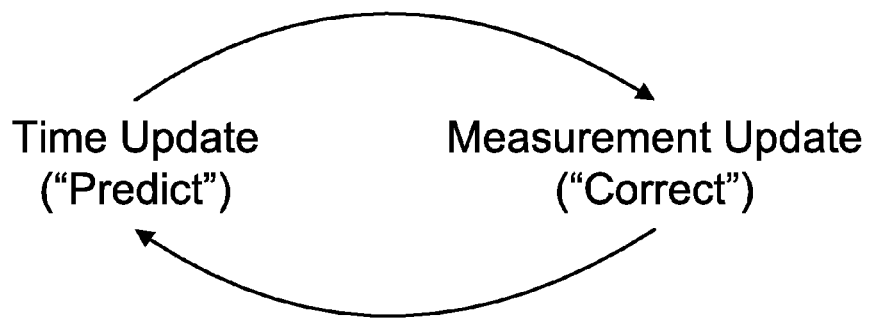
FIG. 5 shows a predictor corrector algorithm of the discrete Kalman filter cycle.
Figure 6:
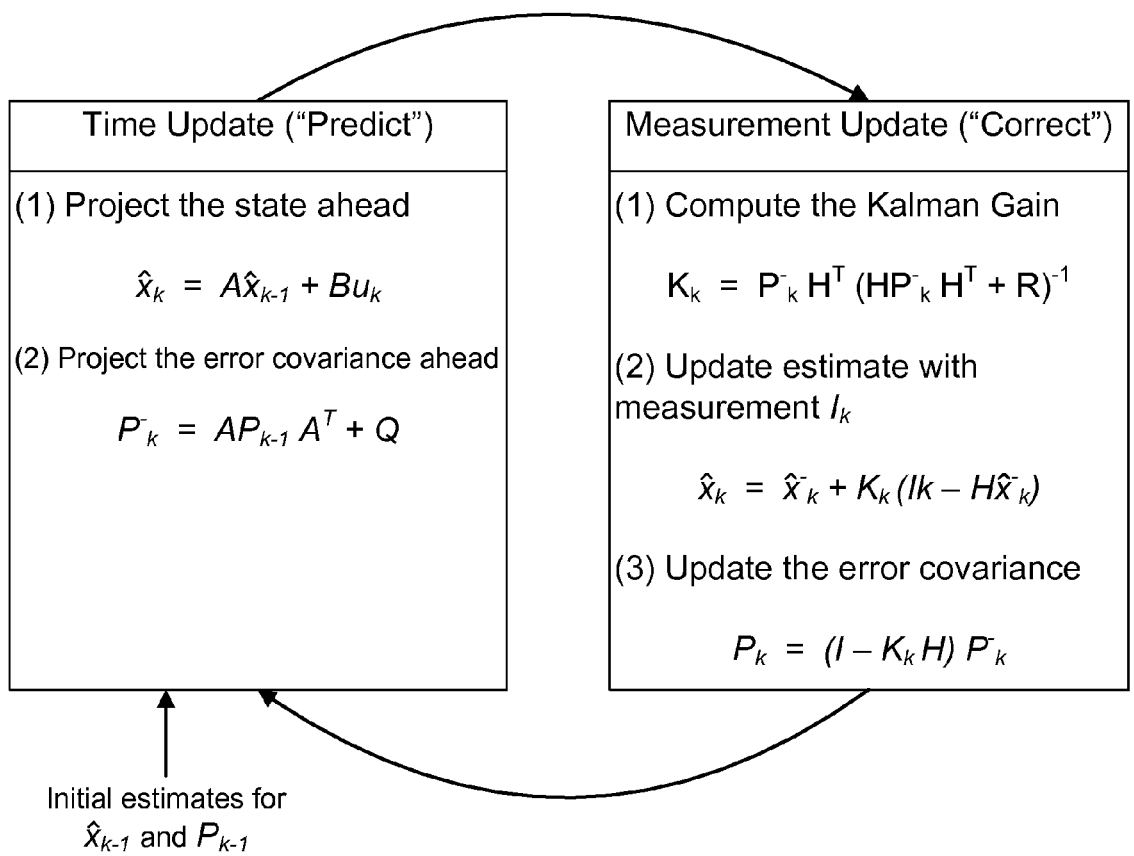
FIG. 6 shows aspects of the discrete Kalman filter cycle algorithm.
Figure 7:
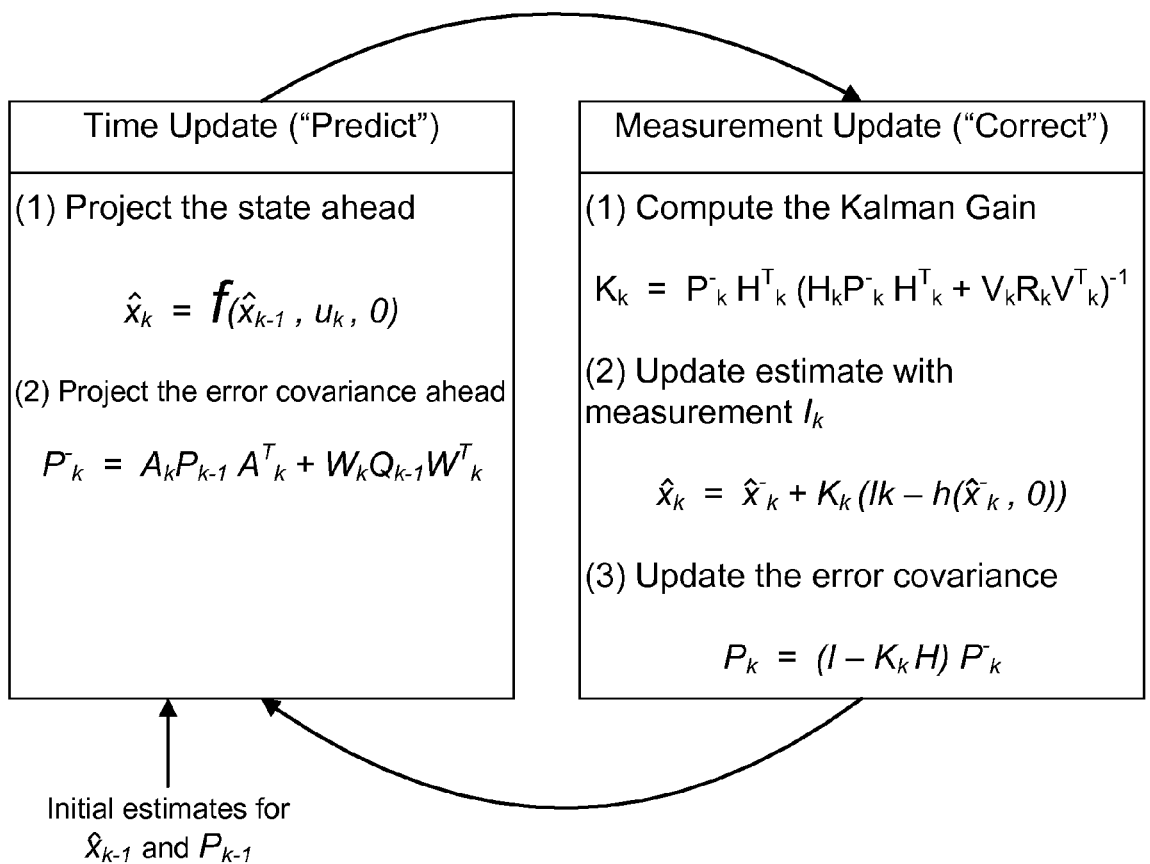
FIG. 7 shows aspects of the extended Kalman filter cycle.

E. Kolaczyk, "Wavelet Methods for the Inversion of Certain Homogeneous Linear Operators in the Presence of Noisy Data," with FIG. 5.1, FIG. 5.2, FIG. 5.4, FIG. 5.5, FIG. 5.6, FIG. 5.8, FIG. 5.10, FIG. 5.11, FIG. 5.13, and FIG. 5.14.

R. Piessens and W. Sweldens, "Quadrature Formulae and Asymptotic Error Expansion of Wavelet Approximations of Smooth Functions." An abstract is also available.

R. Piessens and W. Sweldens, "Asymptotic Error Expansion of Wavelet Approximations of Smooth Functions II." An abstract is also available.

W. C. Shann, "Quadratures Involving Polynomials and Daubechies' Wavelets."

W. Sweldens, "Construction and Application of Wavelets in Numerical Analysis."

M. Wickerhauser, "Nonstandard Matrix Multiplication."

M. V. Wickerhauser, "Computation with Adapted Time-Frequency Atoms"

M. V. Wickerhauser, "Wavelet Approximations to Jacobians and the Inversion of Complicated Maps"

Wavelets and Statistics

F. Abramovich, T. Sapatinas and B. W. Silverman, "Wavelet Thresholding via a Bayesian Approach."

F. Abramovich, T. Sapatinas and B. W. Silverman, "Stochastic Atomic Decompositions in a Wavelet Dictionary."

F. Abramovich and B. W. Silverman, "The Vaguelette-Wavelet Decomposition Approach to Statistical Inverse Problems."

E. H. Adelson and E. P. Simoncelli, "Noise Removal via Bayesian Wavelet Coring."

A. Antoniadis, G. Gregoire and G. P. Nason, "Density and Hazard Rate Estimation for Right Censored Data using Wavelet Methods."

T. Bailey, T. Sapatinas, K. Powell and W. J. Krzanowski, "Signal Detection in Underwater Sounds using Wavelets."

A. G. Bruce, D. L. Donoho, H. Gao and R. D. Martin, "Denoising and Robust Non-linear Wavelet Analysis."

A. G. Bruce and H. Gao, "WaveShrink: Shrinkage Functions and Thresholds."

A. G. Bruce and H. Gao, "WaveShrink with Semisoft Shrinkage."

A. G. Bruce and H. Gao, "Understanding WaveShrink: Variance and Bias Estimation."

A. G. Bruce, H. Gao and D. Ragozin, "S+WAVELETS: An Object-Oriented Toolkit for Wavelet Analysis."

A. G. Bruce and H. Gao, "S+WAVELETS: Algorithms and Technical Details."

J. Buckheit and D. Donoho, "WaveLab and Reproducible Research."

J. F. Burn, A. M. Wilson and G. P. Nason, "Impact During Equine Locomotion: Techniques for Measurement and Analysis."

R. Coifman and N. Saito, "Local Discriminant Bases."

R. Coifman and F. Majid, "Adapted Waveform Analysis and Denoising."

R. Coifman and D. Donoho, "Translation-Invariant De-Noising."

R. Dahlhaus, M. H. Neumann and R. von Sachs, "Non-linear Wavelet Estimation of Time-Varying Autoregressive Processes."

A. Davis, A. Marshak and W. Wiscombe, "Wavelet-Based Multifractal Analysis of Non-Stationary and/or Intermittent Geophysical Signals." with figures.

B. Deylon and A. Juditsky, "Wavelet Estimators. Global Error Mesures Revisited."

D. Donoho, "Nonlinear Solution of Linear Inverse Problems by Wavelet-Vaguelette Decomposition"

D. Donoho, "Smooth Wavelet Decompositions with Blocky Coefficient Kernels"

D. Donoho, "De-noising by Soft Thresholding"

D. Donoho, "Interpolating Wavelet Transforms"

D. Donoho, "Unconditional Bases are Optimal Bases for Data Compression and for Statistical Estimation"

D. Donoho and I. Johnstone, "Adapting to Unknown Smoothness by Wavelet Shrinkage"

D. Donoho and I. Johnstone, "Ideal Spatial Adaptation via Wavelet Shrinkage"

D. Donoho and I. Johnstone, "Minimax Estimation via Wavelet Shrinkage"

D. Donoho and I. Johnstone, "Minimax Risk over I_p Balls"

D. Donoho, I. Johnstone, G. Kerkyacharian and D. Picard, "Density Estimation via Wavelet Shrinkage"

D. Donoho, I. Johnstone, G. Kerkyacharian and D. Picard, "Wavelet Shrinkage: Asymptopia?"

D. Donoho and I. Johnstone, "Ideal Denoising in an Orthonormal Basis Chosen From a Library of Bases."

D. Donoho, S. Mallat and R. von Sachs, "Estimating Covariances of Locally Stationary Processes: Rates of Convergence of Best Basis Methods."

T. Downie and B. W. Silverman, "The Discrete Multiple Wavelet Transform and Thresholding Methods."

H. Y. Gao, "Choice of Thresholds for Wavelet Shrinkage Estimate of the Spectrum."

P. Goel and B. Vidakovic, "Wavelet Transformations as Diversity Enhancers"

P. Hall and G. P. Nason, "On Choosing a Non-integer Resolution Level when Using Wavelet Methods."

I. Johnstone, "Minimax Bayes, Asymptotic Minimax and Sparse Wavelet Priors"

I. M. Johnstone and B. W. Silverman, "Wavelet Threshold Estimators for Data with Correlated Noise."

A. Juditsky, "Wavelet Estimators. Adapting To Unknown Smoothness."

A. Juditsky and F. Leblanc, "Computing Wavelet Density Estimators for Stochastic Processes."

G. Katul and B. Vidakovic, "Partitioning eddy motion using Lorentz wavelet filtering."

R. Morgan and G. P. Nason, "Wavelet Shrinkage of Itch Response Sata."

P. Moulin, "Wavelet Thresholding Techniques for Power Spectrum Estimation."

G. P. Nason and B. W. Silverman, "The Discrete Wavelet Transform in S."

G. P. Nason and B. W. Silverman, "The Stationary Wavelet Transform and some Statistical Applications."

G. P. Nason and B. W. Silverman, "Wavelets for Regression and other Statistical Problems."

G. P. Nason, T. Sapatinas and A. Sawczenko, "Statistical Modelling of Time Series using Non-decimated Wavelet Representations."

G. P. Nason, "Wavelet Regression by Cross-Validation"

G. P. Nason, "Functional Projection Pursuit."

M. H. Neumann and R. von Sachs, "Wavelet Thresholding in Anisotropic Function Classes and Application to Adaptive Estimation of Evolutionary Spectra."

A. B. Owen, "Monte Carlo Variance of Scrambled Equidistribution Quadrature."

D. B. Percival, "On the Estimation of the Wavelet Variance."

A. Pinheiro and B. Vidakovic, "Estimating the Square Root of a Density Via Compactly Supported Wavelets."

J. Raz, L. Dickerson and B. Turetsky, "A Wavelet Packet Model of Evoked Potentials."

N. Saito, "Local Feature Extraction and Its Apppplications Using a Library of Bases."

N. Saito, "Simultaneous Noise Supression and Signal Compression using a Library of Orthonormal Bases and the Minimum Description Length Criterion."

B. Vidakovic, "A Note on Random Densities via Wavelets"

B. Vidakovic, "Nonlinear Wavelet Shrinkage with Bayes Rules and Bayes Factors."

R. von Sachs, G. P. Nason and G. Kroisandt, "Adaptive Estimation of the Evolutionary Wavelet Spectrum."

R. von Sachs and K. Schneider, "Smoothing of Evolutionary Spectra by Non-linear Thresholding." Also available are the figures.

R. von Sachs and M. H. Neumann, "A Wavelet-based Test for Stationarity."

R. von Sachs and B. MacGibbon, "Non-parametric Curve Estimation by Wavelet Thresholding with Locally Stationary Errors."

A. T. Walden, D. B. Percival and E. J. McCoy, "Spectrum Estimation by Wavelet Thresholding of Multitaper Estimators."

Yazhen Wang, "Jump and sharp cusp detection by wavelets."

Yazhen Wang, "Function estimation via wavelet shrinkage for long-memory data."

Yazhen Wang, "Small ball problems via wavelets for Gaussian processes."

Yazhen Wang, "Fractal function estimation via wavelet shrinkage."

Yazhen Wang, "Minimax estimation via wavelets for indirect long-memory data."

Yazhen Wang, "Change curve estimation via wavelets" (with an application to image processing); FIG. 4(a), FIG. 4(b).

Yazhen Wang, "Change-point analysis via wavelets for indirect data."

Yazhen Wang, "Self-similarity index estimation via wavelets for locally self-similar processes" (with Cavanaugh and Song); FIG. 1, FIG. 2, FIGS. 3 and 4.

M. V. Wickerhauser, "Fast Approximate Factor Analysis."

Wavelets and Econometrics

S. A. Greenblatt, "Wavelets in Economics: An Application to Outlier Testing."

M. J. Jensen, "Wavelet Analysis of Fractionally Integrated Processes."

M. J. Jensen, "OLS Estimate of the Fractional Differencing Parameter Using Wavelets Derived From Smoothing Kernels."

Wavelets and Fractals

A. Davis, A. Marshak and W. Wiscombe, "Wavelet-Based Multifractal Analysis of Non-Stationary and/or Intermittent Geophysical Signals." with figures.

C. Jones, 2-D Wavelet Packet Analysis of Structural Self-Organization and Morphogenic Regulation in Filamentous Fungal Colonies.

J. Lewalle, "Wavelet Transforms of the Navier-Stokes Equations and the Generalized Dimensions of Turbulence"

W. Hwang and S. Mallat, "Characterization of Self-Similar Multifractals with Wavelet Maxima."

Wavelets and Communication Theory

J. Dill and A. R. Lindsey, "Wavelet Packet Modulation: A Generalized Method for Orthogonally Multiplexed Communication."

R. Learned, H. Krim, B. Claus, A. S. Willsky, and W. C. Karl, "Wavelet-Packet-Based Multiple Access Communication."

A. R. Lindsey, "Multidimensional Signaling via Wavelet Packets."

A. R. Lindsey, Generalized Orthogonally Multiplexed Communication via Wavelet Packet Bases, chapter 1, chapter 2, chapter 3, chapter 4, chapter 5, chapter 6. Also with appendix and references.

Wavelets and Computer Graphics

M. Cohen, S. Gortler, P. Hanrahan and P. Schröder, "Wavelet Radiosity." With FIG. 12 and FIG. 14.

M. Cohen, S. Gortler, P. Hanrahan and P. Schröder, "Wavelet Projections for Radiosity."

A. Dreger, M. H. Gross R. Koch and L. Lippert, "A New Method to Approximate the Volume Rendering Equation using Wavelet Bases and Piecewise Polynomials," with FIGS. 5-6, FIGS. 7-10, and FIGS. 11-13. Also abstract available. Technical Report No. 220, Computer Science Department, ETH Zürich, 1994.

A. Fournier, "Wavelets and their Applications in Computer Graphics." This is 2.5 MB compressed.

M. H. Gross and L. Lippert, "Fast Wavelet Based Volume Rendering by Accumulation of Tranparent Texture Maps." With FIG. 6, FIG. 7, FIG. 8, FIG. 9, FIG. 10 and FIG. 11. Technical Report No. 228, Computer Science Department, ETH Zürich, 1995.

M. H. Gross and R. Koch, "Visualization of Multidimensional Shape and Texture Features in Laser Range Data using Complex-Valued Gabor Wavelets."

M. H. Gross and L. Lippert, "Ray-tracing of Multiresolution B-Spline Volumes." Also abstract available. Technical Report No. 239, Computer Science Department, ETH Zürich, 1996.

P. Hanrahan and P. Schröder, "Wavelet Methods for Radiance Computations." With FIG. 8, FIG. 9 left, FIG. 9 right, FIG. 10, FIG. 10 top left and FIG. 10 top right.

C. Herley, "Exact Interpolation and Iterative Subdivision Schemes."

P. Schröder, W. Sweldens and D. Zorin, "Interpolating Subdivision for Meshes with Arbitrary Topology". An abstract is also available.

Wavelets and Physics

J. C. van den Berg, ed., "Wavelets in Physics", Cambridge University Press, 1999 (a survey of many applications).

G. Kaiser, "A Detailed Introduction to Mathematical and Physical Wavelets"

C. Best and A. Schäfer, "Variational Description of Statistical Field Theories using Daubechies' Wavelets."

G. Beylkin, J. Dunn and D. Gines, "Order N Static and Quasi-Static Computations in Electrodynamics using Wavelets."

J. C. Cohen and T. Chen, "Fundamentals of the Discrete Wavelet Transform for Seismic Data Processing."

A. Fournier, "Wavelet Analysis of Observed Geopotential and Wind: Blocking and Local Energy Coupling Across Scales."

A. Fournier, "Wavelet Multiresolution Analysis of Numerically Simulated 3d Radiative Convection."

A. Fournier, "Wavelet Representation of Lower-Atmospheric Long Nonlinear Wave Dynamics, Governed by the Benjamin-Davis-Ono-Burgers Equation."

F. Herrmann, "A scaling medium representation, a discussion on well-logs, fractals and waves." An abstract is also available.

I. Pierce and L. Watkins, "Modelling optical pulse propagation in nonlinear media using wavelets."

W. C. Shann, "Finite Element Methods for Maxwells Equations with Stationary Magnetic Fields and Galerkin-wavelet Methods for Two Point Boundary Value Problems," with separate abstract and table of contents.

L. R. Watkins and Y. R. Zhou, "Modelling Propagation in Optical Fibres using Wavelets."

R. O. Wells, "Adaptive Wave Propogation Modelling."

L. Zubair, "Studies in Turbulence using Wavelet Transforms for Data Compression and Scale-Separation."

A. Fournier, "An introduction to orthonormal wavelet analysis with shift invariance: Application to observed atmospheric-blocking spatial structure", to appear in J. Atmos. Sci., 2000 Dec. 1.

A. Fournier, "Atmospheric energetics in the wavelet domain I: Governing equations and interpretation for idealized flows", submitted to J. Atmos. Sci., 2000 (revised).

A. Fournier, "Atmospheric energetics in the wavelet domain II: Time-averaged observed atmospheric blocking", submitted to J. Atmos. Sci., 1999.

A. Fournier, "Atmospheric energetics in the wavelet domain III: Instantaneous transfers between block and local eddies", submitted to J. Atmos. Sci., 1999.

Hardware and Software Implementation of Wavelet Transforms

J. Fridman and E. S. Manolakos, "On Linear Space-Time Mapping for the 1-D Discrete Wavelet Transform."

J. Fridman and E. S. Manolakos, "Distributed Memory and Control VLSI Architectures for the 1-D Discrete Wavelet Transform."

J. Lu, "Computation of 2-D Wavelet Transform on the Massively Parallel Computer for Image Processing."

MathSoft Engineering & Education, Inc, "Wavelets Extension Pack", 1999.

O. Nielsen and M. Hegland, "A Scalable Parallel 2D Wavelet Transform Algorithm."

Game Theory References

Use of Game Theory to Control Ad Hoc Networks

The resources relating to ad hoc networks and game theory listed in the Game Theory and Ad Hoc Networks References Appendix, each of which is expressly incorporated herein by reference, provides a sound basis for understanding the implications of game theory for the design, control and analysis of communications networks, and in particular, ad hoc networks. A review of these references will assure a background in this field for an understanding of aspects of the invention which rely on these topics.

Description of Games

Roger Myerson, Nash Equilibrium and the History of Economic Theory. JEL 1999

Rationality, Dominance, Weak Dominance etc

Douglas Bernheim, Rationalizable strategic behavior. Econometrica 1984

David Pearce, Rationalizable strategic behavior and the problem of perfection. Econometrica 1984

Douglas Bernheim, Axiomatic characterization of rational choice in strategic enviroments. Scand. J. of E. 1986

Shimoji and Watson, Conditional Dominance, rationalizability and game forms. Journal of Economic Theory 1998

David Roth, Rationalizable predatory pricing. Journal of Economic Theory 1996

Basu and Weibul, strategy subsets closed under rational behavior. E. Letters 1991

Larry Samuelson, Dominated strategies and common knowledge. Games and Economic Behavior 1992

Marx and Swinkels, Order independence for iterated weak dominance. Games and Economic Behavior 1997

Equilibrium: Nash, Refinements, Correlated

Selten, Reexamination of the Perfectness concept for equilibrium points in extensive form games. International Journal of Game Theory 1975.

Myerson, Refinements of the Nash equilibrium concept. International Journal of Game Theory 1975.

Kalai and Samet, Persistent equilibria in strategic games. International Journal of Game Theory 1984.

Kohlberg and Mertens, On the strategic stability of Equilibria. Econometrica, 1986.

Aumann, Correlated equilibria as an expression of baysian rationality. Econometrica, 1987.

Aumann and Brandenberger, Espitemic conditions for equilibrium. Econometrica 1995

Hal Varian, A model of Sales. American Economic Review 1980

The Extensive Form Games with Perfect Information

Rubinstein, On the interpretation of game theory. Econometrica 1991

Reny, Common beliefs and the theory of games with perfect information. Journal of Economic Theory 1993.

Aumann Backward induction and common knowledge of rationality. Games and Economic Behavior 1995

Binmore, A note on backward induction: Aumann, Reply to Binmore. Games and Economic Behavior 1996

Selten, A Reexamination of the perfectness.

Hyperbolic Discounting

O'Donoghue and Rabin, Doing it now or doing it later. American Economic Review 1999

David Laibson, Golden Eggs and Hyperbolic Discounting. Quarterly Journal of Economics 1997

The Economics of Altruism

Gary Becker, A theory of social interactions. Journal of Political Economy 1974

Ted Bergstrom, A fresh look at the rotten kid theorem and other household mysteries. Journal of Political Economy 1989

Bernheim and Stark, Altruism within the family reconsidered: do nice guys finish last. American Economic Review 1988

Lindbeck and Weibull, Altruism and time consistency: the economics of fait accompli. Journal of Political Economy 1988

Bruce and Waldman, Transfers in kind: why they can be efficient and non-paternalistic. American Economic Review 1991

Jack Robles, Paternal altruism or smart parent altruism? CU WP 98-10

Mathew Rabin, Incorperating fairness into economics and game theory. American Economic Review 1993

Ray and Ueda, Egalitarianism and incentives. Journal of Economic Theory 1996

Bernheim, Shleifer and Summers, The strategic bequest motive. Journal of Political Economy 1985

Extensive Form Games without Perfect Information

Kreps and Wilson, Sequential Equilibrium. Econometrica, 1983.

Van Damme, Stable Equilibria and forward induction. Journal of Economic Theory 1989.

Strategic Information Transmission

Crawford and Sobel, Strategic information transmission. Econometrica 1982.

Cho and Kreps, Signalling games and stable equilibria. Quarterly Journal of Economics 1987

Mailath, Okuno-Fujiwara and Postlewaite, Belief based refinements in signalling games. Journal of Economic Theory 1993

Milgrom and Roberts, Limit pricing and entry under incomplete information: an equilibrium analysis. Econometrica 1982 (pages 443-459)

Cho and Sobel, Strategic Stability and uniqueness in signalling games. Journal of Economic Theory 1990.

Farrell, Meaning and credibility in cheap talk games. Games and Economic Behavior Milgrom and Roberts, Limit pricing and entry under incomplete information, an equilibrium analysis, Econometrica 1982

Milgrom, Good news and bad news, representation and applications, Rand.

Folk Theorems for Repeated Games

Dilip Abreu. On the theory of infinitely repeated games with Discounting. Econometrica 1988

Benoit and Krishna. Finitely Repeated games. Econometrica, 1985.

James Friedman. A noncooperative equilibrium for supergames. Review of Economic Studies 1971.

James Friedman. Cooperative equilibria in finite horizon supergames. Journal of Economic Theory 1985.

Fudenberg and Maskins. The Folk Theorem in repeated games with discounting or with incomplete information. Econometrica 1986.

Roy Radner. Collusive Behavior in non-cooperative epsilon equilibria in oligopolies with long but finite lives. Journal of Economic Theory 1980.

Ariel Rubinstein. Equilibrium in supergames with the overtaking criterion. Journal of Economic Theory 1977.

Renegotiation

Benoit and Krisna, Renegotiation in finitely repeated games. Econometrica 1993

Bergin and MacCleod, Efficiency and renegotiation in repeated games. Journal of Economic Theory 1993

Andreas Blume, Interplay communication in repeated games. Games and Economic Behavior 1994

Geir Asheim, Extending renegotiation proofness to infinite horizon games. Games and Economic Behavior 1991

Bernheim and Ray, Collective dynamic consistency in repeated games. Games and Economic Behavior 1989

Farrel and Maskin, Renegotiation in Repeated Games. Games and Economic Behavior 1989

Cooperative Game Theory

Freidman, Game theory with applications to economics chapter 6 and 7

Nash, The Bargaining problem. Econometrica 1950

Kalai and Smordinski, Other Solutions to Nash's problem. Econometrica 1975

Noncooperative Bargaining

Rubinstein, Perfect equilibrium in a bargaining model. Econometrica 1982

Joel Watson, Alternating offer bargaining with two sided incomplete information. Review of Economic Studies 1999

Reputation

Kreps, Milgrom, Roberts and Wilson, Reputation and imperfect information: predation, reputation and entry deterence: rational cooperation in the finitely repeated prisoner's dilemma. Journal of Economic Theory 1981

Aumann and Sorin, Cooperation and Bounded recal. Games and Economic Behavior 1989

Klaus Schmidt, Reputation and equilibrium characterization in repeated games with conflicting interests, Econometrica 1993, 325-352

Cripps and Thomas, Reputation and Commitment in Two person games without discounting, Econometrica, 1995, 1401-1420

Joel Watson, A reputation refinement withough equilibrium, Econometrica 1993, 199-206

Celentani, Fudenberg and Levine, Maintaining a reputation against a long lived opponent Econometrica 1996, 691-704

Evolutionary Game Theory

Vince Crawford, An Evolutionary interpretation of VHBB's experimental results on coordination. Games and Economic Behavior 1991

Gilboa and Matsui, Social Stability and Equilibrium, Econometrica 1991

Kandori, Mailath and Rob, Learning, Mutation, and Long Run Equilibria in games, Econometrica 1993.

Peyton Young, An Evolutionary Model of Bargaining, Journal of Economic Theory 1993
Peyton Young, The Evolution of Conventions, Econometrica 1993
Larry Samuelson, Stochastic Stability with alternative best replies. Journal of Economic Theory
Noldeke and Samuelson, The Evolution of Backwards and Forwards Induction, Games and Economic Behavior 1993
Jack Robles, An Evolutionary Folk Theorem For Finitely Repeated Games CU WP 99-
Kim and Sobel, An Evolutionary Approach to Preplay Communication Econometrica 1995
General Game Theory
Bierman H. S. & Fernandez L., Game Theory with Economic Applications, Addison-Wesley, 1993.
Dixit A., & Nalebuff B., Thinking Strategically: the Competitive Edge in Business, Politics, and Everyday Life, New York: Norton, 1991.
McMillan J., Games, Strategies, and Managers, Oxford: OUP, 1992.
Baird D. G., Gertner R. H., and Picker R. C., Game Theory and the Law, Harvard U.P., 1994.
Rasmusen E., Games and Information: An Introduction to Game Theory, Oxford: B. Blackwell, 2nd edition, 1994.
Ghemawat P., Games Businesses Play: Cases and Models, New York: Wiley, 1995.
Gardner R., Games for Business and Economics, New York: Wiley, 1995.
Strategic Decision Making
Dixit & Nalebuff, Intro; Ch2 Anticipating your rivals response; Ch3 Seeing through your rivals response.
Barnett, F. W. Making game theory work in practice, Wall Street Journal, 1995.
Bierman & Fernandez, Ch5 Nash equilibrium I, Ch11 Nash equilibrium II
O'Neill B., International escalation and the dollar auction, Journal of Conflict Resolution, 1986.
Schelling T. C., Ch7 Hockey helmets, daylight saving, and other binary choices, in his Micromotives and Macrobehavior, NY: Norton, 1978.
Marks R. E., Competition and common property, 1998.
McMillan J., Ch3 Understanding cooperation and conflict.
McAfee R. P. & J. McMillan, Competition and game theory, Journal of Marketing Research, 1996.
Baird, Gertner, & Picker, Ch1 Simultaneous decision-making and the normal form game.
Gardner, Ch1 Introduction, Ch2 Two-person games, Ch16 Voting games.
Rasmusen, Ch1 The rules of the game.
Schelling T. C., What is game theory? in his Choice and Consequence: Perspectives of an Errant Economist, Camb.: Harvard UP, 1980.
Decision Analysis—Games Against Nature
Apocalypse maybe, and An insurer's worst nightmare, The Economist, 1995/96
Bierman & Fernandez, Chs 1-3.
Ulvila J. W. & R. Brown, Decision analysis comes of age, Harvard Buisness Review 1982.
Howard R. A., Decision analysis: practice and promise, Management Science, 1988.
Clemen R. T., Making Hard Decisions: An Introduction to Decision Analysis, Belmont, Calif.: Duxbury, 1996.
Samson D., Chs 2-6, 11, Managerial Decision Analysis, Chicago: R. D. Irwin, 1988.
Strategic Moves
Dixit & Nalebuff, Ch5 Strategic moves.
Brams S. J. & J. M. Togman, Cooperation through threats: the Northern Ireland case, PS: Political Science & Politics, March 1998.
Gardner, Ch4 n-person games, Ch5 Non-cooperative games.
Colman A. M., Ch8 Multi-person games: social dilemmas, in his Game Theory and Experimental Games, Oxford: Pergamon, 1982.
Kay J., Ch3 Co-operation and Co-ordination, in his Foundations of Corporate Success: How Business Strategies Add Value, Oxford: OUP, 1993.
Brams S. J., Ch1 Int. relations games, in Game Theory and Politics, NY: Macmillan, 1975.
Credible Commitment
Dixit & Nalebuff, Ch6 Credible commitments.
Bierman & Fernandez, Ch23 Subgame-perfect equilibrium
Rasmusen, Ch4.1 Subgame perfection.
Gardner, Ch6 Credibility and subgame perfection.
Ghemawat, Ch3 Preemptive capacity expansion in the titanium dioxide industry.
Repetition and Reputation
Dixit & Nalebuff, Ch4 Resolving the Prisoner's Dilemma; Ch9 Cooperation and coordination.
Nowak, M., R. May, & K. Sigmund, The arithmetic of mutual help, Scientific American, 1995
Hofstadter D., Ch29 The Prisoner's Dilemma computer tournaments and the evolution of cooperation, in his Metamagical Themas, Penguin, 1985.
Marks R. E., Midgley F D. F., & Cooper L. G., Adaptive behaviour in an oligopoly, in Evolutionary Algorithms in Management Applications, ed. by J. Biethahn & V. Nissen, (Berlin: Springer-Verlag), 1995.
Baird Gertner & Picker, Ch2 Dynamic interaction and the extensive-form game, Ch5 Reputation and repeated games.
Gardner, Ch7 Repeated games, Ch8 Evolutionary stability and bounded rationality.
Rasmusen, Ch4 Dynamic games and symmetric information, Ch5 Reputation and repeated games with symmetric information.
Unpredictability
Dixit & Nalebuff, Ch7 Unpredictability; Ch8 Brinkmanship.
Bierman & Fernandez, Ch11.9
Gardner, Ch3 Mixed strategies.
Rasmusen, Ch3 Mixed and continuous strategies.
Bargaining
Dixit & Nalebuff, Ch10 The voting strategy; Ch11 Bargaining.
McMillan, Ch5 Gaining bargaining power; Ch6 Using information strategically.
Elster J., Ch14 Bargaining, in Nuts and Bolts for the Social Sciences, Camb.: CUP, 1989
Murnighan J. K., Game's End, Chapter 15 in his: Bargaining Games: A New Approach to Strategic Thinking in Negotiations, NY: William Morrow, 1992.
Bierman & Fernandez, Ch6 Bargaining.
Schelling T. C., Ch2 Essay on bargaining, in The Strategy of Conflict, Camb.: Harvard UP, 1980.
Baird Gertner & Picker, Ch7 Noncooperative bargaining
Gardner, Ch12 Two-person bargains. Ch14 n-person bargaining and the core.
Rasmusen, Ch11 Bargaining.
Brams S. J., Negotiation Games: Applying Game Theory to Bargaining and Arbitration, NY: Routledge, 1990.
Using Information Strategically
McMillan, Ch6 Using information strategically
Bierman & Fernandez, Ch17 Bayesian equilibrium, Ch19 Adverse selection and credit rationing
Rasmusen, Ch2 Information P-13

Baird Gertner & Picker, Ch4 Signalling, screening, and non-verifiable information
Gardner, Ch9 Signaling games.
Bidding in Competition
Revenge of the nerds, It's only a game, and Learning to play the game, The Economist, 1994
Landsburg S. E., Cursed winners and glum losers, Ch18 of his The Armchair Economist: Economics and Everyday Life, New York: The Free Press, 1993.
Norton, R., Winning the game of business, Fortune, 1995,
Koselka, R., Playing poker with Craig McCaw, Forbes, 1995,
Dixit & Nalebuff, Ch12 Incentives.
McMillan, Ch11 Bidding in competition
McAfee R. P. & J. McMillan, Analyzing the airwaves auction, Journal of Ec. Perspectives, 1996
R. Marks, Closed tender vs. open bidding auctions, 22 Dec. 1994.
The Economist, Secrets and the prize, 12 Oct. 1996, p. 98.
Scientific American, Making honesty pay, January 1997, p. 13.
Gardner, Ch11 Auctions.
Brams S. J. & A. D. Taylor, Fair division by auctions, Ch9 of their Fair Division: From Cake-Cutting to Dispute Resolution, Cambridge: CUP, 1996.
Rasmusen, Ch12 Auctions.
Contracting, or the Rules of the Game
Kay, Ch4 Relationships and contracts.
Dixit & Nalebuff, Ch12 Incentives.
McMillan, Ch8 Creating incentives; Ch9 Designing contracts, Ch10 Setting executives' salaries.
Williamson O. E., Strategizing, economizing, and economic organization, Strategic Management Journal, 1991.
Bierman & Fernandez, Ch7 Involuntary unemployment.
Gardner, Ch10 Games between a principal and an agent.
Milgrom P. & Roberts J., Ch5 Bounded rationality and private information; Ch6 Moral hazard and performance incentives.
Economics, Organization and Management, Englewood Cliffs: Prentice-Hall, 1992.
Choosing the Right Game: Co-Opetition
Brandenburger A. M. & B. J. Nalebuff, The right game: using Game Theory to shape strategy, Harvard Business Review, 1995 mayet.som.yale.edu/coopetition/index2.html
Koselka R., Businessman's dilemma, and Evolutionary economics: nice guys don't finish last, Forbes, Oct. 11, 1993.
Brandenburger A. M. & B. J. Nalebuff, Co-opetition: 1. A revolutionary mindset that combines competition and cooperation; 2. The Game Theory Strategy that's changing the game of business. New York: Currency Doubleday, 1996.
Brandenburger A.M. & Harborne W. S. Jr., Value-based business strategy, Journal of Economics and Management Strategy, 5(1), 1996.
Baird Gertner & Picker, Ch6 Collective action, embedded games, and the limits of simple models.
Morrow J. D., Game Theory for Political Scientists, Princeton: P.U.P., 1994.
Casson M., The Economics of Business Culture: Game Theory, Transaction Costs and Economic Performance, Oxford: OUP, 1991.
Schelling T. C., Altruism, meanness, and other potentially strategic behaviors, American Economic Review, 68(2): 229-231, May 1978.
Crawford V. P., Thomas Schelling and the analysis of strategic behavior, in Strategy and Choice, ed. by R. J. Zeckhauser, MIT Press, 1991.
For a History of Game Theory Since Old Testament Times, Point your Browser at the Following URL: www.canterbury.ac.nz/econ/hist.htm
For further surfing on the 'Net about game theory, start at the following URLs: www.pitt.edu/~alroth/alroth.html
E. Dekel, D. Fudenberg and D. K. Levine, Learning to Play Bayesian Games (Jun. 20, 2001). www.gametheory.net/html/lectures.html
Drew Fudenberg and David K. Levine, The Nash Threats Folk Theorem With Communication and Approximate Common Knowledge in Two Player Games (Jun. 10, 2002).
Game Theory and Ad Hoc Networks References
E. Altman, R. El Azouzi, and T. Jimenez. Slotted aloha as a stochastic game with partial information. In Proceedings of WiOpt '03, 2003.
A Archer and E Tardos. Truthful mechanisms for one-parameter agents. In Proc. 42nd IEEE Symp. On Foundations of Computer Science, 2001.
N. Ben Salem, L. Buttyan, J.P. Hubaux, and Jakobsson M. A charging and rewarding scheme for packet forwarding. In Proceeding of Mobihoc, June 2003.
L. Blazevic, L. Buttyan, S. Capkun, S. Giordiano, J.-P. Hubaux, and J.-Y. Le Boudec. Self-organization in mobile ad-hoc networks: the approach of terminodes. IEEE Communications Magazine, 39(6):166-174, June 2001.
G. E. Bolton and A. Ockenfels. ERC: A theory of equity, reciprocity and competition. The American Economic Review, 90:166-193, March 2000.
A. Bovopoulos and A. Lazar. Asynchronous iterative algorithms for optimal load balancing. In Proceedings of the 22nd Annual Conference on Information Sciences and Systems, pages 1051-1057, 1988.
Felix Brandt and Gerhard Weβ. Antisocial Agents and Vickrey Auctions. In Pre-proceedings of the Eighth International Workshop on Agent Theories, Architectures, and Languages (ATAL-2001), pages 120-132, 2001.
Felix Brandt. A Verifiable, Bidder-Resolved Auction Protocol. In Proceedings of the 5th International Workshop on Deception, Fraud and Trust in Agent Societies, pages 18-25, 2002.
S. Buchegger and J. Le Boudec. Performance analysis of the CONFIDANT protocol. In Proceedings of IEEE/ACM Workshop on Mobile Ad Hoc Networking and Computing (MobiHOC), June 2002.
R. Buyya, H. Stockinger, J. Giddy, and D. Abramson. Economic Models for Management of Resources in Peer-to-Peer and Grid Computing. In Proceedings of the SPIE International Symposium on The Convergence of Information Technologies and Communications (ITCOM), August 2001.
M. Castro, P. Druschel, A. Ganesh, A. Rowstron, and D. S. Wallach. Security for structured peer-to-peer overlay networks. In Proc. 5th Symposium on Operating Systems Design and Implementation, Boston, Mass., December 2002.
Clarke, E. H. (1971). Multipart pricing of public goods, Public Choice 11, 17-33.
T. Clausen and P. Jacquet. Optimized link state routing protocol. October 2003. hipercom.inria.fr/olsr/
S. Corson and J. Macker. Mobile ad hoc networking (MANET): Routing protocol performance issues and evaluation considerations. Request for comments 2501, Internet Engineering Task Force, 1999. www.rfc-editor.org/
J. Crowcroft, R. Gibbens, F. Kelly, and S. Ostring. Modelling incentives for collaboration in mobile ad hoc networks. In Proceedings of WiOpt '03, 2003.

Dasgupta, P., P. Hammond, and E. Maskin (1979). The implementation of social choice rules, Review of Economic Studies 46, 185-216.

Deering, S., D. Estrin, D. Farinacci, V. Jacobson, C. Liu, and L. Wei (1996). The PIM architecture for wide-area multicast routing, ACM/IEEE Transactions on Networking 54, 153-162.

A. Demers, S. Keshav, and S. Shenker. Analysis and simulation of a fair queueing algorithm. In SIGCOMM '89, Proceedings of the ACM Symposium on Communications Architectures & Protocols, pages 1-12, 1989.

C. Douligeris and R. Mazumdar. User optimal flow control in an integrated environment. In Proceedings of the Indo-US Workshop on Signals and Systems, 1988.

Joan Feigenbaum, Christos H Papadimitriou, and Scott Shenker. Sharing the cost of multicast transmissions. Journal of Computer and System Sciences, 63:21-41, 2001.

Feigenbaum, Joan, Christos Papadimitriou, Rahul Sami, and Scott Shenker (2002). "A BGP-based Mechanism for Lowest-Cost Routing." In Proc. 21st Symposium on Principles of Distributed Computing, ACM Press, 173-182.

J. Feigenbaum and S. Shenker. Distributed algorithmic mechanism design: Recent results and future directions. In Proc. 6th Int'l Workshop on Discrete Algorithms and Methods for Mobile Computing and Communications, pages 1-13, Atlanta, Ga., September 2002.

T. Fent, G. Feichtinger, and G. Tragler. A dynamic game of offending and law enforcement. International Game Theory Review, 4(1):71-89, 2002.

Ferguson, D., C. Nikolaou, and Y. Yemini (1989). An economy for flow control in computer networks, in "Proceedings of the 8th Infocom," pp. 100-118, IEEE Computer Society Press, Los Alamitos.

S. Floyd and K. Fall. Promoting the use of end-to-end congestion control. IEEE/ACM Transactions on Networking, 7(4):458-472, August 1999.

E. Friedman and D. Parkes, "Pricing WiFi at Starbucks—Issues in Online Mechanism Design", In Proc. Fourth ACM Conf. on Elec. Commerce (EC '03), 2003. Extended version at www.eecs.harvard.edu/econcs/pubs/online.pdf. citeseer.nj.nec.com/article/friedman03pricing.html Friedman, E., and S. Shenker (1997). "Learning and Implementation in the Internet," preprint. www.aciri.org/shenker/decent.ps A. C. Fuqua, T-W Ngan, and D. S. Wallach, "Economic Behavior of Peer-to-Peer Storage Networks", Workshop on Economics of Peer-to-Peer Systems, Berkeley, Calif., 2003, citeseer.nj.nec.com/fuqua03economic.html Goldberg, A. V., J. D. Hartline, and A. Wright (1999). "Competitive Auctions and Digital Goods," InterTrust Technical Report 99-01. Available at www.intertrust.com/star/tr/tr-99-01.html A. Goldsmith and S. Wicker. Design challenges for energy-constrained ad hoc wireless networks. IEEE Wireless Communications, 9(4):8-27, 2002.

P. Golle, K. Leyton-Brown, I. Mironov, and M. Lillibridge. Incentives for sharing in peer-to-peer networks. In Proc. 3rd ACM Conf. on Electronic Commerce, Tampa, Fla., October 2001.

Z. Haas. A new routing protocol for reconfigurable wireless networks. In IEEE 6th International Conference on Universal Communications Record, volume 2, pages 562-566, October 1997.

Garrett Hardin. The Tragedy of the Commons. Science, 162: 1243-1248, 1968. Alternate Location: dieoff.com/page95.htm.

Michael Harkavy, J. D. Tygar, and Hiroaki Kikuchi. Electronic Auctions with Private Bids. In 3rd USENIX Workshop on Electronic Commerce, pages 61-74, September 1998.

X. Hong, K. Xu, and M. Gerla. Scalable routing protocols for mobile ad hoc networks. IEEE Networks, 16(4):11-21, July 2002.

M.-T. Hsiao and A. Lazar. Optimal decentralized flow control of markovian queueing networks with multiple controllers. Performance Evaluation, 13(3):181-204, 1991.

Jackson, Matthew O., and Asher Wolinsky (1996). "A Strategic Model of Social and Economic Networks." Journal of Economic Theory 71, 44-74.

M. Jakobsson, J.P. Hubaux, and L. Huttyan. A micro-payment scheme encouraging collaboration in multi-hop cellular networks. In Proceedings of Financial Crypto 2003, January 2003.

Y. Jin and G. Kesidis. Equilibria of a noncooperative game for heterogenous users of an ALOHA network. IEEE Communications Letters, 6(7):282-284, July 2002.

D. Johnson, D. Maltz, and Y.-C. Hu. The dynamic source routing protocol for mobile ad hoc networks, April 2003. www.ietf.org/internet-drafts/draft-ietf-manet-dsr-09.txt Johnson, D. S., M. Minko_, and S. Phillips (2000). The prize collecting Steiner tree problem: theory and practice, in "Proceedings of the 11th Symposium on Discrete Algorithms," pp. 760-769, ACM Press/SIAM, New York/Philadelphia.

Y. Korilis and A. Lazar. On the existence of equilibria in noncooperative optimal flow control. Journal of the ACM, 42(3):584-613, 1995.

Korilis, Y., A. A. Lazar, and A. Orda (1995). Architecting noncooperative networks, Journal on Selected Areas in Communications 13, 1241-1251.

R. La and V. Anantharam. Charge-sensitive tcp and rate control in the internet. In Proceedings of INFOCOM 2000, 2000.

R. La and V. Anantharam. Optimal routing control: Repeated game approach. IEEE Transactions on Automatic Control, 47(3):437-450, 2002.

Ron Lavi and Noam Nisan. Competitive analysis of incentive compatible on-line auctions. In Proc. 2nd ACM Conf. on Electronic Commerce (EC-00), 2000.

S.-J. Lee, W. Su, J. Hsu, M. Gerla, and R. Bagrodia. A performance comparison study of ad hoc wireless multicast protocols. In Proceedings of IEEE INFOCOM 2000, pages 565-574, March 2000.

A. Legout and E. W. Biersack. Revisiting the fair queueing paradigm for end-to-end congestion control. IEEE Network Magazine, 16(5):38-46, September 2002.

A. B. MacKenzie and S. B. Wicker. Selfish users in aloha: A game-theoretic approach. In Vehicular Technology Conference, 2001. VTC 2001 Fall. IEEE VTS 54th, volume 3, October 2001.

J. MacKie-Mason and H. Varian. Pricing congestible network resources. IEEE Journal on Selected Areas in Communications, 13(7):1141-1149, 1995.

P. Marbach. Priority service and max-min fairness. In Proceedings of IEEE INFOCOM 2002, volume 1, pages 266-275, 2002.

S. Marti, T. J. Giuli, K. Lai, and M. Baker. Mitigating routing misbehavior in mobile ad hoc networks. In Proceedings of MOBICOM 2000, August 2000.

K. Mase, Y. Wada, N. Mori, K. Nakano, M. Sengoku, and S. Shinoda. Flooding schemes for a universal ad hoc network. In Industrial Electronics Society, 2000. IECON 2000., volume 2, pages 1129-1134, 2000.

R. Mazumdar, L. Mason, and C. Douligeris. Fairness in network optimal flow control: Optimality of product forms. IEEE Transactions on Communications, 39(5):775-782, 1991.

P. Michiardi and R. Molva. Core: A collaborative reputation mechanism to enforce node cooperation in mobile ad hoc networks. In Communication and Multimedia Security 2002 Conference, 2002.

P. Michiardi and R. Molva. Game theoretic analysis of security in mobile ad hoc networks. Technical Report RR-02-070, Institut Eurécom, 2002.

P. Michiardi and R. Molva. A game theoretical approach to evaluate cooperation enforcement mechanisms in mobile ad hoc networks. In Proceedings of WiOpt '03, March 2003.

Dov Monderer and Moshe Tennenholtz. Distributed Games: From Mechanisms to Protocols. In Proceedings of the 16th National Conference on Artificial Intelligence (AAAI), pages 32-37, 1999.

Moulin, H. (1999). Incremental cost sharing; characterization by strategyproofness, Social Choice and Welfare 16, 279-320.

Moulin, H. and S. Shenker (1997). Strategyproof Sharing of Submodular Costs: Budget Balance Versus Efficiency, to appear in Economic Theory. www.aciri.org/shenker/cost.ps Moulin, Hervé, and Scott Shenker (2001). "Strategyproof Sharing of Submodular Costs: Budget Balance versus Efficiency." Economic Theory 18, 511-533.

J. B. Nagle. On packet switches with infinite storage. IEEE Transactions on Communications, 35(4):435-438, April 1987.

J. F. Nash. Non-cooperative games. Annals of Mathematics, 54(2):286-295, September 1951.

T.-W. J. Ngan, D. S. Wallach, and P. Druschel. Enforcing fair sharing of peer-to-peer resources. In Proc. 2nd Int'l Workshop on Peer-to-Peer Systems, Berkeley, Calif., February 2003.

Noam Nisan and Amir Ronen. Algorithmic mechanism design. Games and Economic Behavior, 35:166-196, 2001.

Nisan, N. (1999). Algorithms for selfish agents, in "Proceedings of the 16th Symposium on Theoretical Aspects of Computer Science," pp. 1-17, Springer-Verlag, Berlin. Lecture Notes in Computer Science, Vol. 1563.

Nisan, N. and A. Ronen (2000). Computationally Feasible VCG Mechanisms, to be presented at "Games 2000." http://www.cs.huji.ac.il/~noam/vcgbased.ps Noam Nisan and Amir Ronen. Algorithmic Mechanism Design. In Proceedings of the 31st ACM Symposium on Theory of Computing, pages 129-140, 1999.

Osborne, M.-J. and A. Rubinstein (1994). "A Course in Game Theory," MIT Press, Cambridge Mass.

R. Ogier, F. Templin, and M. Lewis. Topology dissemination based on reversepath forwarding, October 2003. vesuvio.ipv6.cselt.it/internet-drafts/draft-ietf-manet-tbrpf-11.txt E. Ogston and S. Vassiliadis. A Peer-to-Peer Agent Auction. In Proceedings of the First International Joint Conference on Autonomous Agents and Multi-Agent Systems (AAMAS), 2002.

A. Orda, R. Rom, and N. Shimkin. Competitive routing in multi-user communication networks. IEEE/ACM Transactions on Networking, 1(5):510-521, October 1993.

M. J. Osborne and A. Rubinstein. A Course in Game Theory. MIT Press, Cambridge, 1994.

C. Papadimitriou. Algorithms, games, and the internet. In Proc. 33rd ACM Symposium on Theory of Computing, pages 1-5, Hersonissos, Crete, Greece, July 2001.

D. C. Parkes. Iterative Combinatorial Auctions: Achieving Economic and Computational Efficiency (Chapter 2). PhD thesis, University of Pennsylvania, May 2001. www.eecs.harvard.edu/~parkes/pubs/ch2.ps.

W. Peng, X.-C. Lu. On the reduction of broadcast redundancy in mobile ad hoc networks. In Mobile and Ad Hoc Networking and Computing, 2000. MobiHOC., pages 129-130, 2000.

C. Perkins, E. Belding-Royer, and S. Das. Ad hoc on-demand distance vector (AODV) routing. Request for comments 3561, Internet Engineering Task Force, 2003.

C. E. Perkins, editor. Ad Hoc Networking. Addison-Wesley, Boston, 2001.

Adrian Perrig, Sean Smith, Dawn Song, and J. Doug Tygar. SAM: A Flexible and Secure Auction Architecture Using Trusted Hardware, 1991. citeseer.nj.nec.com/perrig91sam.html V. Rodoplu and H.-Y. Meng. Minimum energy mobile wireless networks. IEEE Journal on Selected Areas in Communications, 17(8):1333-1344, August 1999.

A. Rowstron and P. Druschel. Pastry: Scalable, distributed object address and routing for large-scale peer-to-peer systems. In Proc. IFIP/ACM Int'l Conf. on Distributed Systems Platforms, pages 329-350, Heidelberg, Germany, November 2001.

A. Rowstron and P. Druschel. Storage management and caching in PAST, a large-scale, persistent peer-to-peer storage utility. In Proc. 18th ACM Symposium on Operating Systems Principles, pages 188-201, Chateau Lake Louise, Banff, Canada, October 2001.

E. Royer and C.-K. Toh. A review of current routing protocols for ad hoc mobile wireless networks. IEEE Personal Communications, 6(2):46-55, April 1999.

T. Sandholm. Distributed rational decision making. In G. Weiβ, editor, Multiagent Systems: A Modern Approach to Distributed Artificial Intelligence, chapter 5. The MIT Press, 1999.

Tuomas Sandholm. Limitations of the Vickrey Auction in Computational Multiagent Systems. In Proceedings of the 2nd International Conference on Multi-Agent Systems (ICMAS). AAAI Press, 1996. Menlo Park, Calif.

S. Shenker. Making greed work in networks: A game-theoretic analysis of switch service disciplines. IEEE/ACM Transactions on Networking, 3(6):819-831, December 1995.

S. Singh, M. Woo, and C. S. Raghavendra. Power-aware routing in mobile ad hoc networks. In Proceeding of MOBICOM 1998, pages 181-190, 1998.

Shapley, L. S. (1953). A value for n-person games, in "Contributions to the Theory of Games," pp. 31-40, Princeton University Press, Princeton.

Sharman Networks. Kazaa Guide: Supernode FAQ, 2003. www.kazaa.com/us/help/faq/supernodes.htm.

J. Shneidman and D. Parkes, "Rationality and Self-Interest in Peer to Peer Networks", In Proc. 2nd Int. Workshop on Peer-to-Peer Systems (IPTPS '03), 2003, citeseer.nj.nec.com/shneidman03rationality.html Jeffrey Shneidman and David C. Parkes. Using Redundancy to Improve Robustness of Distributed Mechanism Implementations, 2003. Working Paper. Poster version to appear at ACM Conference on Electronic Commerce EC '03.

V. Srinivasan, P. Nuggehalli, C. Chiasserini, and R. Rao. Cooperation in wireless ad hoc networks. In Proceedings of INFCCOM 2003, volume 2, pages 808-817, 2003.

A. Urpi, M. Bonuccelli, and S. Giordano. Modelling cooperation in mobile ad hoc networks: a formal description of selfishness. In Proceedings of WiOpt '03, March 2003.

A. van den Nouweland, P. Borm, W. van Golstein Brouwers, R. Groot Bruinderink, and S. Tijs. A game theoretic approach to problems in telecommunication. Management Science, 42(2):294-303, February 1996.

H. R. Varian. Mechanism design for computerized agents. In Proc. First Usenix Workshop on Electronic Commerce, New York, N.Y. 1995

Vickrey, W. (1961). Counterspeculation, auctions, and competitive sealed tenders, Journal of Finance 16, 8-37.

Walsh, W. and M. Wellman (1998). A market protocol for decentralized task allocation, in "Proceedings of the Third International Conference on Multi-Agent Systems," pp. 325-332, IEEE Computer Society Press, Los Alamitos.

J. E. Wieselthier, G. D. Nguyen, and A. Ephremides. Algorithms for energy-efficient multicasting in static ad hoc wireless networks. Mobile Networks and Applications, 6:251-263, 2001.

C. Jason Woodard and David C. Parkes, 1st Workshop on the Economics of P2P systems, Strategyproof Mechanisms for Ad Hoc Network Formation, 2003, citeseer.nj.nec.com/woodard03strategyproof.html, www.sims.berkeley.edu/research/conferences/p2pecon/papers/s6-woodard.pdf Z. Zhang and C. Douligeris. Convergence of synchronous and asynchronous greedy algorithms in a multiclass telecommunications environment. IEEE Transactions on Communications, 40(8):1277-1281, 1992.

Urs Anliker, Jan Beutel, Matthias Dyer, Rolf Enzler, Paul Lukowicz, Lothar Thiele, Gerhard Troester [AnlikerBDELTT:03] A Systematic Approach to the Design of Distributed Wearable Systems IEEE Transactions on Computers Samuel Bendahan, Giovanni Camponovo, Yves Pigneur [BendahanCP:03] Multi-issue actor analysis: tools and models for assessing technology environments Journal of Decision Systems Aslan Tchamkerten [Tchamkerten:03] On the Discreteness of Capacity-Achieving Distributions IEEE Transactions on Information Theory Stephan ten Brink, Aslan Tchamkerten [BrinkT:03] Capacity of the Binary Input Rayleigh Channel with Perfect Side Information IEEE Transactions on Communications L. Buttyan, J.-P. Hubaux and S. Capkun [ButtyanHC:03] A Formal Model of Rational Exchange and its Application to the Analysis of Syverson's Protocol Journal of Computer Security Marc Heissenbüttel, Torsten Braun, Thomas Bernoulli, and Markus Waelchli [HeissenbuettelB:04a] BLR: Beacon-Less Routing Algorithm for Mobile Ad-Hoc Networks Elsevier's Computer Communications Journal Olivier Dousse, Francois Baccelli, Patrick Thiran [DousseBT:03a] Impact of Interferences on Connectivity in Ad Hoc Networks IEEE/ACM Transactions on Networking Mario Cagalj, Jean-Pierre Hubaux and Christian Enz [CagaljHE:03] Energy-efficient Broadcasting in All-wireless Networks ACM Mobile Networks and Applications (MONET)

Irena Maravic, Martin Vetterli [MaravicV:04a] Exact Sampling Results for Some Classes of Parametric Non-Bandlimited 2-D Signals IEEE Transactions on Signal Processing, Volume 52, Issue 1, January 2004

Christian Plessl, Rolf Enzler, Herbert Walder, Jan Beutel, Marco Platzner, Lothar Thiele and Gerhard Troester [PlesslEWBPTT:03] The Case for Reconfigurable Hardware in Wearable Computing Personal and Ubiquitous Computing, Springer-Verlag, Vol. 7, No. 5, pages 299-308, October 2003

L. Buttyan, J P. Hubaux [ButtyanH:03a] Stimulating Cooperation in Self-Organizing Mobile Ad Hoc Networks ACM/Kluwer Mobile Networks and Applications, Vol. 8, No. 5, October 2003

Karl Aberer, Philippe Cudré-Mauroux, Anwitaman Datta, Zoran Despotovic, Manfred Hauswirth, Magdalena Punceva, Roman Schmidt [AbererCDDHPS:03] P-Grid: A Self-organizing Structured P2P System ACM SIGMOD Record, 32(3), September 2003

Olivier Dousse, Patrick Thiran [DousseT:03] Physical connectivity of self-organized ad hoc wireless networks IEEE Intelligent systems, Vol. 18, Iss. 4, July-August 2003

Frank Siegemund, Michael Rohs [SiegemundR:03] Rendezvous Layer Protocols for Bluetooth-Enabled Smart Devices (extended version) Personal and Ubiquitous Computing Journal (PUC), vol. 7, nr. 2, July 2003

Benoît Garbinato, Philippe Rupp [GarbinatoR:03b] From Ad Hoc Networks to Ad Hoc Applications ERCIM News, no 54, July 2003

M. Gastpar, B. Rimoldi and M. Vetterli [GastparRV:03] To code or not to code: Lossy source-channel communication revisited IEEE Transactions on Information Theory, 49(5): 1147-1158, May 2003

Karl Aberer, Philippe Cudre-Mauroux, Anwitaman Datta, Zoran Despotovic, Manfred Hauswirth, Magdalena Punceva, Roman Schmidt, Jie Wu [AbererCDDHPSW:03] Advanced Peer-to-Peer Networking: The P-Grid System and its Applications PIK Journal February 2003: Special Issue on Peer-to-Peer Systems, April-June 2003

Samarjit Chakraborty, Simon Künzli, Lothar Thiele, Andreas Herkersdorf, Patricia Sagmeister [ChakrabortyKTHS:03] Performance Evaluation of Network Processor Architectures: Combining Simulation with Analytical Estimation Computer Networks, special issue on Network Processors, Volume 41, Issue 5, pages 641-665, Elsevier Science, April 2003

Srdjan Capkun, Levente Buttyan and Jean-Pierre Hubaux [CapkunBH:03] Self-Organized Public-Key Management for Mobile Ad Hoc Networks IEEE Transactions on Mobile Computing, Vol. 2, No. 1, January-March 2003

D. Tuninetti and G. Caire [TuninettiG:03] The Long-term average capacity region per unit cost with application to protocol for sensor networks European Transactions on Telecommunications. Special Issue on Selected Papers from the Conference European Wireless 2002. ETT Vol 14, No. 1, January-February 2003

L. Buttyan and J.-P. Hubaux (eds.), G. Avoine, S. Buchegger, S. Capkun, J Y. Le Boudec, S. Vaudenay et al. [ButtyanH: 03b] Report on a Working Session on Security in Wireless Ad Hoc Networks ACM Mobile Computing and Communications Review. Vol. 7, No. 1, January 2003

Karl Aberer, Anwitaman Datta, Zoran Despotovic, Andreas Wombacher [AbererDDW:03] Separating Business Process from User Interaction in Web-Based Information Commerce Electronic Commerce Research, 3 (1-2): 83-111, January-April, 2003, Kluwer Academic Publishers G. Camponovo, Y. Pigneur [CamponovoP:02a] Analyzing the m-business landscape Annals of Telecommunications, Hermes, January-February 2003, vol. 58, no. 1-2

Jeremy Elson, Kay Römer [ElsonR:03] Wireless Sensor Networks: A New Regime for Time Synchronization ACM SIGCOMM Computer Communication Review (CCR), January 2003

Karl Aberer, Philippe Cudré-Mauroux, Manfred Hauswirth [AbererCH:02a] A Framework for Semantic Gossiping ACM SIGMOD Record, December 2002

G. Avoine and S. Vaudenay [AvoineV:03a] Cryptography with Guardian Angels: Bringing civilization to pirates— Abstract In L. Buttyan and J.-P. Hubaux (Eds.), Report on a Working Session on Security in Wireless Ad Hoc Networks, ACM Mobile Computing and Communications Review (MC2R), Vol. 7., No. 1., 2003, pp. 74-94

Kay Römer, Oliver Kasten, Friedemann Mattern [RomerKM: 02] Middleware Challenges for Wireless Sensor Networks ACM SIGMOBILE Mobile Computing and Communication Review (MC2R), Fall 2002

P. L. Dragotti, S. Servetto and M. Vetterli [DragottiSV:02] Optimal filter banks for multiple description coding: analysis and synthesis IEEE Transactions on Information Theory, 48(7):2036-2052, July 2002

R. Karrer and T. Gross [KarrerG:02] Location Selection for Active Services Cluster Computing 5(3): 265-275; July 2002

M. Vetterli, P. Marziliano, T. Blu [VetterliMB:02] Sampling Signals with Finite Rate of Innovation IEEE Transactions on Signal Processing, 50(6),1417-1428, June 2002

Q. Li, B. Rimoldi, and M. K. Simon [LiRS:02] Bandwidth-Efficient Constant-Energy Trellis-Coded Modulation Schemes with Prescribed Decoding Delay IEEE Trans. on Information Theory, Vol. 48, Number 5, May 2002

L. Blazevic, S. Giordano, J.-Y. Le Boudec [BlazevicGL:02a] Self Organized Terminode Routing Cluster Computing Journal, Vol. 5, No. 2, April 2002

Mark Heitmann, Peter Aschmoneit [HeitmannA:02a] Customer Centred Community Application Design International Journal on Media Management (4:1, Spring 2002)

S. Capkun, M. Hamdi, J. P. Hubaux [CapkunHH:02] GPS-free Positioning in Mobile Ad-Hoc Networks In Cluster Computing Journal, April 2002, Vol. 5, No. 2

Magaly Dubosson, Alexander Osterwalder, Yves Pigneur [DubossonOP:02] ebusiness Model Design, Classification and Measurements Thunderbird International Business Review, January 2002, vol. 44, no. 1: 5-23

K. Aberer, M. Punceva, M. Hauswirth, R. Schmid [AbererPHS:02] Improving Data Access in P2P Systems IEEE Internet Computing, January/February 2002, pp. 58-67

L. Blazevic, L. Buttyan, S. Capkun, S. Giordano, J. P. Hubaux, J. Y. Le Boudec [BlazevicBCGHL:01] Self-Organization in Mobile Ad-Hoc Networks: the Approach of Terminodes IEEE Communications Magazine, June 2001.

S. Servetto, K. Nahrstedt [ServettoN:01] Broadcast-Quality Video over IP IEEE Transactions on Multimedia, 3(1):162-173, March 2001

J. P. Hubaux, Th. Gross, J. Y. Le Boudec, M. Vetterli [HubauxGLV:01] Towards self-organized mobile ad hoc networks: the Terminodes project IEEE Communications Magazine, January 2001.

Evaluation of the Zaurus SL5600 PDA as a platform for ad-hoc networking L. Previtali www.terminodes.org/MV2003-Present/Lu13/Zaurus_Previtali.pdf Simulating large ad-hoc networks with ns-2 V. Naoumov, www.terminodes.org/MV2003-Present/Lu13/Simulating-Naoumov.pdf Security of emergent properties in ad-hoc networks Prof. V. Gligor, Univ. of Maryland www.terminodes.org/MV2003-Present/Ma14/Gligor-MonteVerita.pdf On the self-organization of security in multi-hop networks Prof. JP. Hubaux www.terminodes.org/MV2003-Present/Ma14/Multi-Hop-JPH.pdf Immune Networking Systems Prof. J.-Y. Le Boudec www.terminodes.org/MV2003-Present/Ma14/ImmuneLeBoudec.pdf Fair exchange with guardian angels G. Avoine www.terminodes.org/MV2003-Present/Ma14/FairExchange-Avoine.pdf Spatial analysis of mobile ad-hoc networks under the Signal to Interference Ratio connectivity model Prof. F. Baccelli, Ecole Normale Supérieure and INRIA, Paris www.terminodes.org/MV2003-Present/Me15/Spacial-Baccelli.pdf Connectivity and interferences in wireless ad-hoc networks, a percolation approach O. Dousse www.terminodes.org/MV2003-Present/Me15/OlivierDousseMonteverita.pdf Ad-hoc networks: the worst and the average case Prof. R. Wattenhofer www.terminodes.org/MV2003-Present/Me15/MV-Wattenhofer.pdf www.terminodes.org
www.google.com/search?&q=terminodes
www.ietf.org/html.charters/manet-charter.html.
citeseer.nj.nec.com/cs?cs=1&q=manet&submit=Documents
www.google.com/search?&q=%22ad+hoc %22+and+game
citeseer.nj.nec.com/cs?cs=1&q=game+and+%22ad+hoc %22
carmen.cselt.it/idxwg/manet.html Combinatorial Optimization and Auctions Buckley, F. and Harary, F. Distances in Graphs. Redwood City, Calif.: Addison-Wesley, 1990.

Garey, M. R. and Johnson, D. S. Computers and Intractability: A Guide to the Theory of NP-Completeness. New York: W. H. Freeman, 1983.

Karp, R. M. "Reducibility Among Combinatorial Problems." In Complexity of Computer Computations, (Proc. Sympos. IBM Thomas J. Watson Res. Center, Yorktown Heights, N.Y., 1972). New York: Plenum, pp. 85-103, 1972.

Levin, L. A. "Universal Searching Problems." Prob. Info. Transm. 9, 265-266, 1973.

Papadimitriou, C. H. and Steiglitz, K. Combinatorial Optimization: Algorithms and Complexity. New York: Dover, 1998.

Algorithms and Theory of Computation Handbook, CRC Press LLC, 1999, "NP-hard", from Dictionary of Algorithms and Data Structures, Paul E. Black, ed., NIST.

www.nist.gov/dads/HTML/nphard.html
db.uwaterloo.ca/~alopez-o/comp-faq/faq.html

S. Cook. "The complexity of theorem-proving procedures", Proceedings of the 3rd Annual Symposium on the Theory of Computing, ACM, New York, 151-158.

J. Edmonds. Paths, trees, and flowers. Canadian Journal of Mathematics, 17, pp. 449-467.

M. R. Garey, D. S. Johnson. Computers and Intractability, W.H. Freeman & Co, 1979.

L. Levin. Universal Search Problems, Probl. Pered. Inf. 9(3), 1973. A translation appears in B. A. Trakhtenbrot. A survey of Russian approaches to Perebor (brute-force search) algorithms, Annals of the History of Computing, 6(4):384-400, 1984 www.nada.kth.se/~viggo/problemlist/compendium.html Algorithm for Optimal Winner Determination in Combinatorial.—Sandholm (2001) wireless.fcc.gov/auctions/conferences/combin2001/papers/sandholm6.pdf Bidding and Allocation in Combinatorial Auctions—Nisan (2000) www.cs.berkeley.edu/~christos/games/readings/nisanauctions.ps Integer Programming for Combinatorial Auction Winner.—Andersson, Tenhunen, Ygge (2000) www.csd.uu.se/~arnea/abs/./ps/icmas00.ps Iterative Combinatorial Auctions: Theory and Practice—Parkes, Ungar (2000) www.eecs.harvard.edu/econcs/pubs/ibundle00.pdf CABOB: A Fast Optimal Algorithm for Combinatorial Auctions—Sandholm, Suri, Gilpin (2001) www.cs.ucsb.edu/~suri/psdir/cabob.ps Some Tractable Combinatorial Auctions—Tennenholtz (2000) iew3.technion.ac.il/~moshet/bmatchaaai.ps Truth Revelation in Approximately Efficient.—Lehmann, O'Callaghan. (1999) www.cs.huji.ac.il/%7Elehmann/papers/mechanisms/LCS.ps Optimal Solutions for Multi-Unit Combinatorial Auctions.—Gonen, Lehmann (2000) www.cs.huji.ac.il/~lehmann/Leibniz/EC00sub.ps A Combinatorial Auction for Collaborative Planning—Hunsberger, Grosz (2000) www.eecs.harvard.edu/grosz/papers/HunsbergerGro2000-ICMAS.ps eMediator: A Next Generation Electronic Commerce Server—Sandholm (2002) www-2.cs.cmu.edu/~sandholm/eMediator.ci.pdf eMediator: A Next Generation Electronic Commerce Server—Sandholm (1999) siesta.cs.wustl.edu/~sandholm/eMediator.tr.ps Towards a Universal Test Suite for Combinatorial.—Leyton-Brown, Pearson. (2000) robotics.stanford.edu/CATS/CATS.ps Combinatorial Auctions for Supply Chain Formation—Walsh, Wellman, Ygge (2000) www-personal.engin.umich.edu/~wew/Papers/ec00.ps Mutually Destructive Bidding: The FCC Auction Design Problem—Mark Bykowsky Robert (1995) www.hss.caltech.edu/~jledyard/MDBpap_d1.pdf Combinatorial Auctions with Decreasing Marginal Utilities—Lehmann, Lehmann (2001) www.cs.huji.ac.il/%7Elehmann/papers/mechanisms/LLN.ps Combinatorial Auctions with Decreasing Marginal Utilities.—Lehmann, Lehmann, Nisan (2001) www.cs.huji.ac.il/~lehmann/papers/mechanisms/EC01.ps Winner Determination in Combinatorial Auction.—Sandholm, Suri, Gilpin. (2002) www.cs.ucsb.edu/~suri/psdir/general.ps Preventing Strategic Manipulation in Iterative Auctions: Proxy.—Parkes, Ungar (2000) www.eecs.harvard.edu/econcs/pubs/iGVA00.pdf Towards a Characterization of Truthful Combinatorial Auctions—Lavi, Mu'alem, Nisan (2003) www.cs.huji.ac.il/~noam/partial.ps Preference Elicitation in Combinatorial Auctions (Extended.—Conen, Sandholm (2001) www.cs.cmu.edu/~sandholm/elicitation.acmec01.pdf Reducing Truth-telling Online Mechanisms to Online.—Baruch Awerbuch Yossi (2003) www.math.tau.ac.il/~azar/price.ps A Combinatorial Auction with Multiple Winners for Universal.—Kelly, Steinberg (1998) www.statslab.cam.ac.uk/~frank/AUCTION/ks-16mar00.ps A Combinatorial Auction with Multiple Winners for Universal.—Frank Kelly Richard (1998) www.statslab.cam.ac.uk/~frank/AUCTION/auction.pdf An Approximate Truthful Mechanism for.—Archer. (2003) www.cs.cornell.edu/People/eva/papers/soda03.pdf Multiple-Issue Auction and Market Algorithms for the.—Teich, Wallenius. (1999) www-ec.njit.edu/~bartel/Nego-Pap/MultipleIssueAuctions.pdf Costly Valuation Computation in Auctions—Larson, Sandholm (2001) www.cs.cmu.edu/~sandholm/tark01.pdf Robust Combinatorial Auction Protocol against False-name Bids—Yokoo, Sakurai, Matsubara (2000) www.kecl.ntt.co.jp/csl/ccrg/members/yokoo/PDF/aaai2000.pdf Incentive Compatible Multi Unit Combinatorial Auctions—Bartal, Gonen (2002) www.cs.huji.ac.il/~noam/icmuca.ps Secure Multi-agent Dynamic Programming based on Homomorphic.—Yokoo, al. (2002) www.kecl.ntt.co.jp/csl/ccrg/members/yokoo/PDF/aamas2002-secure-wd.pdf Exploring Bidding Strategies for Market-Based Scheduling—Reeves, Wellman. (2003) ai.eecs.umich.edu/people/wellman/pubs/dexter.pdf Preference Elicitation and Query Learning—Blum, Jackson, Sandholm, Zinkevich (2003) www-2.cs.cmu.edu/People/avrim/Papers/prefelicitCOLT.ps An Efficient Approximate Algorithm for Winner.—Sakurai, Yokoo, Kamei (2000) www.kecl.ntt.co.jp/csl/ccrg/members/yuko/ec00.ps On the Sensitivity of Incremental Algorithms for.—Kastner, Hsieh. (2002) www.ece.ucsb.edu/~kastner/papers/incremental_alg_CA.pdf Effectiveness of Preference Elicitation in Combinatorial.—Hudson, Sandholm (2002) www-2.cs.cmu.edu/~sandholm/elicitation.CMU-CS-02-124.pdf Constructing and Clearing Combinatorial Exchanges Using.—Smith, Sandholm, Simmons (2002) www-2.cs.cmu.edu/~sandholm/exchange_elicitation.pdf Opportunity Cost Algorithms for Combinatorial Auctions—Akcoglu, Aspnes, DasGupta. (2000) www.cs.yale.edu/homes/aspnes/auctions-full.ps SAM: A Flexible and Secure Auction Architecture Using.—Perrig, Smith, Song. (1991) paris.cs.berkeley.edu/~perrig/projects/SAM/sam-ejeta.ps.gz On the Sensitivity of Incremental Algorithms for.—Kastner, Hsieh. (2002) beijing.cs.ucla.edu/~kastner/papers/PRELIM-ec01-incremental_CA.ps Using Value Queries in Combinatorial Auctions—Beno Hudson Tuomas (2003) www-2.cs.cmu.edu/sandholm/using_value_queries.acmecposter03.pdf Characterization of Strategy/False-name Proof Combinatorial.—Yokoo (2003) www.eecs.harvard.edu/~pesha/Public/111.pdf On Polynomial-Time Preference Elicitation with Value Queries—Zinkevich, Blum, Sandholm (2003) www-2.cs.cmu.edu/People/avrim/Papers/prefelicitACMEC.ps Exploring Bidding Strategies for Market-Based Scheduling—Wellman, MacKie-Mason. (2003) ai.eecs.umich.edu/people/wellman/pubs/dexter02.pdf The Effect of False-name Bids in Combinatorial Auctions.—Yokoo, Sakurai. (2003) www.kecl.ntt.co.jp/csl/ccrg/members/yokoo/PDF/geb-false-name-2003.pdf Solving Concisely Expressed Combinatorial Auction Problems—Boutilier (2002) www.cs.toronto.edu/~cebly/Papers/bidcomp.pdf Mechanism Design with Incomplete Languages—Ronen (2001) robotics.stanford.edu/~amirr/incomleteLang7.pdf Extremal Behaviour in Multiagent Contract Negotiation—Dunne (2004) www.csc.liv.ac.uk/research/techreports/tr2004/ulcs-04-012.pdf An Iterative Generalized Vickrey Auction: Strategy-Proofness.—Parkes (2001) www.eecs.harvard.edu/econcs/pubs/ivickrey01.pdf Preference Elicitation in Proxied Multiattribute Auctions—Sunderam, Parkes (2002) www.eecs.harvard.edu/econcs/pubs/proxysunderam.ps Price-Based Information Certificates for Minimal-Revelation.—Parkes (2002) www.eecs.harvard.edu/~parkes/pubs/certificates.pdf AkBA: A Progressive, Anonymous-Price Combinatorial Auction—Wurman, Wellman (2000) www.csc.ncsu.edu/faculty/wurman/Papers/Wurman-EC00.ps Secure Combinatorial Auctions by Dynamic Programming with.—Suzuki, Yokoo (2002) www.kecl.ntt.co.jp/csl/ccrg/members/yokoo/PDF/fc02.pdf An Efficient Approximate Allocation Algorithm for.—Zurel, Nisan (2001) www.cs.huji.ac.il/~zurel/alppaper/paper.ps.gz An Iterative Generalized Vickrey Auction: Strategy-Proofness.—Parkes (2001) www.cis.upenn.edu/~dparkes/pubs/ivickrey01.ps Declarative Specification and Solution of Combinatorial.—Baral, Uyan (2001) www.public.asu.edu/~cbaral/papers/lpnmr01-BU.ps Robust Double Auction Protocol against False-name bids—Yokoo, Sakurai, Matsubara (2001) www.kecl.ntt.co.jp/csl/ccrg/members/yokoo/PDF/icdcs2001-camera.pdf Truth Revelation in Rapid, Approximately Efficient.—Lehmann, O'Callaghan. (1999) www.cs.huji.ac.il/~lehmann/papers/mechanisms/EC99.ps.gz Applying Learning Algorithms to Preference Elicitation—Sebastien Lahaie Harvard (2004) www.eecs.harvard.edu/econcs/bib/./cache/lahaie04.pdf Secure Generalized Vickrey Auction without Third-party Servers—Yokoo, Suzuki (2004) lang.is.kyushu-u.ac.jp/~yokoo/PDF/fc2004.pdf An Implementation of the Combinatorial Auction Problem in ECL—Robert Menke And (2000) www.ics.uci.edu/~csp/r88.ps Learning the Empirical Hardness of Optimization.—Leyton-Brown. (2002) www.cs.ubc.ca/~kevinlb/computation.ps A New and Improved Design for Multi-Object Iterative.—Kwasnica, Ledyard. (2002) lema.smeal.psu.edu/kwasnica/RAD502.pdf Generalizing Preference Elicitation in Combinatorial Auctions—Hudson, Sandholm (2003) 2.cs.cmu.edu/~sandholm/generalizing_pref_elicit_in_CAs.AAMASposter03.pdf An Algorithm for Computing the Outcome of Combinatorial.—Wurman, Sureka, Cai (2003) www.csc.ncsu.edu/faculty/wurman/Papers/predictor.pdf Self-enforcing Strategic Demand Reduction—Reitsma, Stone, Csirik, Littman (2002) www.cs.utexas.edu/users/pstone/Papers/2002amec/PRSDR.ps.gz Task Allocation in the RoboCup Rescue Simulation Domain.—Nair, Ito, Tambe. (2001) www.isi.edu/teamcore/tambe/papers/2002/rescue.ps Learning the Empirical Hardness of Optimization.—Leyton-Brown. (2002) robotics.stanford.edu/~kevinlb/computation.ps Bundle Design in Robust Combinatorial Auction Protocol.—Yokoo, Sakurai. (2001) www.kecl.ntt.co.jp/csl/ccrg/members/yokoo/PDF/ijcai2001-bundle.pdf Robust Multi-unit Auction Protocol against False-name Bids—Yokoo, Sakurai, Matsubara (2001) www.kecl.ntt.co.jp/csl/ccrg/members/yokoo/PDF/ijcai2001-ir.pdf The Communication Complexity of Approximate Set Packing and Covering—Nisan (2001) www.cs.huji.ac.il/~noam/ccauccs.ps Mirage: A Microeconomic Resource Allocation System for.—Brent Chun Philip (2005) www.eecs.harvard.edu/~chaki/doc/mirage.pdf Addressing Strategic Behavior in a Deployed—Microeconomic Resource Allocator www.eecs.harvard.edu/~chaki/doc/p2pecon05.pdf A Reinforcement Learning Approach for Supply Chain—Management Tim Stockheim www.wiiw.de/publikationen/AReinforcementLearningApproach.pdf Specifying and Monitoring Market Mechanisms—Using Rights And www.eecs.harvard.edu/econcs/pubs/rights_long.pdf Protocol/Mechanism Design for Cooperation/Competition—Yokoo (2004) www.aamas2004.org/proceedings/002-yokoom_design.pdf GROWRANGE: Anytime VCG-Based Mechanisms—David Parkes Division www.eecs.harvard.edu/econcs/pubs/anytime.pdf Hard-to-Manipulate VCG-Based Auctions—Saurabh Sanghvi David www.eecs.harvard.edu/econcs/pubs/hard_to_manipulate.pdf Applying Learning Algorithms to Preference Elicitation in—Combinatorial Auctions. www.eecs.harvard.edu/econcs/pubs/lahaie_uce.pdf Resource Allocation in Federated Distributed.—AuYoung, Chun. (2004) berkeley.intel-research.net/bnc/papers/oasis04.pdf Optimal Models of Disjunctive Logic Programs: Semantics.—Nicola Leone Francesco (2004) www.icons.rodan.pl/publications/[Leone2004].pdf Strategy/False-name Proof Protocol for Combinatorial.—Suyama, Yokoo (2004) www.aamas2004.org/proceedings/022_-suyamat_false_name-proof2.pdf Statement of Interest for Bayesian Modeling Applications.—Vincent Conitzer download.intel.com/research/share/UA103_workshop/Conitzer/conitzer_sandholm_applications_soi.pdf Computing Price Trajectories in Combinatorial—Auctions With Proxy Bidding, Peter R. Wurman www.csc.ncsu.edu/faculty/wurman/Papers/Wurman-ECRA.pdf The Communication Requirements of Social Choice Rules and.—Segal (2004) www.stanford.edu/~isegal/rules.pdf CS294 Game Theory and the Internet Fall 2003—Lecture Lecturer Christos http.cs.Berkeley.edu/~christos/games03/scribe1015.ps Combinatorial Auctions with Structured Item Graphs—Vincent Conitzer www-2.cs.cmu.edu/~sandholm/CAs_structured.aaai04.pdf Understanding Random SAT:—Beyond The Clauses-To-Variables robotics.stanford.edu/~eugnud/papers/randomsat.ps Truthful Approximation (;)-Bounded Algorithms for.—Rica Gonen School www.cs.huji.ac.il/~yair/x.ps Iterative Dutch Combinatorial Auctions—Shantanu Biswas Biswas people.csa.iisc.ernet.in/~biswas/annals.ps Multi-Unit Combinatorial Auctions: an Exact Approach—Mansini, Speranza (2003) www.unipa.it/Odysseus/Odysseus2003_file/odysseus-main_file/pdf/MansiniSperanza.pdf Towards a Characterization of Polynomial—Preference Elicitation With . . . www.imc.pi.cnr.it/~santi/papers/COLT04 FULL.ps Self-interested Automated Mechanism Design and—Implications For Optimal www-2.cs.cmu.edu/~sandholm/SI_AMD_and_CAs.acmec04.pdf An Auction Based Approach in Decentralized Project.—Giuseppe Confessore. (2002) www.adeit.uv.es/pms2002/papers/N23.pdf Second-Chance Auctions for Multimedia Session Pricing—Peter Reichl Sandford userver.ftw.at/~reichl/publications/MIPS03.pdf Computationally-Feasible Truthful Auctions for Convex Bundles—Babaioff, Blumrosen (2004) www.cs.huji.ac.il/~liad/papers/convex-auctions.ps Computing Price Trajectories in Combinatorial Auctions—With Proxy Bidding www.csc.ncsu.edu/faculty/wurman/Papers/ProxyPrices-FCC.pdf Research Opportunities in Combinatorial Auction Problem: Winner.—Sum (2001) www4.comp.polyu.edu.hk/~cspfsum/techreport/emarket_proposal.ps Optimal Investment in Knowledge Within—Firm Using Market cism.bus.utexas.edu/works/articles/knowledge.pdf Exploring Bidding Strategies for Market-Based—Scheduling Michael Wellman www-personal.umich.edu/~jmm/papers/dexter_19jun02.pdf Opportunity Cost Algorithms www.cs.uic.edu/~dasgupta/resume/publ/papers/kao_auction.ps.Z Comparative Analysis on Two Selling Mechanisms: Multi-unit-Combinatorial Auction And (2001) www4.comp.polyu.edu.hk/~cspfsum/techreport/sum_tr100a_2001.ps Incompletely Specified Combinatorial Auctions Joni L. Jones—Computer And Information www.cba.ufl.edu/dis/papers/msjj.pdf Towards a Micro-Economic Model for Resource Allocation—In Grid Computing (2002) www.cs.umanitoba.ca/~anrl/PUBS/ccece2002_kumaran.pdf Economically-Augmented Job Shop Scheduling—Wolfram Conen Xonar nestroy.wi-inf.uni-essen.de/~conen/conen/paper/conen-final-ICAPS.pdf An Allocation Heuristic for Combinatorial Auctions Joni L. Jones—Michael And Mary www.cba.ufl.edu/dis/papers/0106100.pdf Coordinated Aggressive Bidding in Distributed—Combinatorial Resource. (2003) www.isi.edu/~frank/Papers/aamas-workshop-2003.pdf Bidtree ordering in IDA® combinatorial auction.—Collins, Demir, Gini www.cs.umn.edu/magnet/papers/common/col02amec.ps Exploring CP-IP based techniques for the bid evaluation in.—Guerri, Milano (2003) www-lia.deis.unibo.it/Research/TechReport/lia03003.ps Multi-Agent Negotiation using Combinatorial Auctions with.—Collins, Gini, Mobasher www.cs.umn.edu/magnet/papers/common/mas99.ps Boosting as a Metaphor for Algorithm Design—Leyton-Brown, Nudelman. robotics.stanford.edu/~kevinlb/boosting.ps An Ascending-Price Generalized Vickrey Auction—Parkes, Ungar (2002) www.eecs.harvard.edu/econcs/pubs/iBEA.pdf A Constraint Programming Agent for Automated Trading—Aurell, Boman, Carlsson. www.sics.se/~sverker/public/papers/sics_tac_01.pdf Online Auction Site Management—Wurman www.csc.ncsu.edu/faculty/wurman/Papers/Wurman-article.pdf Algorithms for a Temporal Decoupling Problem in Multi-Agent.—Hunsberger (2002) consystlab.unl.edu/eLibrary/Hunsberger-aaai2002.ps Task Allocation in the RoboCup Rescue—Nair, Ito, Tambe, Marsella (2001) www.isi.edu/teamcore/Rescue/Rescue-ISI-JAIST.pdf Theory, Experiment and the Federal Communications.—Jeffrey Banks Mark (2001) wireless.fcc.gov/auctions/conferences/combin2001/papers/vsmith.pdf Preference Elicitation and Allocation with Read-Once.—Zinkevich, Blum, Sandholm (2002) www-2.cs.cmu.edu/~sandholm/prefelicit8.ps Price-oriented, Rationing-free Protocol: Guideline for.—Yokoo, Sakurai (2002) www.kecl.ntt.co.jp/csl/ccrg/members/yokoo/PDF/gtdt2002.pdf Multiagent Auctions for Multiple Items—Ben-Ameur, Chaib-draa, Kropf (2001) damas.ift.ulaval.ca/~benameur/auction/aois.pdf Auctions with Endogenously . . .—Park, al. (2001) rutcor.rutgers.edu/pub/rrr/reports2001/03.pdf Lecture 9,10: March 13,20—Lecturer Christos Papadimitriou www.cs.berkeley.edu/~christos/games/ln9.ps Competition For vs. On the Rails: A Laboratory Experiment—Cox, Offerman, Olson, Schram w3.arizona.edu/~econ/working_papers/compvson.pdf Optimal Models of Disjunctive Logic Programs.—Leone, Scarcello. (2001) www.cs.umd.edu/Library/TRs/CS-TR-4298/CS-TR-4298.ps.Z Algorithms for Combinatorial Coalition Formation and Payoff.—Li, Sycara (2001) www.ri.cmu.edu/pub_files/pub3/li_cuihong_2001_1/li_cuihong_2001_1.ps.gz Combinatorial Auctions, Knapsack Problems, and Hill-climbing Search—Holte (2001) www.site.uottawa.ca/~holte/Publications/ai2001.ps Sardine: An Agent-facilitated Airline Ticket Bidding System—Morris, Maes (2000) www.media.mit.edu/~joanie/sardine/AGENTS2000-DEMO-Sardine.pdf Negotiating Beyond the Bid Price—Morris, Maes (2000) www.zurich.ibm.com/~mrs/chi00/contributions/morris.pdf Optimal Bid Sequences for Multiple-Object Auctions with.—Chen, Kao, Lu (2000) www.iis.sinica.edu.tw/~hil/paper/auction.ps.gz Optimal Investment in Knowledge within a Firm Using a Market.—Ba (1999) cism.bus.utexas.edu/works/articles/sulin.pdf Approximately-Strategyproof and Tractable Multi-Unit Auctions—Kothari, Parkes, Suri (2003) www.eecs.harvard.edu/econcs/pubs/p133-kothari.ps Solving Combinatorial Exchanges: Optimality via a Few.—Kothari, Sandholm, Suri (2004) www.aamas2004.org/proceedings/233_kotharia_partial-2.pdf Effectiveness of Preference Elicitation in Combinatorial.—Hudson, Sandholm (2002) www-2.cs.cmu.edu/~sandholm/effectiveness_of_elicitaton.amec02.pdf Using Value Queries in Combinatorial Auctions—Beno Hudson Tuomas (2003) www-2.cs.cmu.edu/~sandholm/using_value_queries.acmecposter03.pdf BOB: Improved Winner Determination in Combinatorial Auctions.—Sandholm, Suri (2003) www-2.cs.cmu.edu/~sandholm/bidbranching.aaai00.extended.ps Optimal Clearing of Supply/Demand Curves—Sandholm, Suri (2002) www-2.cs.cmu.edu/~sandholm/supply-demand.aaai02WS.pdf Resource Allocation in Computational Grids—Market Engineering Approach www.iw.uni-karlsruhe.de/Publications/SchnizlerNeumannWeinhardt_04_ResourceAllocation.pdf Anonymous Pricing of Efficient Allocations in Combinatorial.—Wolfram Conen Fh (2004) www.aamas2004.org/proceedings/033-conenw_pricing.pdf Combinatorial Auctions and Knapsack Problems—Kelly (2004) www.aamas2004.org/proceedings/175_-kellyt_knapsack.pdf Generalized Knapsack Solvers for Multi-Unit Combinatorial.—Kelly (2004) ana.lcs.mit.edu/peyman/AMEC-VI/final-papers/Kelly.pdf Combinatorial Auctions and Knapsack Problems—Kelly www.eecs.umich.edu/~tpkelly/papers/kellyt_knapsack.ps An Iterative Auction Mechanism for Combinatorial Exchanges—Shantanu Biswas Narahari (2003) people.csa.iisc.ernet.in/~biswas/iterative_greedy.ps Incentive-Compatible, Budget-Balanced, yet Highly Efficient.—Babaioff, Walsh (2004) www.cs.huji.ac.il/~mosheb/trad-red-journal.ps Self Reordering for security in Generalized English Auctions.—Silaghi, Faltings (2002) www.cs.fit.edu/~msilaghi/papers/AAMAS2002-GEA.pdf Coherent Pricing of Efficient Allocations in Combinatorial.—Wolfram Conen Xonar (2002) www-2.cs.cmu.edu/~ sandholm/pricing.AAAI-02_GTDT_WS.pdf Multiscaling in Inelastic Collisions—Ben-Naim, Krapivsky (2000) isbp.lanl.gov/~ebn/posters/collision.ps A Non-diffident Combinatorial Optimization Algorithm—Trombettoni, Neveu. ftp-sop.inria.fr/cermics/contraintes/neveu/ssrhp.ps.gz Constant Ratio Approximations of Feedback Vertex Sets in.—Bafna, Bergman, Fujito (1996) dimacs.rutgers.edu/pub/dimacs/TechnicalReports/TechReports/1996/96-29.ps.gz Object Oriented Structuing of Real Time Control Systems—Fabian, Lennartson www.s2.chalmers.se/~fabian/Personal/oosrts.ps A Random Walk On The Rook Placements On A Ferrers Board—Hanlon www.zbmath.fiz-karlsruhe.de/e-journals/EJC/Volume_3/./Volume_3/PostScriptfiles/v3l2r26.ps A Variable Depth Search Algorithm with Branching Search.—Yagiura, Yamaguchi. (1998) algo.kuamp.kyoto-u.acjp/members/yagiura/./papers/oms98_300 dpi.ps.gz Extensions and Explorations of the Elastic Arms Algorithm—Ohlsson (1992) ftp.cis.ohio-state.edu/pub/neuroprose/ohlsson.track.ps.Z Bibliography—Aarts Korst www.cs.mu.oz.au/~rwebber/research/thesis/chbib.ps.gz Using Case-Based Reasoning as a Reinforcement Learning.—Zeng, Sycara www.cs.cmu.edu/afs/cs/usr/katia/www/cabins-papers/ictai95-final.ps.gz On Bounding the Betti Numbers and Computing the Euler.—Basu (1997) cs.nyu.edu/phd_students/saugata/papers.postscript/journal97.ps.gz 0/1-Integer Programming: Optimization and Augmentation.—Schulz, Weismantel. (1995) ftp.zib.de/pub/zib-publications/reports/SC-95-08.ps Optimization by Genetic Annealing—Xin Yao (1991) www.cs.adfa.oz.au/pub/xin/acnn91.ps.Z Parallel Hybrid Meta-Heuristics: Application to the.—Bachelet, Preux, Talbi (1996) www.lift.fr/~talbi/poc96.ps Neural Networks For NP-Complete Problems—Budinich (1996) www.ts.infn.it/~mbh/NN_NPC_probs.ps.Z A Self-Stabilizing Distributed Branch-and-Bound Algorithm—Yahfoufi, Dowaji (1996) ftp.prism.uvsq.fr/pub/reports/1995/1995.019.ps A Parallel Branch Bound Algorithm for Makespan Optimal.—Brockmann, Dangelmaier (1997) www.uni-paderborn.de/SFB376/c2/publications/cesa98-fspm-paper.ps.gz All the needles in a haystack: Can exhaustive search.—Nievergelt, Gasser. (1995) ftp.inf.ethz.ch/pub/org/ti/jn/paper/paper.ps.gz Practical Methods for Approximating Shortest Paths on a Convex.—Hershberger (1995) www.cs.wustl.edu/cs/techreports/1994/wucs-94-31.ps.Z Modeling Diagrammatic Reasoning Tasks with a Topological.—Giavitto, Valencia www.lri.fr/~giavitto/UTopola/twd98final.ps.gz Design and Dimensioning of Survivable SDH/SONET Networks—Soriano, Wynants, al. (1998) smg.ulb.ac.be/Preprints/FullText/Fortz98_12.ps.gz From Approximate to Optimal Solutions: Constructing Pruning and.—Gent, Walsh (1997) www.cs.strath.ac.uk/~apes/papers/cdbf.ps.gz Goals for Concept Representation in the GALEN project—Rector (1993) mighp0.cs.man.ac.uk/mig/pub/papers/scamc93.ps Evaluating the Trade-Offs in the Parallelization.—Carceroni, Meira. (1997) www.cs.rochester.edu/u/sandhya/papers/brazil97.ps A Polynomial Time Algorithm for the N-Queens Problem—Sosic, Gu (1990) www.cit.gu.edu.au/~sosic/papers/sigart90.ps.Z Learning in the Presence of Malicious Errors—Kearns (1993) www.research.att.com/~mkearns/papers/malicious.ps.Z The Computational Complexity of Cartographic Label Placement—Marks, Shieber (1991) www.eecs.harvard.edu/shieber/papers/label.ps.gz Complexes Of Not i-Connected Graphs—Babson, Björner, Linusson. (1996) www.matematik.su.se/users/linusson/artiklar/Topology.dvi.ps Oracles in . . . are Sufficient for Exact Learning—Köbler, Lindner (1997) theorie.informatik.uni-ulm.de/pub/papers/ti/learning.ps.gz Proactive RSA—Frankel, Gemmell, MacKenzie, Yung (1997) www.hrl.il.ibm.com/Proactive/Papers/pro_rsa.ps.gz Computing Many Faces in Arrangements of Lines and Segments—Agarwal, Matousek. (1994) ftp.cs.duke.edu/pub/dist/techreport/1994/1994-17.ps.Z Visibility in Pseudo-Polygons and Vertex-Edge.—O'Rourke, Streinu (1995) ams.sunysb.edu/pub/geometry/msi-workshop/95/streinu-full.ps.gz The Maximum Clique Problem—Bomze, Budinich, Pardalos, Pelillo (1999) www.dsi.unive.it/~pelillo/papers/tr99-1.ps.gz Data Structures for Mobile Data—Basch, Guibas, Hershberger theory.stanford.edu/~jbasch/compressed/papers/bgh-dsmd-97.ps.gz An Evolutionary Heuristic for the Minimum Vertex Cover Problem—Khuri, Back (1994) ftp.cs.cuhk.hk/pub/EC/GA/papers/ki94.ps.gz Genetic Programming in Database Query Optimization—Stillger, Spiliopoulou (1996) www.wiwi.hu-berlin.de/~myra/C_GP96.ps.gz Guarding Polyhedral Terrains—Bose, Shermer, Toussaint, Zhu (1992) www-cgrl.cs.mcgill.ca/~godfried/publications/terrain.ps.gz Oscillation, Heuristic Ordering and Pruning in Neighborhood.—Labat, Mynard www-poleia.lip6.fr/~mynard/frames/./ps/cp97.ps.gz Designing Algorithms By Sampling—Goldberg, Hollinger (1998) www.cs.rpi.edu/pub/goldberg/learning.ps.gz On the Hardness of Approximating MAX k-CUT and its Dual—Kann, Khanna, Lagergren. (1995) cm.bell-labs.com/cm/ms/who/sanjeev/postscriptum/maxcut.ps.gz Oriented Matroids Today—Ziegler (1998) www.wisdom.weizmann.ac.il/Research/EIJC/Journal/Surveys/ds4.ps Solving Small TSPs with Constraints—Caseau, Laburthe (1997) www.dmi.ens.fr/users/laburthe/papers/iclp97.ps.gz
When Gravity Fails: Local Search Topology—Frank, Cheeseman, Stutz (1997) ic-www.arc.nasa.gov/ic/people/frank/plateau.jair97.ps
Guarded Expressions in Practice—Dolzmann, Sturm (1997) www.fmi.uni-passau.de/~redlog/paper/MIP-9702.ps.Z
The VC-Dimension of Set Systems Defined by Graphs—Kranakis, Krizanc, Ruf. (1996) www.cis.tu-graz.ac.at/igi/bruf/vc_detail.ps.gz
Fitness Landscapes Arising from the Sequence-Structure Maps of.—Stadler (1997) www.tbi.univie.ac.at/papers/Abstracts/97-09-001.ps.gz
Combinatorial and Geometric Approaches to Counting.—Imai, Iwata, Sekine. (1996) naomi.is.s.u-tokyo.acjp/papers/Tutte-Polynomial/linear_600.ps.gz
Buildings and Non-positively Curved Polygons of Finite Groups—Brown (1998) www.math.ethz.ch/EMIS/journals/NYJM/j/1998/4-15.ps
A General Purpose Distributed Implementation of Simulated—Diekmann, Luling, Simon (1992) www.uni-paderborn.de/fachbereich/AG/monien/PUBLICATIONS/POSTSCRIPTS/IndSimAnnealing_SPDP92.ps.Z
A Self-Stabilizing Algorithm For The Maximum Flow Problem—Ghosh, Gupta, Pemmaraju (1995) www.cs.uiowa.edu/ftp/sriram/self_stabilization/flow.ps.gz
Partitioning Meshes with Lines and Planes—Cao, Gilbert, Teng (1996) parcftp.parc.xerox.com/pub/gilbert/csl9601.ps.Z
Algebraic Combinatorics with MAPLE and ACE—Krob, Lascoux, Leclerc, Thibon. www-igm.univ-m/v.fr/~jyt/ARTICLES/acma.ps
A Comparative Study of a Penalty Function, a Repair.—Bäck, Schütz, Khuri (1995) ls11-www.informatik.uni-dortmund.de/people/baeck/papers/ea95.ps.gz
A Connectionist Model for Diagnosis—Yue Xu www.comp.utas.edu.au/users/yxu/AI97.ps
Kinetic Binary Space Partitions for Intersecting.—Agarwal, Erickson. (1998) compgeom.cs.uiuc.edu/~jeffe/pubs/3dbsp.ps.gz
The Reactive Tabu Search—Battiti (1994) www.cacr.caltech.edu/~battiti/archive/reactive-tabu-search.ps.gz
The Application of a Parallel Genetic Algorithm to the.—Stöppler, Bierwirth (1992) medusa.logistik.uni-bremen.de/Papers/fsp.ps
Piecewise Linear Paths Among Convex Obstacles—de Berg, Matousek, Schwarzkopf (1993) www.cs.ust.hk/~otfried/Papers/1993-20.ps
Genetic Algorithms and Artificial Life—Mitchell, Forrest (1993) www.santafe.edu/~mm/GA.Alife.ps
New Tabu Search Results for the Job Shop Scheduling Problem—Chambers, Barnes (1996) net.cs.utexas.edu/users/jbc/home/papers/orp9606/orp9606.ps.Z
Anais da II Oficina Nacional em Problemas Combinatórios.—de Aragao, de Souza (1995) www.dcc.unicamp.br/ic-tr-ftp/1995/95-17.ps.gz
On Argumentation-Based Negotiation—Jennings, Parsons, Noriega, Sierra (1998) ftp.elec.qmw.ac.uk/pub/isag/distributed-ai/publications/iwmas.ps
The IDOS system: An Approach for Distributed Internet.—Yosi Ben-Asher cs.haifa.ac.il/YOSI/PAPERS/idos.ps
Some Matrix Techniques in Game Theory—Li, Nataraj www.wm.edu/CAS/MINEQ/ps_zips/games.ps.gz
A View of Large Scale Distributed Computing—Panzieri, Shrivastava (1994) www.newcastle.research.ec.org/broadcast/trs/./papers/38.ps
Efficient Concurrency Control for Broadcast Environments—Jayavel Shanmugasundaram (1999) ccs-www.c-s.umass.edu/db/publications/bdisk.ps
Parallel Asynchronous Label Correcting Methods for.—Bertsekas, Guerriero. (1996) web.mit.edu/dimitrib/www/parallelsp.ps
CAFÉ: A Complex Adaptive Financial Environment—Even, Mishra (1996) www.cs.nyu.edu/mishra/PUBLICATIONS/96.cafe.ps
Toward a Declarative Language for Negotiating Executable.—Reeves, Grosof. (1999) www.research.ibm.com/people/g/grosof/paps/rc21476.ps
Cooperative Transportation Scheduling: an Application.—Fischer, Müller, Pischel (1995) ftp.dfki.uni-kl.de/pub/Publications/ResearchReports/95/RR-95-01.ps.gz
Charging of Multimedia Flows in an Integrated Services.—Stiller, Fankhauser. (1998) www.cl.cam.ac.uk/Research/SRG/nossdav98/papers/nosdav98-050.ps.gz
Combinatorial Games under Auction Play—Andrew Lazarus www-math.mit.edu/~propp/auction.ps.gz
Auction Protocols for Decentralized Scheduling—Wellman, Walsh, Wurman. (1998) www-personal.engin.umich.edu/~ wew/Papers/mb-scheduling-extended.ps.Z
Bidding for the Antamina Mine: Valuation and Incentives in a.—Moel, Tufano (1998) www.realoptions.org/abstracts/./papers/Antamina.PDF
Peering and Provisioning of Differentiated Internet Services—Semret, Liao, Campbell. (1999) ftp.ctr.columbia.edu/CTRResearch/comet/public/tech-reports/99/SEM99c.ps.gz
Disintermediation, Reintermediation, or Cybermediation?.—Giaglis, Klein, O'Keefe www.brunel.ac.uk/depts/cs/reports/InterVersion2.pdf
A Data Parallel Augmenting Path Algorithm for the Dense.—Damberg, Storoy, Sørevik (1995) www.ii.uib.no/~tors/papers/MTOAP.ps
Models and Algorithms for Vehicle Scheduling—Freling, Paixao, Wagelmans (1999) www.eur.nl/WebDOC/doc/econometrie/eeb199601111120020.ps
Spot and Derivative Markets in Admission Control—Lazar, Semret (1999) ftp.ctr.columbia.edu/CTRResearch/comet/public/tech-reports/98/LAZ98d.ps.gz
Dynamic Channel Allocation In IP-Based Multimedia Cdma Networks—Thie, Sontag rnvs.informatik.tu-chemnitz.de/Mitarbeiter/Thie_sub/././open_docs/3Gwireless00.ps.gz
Information Dissemination and Aggregation in Asset Markets.—Chan, LeBaron, al. (1998) www.econ.wisc.edu/~blake/research.htmld/./papers/disagg.pdf
A Microeconomic Scheduler for Parallel Computers—Stoica, Abdel-Wahab, Pothen (1994) www.cs.cmu.edu/~istoica/lncs95.ps.gz
Impact of the Internet on Purchasing Practices Preliminary.—Segev, Beam, Gebauer (1997) haas.berkeley.edu/~citm/wp-1024.PDF
Agent-Based Configuration of Virtual Enterprises—Russ, Vierke www.dfki.de/~vierke/papers/virtual.ps.gz
Market-Based Negotiation for Digital Library Services—Mullen, Wellman (1996) ftp.eecs.umich.edu/people/wellman/usenix96.ps.Z
Modelling Electronic Commerce Activities Using.—Papadopoulos, Arbab (1998) www.cs.ucy.ac.cy/DEXA98.ps.gz
A Decision-Theoretic Model For Cooperative Transportation.—Fischer, Müller (1996) ftp.dfki.uni-sb.de/pub/MAGSY/Papers/MAAMAW96.ps.gz
How to Enhance Market Liquidity—Economides raven.stern.nyu.edu/networks/how.ps Time-Quality Tradeoffs in Reallocative Negotiation with.—Martin Andersson (1999) 128.252.165.44/~sandholm/types.OCSM.exp-AAAI99.ps Continuations, Reversals, and Adverse Selection on the Nasdaq.—Jones, Lipson www.rhsmith.umd.edu/finance/CFEA/contin.ps Lessons from Wall Street: case studies in configuration, tuning.—Shasha (1997) cs.nyu.edu/faculty/shasha/papers/walltalk.ps Customized Dynamic Load Balancing for a Network of.—Zaki, Li, Parthasarathy (1995) ftp.cs.rochester.edu/pub/papers/systems/95.tr602.Customized_dynamic_load_balancing.ps.gz The Evolution of a Pure Credit Monetary System—Goldschlager, Baxter (1994) www.cs.monash.edu.au/~rohan/PAPERS/coe.ps Query Order in the Polynomial Hierarchy—Hemaspaandra, Hemaspaandra, Hempel (1998) hypatia.dcs.qmw.ac.uk/data/edu/cs.rochester.edu/theory/97.tr634rev.Query_order_in the_polynomial_hierarchy.ps.gz Optimistic Protocols for Multi-Party Fair Exchange—Asokan, al. (1996) www.semper.org/info/232ZR021.ps.gz Niche Search: an Application in Vehicle Routing—Pedroso (1998) www.islab.brain.riken.go.jp/~jpp/publications/niche-routing.ps.gz Fast Stable Merging And Sorting In Constant Extra Space—Huang, Langston (1990) cs.utk.edu/pub/TechReports/1990/ut-cs-90-106.ps.Z Mapping and Load-Balancing—Task Leader ftp.cpc.wmin.ac.uk/pub/sepp/P6/task4.ps.gz Results and Challenges in Web Search Evaluation—Hawking, Craswell, Thistlewaite (1999) pastime.anu.edu.au/TAR/www8.ps.gz Fairness in Electronic Commerce—Asokan (1998) www.zurich.ibm.com/Technology/Security/publications/1998/Asokan98.ps.gz The Use Of—Cyberspace In lucien.berkeley.edu/MOO/cyberspace.ps An Interactive Visualization for Message Sequence Charts—Eick, Ward (1996) www.bell-labs.com/~eick/bibliography/1996/seq_copyright.ps.gz Fetching Data From Tertiary Storage Systems—Lu, Feng, Zhai www.cs.ust.hk/faculty/luhj/ps/adc98.ps.gz Applying Tabu Search with Influential Diversification to.—Hübscher, Glover ftp.cc.gatech.edu/pub/people/roland/papers/tabu.ps.gz An Architecture for Negotiating Agents that Learn—Bui, Venkatesh, Kieronska (1995) www.cs.curtin.edu.au/~buihh/papers/new-tr-7-95.ps.gz Geometric Origin of Montonen-Olive Duality—Cumrun Vafa ftp.desy.de/pub/preprints/hep-th/9707/9707131.ps.gz Page 70=Page Blanche—Section Measurement (1988) gatekeeper.dec.com/pub/net/info/bruno.cs.colorado.edu/pub/standards/ccitt/1988/postscript/2_3_03.ps.Z Asynchronous Protocols for Optimistic Fair Exchange—Asokan, Shoup, Waidner (1998) www.zurich.ibm.com/Technology/Security/publications/1998/ASW98.ps.gz Learning other agents' preferences in multi-agent.—Bui, Venkatesh. (1996) www.cs.curtin.edu.au/~buihh/papers/ijcis.ps.gz Authentication for Distributed Systems—Woo, Lam (1992) ftp.cs.utexas.edu/pub/lam/denning.ps.Z Integrated Document Caching and Prefetching in Storage.—Kraiss, Weikum (1998) www-dbs.cs.uni-sb.de/public_html/papers/McMIN_VLDBJ.ps.gz DDE: A Modified Dimension Exchange Method for Load Balancing in.—Wu, Shu (1997) ftp.cs.buffalo.edu/pub/tech-reports/96-14.ps.Z Fairness in Electronic Commerce—Asokan (1998) www.zurich.ibm.com/Technology/Security/publications/1998/Asokan98b.ps.gz Beowulf: A Parallel Workstation For Scientific Computation—Sterling, Becker, al. (1995) www.cs.umd.edu/users/dfs/papers/Beowulf-ICPP95.ps.Z Hyperoctahedral Schur Algebras—Green www.maths.lancs.ac.uk/~greenrm/dvi/h1.ps.gz Secure Reliable Multicast Protocols in a WAN—Dahlia Malkhi (1997) www.research.att.com/~dalia/./pubs/wan.ps.gz Internet Security Association and Key Management.—Maughan, Schertler. (1997) ftp.botik.ru/pub/doc/internet-drafts/draft-ietf-ipsec-isakmp-08.ps.gz Microscopic string analysis of the D0-D8 brane.—Billó, Di. (1998) www.nordita.dk/~nielsen/www/Activities/pre98/9810.ps.gz Controllability Via Chronological Calculus—Kawski (1999) math.1a.asu.edu/pub/kawski/preprints/99-cdc.ps Updated Tables Of Parameters Of (T,M,S)-Nets—Clayman, Lawrence, Mullen. (1997) www.research.att.com/~trmaster/./TRs/97/97.13/97.13.1.body.ps Reducing P to a Sparse Set using a Constant Number of Queries.—van Melkebeek (1996) www.cs.uchicago.edu/~dieter/Papers/sparse-ccc96.ps.gz Efficient Approximation Algorithm for Minimizing Makespan on.—Chandra Chekuri (1998) ftp.hpc.uh.edu/pub/ipco98/chekuri.ps Asymptotic Approximation of the Move-To-Front Search Cost.—Jelenkovic (1999) www.cs.bell-labs.com/cm/ms/who/predrag/mypub/mtfRevised.ps A Selected Survey of Umbral Calculus—Di Bucchianico, Loeb (1995) www.wisdom.weizmann.ac.il/Research/EIJC/Journal/Surveys/ds3.ps Solving Hard Combinatorial Problems with GSAT—a Case Study—Hoos (1996) www.intellektik.informatik.tu-darmstadt.de/~hoos/ps/ki96.ps Fiber Polytopes For The Projections Between Cyclic.—uAthanasiadis, De. (1997) matsun1.matesco.unican.es/CAG/people/santos/Articulos/fibercyclic.ps.gz The Formal Theory of Birth-and-Death Processes, Lattice.—Flajolet, Guillemin (1999) algo.inria.fr/flajolet/Publications/FlajoletGuillemin.ps.gz Solving the Traveling Salesman Problem with a.—Tschöke, Racke. (1994) www.uni-paderborn.de/fachbereich/AG/monien/PUBLICATIONS/POSTSCRIPTS/TRLM_Traveling_Salesman.ps.Z Subpolytopes of Cyclic Polytopes—Bisztriczky, Károlyi (1996) dimacs.rutgers.edu/pub/dimacs/TechnicalReports/TechReports/1996/96-05.ps.gz Database Learning: a Method for Empirical Algorithm Design—Goldberg, Hollinger (1997) www.dsi.unive.it/~wae97/proceedings/ONLY_PAPERS/pap23.ps.gz Joins for (Augmented) Simplicial Sets—Ehlers, Porter (1998) www.bangor.ac.uk/~mas013/preprint/9807.ps epsilon-Transformation: Exploiting Phase Transitions to.—Zhang, Pemberton (1994) ftp.cs.ucla.edu/tech-report/94-reports/940003.ps.Z Residuation and Guarded Rules for Constraint Logic Programming—Smolka (1991) ftp.digital.com/pub/DEC/PRL/research-reports/PRL-RR-12.ps.Z MAX-MIN Ant System and Local Search for Combinatorial.—Thomas Stützle, Holger. (1997) iridia.ulb.ac.be/~stuetzle/publications/MIC97.ps.gz Fast Combinatorial Algorithms for Packing and Covering Problems—Könemann (2000) www.andrew.cmu.edu/~jochen/diplom.ps.gz Identities Of Structure Constants For Schubert Polynomials.—Bergeron, Sottile (1997) www.liafa.jussieu.fr/~cp/FPSAC/FPSAC97/ARTICLES/Sottile.ps.gz Constraint Logic Programming and Integer.—Darby-Dowman. (1996) www.idsia.ch/~zaffalon/papers/clp_ip_397.ps.gz Amplitude Spectra of Fitness Landscapes—Hordijk, Stadler (1998) www.inet.gda.pl/ai/www.santafe.edu/sfi/pubications/Working-Papers/98-02-021.ps Impossibility Results for Weak Threshold Networks—Costas Busch (1997) www.cs.brown.edu/people/cb/publ/thres_IPL_97.ps Rewriting-Based Derivation of Efficient Algorithms to Build.—Cazier, Dufourd www.cg.tuwien.ac.at/~wp/SCCG96-proceedings/papers/Cazier.ps.gz Strategic Oscillation in Heuristic Local Search—Laurent Mynard www-poleia.lip6.fr/~mynard/frames/./ps/kbcs96.ps.gz A Geometric Approach to Molecular Docking and Similarity—Bajaj, Bernardini, Sugihara ftp.cs.purdue.edu/pub/shastra/pubs/dock.ps.gz Resolvents of minus M-matrices and Splittings of M-matrices—McDonald, Neumann, Schneider (1992) www.math.uregina.ca/~judi/files/mns.ps Asymptotical Behaviour of Several Interacting Annealing Processes—Trouve (1994) www.dmi.ens.fr/ftp/pub/dmi/users/lmens/lmens-94-25.ps.Z The Constrainedness of Search—Gent, MacIntyre, Prosser, Walsh (1996) dream.dai.ed.ac.uk/group/tw/sat/./papers/CRCaaai96gmpw.ps Evolutionary Heuristics For The Bin Packing Problem—Sami Khuri, Martin Schütz. (1995) www.cs.purdue.edu/coast/archive/clife/GA/papers/icannga95.ps.gz A New Understanding of Greed—Ram (1993) www.cs.ucla.edu/~stott/spub/Ram.PhDdissertation.ps.Z Asymptotically Optimal Erasure—Resilient Codes for Large.—Chee, Colbourn, Ling (2000) www.emba.uvm.edu/~olbourn/src/erasure.ps Non Overlapping Partitions, Continued Fractions, Bessel.—Flajolet, Schott algo.inria.fr/flajolet/Publications/bessel.ps.gz A Simple Heuristic Based Genetic Algorithm for the Maximum.—Marchiori (1998) www.cwi.nl/~elena/sac98.ps.gz A Constraint Programming Framework for Local Search Methods—Pesant, Gendreau (1999) ftp.crt.umontreal.ca/pub/users/pesant/JHeuristics.ps.gz A New Look at the Easy-Hard-Easy Pattern of Combinatorial.—Mammen, Hogg (1997) www.cs.cmu.edu/afs/cs/project/jair/pub/volume7/mammen97a.ps.Z Minimal Tangent Visibility Graphs—Pocchiola, Vegter (1995) www.dmi.ens.fr/ftp/pub/dmi/users/liens/liens-95-20.A4.ps.Z A Surface-Based Approach to DNA Computation—Qinghua Liu (1996) corninfo.chem.wisc.edu/Papers/princeton.ps Amplitude Spectra of Fitness Landscapes—Hordijk, Stadler (1998) www.tbi.univie.ac.at/papers/Abstracts/98-03-002.ps.gz Statistical Properties of Finite Sequences with High.—Li, Vitanyi (1994) www.cwi.nl/~paulv/papers/zero.ps Constraint Representation for Propagation—Harvey, Stuckey (1998) www.cs.mu.oz.au/~pjs/papers/representation.ps.gz Generating Random Elements of Finite Distributive Lattices—Propp (1996) www.wisdom.weizmann.ac.il/Journal/Volume_4/PostScriptfiles/v412rl5.ps A Remark on Matrix Rigidity—Shokrollahi, Spielman, Stemann (1996) www.uni-paderborn.de/fachbereich/AG/agmadh/WWW/english/././PapersPostscript/matrixrigid_TR-020-96.ps Designing a Data Structure for Polyhedral Surfaces—Kettner (1997) dinis.inf.ethz.ch/personal/kettner/pub/polyhedron_design.ps.gz Combinatorial Optimisation and Linear Prediction.—Louchet, Mathurin. www-syntim.inria.fr/syntim/recherche/louchet/louchetWash97.ps.gz Schubert Polynomials and Bott-Samelson Varieties—Magyar (1998) max.math.brandeis.edu/~magyar/SchubPolys.ps A Separator-Based Framework for Automated Partitioning and.—Eric Schwabe (1992) www.cs.cmu.edu/afs/cs/project/quake/public/papers/dags92-pde-framework.ps Combinatorics, computer algebra and Wilcoxon-Mann-Whitney test—Di Bucchianico (1996) ftp.win.tue.nl/pub/techreports/cosor/96-24.ps Rigidity and Renormalization in One Dimensional Dynamical Systems—de Melo (1998) www.impa.br/~demelo/icm.ps Continuous-based Heuristics for Graph and Tree.—Pelillo, Siddiqi, Zucker (1999) www.dsi.unive.it/~pelillo/papers/tr99-4.ps.gz Oriented Matroids in Terms of Order Functions—Jaritz (1997) cirm.univ-mrs.fr/EMIS/journals/BAG/vol.38/no.2/b38h2ja.ps.gz Partial Constraint Satisfaction Problems and Guided Local Search—Voudouris, Tsang (1995) ftp.essex.ac.uk/pub/csc/technical-reports/CSM-250.ps.Z Simple Maximum Flow Algorithms in Lossy Networks—Tardos, Wayne (1997) ftp.hpc.uh.edu/pub/ipco98/tardos.ps On Multiple Interpretations—Junghyun Han (1997) graphics.skku.ac.kr/paper/sm97.ps A Perceptual Organization Approach to Contour Estimation Via.—Casadei, Mitter (1998) donald-duck.mit.edu/~casadei/pubs/perceptOrgWksp.ps A Subexponential Bound for Linear Programming—Matousek, Sharir, Welzl (1996) www.inf.ethz.ch/personal/emo/publications/./ps-files/SubexLP-ALGORITHMICA16.ps Construction Methods for Covering Codes—Östergard (1993) saturn.hut.fi/pub/reports/A25.ps.Z Adocs: a Drawing System for Generic Combinatorial Structures—Bertault (1995) ftp.loria.fr/pub/loria/eureca/ADOCS/adocsdoc2.ps.gz Evaluating the Quality of Approximations to the Non-Dominated.—Hansen, Jaszkiewicz (1998) www.imm.dtu.dk/documents/ftp/tr98/tr07_98.ps Hybrid Genetic Algorithms for Constrained Placement Problems—Schnecke, Vornberger (1997) www.bch.msu.edu/labs/kuhn/web/volker/postscripts/ieee_ec.ps.Z Ant Colonies for the QAP—Gambardella, Taillard, Dorigo (1997) iridia.ulb.ac.be/pub/mdorigo/tec.reps/TR.07-IDSIA.4.97.ps.gz Applications of Cut Polyhedra—Deza, Laurent (1992) ftp.ens.fr/pub/dmi/users/liens/liens-92-18.A4.ps.Z Peering and Provisioning of Differentiated Internet Services—Semret, Liao, Campbell. (2000) www.ieee-infocom.org/2000/papers/453.ps A Competitive Environment for Parallel Applications on.—Shum, Moody (1996) WWW.cl.cam.ac.uk/users/khs1001/hcw.ps.gz ProbSy—A System for the Calculation of Probabilities in.—Madsen, Nielsen, Jensen (1997)

Genetic Algorithms, Classifiers and Parallelism An.—By Rui Mendes shiva.di.uminho.pt/~azuki/Publications/scs.ps.gz A Model For Cooperative Transportation Scheduling—Fischer, Müller, Pischel. (1995) ftp.dfki.uni-sb.de/pub/MAGSY/Papers/ICMAS95.ps.gz A Computational Market Model Based on Individual Actions—Steiglitz, Honig, Cohen ftp.cs.princeton.edu/~ken/econ.ps Continuous Value Function Approximation for Sequential.—Boutilier. (1999) www.cs.ubc.ca/spider/cebly/Papers/_download_/contauct.ps Some Economics of Market-Based Distributed Scheduling—Walsh, Wellman, Wurman. (1998) www-personal.engin.umich.edu/~wew/Papers/icdcs98.ps.Z ICOMA: An Open Infrastructure for Agent-based Intelligent.—Lee Kang (1997) seopo.skku.ac.kr/~feb01/papers/icpads.ps Sequential Auctions for the Allocation of Resources.—Boutilier. (1999) www.cs.ubc.ca/spider/cebly/Papers/_download_/auctions.ps Smart Software as Customer Assistant in Large-Scale.—Hans Akkermans Akmc (1997) www.soc.hk-r.se/research/1997/sscalsdlm.ps An—Relaxation Method For Separable Convex Cost Network Flow Problems Paul Tseng web.mit.edu/afs/athena.mit.edu/user/d/i/dimitrib/www/erelax.ps The Distributional Effects of Carbon Regulation: Why auctioned.—Cramton, Kerr (1999) www.cramton.umd.edu/papers1995-1999/99ee-distributional-effects-of-carbon-regulation.pdf Towards a Generic E-Negotiation Platform—Benyoucef, Keller, Lamouroux. (2000) www.iro.umontreal.ca/~labgelo/Publications/Papers/retis-2000.pdf Bid Evaluation and Selection in the MAGNET.—Steinmetz. (1999) maya.cs.depaul.edu/~mobasher/papers/magnet-lnai.ps Adaptive Parallelism For Computing On Heterogeneous Clusters—Shum WWW.cl.cam.ac.uk/users/khs1001/thesis.ps.gz Tracking the Invisible Hand: Convergence of Double.—Bosch-Domnech, Sunder (1999) www.gsia.cmu.edu/andrew/sunder/Bosch.pdf COPS: A Model and Infrastructure for Secure and Fair.—Röhm, Pernul (1999) www.wi-inf.uni-essen.de/~ifs/publikationen/papers/roepe99.ps.gz Peering and Provisioning of Differentiated Internet Services—Semret, Liao, Campbell. (2000) comet.ctr.columbia.edu/publications/2000/peerprov.pdf Auction Protocols for Decentralized Scheduling—Wellman, Walsh, Wurman. (1998) www.csc.ncsu.edu/faculty/wurman/Papers/Scheduling.ps New Versions of Ask and Tell for Synchronous.—Brim, Gilbert. (1996) ftp.cs.city.ac.uk/users/drg/techreports/1996-03.ps.gz Distributed Commerce Transactions—Steven Ketchpel www-db.stanford.edu/pub/papers/aaai97.ps Roles for Electronic Brokers—Paul Resnick vsys-www.informatik.uni-hamburg.de/documents/papers/e-market/roles.for.electronic.brokers.ps.gz Integrated document caching and prefetching in storage.—Kraiss, Weikum (1998) atschfichter9.informatik.tu-muenchen.de:3180/Millicent/journals/vldb/tocs/./papers/8007003/80070141.ps.gz The Networked Information Economy: Applied And Theoretical.—Ketchpel (1998) www-diglib.stanford.edu/~ketchpel/thesis/full-thesis.ps.gz A Competitive Analysis of the List Update Problem with Lookahead—Albers (1998) www.mpi-sb.mpg.de/~albers/tcs98.ps.gz Recent Work on Distributed Commit Protocols, and.—Mohan, Dievendorff (1994) www.almaden.ibm.com/cs/exotica/mqm_de0394.ps Hierarchical Lighting Simulation for Outdoor Scenes—Katja Daubert, Hartmut. (1997) www9.informatik.uni-erlangen.de/Persons/Schirmacher/eng/publ/./proj/outdoor/outdoor97_noimg.ps.gz Improved Randomized On-Line Algorithms for the List Update Problem—Albers (1995) www.mpi-sb.mpg.de/~albers/soda95.ps.gz Evaluation of Mapping and Dynamic Load-Balancing.—Senar, Ripoll. ftp.cpc.wmin.ac.uk/pub/seihpc/madrid/uab-mapping.ps.gz Autoroute Dialogue Demonstrator—Lewin (1998) kidwelly.cam.sri.com/tr/crc073/paper.ps.Z Design of Time Cognizant Electronic Brokerages—Prabhudev Konanay icf.bus.utexas.edu/~pkonana/ps/cist.ps Customized Dynamic Load Balancing for a Network of Workstations—M. Javeed (1995) ftp.cs.rochester.edu/pub/papers/systems/96.HPDC.Customized_dynamic_load_balancing.ps.gz A Linear Time Algorithm for the Feasibility of.—Auletta, Monti. (1998) www.unisa.it/giuper.dir/PAPERS/swat-complete.ps.gz Generating Linear Extensions of Posets by Transpositions—Ruskey (1992) www.csr.uvic.ca/~fruskey/Publications/JCTextension.ps A Tabu Search Approach for Scheduling Problem Under Labour.—Cavalcante, de Souza (1997) www.dcc.unicamp.br/ic-tr-ftp/1997/97-13.ps.gz Queueing Analysis of Oblivious Packet-Routing Networks—Mor Harchol-Balter http.cs.berkeley.edu/~harchol/Papers/SODA94-oblivious.ps Weighted Derangements And Laguerre Polynomials—Foata, ZEILBERGER cirm.univ-mrs.fr/pub/EMIS/journals/SLC/opapers/s08foazeil.ps A Unifying Framework for Integer and Finite Domain.—Bockmayr, Kasper (1997) www.mpi-sb.mpg.de/~bockmayr/publications/reports/MPI-I-97-2-008.ps.gz Three Easy Special Cases of the Euclidean Travelling.—Deineko, Rudolf, van. (1995) ftp.tu-graz.ac.at/pub/papers/math/sfb17.ps.gz CS: a MuPAD Package for Counting and Randomly.—Denise, Dutour. (1998) dept-info.labri.u-bordeaux.fr/~dutour/PAPERS/cs-fpsac.ps.gz The Applicability of Neural Nets for Decision Support—Aarts, Wessels, Zwietering (1993) www.iiasa.ac.at/Publications/Documents/WP-93-005.ps Representations of the Covering Groups of the Symmetric Groups.—Bessenrodt cartan.u-strasbg.fr/~slc/opapers/s33bess.ps Fast Probabilistic Modeling for . . . —Baluja, Davies (1998) www.cs.cmu.edu/afs/cs/user/scottd/www/aaai98-combopt.ps.gz Markov Chain Algorithms for Planar Lattice Structures (Extended.—Luby, al. (1995) dbwilson.com/exact/luby-randall-sinclair.ps.gz The Use of Dynamic Programming in Genetic Algorithms for.—Yagiura, IBARAKI (1996) kuamp.kuamp.kyoto-u.ac.jp/labs/or/members/yagiura/./papers/gendp96_300dpi.ps.Z Price Discovery without Trading: Evidence from the Nasdaq.—Cao, Ghysels, Hatheway (1999) www.cob.ohio-state.edu/~fin/journal/archive_papers/issjun00/ms6645.pdf A Market Architecture for Multi-Agent Contracting—Collins, Jamison, Mobasher. (1997) www.cs.umn.edu/Research/airvl/magnet/papers/tr97-15.pdf Temporal Strategies in a Multi-Agent Contracting Protocol—Collins, Jamison, Gini. (1997) maya.cs.depaul.edu/~mobasher/papers/magnet-aaaiwkshop.ps A Load Distribution Through Competition for Workstation Clusters—Kam Hong WWW.cl.cam.ac.uk/users/khs1001/iscis94.ps.gz Decentralized Markets versus Central Control: A Comparative Study—Ygge, al. (1999) www.cs.cmu.edu/afs/cs/project/jair/pub/volume11/ygge99a.ps.Z Market Pricing of Differentiated Internet Services—Semret, Liao, Campbell, Lazar (1998) ftp.ctr.columbia.edu/CTR-Research/comet/public/tech-reports/98/SEM98.ps.gz Auction-Driven Coordination for Plantwide Optimization—Jose, Ungar (1998) www.cis.upenn.edu/~ungar/papers/focapo.ps Computational and Experimental Studies in Auction Theory and.—Elbittar www.pitt.edu/~aaest4/abstract.pdf Efficient Concurrency Control for Broadcast Environments—Shanmugasundaram. (1999) www.cs.wisc.edu/~jai/papers/broadcast.ps Massively Parallel Augmenting Path Algorithms for the.—Storoy, Sorevik (1996) www.ii.uib.no/~tors/papers/assign.ps Order Submission Under Price Uncertainty: An Experimental Study—Theissen (2000) www.wiwi.uni-frankfurt.de/professoren/krahnen/dokus/Mitarbeiter/et/cm-4.pdf Negotiation and the Web: Users' Perceptions . . . —Kersten, al. (1998) www.iiasa.ac.at/Publications/Documents/IR-98-002.ps Market Mechanisms in a Programmed System—Tucker www.cs.ucsd.edu/~ptucker/publications/sci98.ps Partitioning of Unstructured Meshes for Load Balancing—Martin, Otto (1994) cse.ogi.edu/pub/tech-reports/1994/94-017.ps.gz Connectivity Properties of Matroids—Mihail, Sudan (1989) theory.lcs.mit.edu/~madhu/papers/matroids.ps Optimistic Protocols for Fair Exchange—Asokan, Schunter, Waidner (1996) www.semper.org/sirene/lit/./publ/AsSW3_96FairX.IBMrep.ps.gz Performance And Portability In Parallel Computing.—Bernardo. (1995) www-ad.fsl.noaa.gov/mvpab/hpcs/papers/houches93.bjr.ps Hierarchical Solution Techniques for Realistic Rendering—Sillion w3imagis.imag.fr/Publications/fxs/S95gc.ps.gz Architecture and Design of a Secure Electronic Marketplace—Schunter, Waidner www.semper.org/sirene/lit/./publ/ScWa_97SEMPER.JENC8.ps.gz Optimal Sampling Strategies in Quicksort and Quickselect—>, Roura (1998) www.lsi.upc.es/dept/techreps/ps/R98-1.ps.gz Modelling Traffic Demand Between Nodes in a.—Jacek Kowalski www.elec.uow.edu.au/conferences/95-116.ps An Agent-based Model for the Provision of Advanced.—Rizzo (1995) www.labs.bt.com/people/rizzom/TINA95.ps.gz Large Combinatorial Optimization Problems: a Methodology for.—Gervet (1998) www.icparc.ic.ac.uk/~cg6/publications/jfpl98.ps Relaxation Labeling of Markov Random Fields—Stan Li (1994) markov.eee.ntu.ac.sg:8000/~szli/papers/Relaxation_Labeling.MRF.ps.gz A combinatorial description of blocks in O(P, Λ).—Futorny, König. www.mathematik.uni-bielefeld.de/sfb343/preprints/pr99038.ps.gz Dual-Mode Dynamics Neural Networks For Combinatorial Optimization—Park (1994) usc.edu/pub/nn_robotics/theses/94/jun.park.thesis.ps.Z The Combinatorial Structure of Wait-free Solvable Tasks—Attiya, Rajsbaum (1996) www.matem.unam.mx/~rajsbaum/wdag96.ps Maximum Skew-Symmetric Flows—Goldberg, Karzanov (1995) www.neci.nj.nec.com/tr/neci-tr-96-1.ps A Simple Constructive Computability Theorem for Wait-free.—Herlihy, Shavit (1994) www.cs.brown.edu/~mph/stoc94.ps Improved Algorithms for Optimal Winner Determination in.—Sandholm, Suri (2000) siesta.cs.wustl.edu/~sandholm/bidbranching.aaai00.pdf Revenue Failures and Collusion in Combinatorial Auctions.—Vincent Conitzer Forbes www-2.cs.cmu.edu/~sandholm/vcg_failures.acmec04.pdf BOB: Improved Winner Determination in Combinatorial Auctions.—Sandholm, Suri (2003) www-2.cs.cmu.edu/~sandholm/bidbranching.aij03.pdf Secure Computation for Combinatorial Auctions and Market.—Josiane Nzouonta And (2004) www.aamas2004.org/proceedings/225_nzouontaj_market.pdf Generalized Knapsack Solvers for Multi-Unit Combinatorial.—Kelly (2004) www.eecs.umich.edu/~tpkelly/papers/auction_knapsack_connection.ps Improved Algorithms for Optimal Winner Determination in.—Sandholm, Suri (2000) www.cs.ucsb.edu/~suri/ecommerce/sand-surl.ps Coalitions among Computationally Bounded Agents—Sandholm, Lesser www.cs.wustl.edu/~mas/Publications/brcoal.aij.ps Single Crossing Properties and the Existence of Pure Strategy.—Athey (1999) web.mit.edu/athey/www/scpexist_0399.pdf Equilibrium Prices in Bundle Auctions—Wurman, Wellman (1999) www.csc.ncsu.edu/faculty/wurman/Papers/Bundle-prices-v3.ps Adaptive Distributed Computing through Competition (Extended.—Shum (1996) WWW.cl.cam.ac.uk/users/khs1001/cds_abs.ps.gz Runtime Classification of Agent Services—Weinstein, Birmingham (1997) www-personal.umich.edu/~peterw/Ontology/sca.paper.ps Auctioning Off Labor Contracts: Legal Restrictions Reconsidered—Kübler (1996) amadeus.wiwi.hu-berlin.de/pub/papers/sfb373/sfb1996/dpsfb960022.ps.Z Unified Support for Heterogeneous Security Policies in.—Minsky, Ungureanu (1998) www.cs.rutgers.edu/~minsky/papers/usenix-paper.ps Searching Market Equilibria under Uncertain Utilities—Kryazhimskii, Nentjes. (1998) www.iiasa.ac.at/Publications/Documents/IR-98-007.ps A secure XML/Java-based Implementation of Auction Services.—Conen, Dridi, Köppen (2000) nestroy.wi-inf.uni-essen.de/Forschung/Publikationen/WETICE2000/ca.ps Towards New Lower Bounds for the List Update Problem—Ambühl, Gärtner, von Stengel (1998) www.inf.ethz.ch/personal/stengel/TEXTE/lowerb.ps.gz Regulating Human-Robot Interaction using "emotions", "drives".—(Ferrell) (1998) www.ai.mit.edu/projects/cog/Publications/breazealAgents98.ps.gz A Multi-Agent System for Telephone Network Management—George Kiss (1991) hcrl.open.ac.uk/web/techreports/papers/tr72.ps.gz A Linear Algebraic Reconstruction of Majorization—Parker, Ram (1997) ftp.cs.ucla.edu/tech-report/97-reports/970036.ps.Z A New Family of Randomized Algorithms for List Accessing—Garefalakis (1997) www.cs.utoronto.ca/~theo/final.ps.Z Optimal All-to-All Personalized Communication with Minimum.—Johnsson, Ho (1991) ftp.das.harvard.edu/techreports/tr-18-91.ps.gz An Algorithm for Enumerating All Spanning Trees of a Directed.—Sanjiv Kapoor www.eecs.nwu.edu/~vijay/enum.ps The Overlay of Lower Envelopes and its Applications—Agarwal, Schwarzkopf, Sharir (1996) ftp.cs.uu.nl/pub/RUU/CS/techreps/CS-1994/1994-40.ps.gz On the Power of Additive Combinatorial Search Model—Grebinski (1998) www.loria.fr/~grebinsk/publications/cocoon98.ps.gz Quantum Computing and Phase Transitions in Combinatorial Search—Hogg (1996) www.cs.cmu.edu/afs/cs/project/jair/pub/volume4/hogg96a.ps.Z Kolmogorov Complexity Arguments in Combinatorics—Li, Vitanyi (1994) www.cwi.nl/~paulv/papers/comb.ps Reconstructing Physical Symbol Systems—Touretzky, Pomerleau pecan.srv.cs.cmu.edu/afs/cs/usr/dst/www/pubs/simon-reply-www.ps.gz Using a Neural Network to Learn General Knowledge in a.—Reategui, Campbell. (1995) www.cs.ucl.ac.uk/staff/E.Reategui/publications/iccbr-95.ps Driver Scheduling using Genetic Algorithms with Embedded.—Kwan, Kwan, Wren (1997) agora.leeds.ac.uk/scs/doc/reports/1997/97-30.ps.Z Specification-By-Demonstration: The ViCCS Interface—Minton, Philpot, Wolfe (1995) ic-ftp.arc.nasa.gov/pub/wolfe/papers/multi-tac/ml94-pbd-workshop.ps.gz Fast Estimation of Diameter and Shortest Paths (without.—Aingworth, Chekuri. (1996) theory.stanford.edu/people/chekuri/postscript/diameter.ps.gz Game Theories and Computer Go—Müller (1993) www.etl.go.jp/etl/suiron/~mueller/ps/mueller93.ps Niche Search: an Application to the Manhattan Newspaper Problem—Pedroso (1997) www.islab.brain.riken.go.jp/~jpp/publications/manhattan-dp.ps.gz Combinatorial Representation Theory—Barcelo, Ram (1996) www.math.princeton.edu/~rama/pub/CRT-main.ps.gz Adjacency on Combinatorial Polyhedra—Matsui, Tamura (1993) misojiro.misojiro.t.u-tokyo.ac.jp/~tomomi/TRs/./setp5.ps.Z Improving Convergence and Solution Quality of Hopfield-Type Neural.—Li (1996) markov.eee.ntu.ac.sg:8000/~szli/papers/tsp.ps.gz The Convenience of Tilings—Boas (1997) www.wins.uva.nl/pub/theory/illc/researchreports/CT-96-01.text.ps.Z Analytic Combinatorics of Non-crossing Configurations—Flajolet, Noy (1997) ftp.inria.fr/INRIA/publication/publi-ps-gz/RR/RR-3196.ps.gz Helly-type Theorems and Generalized Linear Programming—Amenta (1994) net.cs.utexas.edu/users/amenta/pubs/dcg.ps.gz A Market Architecture for Multi-Agent Contracting—Collins, Youngdahl. (1998) maya.cs.depaul.edu/~mobasher/papers/magnet-aa98.ps.gz Tradeable Carbon Permit Auctions—How and why to auction not.—Cramton, Kerr (1999) www.cramton.umd.edu/papers1995-1999/98wp-tradeable-carbon-permit-auctions.pdf Market Based Control of SCP Congestion in Intelligent Networks—Scholtz, Hanrahan www.ee.wits.ac.za/~comms/output/satnac99/scholtz_marketcontrol.ps Models and Algorithms for Vehicle Scheduling—Freling, Pinto, al. (1999) www.eur.nl/few/ei/papers/./pub/ei9562.ps The Progressive Second Price Auction Mechanism for Network.—Lazar, Semret (1998) ftp.ctr.columbia.edu/CTR-Research/comet/public/papers/98/LAZ98.ps.gz A Market Protocol for Decentralized Task Allocation and.—Walsh (1998) www-personal.engin.umich.edu/~wew/Papers/proposal.ps.Z Saumerstrasse 4 F-06610 La Gaude, France CH-8803 Rüschlikon.—Ax Mai www.semper.org/info/./deliver/d10/d10.ps.gz Some General Questions About Markets—Tordjman (1998) www.iiasa.ac.at/Publications/Documents/IR-98-025.ps Exact Results for ID Conserved Order Parameter Model Vladimir.—Department Of mpej.unige.ch/mp_arc/c/94/94-1.ps.gz Reduced Decompositions Of Permutations In Terms Of Star.—Pak (1997) pascal.math.yale.edu/users/paki/trees4.ps Algorithmic Aspects of Using Small Instance Relaxations in.—Christof, Reinelt (1998) www.iwr.uni-heidelberg.de/iwr/comopt/christof/./publications/sir.ps.gz Design, Analysis and Simulation of the Progressive Second.—Lazar, Semret ftp.ctr.columbia.edu/CTRResearch/comet/public/tech-reports/98/LAZ98b.ps.gz First-Price Auctions when the Ranking of Valuations is.—Landsberger, Rubinstein (1996) amadeus.wiwi.hu-berlin.de/pub/papers/sfb373/sfb1996/dpsfb960036.ps.Z Designing Bidding Strategies for Trading Agents in.—. (1998) www.iiia.csic.es/Projects/fishmarket/icmas98.ps.gz Off-line Algorithms for The List Update Problem—Reingold, Westbrook (1995) ftp.cs.yale.edu/WWW/HTML/YALE/CS/HyPlans/westbrook/list-update-rw.ps.Z Genetic Algorithms for Combinatorial Optimization: The.—Anderson, Ferris (1994) ftp.cs.wisc.edu/math-prog/tech-reports/93-ga.ps Optimizing Over All Combinatorial Embeddings of a Planar.—Mutzel, Weiskircher (1999) www.mpi-sb.mpg.de/~weiski/ipco-lncs99.ps.gz Combinatorial Games: Selected Bibliography With A Succinct.—Fraenkel (1994) www.combinatorics.org/Surveys/ds2.ps A Resource Allocation Game with Application to Wireless.—Nemo Semret (1996) comet.columbia.edu/~nemo/thesis_proposal.ps

(21) Up to the Point Where—Strictly Increases Despite web.mit.edu/afs/athena.mit.edu/user/d/i/dimitrib/www/RELAX4_doc.pdf Using Genetic Algorithms for Planarization Problems—Comellas. (1992) maite71.upc.es/papers/comellas/genplan/genplan.ps.Z A Market Protocol for Decentralized Task Allocation—Walsh, Wellman (1998) www-personal.engin.umich.edu/~wew/Papers/icmas98-extended.ps.Z Making Trust Explicit in Distributed Commerce Transactions—Ketchpel www-db.stanford.edu/~ketchpel/papers/DCS96/distributed-transactions.ps Self Reordering for security in Generalized English Auctions.—Silaghi, Faltings (2002) www.cs.fit.edu/~msilaghi/papers/AAMAS2002-GEA.pdf An Algorithm Applicable to Clearing Combinatorial Exchanges—Silaghi (2002) www.cs.fit.edu/~tr/cs-2002-14.pdf On the Mean Revenue of Combinatorial Exchanges Under Variation of.—Tanner (2004) www.ivs.tu-berlin.de/papers/2004/tanner bis.pdf Efficiency Competition through Representation Changes.—Smirnov, Veloso www.cs.cmu.edu/~mmv/papers/yury-KR96.ps.gz Combinatorial Bases in Systems of Simplices and Chambers—Alekseyevskaya (1996) dimacs.rutgers.edu/techps/1994/94-13.ps A Replicable Web-Based Negotiation Server For E-Commerce—Su, Huang, Hammer (2000) ftp.dbcenter.cise.ufl.edu/Pub/publications/hicss2000-final.pdf An Auction/Sequential Shortest Path Algorithm For The Minimum.—Bertsekas web.mit.edu/dimitrib/www/Auction_Sh_Paths.ps Simulating the Madness of Crowds: Price Bubbles in an.—Steiglitz, Shapiro (1997) www.cs.princeton.edu/~ken/madness.ps Comparison of Two Algorithms for the Search of Shortest Routes.—Sartenaer (1995) www.cerfacs.fr/~sartena/auction.ps.gz Implementation of an Activity Coordination System—Morris www.eecs.harvard.edu/~rtm/ieeekbse.ps Synergies in Wireless Telephony: Evidence from the.—Ausubel, Cramton. (1997) www.cramton.umd.edu/papers1995-1999/97jems-synergies-in-wireless-telephony.pdf A Formal Specification Of Signalling System No. 7 Telephone User.—Graeme Smith www.cs.uq.oz.au/personal/smith/sicon.ps.Z New Constructs for the Description of Combinatorial.—Bisschop, Fourer (1995) iems.nwu.edu/~4er/COMBIN/combin.ps.gz Two Minimum Dominating Sets With Minimum Intersection.—Eades, Keil, Manuel. (1994) ftp.cs.newcastle.edu.au/pub/techreports/tr94-06.ps.Z Competitive Scenarios for Heterogeneous Trading Agents—Rodríguez-Aguilar. (1998) sinera.iiia.csic.es/~pablo/AGENTS98.ps FM96.5 A Java-based Electronic Auction House—Rodriguez, Noriega. www.iiia.csic.es/~jar/papers/PAAM97.ps.gz Bid Rotation and Collusion in Repeated Auctions—Aoyagi (1998) www.pitt.edu/~econdept/workpaper/aoyagi5.ps Middleware for Development of CSCW Handheld Applications—Dittrich, Becker (1998) www.teco.edu/hcscw/sub/122.Dittrich/HandheldCscwMiddlewareV2.ps Possibilistic-Based Design of Bidding Strategies in Electronic.—Pere Garcia (1998) www.iiia.csic.es/Publications/1998/ecai-lluis.ps Auctions Without Competition: The Case of Timber Sales in the.—Jacobsen (1999) www.iiasa.ac.at/Publications/Documents/IR-99-072.ps Trading Scenarios for Heterogeneous Agents—Rodríguez-Aguilar. www.iiia.csic.es/~jar/papers/acia97.ps MAGMA: An Agent-Based Virtual Market for Electronic.—Tsvetovatyy, Gini. (1997) www-users.cs.umn.edu/~gini/papers/magma.ps.gz Tickets and Currencies Revisited: Extensions to.—Sullivan, Haas, Seltzer (1999) www.eecs.harvard.edu/~sullivan/HotOS.ps Interior Point Methods for Combinatorial Optimization—Mitchell, Pardalos, Resende (1998) www.research.att.com/~mgcr/doc/ipmco.ps.Z The Anatomy of a Call Market: Evidence from Germany—Kehr, Krahnen, Theissen (1999) www.wiwi.uni-frankfurt.de/professoren/krahnen/dokus/Mitarbeiter/et/anatomy6.pdf A Fair Treatment For All Growers At The Auction—Corvaisier, Moreau-Gaudry. www.math.jyu.fi/~mtlai/ECMI/group1.ps Second-price Auctions with Power-Related Distributions.—Froeb, Tschantz, Crooke (1999) mba.vanderbilt.edu/luke.froeb/papers/PRDist.ps Conflicts of Interest and Market Illiquidity in Bankruptcy.—Strömberg (2000) gsbwww.uchicago.edu/fac/finance/papers/bcypapernew.pdf What Can a Market Compute, and At What Expense?—Shoham, Tennenholtz (1999) iew3.technion.ac.il:8080/~moshet/ratcom12pt.ps Modeling Auctions as Dynamic Systems—Research Proposal www.stanford.edu/~vengerov/auctions.pdf A Resource Allocation Game with Application to Wireless Spectrum—Lazar, Semret (1996) ftp.ctr.columbia.edu/CTR-Research/comet/public/papers/96/LAZ96d.ps.gz Auctions for Network Resource Sharing—Lazar, Semret (1997) ftp.ctr.columbia.edu/CTR-Research/comet/public/tech-reports/97/LAZ97.ps.gz Towards a Test-bed for Trading Agents in Electronic.—Rodriguez-Aguilar. (1998) www.iiia.csic.es/Projects/fishmarket/aicom.ps.gz Performance Investigation of an On-Line Auction System—Hillston, Kloul www2.dcs.ed.ac.uk/pepa/./auction.ps.gz A Status Report on the SEMPER Framework for Secure.—Schunter, Waidner. (1998) www.semper.org/sirene/lit/./publ/ScWW_98SEMPER.ps.gz The Average Case Analysis of Algorithms: Multivariate.—Flajolet, SEDGEWICK (1997) ftp.inria.fr/INRIA/publication/publi-ps-gz/RR/RR-3162.ps.gz An Auction-Theoretic Modeling of Production Scheduling to.—Kutanoglu (1999) www.lehigh.edu/~erk3/wpl.ps.gz Implementing a Market-Based Spectrum Policy—Arthur De www.ss.uci.edu/econ/personnel/devany/SpectrumPaper.ps Fast Graph Partitioning Algorithms—Khan, Li (1995) hermes.ece.uvic.ca/DOCUMENTS/WWW_LAPIS/papers/1995/pacrim95b.ps.gz Generating Auction Configurations from Declarative Contract.—Reeves (2000) www.eecs.umich.edu/~dreeves/misc/qual.ps Information Impact of Ranking of Valuations on Bidding Behavior.—Elbittar (1999) www.pitt.edu/~aaest4/jmp.pdf Enhanced Negotiation and Opportunistic Optimization for.—Dias, Stentz (2002) www.ri.cmu.edu/pub_files/pub3/dias_m_bernardine_2002_2/dias_m_bernardine_2002_2.pdf Bidding and Allocation in Combinatorial Auctions—Nisan (1999) www.cs.huji.ac.il/~noam/auctions.ps Michigan Internet AuctionBot—Reeves (1999) www.eecs.umich.edu/~aprakash/598/dreeves-auctionbot/lecture.pdf A Simple Solution of Some Auction Games—Wolfstetter (1995) amadeus.wiwi.hu-berlin.de/pub/papers/sfb373/sfb1995/dpsfb950023.ps.Z An Algorithm for Optimal Winner Determination in Combinatorial.—Sandholm (1999) www.cs.wustl.edu/cs/techreports/1999/wucs-99-01.tr.ps.Z Auction Algorithms for Shortest Hyperpath Problems—De Leone, Pretolani (1998) www2.unicam.it/~deleone/Links/tr/tr1998_01.ps High-Dimensional OLAP: A Minimal Cubing Approach Xiaolei.—University Of Illinois www.cs.uiuc.edu/~hanj/pdf/vldb04_hdolap.pdf An All-Pay Auction Approach to Reallocation—Lenting, Braspenning (1994) ftp.cs.unimaas.nl/pub/papers/lenting/ecai94.ps.Z Sequential And Distributed Algorithms For Fast Graph Partitioning—Khan (1994) www.ece.uvic.ca/~skhan/Publications/KhanMAScThesis.ps.gz FM0.9beta Users' Guide—Rodríguez-Aguilar. (1998) www.iiia.csic.es/Publications/Reports/1998/98-32.ps.gz Optimal Bids in Multi-Unit Auctions When Demand is Price Elastic—Nautz (1996) amadeus.wiwi.hu-berlin.de/pub/papers/sfb373/sfb1996/dpsfb960033.ps.Z Extending A General-Purpose Algebraic Modeling Language To.—Robert Fourer (1998) iems.nwu.edu/~4er/WRITINGS/loglang.ps.gz Auctions and Takeovers.—Under Delaware Law (1999) www.cramton.umd.edu/papers1995-1999/98palrave-auctions-and-takeovers.pdf The Cocaine Auction Protocol: On The Power Of Anonymous.—Stajano, Anderson (1999) ftp.uk.research.att.com/pub/docs/att/tr.1999.4.ps.gz BiddingBot: A Multiagent Support System for.—Ito, Fukuta. (2000) www.cs.cmu.edu/~softagents/papers/itota-icmas00-poster.pdf Optimal Investment in Knowledge within a Firm Using a Market.—Ba (1999) cism.bus.utexas.edu/works/articles/sulin.pdf Third- and Higher-Price Auctions—Wolfstetter (1995) amadeus.wiwi.hu-berlin.de/pub/papers/sfb373/sfb1996/dpsfb960003.ps.Z iBundle: An Efficient Ascending Price Bundle Auction—Parkes (1999) www.cis.upenn.edu/~dparkes/pubs/ibundle.ps Optimal Auctions Revisited—Monderer, Tennenholtz (1998) iew3.technion.ac.il:8080/~moshet/optauc.ps Economic Mechanism Design for Computerized Agents—Varian (1995) www.cs.nccu.edu.tw/~jong/reports/ps/econ.ps.gz Auctions without Common Knowledge—Brainov, Sandholm (1999) www.cs.wustl.edu/cs/techreports/1999/wucs-99-05.ps.Z Experiments With the Auction Algorithm for the Shortest Path.—Larsen, Pedersen (1997) www.diku.dk/research/techreports/./published/97-6.ps.gz A Note on the Practical Performance of the Auction Algorithm for.—Larsen (1997) www.diku.dk/research/techreports/./published/97-7.ps.gz Collusive Bidding in the FCC Spectrum Auctions—Cramton, Schwartz (1999) www.cramton.umd.edu/papers1995-1999/98wp-collusive-bidding-in the-fcc-spectrum-auctions.pdf Fast-Paced Trading of Multi-Attribute Goods—Eugene Fink Computer www.csee.usf.edu/~eugene/research/papers/./full/tradefast.ps Filter Similarities in Content-Based Publish/Subscribe Systems—Mühl, Fiege, Buchmann (2002) www.gkec.informatik.tu-darmstadt.de/rebeca/arcs02.pdf A PVM implementation of the Fishmarket Multiagent System—Di Napoli (1996) www.iiia.csic.es/Publications/1996/PVM.ps.Z Polynomial Auction Algorithms for Shortest Paths—Bertsekas, Pallottino, Scutella (1992) web.mit.edu/dimitrib/www/Auction_BPS.ps Solving Combinatorial Exchanges: Optimality via a Few Partial.—Kothari, Sandholm (2002) www-2.cs.cmu.edu/~sandholm/partialBids.aaai02WS.pdf Draft Version Do not quote without authors' permission.—Auctions Robert Easley www.coins.nd.edu/~reasley/cef99.pdf The Efficiency of the FCC Spectrum Auctions—Cramton (1998) www.cramton.umd.edu/papers1995-1999/98jle-efficiency-of-the-fcc-spectrum-auctions.pdf Auction-based Optimization for Plantwide Control—Jose (1997) www.seas.upenn.edu/~joser/proposal.ps.gz Report 1B: Package Bidding for Spectrum Licenses—Cra No The (1999) www.cramton.umd.edu/papers1995-1999/97cra-package-bidding-for-spectrum-ficenses.pdf Privacy Preserving Auctions and Mechanism Design—Naor, Pinkas, Sumner (1999) www.wisdom.weizmann.ac.il/~bennyp/PAPERS/aip.ps.gz A Componentized Architecture for Dynamic Electronic Markets—Reich, Ben-Shaul (1998) www.dsg.technion.ac.il/gem/papers/gem-sigmodrec.ps.gz Optimal Auction Design for Agents with Hard Valuation Problems—Parkes (1999) www.cis.upenn.edu/~dparkes/pubs/hard_valuation_short.ps Achieving Budget-Balance with Vickrey-Based Payment.—Parkes, Kalagnanam, Eso (2001) www.eecs.harvard.edu/econcs/pubs/combexch01.pdf Auction Theory: A Summary with Applications to Treasury Markets—Das, Sundaram www.people.hbs.edu/sdas/aucsurv.ps A Real-Time Auction System over the WWW—Bouganis, Koukopoulos, Kalles www.cti.gr/RD3/pubs/confs/ccn99.pdf Accounting for Cognitive Costs in On-line Auction Design—Parkes, Ungar, Foster (1999) www.cis.upenn.edu/~dparkes/on-line-auctions.ps Using Auction Theory to Inform Takeover Regulation—Cramton, Schwartz (1991) www.cramton.umd.edu/papers1990-1994/91jleo-using-auction-theory-to-inform-takeover-regulation.pdf Multiple-Issue Auction and Market Algorithms for the.—Teich, Wallenius. (1998) www.iiasa.ac.at/Publications/Documents/IR-98-109.ps Approaches to Winner Determination in Combinatorial Auctions—Sandholm 128.252.165.44/~sandholm/windetreview.ps The Auction Manager: Market Middleware for Large-Scale.—Mullen, Wellman (1998) www.iiia.csic.es/amet98/paper7.ps Ascending Auctions—Cramton (1998) www.cramton.umd.edu/papers1995-1999/98eer-ascending-auctions.pdf Money Out of Thin Air: The Nationwide Narrowband PCS Auction—Cramton (1995) www.cramton.umd.edu/papers1995-1999/95jems-money-out-of-thin-air.pdf Vickrey Auctions with Reserve Pricing—Ausubel, Cramton (1999) www.cramton.umd.edu/papers1995-1999/99wp-vickrey-auctions-with-reserve-pricing.pdf The Design and Implementation of a Secure Auction Service—Franklin, Reiter (1995) www.parc.xerox.com/csl/members/franklin/pubs/auction.ps The Optimality of Being Efficient—Ausubel, Cramton (1999) www.cramton.umd.edu/papers1995-1999/98wp-optimality-of-being-efficient.pdf Cost and Trust Issues in On-Line Auctions—Ungar, Parkes, Foster (1998) www.cis.upenn.edu/~dparkes/pubs/amet98.ps The FCC Spectrum Auctions: An Early Assessment—Cramton (1997) www.cramton.umd.edu/papers1995-1999/97jems-fcc-spectrum-auctions.pdf Control Architecture for a Flexible Internet Auction Server—Wurman, Wellman, Walsh. (1999) www.csc.ncsu.edu/faculty/wurman/Papers/AB-control-arch.ps The Impact of Auctions on Residential Sales Prices in New.—Mark Dotzour Everard business.fullerton.edu/journal/past/./pdf/vol16n01/v16p057.pdf A Parametrization of the Auction Design Space—Wurman, Wellman, Walsh (1999) www.csc.ncsu.edu/faculty/wurman/Papers/auction_parameters.ps Fair On-line Auctions Without Special Trusted Parties—Stubblebine, Syverson (1999) www.cs.columbia.edu/~stu/99fc-stubblebine.ps Electronic Auctions with Private Bids—Harkavy, Tygar, Kikuchi (1998) www.ep.u-tokai.ac.jp/~kikn/Ps/secpri2.ps Demand Reduction and Inefficiency in Multi-Unit Auctions—Ausubel, Cramton (1996) www.cramton.umd.edu/papers1995-1999/98wp-demand-reduction.pdf On Market Mechanisms as a Software Technique—Tucker, Berman (1996) www-cse.ucsd.edu/users/ptucker/market/marmech.ps eMediator: A Next Generation Electronic Commerce Server—Sandholm (1999) siesta.cs.wustl.edu/~sandholm/eMediator.tr.ps Auctioning Securities—Ausubel, Cramton (1998) www.cramton.umd.edu/papers1995-1999/98wp-auctioning-securities.pdf Real Time Issues for Internet Auctions—Wellman, Wurman (1998) linux.eecs.umich.edu/.5/people/wellman/dare98.ps Secure Auctions in a Publish/Subscribe System—Song, Millen www2.csl.sri.com/~millen/dcca8.ps The Michigan Internet AuctionBot: A Configurable Auction.—Wurman, Wellman, Walsh (1998) vulture.eecs.umich.edu/students/pwurman/Papers/Agents98.ps Flexible Double Auctions for Electronic Commerce: Theory.—Wurman, Walsh, Wellman (1997) www-personal.engin.umich.edu/~wew/Papers/m-plus-one-auction.ps.Z Achieving Budget-Balance with Vickrey-Based Payment Schemes in.—Parkes (2002) www.eecs.harvard.edu/~parkes/pubs/combexch.pdf A Control Architecture for Flexible Internet Auction.—Wurman, Wellman, Walsh. (1999) www-personal.engin.umich.edu/~wew/Papers/AB_Architecture2.ps.Z On Combinatorial Auction and Lagrangean Relaxation for.—Kutanoglu, Wu (1998) www.lehigh.edu/~erk3/paperi-iel.ps.gz An Algorithm for Optimal Winner Determination in Combinatorial.—Sandholm (1999) 128.252.165.44/~sandholm/oralg.ijcai99.ps Design of Iterative Mechanisms for Combinatorial Auctions and.—Biswas lcm.csa.iisc.ernet.in/biswas/thesis.pdf Computationally Manageable Combinatorial Auctions—Rothkopf, Pekec, Harstad (1998) dimacs.rutgers.edu/pub/dimacs/TechnicalReports/TechReports/1995/95-09.ps.gz Constructing and Clearing Combinatorial Exchanges Using.—Carnegie Mellon. www.contrib.andrew.cmu.edu/~trey/academic/papers/smith02_elicit.ps.gz Tatonnement Mechanisms—For Combinatorial Exchanges lcm.csa.iisc.ernet.in/biswas/tatonnement.pdf A Decomposition Based Approach for Design of—Supply Aggregation And lcm.csa.iisc.ernet.in/biswas/emc.pdf eMediator: a Next Generation Electronic Commerce Server—Sandholm (1999) 128.252.165.44/~sandholm/eMediator.aaai99ISD.ps Transforms U.S. application Ser. No. 08/240,019 filed May 9, 1994 entitled "Generating Improved Belief Networks"

See, "A Hybrid ANN-HMM ASR system with NN based adaptive preprocessing", Narada Dilp Warakagoda, M. Sc. thesis (Norges Tekniske Hogskole, Institutt for Teleteknikk Transmisjonsteknikk), jedlik.phy.bme.hu/~gerjanos/HMM/hoved.html.

M. A. Cody, "The Wavelet Packet Transform," *Dr. Dobb's Journal*, Vol 19, April 1994, pp. 44-46, 50-54.

V. Wickerhauser, *Adapted Wavelet Analysis from Theory to Software*, AK Peters, Boston, 1994, pp. 213-214, 237, 273-274, 387.

Brown92 Brown, R. G. and P. Y. C. Hwang. 1992. Introduction to Random Signals and Applied Kalman Filtering, Second Edition, John Wiley & Sons, Inc.

Gelb74 Gelb, A. 1974. Applied Optimal Estimation, MIT Press, Cambridge, Mass.

Grewal93 Grewal, Mohinder S., and Angus P. Andrews (1993). Kalman Filtering Theory and Practice. Upper Saddle River, N.J. USA, Prentice Hall.

Jacobs93 Jacobs, O. L. R. 1993. Introduction to Control Theory, 2nd Edition. Oxford University Press.

Julier96 Julier, Simon and Jeffrey Uhlman. "A General Method of Approximating Nonlinear Transformations of Probability Distributions," Robotics Research Group, Department of Engineering Science, University of Oxford [cited 14 Nov. 1995]. Available from www.robots.ox.ac.uk/~siju/work/publications/Unscented.zip.

Kalman60 Kalman, R. E. 1960. "A New Approach to Linear Filtering and Prediction Problems," Transaction of the ASME—Journal of Basic Engineering, pp. 35-45 (March 1960).

Lewis86 Lewis, Richard. 1986. Optimal Estimation with an Introduction to Stochastic Control Theory, John Wiley & Sons, Inc.

Maybeck79 Maybeck, Peter S. 1979. Stochastic Models, Estimation, and Control, Volume 1, Academic Press, Inc.

Sorenson70 Sorenson, H. W. 1970. "Least-Squares estimation: from Gauss to Kalman," IEEE Spectrum, vol. 7, pp. 63-68, July 1970.

See, also:

"A New Approach for Filtering Nonlinear Systems" by S. J. Julier, J. K. Uhlmann, and H. F. Durrant-Whyte, Proceedings of the 1995 American Control Conference, Seattle, Wash., Pages: 1628-1632. Available from www.robots.ox.ac.uk/~siju/work/publications/ACC95_pr.zip Simon Julier's home page at www.robots.ox.ac.uk/~siju/.

"Fuzzy Logic Simplifies Complex Control Problems", Tom Williams, Computer Design, Mar. 1, 1991.

"Neural Network And Fuzzy Systems—A Dynamical Systems Approach To Machine Intelligence", Bart Kosko; Prentice Hall 1992; Englewood Cliffs, N.J.; pp. 13, 18, 19.

B. Krogh et al., "Integrated Path Planning and Dynamic Steering Control for Autonomous Vehicles," 1986.

Brockstein, A., "GPS-Kalman-Augmented Inertial Navigation System Performance," Naecom '76 Record, pp. 864-868, 1976.

Brooks, R., "Solving the Fine-Path Problem by Good Representation of Free Space," IEEE Transactions on Systems, Man, and Cybernetics, pp. 190-197, March-April, 1983.

Brown, R., "Kalman Filtering Study Guide—A Guided Tour," Iowa State University, pp. 1-19, 1984.

Brown, R., Random Signal Analysis & Kalman Filtering, Chapter 5, pp. 181-209, no date.

D. Kuan et al., "Model-based Geometric Reasoning for Autonomous Road Following," pp. 416-423, 1987.

D. Kuan, "Autonomous Robotic Vehicle Road Following," IEEE Transactions on Pattern Analysis and Machine Intelligence, pp. 647-658, 1988.

D. Touretzky et al., "What's Hidden in the Hidden Layers?," Byte, pp. 227-233, August 1989.

Data Fusion in Pathfinder and Travtek, Roy Sumner, VNIS '91 conference, October 20-23, Dearborn, Mich.

Database Accuracy Effects on Vehicle Positioning as Measured by the Certainty Factor, R. Borcherts, C. Collier, E. Koch, R. Bennet, VNIS '91 conference from October 20-23, Dearborn, Mich.

Daum, F., et al., "Decoupled Kalman Filters for Phased Array Radar Tracking," IEEE Transactions on Automatic Control, pp. 269-283, March 1983.

Denavit, J. et al., "A Kinematic Notation for Lower-Pair Mechanisms Bases on Matrices," pp. 215-221, June, 1955.

Dickmanns, E. et al., "Guiding Land Vehicles Along Roadways by Computer Vision", The Tools for Tomorrow, Oct. 23, 1985.

Edward J. Krakiwsky, "A Kalman Filter for Integrating Dead Reckoning, Map Matching and GPS Positioning", IEEE Plans '88 Position Location and Navigation Symposium Record, Kissemee, Fla. USA, Nov. 29-Dec. 2, 1988, pp. 39-46.

Fuzzy Systems and Applications, United Signals and Systems, Inc., Bart Kosko with Fred Watkins, Jun. 5-7, 1991.

IEEE Journal of Robotics & Automation, vol. 4, No. 4, August. 1988, IEEE (New York) J. LeM "Domain-dependent reasoning for visual navigation of roadways, pp. 419-427 (Nissan) Mar. 24, 1988.

J. Crowley, "Part 3: Knowledge Based Supervision of Robotics Systems," 1989 IEEE Conference on Robotics and Automation, pp. 37-42, 1989.

Kaczmarek, K. W., "Cellular Networking: A Carrier's Perspective", 39th IEEE Vehicular Technology Conference, May 1, 1989, vol. 1, pp. 1-6.

Knowledge Representation in Fuzzy Logic, Lotfi A. Zadeh, IEEE Transactions on Knowledge and Data Engineering, vol. 1, No. 1, March 1989.

Sennott, J. et al., "A Queuing Model for Analysis of A Bursty Multiple-Access Communication Channel," IEEE, pp. 317-321, 1981.

Sheridan, T. "Three Models of Preview Control," IEEE Transactions on Human Factors in Electronics, pp. 91-102, June 1966.

Sheth, P., et al., "A Generalized Symbolic Notation for Mechanism," Transactions of the ASME, pp. 102-112, February 1971.

Sorenson, W., "Least-Squares estimation: From Gauss to Kalman," IEEE Spectrum, pp. 63-68, July 1970.

"Automobile Navigation System Using Beacon Information" pp. 139-145.

W. Uttal, "Teleoperators," Scientific American, pp. 124-129, December 1989.

Wareby, Jan, "Intelligent Signaling: FAR & SS7", Cellular Business, pp. 58, 60 and 62, July 1990.

Wescon/87 Conference Record, vol. 31, 1987, (Los Angeles, US) M. T. Allison et al "The next generation navigation system", pp. 941-947.

Ekaterina L.-Rundblad, Alexei Maidan, Peter Novak, Valeriy Labunets, Fast Color Wavelet-Haar Hartley-Prometheus Transforms For Image Processing, www.prometheus-inc.com/asi/algebra2003/papers/katya2.pdf.

Richard Tolimieri and Myoung An, Group Filters And Image Processing, www.prometheus-inc.com/asi/algebra2003/papers/tolimieri.pdf.

Daniel N. Rockmore, Recent Progress And Applications In Group FFTs, www.prometheus-inc.com/asi/algebra2003/papers/rockmore.pdf.

Thomas Theußl and Robert F. Tobler and Eduard Gröller, "The Multi-Dimensional Hartley Transform as a Basis for Volume Rendering", citeseer.nj.nec.com/450842.html.

See also, U.S. Pat. Nos. (expressly incorporated herein by reference):

U.S. Pat. Nos. 3,582,926; 4,291,749; 4,314,232; 4,337,821; 4,401,848; 4,407,564; 4,419,730; 4,441,405; 4,451,887; 4,477,874; 4,536,739; 4,582,389; 4,636,782; 4,653,003; 4,707,788; 4,731,769; 4,740,779; 4,740,780; 4,752,824; 4,787,039; 4,795,223; 4,809,180; 4,818,048; 4,827,520; 4,837,551; 4,853,687; 4,876,594; 4,914,705; 4,967,178; 4,988,976; 4,995,258; 4,996,959; 5,006,829; 5,043,736; 5,051,735; 5,070,323; 5,070,931; 5,119,504; 5,198,797; 5,203,499; 5,214,413; 5,214,707; 5,235,633; 5,257,190; 5,274,560; 5,278,532; 5,293,115; 5,299,132; 5,334,974; 5,335,276; 5,335,743; 5,345,817; 5,351,041; 5,361,165; 5,371,510; 5,400,045; 5,404,443; 5,414,439; 5,416,318; 5,422,565; 5,432,904; 5,440,428; 5,442,553; 5,450,321; 5,450,329; 5,450,613; 5,475,399; 5,479,482; 5,483,632; 5,486,840; 5,493,658; 5,494,097; 5,497,271; 5,497,339; 5,504,622; 5,506,595; 5,511,724; 5,519,403; 5,519,410; 5,523,559; 5,525,977; 5,528,248; 5,528,496; 5,534,888; 5,539,869; 5,547,125; 5,553,661; 5,555,172; 5,555,286; 5,555,502; 5,559,520; 5,572,204; 5,576,724; 5,579,535; 5,627,547; 5,638,305; 5,648,769; 5,650,929; 5,653,386; 5,654,715; 5,666,102; 5,670,953; 5,689,252; 5,691,695; 5,702,165; 5,712,625; 5,712,640; 5,714,852; 5,717,387; 5,732,368; 5,734,973; 5,742,226; 5,752,754; 5,758,311; 5,777,394; 5,781,872; 5,919,239; 6,002,326; 6,013,956; 6,078,853; 6,104,101; and 6,449,535.

M. Krebs, "Cars That Tell You Where To Go," The New York Times, Dec. 15, 1996, section 11, p. 1.

L. Kraar, "Knowledge Engineering," Fortune, Oct. 28, 1996, pp. 163-164.

S. Heuchert, "Eyes Forward: An ergonomic solution to driver information overload," Society of Automobile Engineering, September 1996, pp. 27-31.

J. Braunstein, "Airbag Technology Take Off," Automotive & Transportation Interiors, August 1996, p. 16.

I. Adcock, "No Longer Square," Automotive & Transportation Interiors, August 1996, p. 38.

Secure Networks

A number of references relate to secure networks, which are an aspect of various embodiments of the present invention. These references are incorporated herein by reference in their entirety, including U.S. Pat. No. 5,933,498 (Schneck, et al., Aug. 3, 1999); U.S. Pat. No. 5,978,918 (Scholnick, et al., Nov. 2, 1999); U.S. Pat. No. 6,005,943 (Cohen, et al., Dec. 21, 1999); U.S. Pat. No. 6,009,526 (Choi, Dec. 28, 1999); U.S. Pat. No. 6,021,202 (Anderson, et al., Feb. 1, 2000); U.S. Pat. No. 6,021,491 (Renaud, Feb. 1, 2000); U.S. Pat. No. 6,021,497 (Bouthillier, et al., Feb. 1, 2000); U.S. Pat. No. 6,023,762 (Dean, et al., Feb. 8, 2000); U.S. Pat. No. 6,029,245 (Scanlan, Feb. 22, 2000); U.S. Pat. No. 6,049,875 (Suzuki, et al., Apr. 11, 2000); U.S. Pat. No. 6,055,508 (Naor, et al., Apr. 25, 2000); U.S. Pat. No. 6,065,119 (Sandford, II, et al., May 16, 2000); U.S. Pat. No. 6,073,240 (Kurtzberg, et al., Jun. 6, 2000); U.S. Pat. No. 6,075,860 (Ketcham, Jun. 13, 2000); and U.S. Pat. No. 6,075,861 (Miller, II, Jun. 13, 2000).

Cryptographic References

See also, U.S. Pat. No. 4,200,770 (Cryptographic apparatus and method); U.S. Pat. No. 4,218,582 (Public key cryptographic apparatus and method); U.S. Pat. No. 4,264,782 (Method and apparatus for transaction and identity verification); U.S. Pat. No. 4,306,111 (Simple and effective public-key cryptosystem); U.S. Pat. No. 4,309,569 (Method of providing digital signatures); U.S. Pat. No. 4,326,098 (High security system for electronic signature verification); U.S. Pat. No. 4,351,982 (RSA Public-key data encryption system having large random prime number generating microprocessor or the like); U.S. Pat. No. 4,365,110 (Multiple-destinational cryptosystem for broadcast networks); U.S. Pat. No. 4,386,233 (Crytographic key notarization methods and apparatus); U.S. Pat. No. 4,393,269 (Method and apparatus incorporating a one-way sequence for transaction and identity verification); U.S. Pat. No. 4,399,323 (Fast real-time public key cryptography); U.S. Pat. No. 4,405,829 (Cryptographic communications system and method); U.S. Pat. No. 4,438,824 (Apparatus and method for cryptographic identity verification); U.S. Pat. No. 4,453,074 (Protection system for intelligent cards); U.S. Pat. No. 4,458,109 (Method and apparatus providing registered mail features in an electronic communication system); U.S. Pat. No. 4,471,164 (Stream cipher operation using public key cryptosystem); U.S. Pat. No. 4,514,592 (Cryptosystem); U.S. Pat. No. 4,528,588 (Method and apparatus for marking the information content of an information carrying signal); U.S. Pat. No. 4,529,870 (Cryptographic identification, financial transaction, and credential device); U.S. Pat. No. 4,558,176 (Computer systems to inhibit unauthorized copying, unauthorized usage, and automated cracking of protected software); U.S. Pat. No. 4,567,600 (Method and apparatus for maintaining the privacy of digital messages conveyed by public transmission); U.S. Pat. No. 4,575,621 (Portable electronic transaction device and system therefor); U.S. Pat. No. 4,578,531 (Encryption system key distribution method and apparatus); U.S. Pat. No. 4,590,470 (User authentication system employing encryption functions); U.S. Pat. No. 4,595,950 (Method and apparatus for marking the information content of an information carrying signal); U.S. Pat. No. 4,625,076 (Signed document transmission system); U.S. Pat. No. 4,633,036 (Method and apparatus for use in public-key data encryption system); U.S. Pat. No. 5,991,406 (System and method for data recovery); U.S. Pat. No. 6,026,379 (System, method and article of manufacture for managing transactions in a high availability system); U.S. Pat. No. 6,026,490 (Configurable cryptographic processing engine and method); U.S. Pat. No. 6,028,932 (Copy prevention method and apparatus for digital video system); U.S. Pat. No. 6,028,933 (Encrypting method and apparatus enabling multiple access for multiple services and multiple transmission modes over a broadband communication network); U.S. Pat. No. 6,028,936 (Method and apparatus for authenticating recorded media); U.S. Pat. No. 6,028,937 (Communication device which performs two-way encryption authentication in challenge response format); U.S. Pat. No. 6,028,939 (Data security system and method); U.S. Pat. No. 6,029,150 (Payment and transactions in electronic commerce system); U.S. Pat. No. 6,029,195 (System for customized electronic identification of desirable objects); U.S. Pat. No. 6,029,247 (Method and apparatus for transmitting secured data); U.S. Pat. No. 6,031,913 (Apparatus and method for secure communication based on channel characteristics); U.S. Pat. No. 6,031,914 (Method and apparatus for embedding data, including watermarks, in human perceptible images); U.S. Pat. No. 6,034,618 (Device authentication system which allows the authentication function to be changed); U.S. Pat. No. 6,035,041 (Optimal-resilience, proactive, public-key cryptographic system and method); U.S. Pat. No. 6,035,398 (Cryptographic key generation using biometric data); U.S. Pat. No. 6,035,402 (Virtual certificate authority); U.S. Pat. No. 6,038,315 (Method and system for normalizing biometric variations to authenticate users from a public database and that ensures individual biometric data privacy); U.S. Pat. No. 6,038,316 (Method and system for protection of digital information); U.S. Pat. No. 6,038,322 (Group key distribution); U.S. Pat. No. 6,038,581 (Scheme for arithmetic operations in finite field and group operations over elliptic curves realizing improved computational speed); U.S. Pat. No. 6,038,665 (System and method for backing up computer files over a wide area computer network); U.S. Pat. No. 6,038,666 (Remote identity verification technique using a personal identification device); U.S. Pat. No. 6,041,122 (Method and apparatus for hiding cryptographic keys utilizing autocorrelation timing encoding and computation); U.S. Pat. No. 6,041,123 (Centralized secure communications system); U.S. Pat. No. 6,041,357 (Common session token system and protocol); U.S. Pat. No. 6,041,408 (Key distribution method and system in secure broadcast communication); U.S. Pat. No. 6,041,410 (Personal identification fob); U.S. Pat. No. 6,044,131 (Secure digital x-ray image authentication method); U.S. Pat. No. 6,044,155 (Method and system for securely archiving core data secrets); U.S. Pat. No. 6,044,157 (Microprocessor suitable for reproducing AV data while protecting the AV data from illegal copy and image information processing system using the microprocessor); U.S. Pat. No. 6,044,205 (Communications system for transferring information between memories according to processes transferred with the information); U.S. Pat. No. 6,044,349 (Secure and convenient information storage and retrieval method and apparatus); U.S. Pat. No. 6,044,350 (Certificate meter with selectable indemnification provisions); U.S. Pat. No. 6,044,388 (Pseudorandom number generator); U.S. Pat. No. 6,044,462 (Method and apparatus for managing key revocation); U.S. Pat. No. 6,044,463 (Method and system for message delivery utilizing zero knowledge interactive proof protocol); U.S. Pat. No. 6,044,464 (Method of protecting broadcast data by fingerprinting a common decryption function); U.S. Pat. No. 6,044,466 (Flexible and dynamic derivation of permissions); U.S. Pat. No. 6,044,468 (Secure transmission using an ordinarily insecure network communication protocol such as SNMP); U.S. Pat. No. 6,047,051 (Implementation of charging in a telecommunications system); U.S. Pat. No. 6,047,066 (Communication method and device); U.S. Pat. No. 6,047,067 (Electronic-monetary system); U.S. Pat. No. 6,047,072 (Method for secure key distribution over a nonsecure communications network); U.S. Pat. No. 6,047,242 (Computer system for protecting software and a method for protecting software); U.S. Pat. No. 6,047,268 (Method and apparatus for billing for transactions conducted over the internet); U.S. Pat. No. 6,047,269 (Self-contained payment system with circulating digital vouchers); U.S. Pat. No. 6,047,374 (Method and apparatus for embedding authentication information within digital data); U.S. Pat. No. 6,047,887 (System and method for connecting money modules); U.S. Pat. No. 6,049,610 (Method and apparatus for digital signature authentication); U.S. Pat. No. 6,049,612 (File encryption method and system); U.S. Pat. No. 6,049,613 (Method and apparatus for encrypting, decrypting, and providing privacy for data values); U.S. Pat. No. 6,049,671 (Method for identifying and obtaining computer software from a network computer); U.S. Pat. No. 6,049,785 (Open network payment system for providing for authentication of payment orders based on a confirmation electronic mail message); U.S. Pat. No. 6,049,786 (Electronic bill presentment and payment system which deters cheating by employing hashes and digital signatures); U.S. Pat. No. 6,049,787 (Electronic business transaction system with notarization database and means for conducting a notarization procedure); U.S. Pat. No. 6,049,838 (Persistent distributed capabilities); U.S. Pat. No. 6,049,872 (Method for authenticating a channel in large-scale distributed systems); U.S. Pat. No. 6,049,874 (System and method for backing up computer files over a wide area computer network); U.S. Pat. No. 6,052,466 (Encryption of data packets using a sequence of private keys generated from a public key exchange); U.S. Pat. No. 6,052,467 (System for ensuring that the blinding of secret-key certificates is restricted, even if the issuing protocol is performed in parallel mode); U.S. Pat. No. 6,052,469 (Interoperable cryptographic key recovery system with verification by comparison); U.S. Pat. No. 6,055,314 (System and method for secure purchase and delivery of video content programs); U.S. Pat. No. 6,055,321 (System and method for hiding and extracting message data in multimedia data); U.S. Pat. No. 6,055,508 (Method for secure accounting and auditing on a communications network); U.S. Pat. No. 6,055,512 (Networked personal customized information and facility services); U.S. Pat. No. 6,055,636 (Method and apparatus for centralizing processing of key and certificate life cycle management); U.S. Pat. No. 6,055,639 (Synchronous message control system in a Kerberos domain); U.S. Pat. No. 6,056,199 (Method and apparatus for storing and reading data); U.S. Pat. No. 6,057,872 (Digital coupons for pay televisions); U.S. Pat. No. 6,058,187 (Secure telecommunications data transmission); U.S. Pat. No. 6,058,188 (Method and apparatus for interoperable validation of key recovery information in a cryptographic system); U.S. Pat. No. 6,058,189 (Method and system for performing secure electronic monetary transactions); U.S. Pat. No. 6,058,193 (System and method of verifying cryptographic postage evidencing using a fixed key set); U.S. Pat. No. 6,058,381 (Many-to-many payments system for network content materials); U.S. Pat. No. 6,058,383 (Computationally efficient method for trusted and dynamic digital objects dissemination); U.S. Pat. No. 6,061,448 (Method and system for dynamic server document encryption); U.S. Pat. No. 6,061,454 (System, method, and computer program for communicating a key recovery block to enable third party monitoring without modification to the intended receiver); U.S. Pat. No. 6,061,692 (System and method for administering a meta database as an integral component of an information server); U.S. Pat. No. 6,061,789 (Secure anonymous information exchange in a network); U.S. Pat. No. 6,061,790 (Network computer system with remote user data encipher methodology); U.S. Pat. No. 6,061,791 (Initial secret key establishment including facilities for verification of identity); U.S. Pat. No. 6,061,792 (System and method for fair exchange of time-independent information goods over a network); U.S. Pat. No. 6,061,794 (System and method for performing secure device communications in a peer-to-peer bus architecture); U.S. Pat. No. 6,061,796 (Multi-access virtual private network); U.S. Pat. No. 6,061,799 (Removable media for password based authentication in a distributed system); U.S. Pat. No. 6,064,723 (Network-based multimedia communications and directory system and method of operation); U.S. Pat. No. 6,064,738 (Method for encrypting and decrypting data using chaotic maps); U.S. Pat. No. 6,064,740 (Method and apparatus for masking modulo exponentiation calculations in an integrated circuit); U.S. Pat. No. 6,064,741 (Method for the computer-aided exchange of cryptographic keys between a user computer unit U and a network computer unit N); U.S. Pat. No. 6,064,764 (Fragile watermarks for detecting tampering in images); U.S. Pat. No. 6,064,878 (Method for separately permissioned communication); U.S. Pat. No. 6,065,008 (System and method for secure font subset distribution); U.S. Pat. No. 6,067,620 (Stand alone security device for computer networks); U.S. Pat. No. 6,069,647 (Conditional access and content security method); U.S. Pat. No. 6,069,952 (Data copyright management system); U.S. Pat. No. 6,069,954 (Cryptographic data integrity with serial bit processing and pseudo-random generators); U.S. Pat. No. 6,069,955 (System for protection of goods against counterfeiting); U.S. Pat. No. 6,069,969 (Apparatus and method for electronically acquiring fingerprint images); U.S. Pat. No. 6,069,970 (Fingerprint sensor and token reader and associated methods); U.S. Pat. No. 6,070,239 (System and method for executing verifiable programs with facility for using non-verifiable programs from trusted sources); U.S. Pat. No. 6,072,870 (System, method and article of manufacture for a gateway payment architecture utilizing a multichannel, extensible, flexible architecture); U.S. Pat. No. 6,072,874 (Signing method and apparatus using the same); U.S. Pat. No. 6,072,876 (Method and system for depositing private key used in RSA cryptosystem); U.S. Pat. No. 6,073,125 (Token key distribution system controlled acceptance mail payment and evidencing system); U.S. Pat. No. 6,073,160 (Document communications controller); U.S. Pat. No. 6,073,172 (Initializing and reconfiguring a secure network interface); U.S. Pat. No. 6,073,234 (Device for authenticating user's access rights to resources and method); U.S. Pat. No. 6,073,236 (Authentication method, communication method, and information processing apparatus); U.S. Pat. No. 6,073,237 (Tamper resistant method and apparatus); U.S. Pat. No. 6,073,238 (Method of securely loading commands in a smart card); U.S. Pat. No. 6,073,242 (Electronic authority server); U.S. Pat. No. 6,075,864 (Method of establishing secure, digitally signed communications using an encryption key based on a blocking set cryptosystem); U.S. Pat. No. 6,075,865 (Cryptographic communication process and apparatus); U.S. Pat. No. 6,076,078 (Anonymous certified delivery); U.S. Pat. No. 6,076,162 (Certification of cryptographic keys for chipcards); U.S. Pat. No. 6,076,163 (Secure user identification based on constrained polynomials); U.S. Pat. No. 6,076,164 (Authentication method and system using IC card); U.S. Pat. No. 6,076,167 (Method and system for improving security in network applications); U.S. Pat. No. 6,078,663 (Communication apparatus and a communication system); U.S. Pat. No. 6,078,665 (Electronic encryption device and method); U.S. Pat. No. 6,078,667 (Generating unique and unpredictable values); U.S. Pat. No. 6,078,909 (Method and apparatus for licensing computer programs using a DSA signature); U.S. Pat. No. 6,079,018 (System and method for generating unique secure values for digitally signing documents); U.S. Pat. No. 6,079,047 (Unwrapping system and method for multiple files of a container); U.S. Pat. No. 6,081,597 (Public key cryptosystem method and apparatus); U.S. Pat. No. 6,081,598 (Cryptographic system and method with fast decryption); U.S. Pat. No. 6,081,610 (System and method for verifying signatures on documents); U.S. Pat. No. 6,081,790 (System and method for secure presentment and payment over open networks); U.S. Pat. No. 6,081,893 (System for supporting secured log-in of multiple users into a plurality of computers using combined presentation of memorized password and transportable passport record), U.S. Pat. No. 6,192,473 (System and method for mutual authentication and secure communications between a postage security device and a meter server), each of which is expressly incorporated herein by reference.

See, also, U.S. Pat. No. 6,028,937 (Tatebayashi et al.), U.S. Pat. No. 6,026,167 (Aziz), U.S. Pat. No. 6,009,171 (Ciacelli et al.) (Content Scrambling System, or "CSS"), U.S. Pat. No. 5,991,399 (Graunke et al.), U.S. Pat. No. 5,948,136 (Smyers) (IEEE 1394-1995), and U.S. Pat. No. 5,915,018 (Aucsmith), expressly incorporated herein by reference, and Jim Wright and Jeff Robillard (Philsar Semiconductor), "Adding Security to Portable Designs", Portable Design, March 2000, pp. 16-20.

See also, Stefik, U.S. Pat. No. 5,715,403 (System for controlling the distribution and use of digital works having attached usage rights where the usage rights are defined by a usage rights grammar); U.S. Pat. No. 5,638,443 (System for controlling the distribution and use of composite digital works); U.S. Pat. No. 5,634,012 (System for controlling the distribution and use of digital works having a fee reporting mechanism); and U.S. Pat. No. 5,629,980 (System for controlling the distribution and use of digital works), expressly incorporated herein by reference.

Computer Security and Devices

A number of references relate to computer system security, which is a part of various embodiment of the invention. The following references relevant to this issue are incorporated herein by reference: U.S. Pat. No. 5,881,225 (Worth, Mar. 9, 1999); U.S. Pat. No. 5,937,068 (Audebert, Aug. 10, 1999); U.S. Pat. No. 5,949,882 (Angelo, Sep. 7, 1999); U.S. Pat. No. 5,953,419 (Lohstroh, et al., Sep. 14, 1999); U.S. Pat. No. 5,956,400 (Chaum, et al., Sep. 21, 1999); U.S. Pat. No. 5,958,050 (Griffin, et al., Sep. 28, 1999); U.S. Pat. No. 5,978,475 (Schneier, et al., Nov. 2, 1999); U.S. Pat. No. 5,991,878 (McDonough, et al., Nov. 23, 1999); U.S. Pat. No. 6,070,239 (McManis, May 30, 2000); and U.S. Pat. No. 6,079,021 (Abadi, et al., Jun. 20, 2000).

A number of references relate to computer security devices, which is a part of various embodiment of the invention. The following references relevant to this issue are incorporated herein by reference: U.S. Pat. No. 5,982,520 (Weiser, et al., Nov. 9, 1999); U.S. Pat. No. 5,991,519 (Benhammou, et al., Nov. 23, 1999); U.S. Pat. No. 5,999,629 (Heer, et al., Dec. 7, 1999); U.S. Pat. No. 6,034,618 (Tatebayashi, et al., Mar. 7, 2000); U.S. Pat. No. 6,041,412 (Timson, et al., Mar. 21, 2000); U.S. Pat. No. 6,061,451 (Muratani, et al., May 9, 2000); and U.S. Pat. No. 6,069,647 (Sullivan, et al., May 30, 2000).

Virtual Private Network

A number of references relate to virtual private networks, which is a part of various embodiment of the invention. The following references relevant to this issue are incorporated herein by reference: U.S. Pat. No. 6,079,020 (Liu, Jun. 20, 2000); U.S. Pat. No. 6,081,900 (Secure intranet access); U.S. Pat. No. 6,081,533 (Method and apparatus for an application interface module in a subscriber terminal unit); U.S. Pat. No. 6,079,020 (Method and apparatus for managing a virtual private network); U.S. Pat. No. 6,078,946 (System and method for management of connection oriented networks); U.S. Pat. No. 6,078,586 (ATM virtual private networks); U.S. Pat. No. 6,075,854 (Fully flexible routing service for an advanced intelligent network); U.S. Pat. No. 6,075,852 (Telecommunications system and method for processing call-independent signalling transactions); U.S. Pat. No. 6,073,172 (Initializing and reconfiguring a secure network interface); U.S. Pat. No. 6,061,796 (Multi-access virtual private network); U.S. Pat. No. 6,061,729 (Method and system for communicating service information in an advanced intelligent network); U.S. Pat. No. 6,058,303 (System and method for subscriber activity supervision); U.S. Pat. No. 6,055,575 (Virtual private network system and method); U.S. Pat. No. 6,052,788 (Firewall providing enhanced network security and user transparency); U.S. Pat. No. 6,047,325 (Network device for supporting construction of virtual local area networks on arbitrary local and wide area computer networks); U.S. Pat. No. 6,032,118 (Virtual private network service provider for asynchronous transfer mode network); U.S. Pat. No. 6,029,067 (Virtual private network for mobile subscribers); U.S. Pat. No. 6,016,318 (Virtual private network system over public mobile data network and virtual LAN); U.S. Pat. No. 6,009,430 (Method and system for provisioning databases in an advanced intelligent network); U.S. Pat. No. 6,005,859 (Proxy VAT-PSTN origination); U.S. Pat. No. 6,002,767 (System, method and article of manufacture for a modular gateway server architecture); U.S. Pat. No. 6,002,756 (Method and system for implementing intelligent telecommunication services utilizing self-sustaining, fault tolerant object oriented architecture), each of which is expressly incorporated herein by reference.

See also, U.S. Pat. No. 6,081,900 (Secure intranet access); U.S. Pat. No. 6,081,750 (Ergonomic man-machine interface incorporating adaptive pattern recognition based control system); U.S. Pat. No. 6,081,199 (Locking device for systems access to which is time-restricted); U.S. Pat. No. 6,079,621 (Secure card for E-commerce and identification); U.S. Pat. No. 6,078,265 (Fingerprint identification security system); U.S. Pat. No. 6,076,167 (Method and system for improving security in network applications); U.S. Pat. No. 6,075,455 (Biometric time and attendance system with epidermal topographical updating capability); U.S. Pat. No. 6,072,894 (Biometric face recognition for applicant screening); U.S. Pat. No. 6,070,141 (System and method of assessing the quality of an identification transaction using an identification quality score); U.S. Pat. No. 6,068,184 (Security card and system for use thereof); U.S. Pat. No. 6,064,751 (Document and signature data capture system and method); U.S. Pat. No. 6,056,197 (Information recording method for preventing alteration, information recording apparatus, and information recording medium); U.S. Pat. No. 6,052,468 (Method of securing a cryptographic key); U.S. Pat. No. 6,045,039 (Cardless automated teller transactions); U.S. Pat. No. 6,044,349 (Secure and convenient information storage and retrieval method and apparatus); U.S. Pat. No. 6,044,155 (Method and system for securely archiving core data secrets); U.S. Pat. No. 6,041,410 (Personal identification fob); U.S. Pat. No. 6,040,783 (System and method for remote, wireless positive identity verification); U.S. Pat. No. 6,038,666 (Remote identity verification technique using a personal identification device); U.S. Pat. No. 6,038,337 (Method and apparatus for object recognition); U.S. Pat. No. 6,038,315 (Method and system for normalizing biometric variations to authenticate users from a public database and that ensures individual biometric data privacy); U.S. Pat. No. 6,037,870 (Detector system for access control, and a detector assembly for implementing such a system); U.S. Pat. No. 6,035,406 (Plurality-factor security system); U.S. Pat. No. 6,035,402 (Virtual certificate authority); U.S. Pat. No. 6,035,398 (Cryptographic key generation using biometric data); U.S. Pat. No. 6,031,910 (Method and system for the secure transmission and storage of protectable information); U.S. Pat. No. 6,026,166 (Digitally certifying a user identity and a computer system in combination); U.S. Pat. No. 6,018,739 (Biometric personnel identification system); U.S. Pat. No. 6,016,476 (Portable information and transaction processing system and method utilizing biometric authorization and digital certificate security); U.S. Pat. No. 6,012,049 (System for performing financial transactions using a smartcard); U.S. Pat. No. 6,012,039 (Tokenless biometric electronic rewards system); U.S. Pat. No. 6,011,858 (Memory card having a biometric template stored thereon and system for using same); U.S. Pat. No. 6,009,177 (Enhanced cryptographic system and method with key escrow feature); U.S. Pat. No. 6,006,328 (Computer software authentication, protection, and security system); U.S. Pat. No. 6,003,135 (Modular security device); U.S. Pat. No. 6,002,770 (Method for secure data transmission between remote stations); U.S. Pat. No. 5,999,637 (Individual identification apparatus for selectively recording a reference pattern based on a correlation with comparative patterns); U.S. Pat. No. 5,999,095 (Electronic security system); U.S. Pat. No. 5,995,630 (Biometric input with encryption); U.S. Pat. No. 5,991,431 (Mouse adapted to scan biometric data); U.S. Pat. No. 5,991,429 (Facial recognition system for security access and identification); U.S. Pat. No. 5,991,408 (Identification and security using biometric measurements); U.S. Pat. No. 5,987,155 (Biometric input device with peripheral port); U.S. Pat. No. 5,987,153 (Automated verification and prevention of spoofing for biometric data); U.S. Pat. No. 5,986,746 (Topographical object detection system); U.S. Pat. No. 5,984,366 (Unalterable self-verifying articles); U.S. Pat. No. 5,982,894 (System including separable protected components and associated methods); U.S. Pat. No. 5,979,773 (Dual smart card access control electronic data storage and retrieval system and methods); U.S. Pat. No. 5,978,494 (Method of selecting the best enroll image for personal identification); U.S. Pat. No. 5,974,146 (Real time bank-centric universal payment system); U.S. Pat. No. 5,970,143 (Remote-auditing of computer generated outcomes, authenticated billing and access control, and software metering system using cryptographic and other protocols); U.S. Pat. No. 5,966,446 (Time-bracketing infrastructure implementation); U.S. Pat. No. 5,963,908 (Secure logon to notebook or desktop computers); U.S. Pat. No. 5,963,657 (Economical skin-pattern-acquisition and analysis apparatus for access control; systems controlled thereby); U.S. Pat. No. 5,954,583 (Secure access control system); U.S. Pat. No. 5,952,641 (Security device for controlling the access to a personal computer or to a computer terminal); U.S. Pat. No. 5,951,055 (Security document containing encoded data block); U.S. Pat. No. 5,949,881 (Apparatus and method for cryptographic companion imprinting); U.S. Pat. No. 5,949,879 (Auditable security system for the generation of cryptographically protected digital data); U.S. Pat. No. 5,949,046 (Apparatus for issuing integrated circuit cards); U.S. Pat. No. 5,943,423 (Smart token system for secure electronic transactions and identification); U.S. Pat. No. 5,935,071 (Ultrasonic biometric imaging and identity verification system); U.S. Pat. No. 5,933,515 (User identification through sequential input of fingerprints); U.S. Pat. No. 5,933,498 (System for controlling access and distribution of digital property); U.S. Pat. No. 5,930,804 (Web-based biometric authentication system and method); U.S. Pat. No. 5,923,763 (Method and apparatus for secure document timestamping); U.S. Pat. No. 5,920,477 (Human factored interface incorporating adaptive pattern recognition based controller apparatus); U.S. Pat. No. 5,920,384 (Optical imaging device); U.S. Pat. No. 5,920,058 (Holographic labeling and reading machine for authentication and security applications); U.S. Pat. No. 5,915,973 (System for administration of remotely-proctored, secure examinations and methods therefor); U.S. Pat. No. 5,913,196 (System and method for establishing identity of a speaker); U.S. Pat. No. 5,913,025 (Method and apparatus for proxy authentication); U.S. Pat. No. 5,912,974 (Apparatus and method for authentication of printed documents); U.S. Pat. No. 5,912,818 (System for tracking and dispensing medical items); U.S. Pat. No. 5,910,988 (Remote image capture with centralized processing and storage); U.S. Pat. No. 5,907,149 (Identification card with delimited usage); U.S. Pat. No. 5,901,246 (Ergonomic man-machine interface incorporating adaptive pattern recognition based control system); U.S. Pat. No. 5,898,154 (System and method for updating security information in a time-based electronic monetary system); U.S. Pat. No. 5,897,616 (Apparatus and methods for speaker verification/identification/classification employing non-acoustic and/or acoustic models and databases); U.S. Pat. No. 5,892,902 (Intelligent token protected system with network authentication); U.S. Pat. No. 5,892,838 (Biometric recognition using a classification neural network); U.S. Pat. No. 5,892,824 (Signature capture/verification systems and methods); U.S. Pat. No. 5,890,152 (Personal feedback browser for obtaining media files); U.S. Pat. No. 5,889,474 (Method and apparatus for transmitting subject status information over a wireless communications network); U.S. Pat. No. 5,881,226 (Computer security system); U.S. Pat. No. 5,878,144 (Digital certificates containing multimedia data extensions); U.S. Pat. No. 5,876,926 (Method, apparatus and system for verification of human medical data); U.S. Pat. No. 5,875,108 (Ergonomic man-machine interface incorporating adaptive pattern recognition based control system); U.S. Pat. No. 5,872,849 (Enhanced cryptographic system and method with key escrow feature); U.S. Pat. No. 5,872,848 (Method and apparatus for witnessed authentication of electronic documents); U.S. Pat. No. 5,872,834 (Telephone with biometric sensing device); U.S. Pat. No. 5,870,723 (Tokenless biometric transaction authorization method and system); U.S. Pat. No. 5,869,822 (Automated fingerprint identification system); U.S. Pat. No. 5,867,802 (Biometrically secured control system for preventing the unauthorized use of a vehicle); U.S. Pat. No. 5,867,795 (Portable electronic device with transceiver and visual image display); U.S. Pat. No. 5,867,578 (Adaptive multi-step digital signature system and method of operation thereof); U.S. Pat. No. 5,862,260 (Methods for surveying dissemination of proprietary empirical data); U.S. Pat. No. 5,862,246 (Knuckle profile identity verification system); U.S. Pat. No. 5,862,223 (Method and apparatus for a cryptographically-assisted commercial network system designed to facilitate and support expert-based commerce); U.S. Pat. No. 5,857,022 (Enhanced cryptographic system and method with key escrow feature); U.S. Pat. No. 5,850,451 (Enhanced cryptographic system and method with key escrow feature); U.S. Pat. No. 5,850,442 (Secure world wide electronic commerce over an open network); U.S. Pat. No. 5,848,231 (System configuration contingent upon secure input); U.S. Pat. No. 5,844,244 (Portable identification carrier); U.S. Pat. No. 5,841,907 (Spatial integrating optical correlator for verifying the authenticity of a person, product or thing); U.S. Pat. No. 5,841,886 (Security system for photographic identification); U.S. Pat. No. 5,841,865 (Enhanced cryptographic system and method with key escrow feature); U.S. Pat. No. 5,841,122 (Security structure with electronic smart card access thereto with transmission of power and data between the smart card and the smart card reader performed capacitively or inductively); U.S. Pat. No. 5,838,812 (Tokenless biometric transaction authorization system); U.S. Pat. No. 5,832,464 (System and method for efficiently processing payments via check and electronic funds transfer); U.S. Pat. No. 5,832,119 (Methods for controlling systems using control signals embedded in empirical data); U.S. Pat. No. 5,828,751 (Method and apparatus for secure measurement certification); U.S. Pat. No. 5,825,880 (Multi-step digital signature method and system); U.S. Pat. No. 5,825,871 (Information storage device for storing personal identification information); U.S. Pat. No. 5,815,577 (Methods and apparatus for securely encrypting data in conjunction with a personal computer); U.S. Pat. No. 5,815,252 (Biometric identification process and system utilizing multiple parameters scans for reduction of false negatives); U.S. Pat. No. 5,805,719 (Tokenless identification of individuals); U.S. Pat. No. 5,802,199 (Use sensitive identification system); U.S. Pat. No. 5,799,088 (Non-deterministic public key encryption system); U.S. Pat. No. 5,799,086 (Enhanced cryptographic system and method with key escrow feature); U.S. Pat. No. 5,799,083 (Event verification system); U.S. Pat. No. 5,790,674 (System and method of providing system integrity and positive audit capabilities to a positive identification system); U.S. Pat. No. 5,790,668 (Method and apparatus for securely handling data in a database of biometrics and associated data); U.S. Pat. No. 5,789,733 (Smart card with contactless optical interface); U.S. Pat. No. 5,787,187 (Systems and methods for biometric identification using the acoustic properties of the ear canal); U.S. Pat. No. 5,784,566 (System and method for negotiating security services and algorithms for communication across a computer network); U.S. Pat. No. 5,784,461 (Security system for controlling access to images and image related services); U.S. Pat. No. 5,774,551 (Pluggable account management interface with unified login and logout and multiple user authentication services); U.S. Pat. No. 5,771,071 (Apparatus for coupling multiple data sources onto a printed document); U.S. Pat. No. 5,770,849 (Smart card device with pager and visual image display); U.S. Pat. No. 5,768,382 (Remote-auditing of computer generated outcomes and authenticated billing and access control system using cryptographic and other protocol); U.S. Pat. No. 5,767,496 (Apparatus for processing symbol-encoded credit card information); U.S. Pat. No. 5,764,789 (Tokenless biometric ATM access system); U.S. Pat. No. 5,763,862 (Dual card smart card reader); U.S. Pat. No. 5,761,298 (Communications headset with universally adaptable receiver and voice transmitter); U.S. Pat. No. 5,757,916 (Method and apparatus for authenticating the location of remote users of networked computing systems); U.S. Pat. No. 5,757,431 (Apparatus for coupling multiple data sources onto a printed document); U.S. Pat. No. 5,751,836 (Automated, non-invasive iris recognition system and method); U.S. Pat. No. 5,751,809 (Apparatus and method for securing captured data transmitted between two sources); U.S. Pat. No. 5,748,738 (System and method for electronic transmission, storage and retrieval of authenticated documents); U.S. Pat. No. 5,745,573 (System and method for controlling access to a user secret); U.S. Pat. No. 5,745,555 (System and method using personal identification numbers and associated prompts for controlling unauthorized use of a security device and unauthorized access to a resource); U.S. Pat. No. 5,742,685 (Method for verifying an identification card and recording verification of same); U.S. Pat. No. 5,742,683 (System and method for managing multiple users with different privileges in an open metering system); U.S. Pat. No. 5,737,420 (Method for secure data transmission between remote stations); U.S. Pat. No. 5,734,154 (Smart card with integrated reader and visual image display); U.S. Pat. No. 5,719,950 (Biometric, personal authentication system); U.S. Pat. No. 5,712,914 (Digital certificates containing multimedia data extensions); U.S. Pat. No. 5,712,912 (Method and apparatus for securely handling a personal identification number or cryptographic key using biometric techniques); U.S. Pat. No. 5,706,427 (Authentication method for networks); U.S. Pat. No. 5,703,562 (Method for transferring data from an unsecured computer to a secured computer); U.S. Pat. No. 5,696,827 (Secure cryptographic methods for electronic transfer of information); U.S. Pat. No. 5,682,142 (Electronic control system/network); U.S. Pat. No. 5,682,032 (Capacitively coupled identity verification and escort memory apparatus); U.S. Pat. No. 5,680,460 (Biometric controlled key generation); U.S. Pat. No. 5,668,878 (Secure cryptographic methods for electronic transfer of information); U.S. Pat. No. 5,666,400 (Intelligent recognition); U.S. Pat. No. 5,659,616 (Method for securely using digital signatures in a commercial cryptographic system); U.S. Pat. No. 5,647,364 (Ultrasonic biometric imaging and identity verification system); U.S. Pat. No. 5,647,017 (Method and system for the verification of handwritten signatures); U.S. Pat. No. 5,646,839 (Telephone-based personnel tracking system); U.S. Pat. No. 5,636,282 (Method for dial-in access security using a multimedia modem); U.S. Pat. No. 5,633,932 (Apparatus and method for preventing disclosure through user-authentication at a printing node); U.S. Pat. No. 5,615,277 (Tokenless security system for authorizing access to a secured computer system); U.S. Pat. No. 5,613,012 (Tokenless identification system for authorization of electronic transactions and electronic transmissions); U.S. Pat. No. 5,608,387 (Personal identification devices and access control systems); U.S. Pat. No. 5,594,806 (Knuckle profile identity verification system); U.S. Pat. No. 5,592,408 (Identification card and access control device); U.S. Pat. No. 5,588,059 (Computer system and method for secure remote communication sessions); U.S. Pat. No. 5,586,171 (Selection of a voice recognition data base responsive to video data); U.S. Pat. No. 5,583,950 (Method and apparatus for flash correlation); U.S. Pat. No. 5,583,933 (Method and apparatus for the secure communication of data); U.S. Pat. No. 5,578,808 (Data card that can be used for transactions involving separate card issuers); U.S. Pat. No. 5,572,596 (Automated, non-invasive iris recognition system and method); U.S. Pat. No. 5,561,718 (Classifying faces); U.S. Pat. No. 5,559,885 (Two stage read-write method for transaction cards); U.S. Pat. No. 5,557,765 (System and method for data recovery); U.S. Pat. No. 5,553,155 (Low cost method employing time slots for thwarting fraud in the periodic issuance of food stamps, unemployment benefits or other governmental human services); U.S. Pat. No. 5,544,255 (Method and system for the capture, storage, transport and authentication of handwritten signatures); U.S. Pat. No. 5,534,855 (Method and system for certificate based alias detection); U.S. Pat. No. 5,533,123 (Programmable distributed personal security); U.S. Pat. No. 5,526,428 (Access control apparatus and method); U.S. Pat. No. 5,523,739 (Metal detector for control of access combined in an integrated form with a transponder detector); U.S. Pat. No. 5,497,430 (Method and apparatus for image recognition using invariant feature signals); U.S. Pat. No. 5,485,519 (Enhanced security for a secure token code); U.S. Pat. No. 5,485,312 (Optical pattern recognition system and method for verifying the authenticity of a person, product or thing); U.S. Pat. No. 5,483,601 (Apparatus and method for biometric identification using silhouette and displacement images of a portion of a person's hand); U.S. Pat. No. 5,478,993 (Process as safety concept against unauthorized use of a payment instrument in cashless payment at payment sites); U.S. Pat. No. 5,475,839 (Method and structure for securing access to a computer system); U.S. Pat. No. 5,469,506 (Apparatus for verifying an identification card and identifying a person by means of a biometric characteristic); U.S. Pat. No. 5,457,747 (Anti-fraud verification system using a data card); U.S. Pat. No. 5,455,407 (Electronic-monetary system); U.S. Pat. No. 5,453,601 (Electronic-monetary system); U.S. Pat. No. 5,448,045 (System for protecting computers via intelligent tokens or smart cards); U.S. Pat. No. 5,432,864 (Identification card verification system); U.S. Pat. No. 5,414,755 (System and method for passive voice verification in a telephone network); U.S. Pat. No. 5,412,727 (Anti-fraud voter registration and voting system using a data card); U.S. Pat. No. 5,363,453 (Non-minutiae automatic fingerprint identification system and methods); U.S. Pat. No. 5,347,580 (Authentication method and system with a smartcard); U.S. Pat. No. 5,345,549 (Multimedia based security systems); U.S. Pat. No. 5,341,428 (Multiple cross-check document verification system); U.S. Pat. No. 5,335,288 (Apparatus and method for biometric identification); U.S. Pat. No. 5,291,560 (Biometric personal identification system based on iris analysis); U.S. Pat. No. 5,283,431 (Optical key security access system); U.S. Pat. No. 5,280,527 (Biometric token for authorizing access to a host system); U.S. Pat. No. 5,272,754 (Secure computer interface); U.S. Pat. No. 5,245,329 (Access control system with mechanical keys which store data); U.S. Pat. No. 5,229,764 (Continuous biometric authentication matrix); U.S. Pat. No. 5,228,094 (Process of identifying and authenticating data characterizing an individual); U.S. Pat. No. 5,224,173 (Method of reducing fraud in connection with employment, public license applications, social security, food stamps, welfare or other government benefits); U.S. Pat. No. 5,208,858 (Method for allocating useful data to a specific originator); U.S. Pat. No. 5,204,670 (Adaptable electric monitoring and identification system); U.S. Pat. No. 5,191,611 (Method and apparatus for protecting material on storage media and for transferring material on storage media to various recipients); U.S. Pat. No. 5,163,094 (Method for identifying individuals from analysis of elemental shapes derived from biosensor data); U.S. Pat. No. 5,155,680 (Billing system for computing software); U.S. Pat. No. 5,131,038 (Portable authentification system); U.S. Pat. No. 5,073,950 (Finger profile identification system); U.S. Pat. No. 5,067,162 (Method and apparatus for verifying identity using image correlation); U.S. Pat. No. 5,065,429 (Method and apparatus for protecting material on storage media); U.S. Pat. No. 5,056,147 (Recognition procedure and an apparatus for carrying out the recognition procedure); U.S. Pat. No. 5,056,141 (Method and apparatus for the identification of personnel); U.S. Pat. No. 5,036,461 (Two-way authentication system between user's smart card and issuer-specific plug-in application modules in multi-issued transaction device); U.S. Pat. No. 5,020,105 (Field initialized authentication system for protective security of electronic information networks); U.S. Pat. No. 4,993,068 (Unforgettable personal identification system); U.S. Pat. No. 4,972,476 (Counterfeit proof ID card having a scrambled facial image); U.S. Pat. No. 4,961,142 (Multi-issuer transaction device with individual identification verification plug-in application modules for each issuer); U.S. Pat. No. 4,952,928 (Adaptable electronic monitoring and identification system); U.S. Pat. No. 4,941,173 (Device and method to render secure the transfer of data between a videotex terminal and a server); U.S. Pat. No. 4,926,480 (Card-computer moderated systems); U.S. Pat. No. 4,896,363 (Apparatus and method for matching image characteristics such as fingerprint minutiae); U.S. Pat. No. 4,890,323 (Data communication systems and methods); U.S. Pat. No. 4,868,376 (Intelligent portable interactive personal data system); U.S. Pat. No. 4,827,518 (Speaker verification system using integrated circuit cards); U.S. Pat. No. 4,819,267 (Solid state key for controlling access to computer systems and to computer software and/or for secure communications); U.S. Pat. No. 4,752,676 (Reliable secure, updatable "cash" card system); U.S. Pat. No. 4,736,203 (3D hand profile identification apparatus); U.S. Pat. No. 4,731,841 (Field initialized authentication system for protective security of electronic information networks); U.S. Pat. No. 4,564,018 (Ultrasonic system for obtaining ocular measurements), each of which is expressly incorporated herein by reference.

Micropayments Refferences

The following U.S. patents, expressly incorporated herein by reference, define aspects of micropayment, digital certificate, and on-line payment systems: U.S. Pat. No. 5,930,777 (Barber, Jul. 27, 1999, Method of charging for pay-per-access information over a network); U.S. Pat. No. 5,857,023 (Jan. 5, 1999, Demers et al., Space efficient method of redeeming electronic payments); U.S. Pat. No. 5,815,657 (Sep. 29, 1998, Williams, System, method and article of manufacture for network electronic authorization utilizing an authorization instrument); U.S. Pat. No. 5,793,868 (Aug. 11, 1998, Micali, Certificate revocation system), U.S. Pat. No. 5,717,757 (Feb. 10, 1998, Micali, Certificate issue lists); U.S. Pat. No. 5,666,416 (Sep. 9, 1997, Micali, Certificate revocation system); U.S. Pat. No. 5,677,955 (Doggett et al., Electronic funds transfer instruments); U.S. Pat. No. 5,839,119 (Nov. 17, 1998, Krsul; et al., Method of electronic payments that prevents double-spending); U.S. Pat. No. 5,915,093 (Berlin et al.); U.S. Pat. No. 5,937,394 (Wong, et al.); U.S. Pat. No. 5,933,498 (Schneck et al.); U.S. Pat. No. 5,903,880 (Biffar); U.S. Pat. No. 5,903,651 (Kocher); U.S. Pat. No. 5,884,277 (Khosla); U.S. Pat. No. 5,960,083 (Sep. 28, 1999, Micali, Certificate revocation system); U.S. Pat. No. 5,963,924 (Oct. 5, 1999, Williams et al., System, method and article of manufacture for the use of payment instrument holders and payment instruments in network electronic commerce); U.S. Pat. No. 5,996,076 (Rowney et al., System, method and article of manufacture for secure digital certification of electronic commerce); U.S. Pat. No. 6,016,484 (Jan. 18, 2000, Williams et al., System, method and article of manufacture for network electronic payment instrument and certification of payment and credit collection utilizing a payment); U.S. Pat. No. 6,018,724 (Arent); U.S. Pat. No. 6,021,202 (Anderson et al., Method and system for processing electronic documents); U.S. Pat. No. 6,035,402 (Vaeth et al.); U.S. Pat. No. 6,049,786 (Smorodinsky); U.S. Pat. No. 6,049,787 (Takahashi, et al.); U.S. Pat. No. 6,058,381 (Nelson, Many-to-many payments system for network content materials); U.S. Pat. No. 6,061,448 (Smith, et al.); U.S. Pat. No. 5,987,132 (Nov. 16, 1999, Rowney, System, method and article of manufacture for conditionally accepting a payment method utilizing an extensible, flexible architecture); U.S. Pat. No. 6,057,872 (Candelore); and U.S. Pat. No. 6,061,665 (May 9, 2000, Bahreman, System, method and article of manufacture for dynamic negotiation of a network payment framework). See also, Rivest and Shamir, "PayWord and MicroMint: Two Simple Micropayment Schemes" (May 7, 1996); Micro PAYMENT transfer Protocol (MPTP) Version 0.1 (22 Nov. 1995) et seq., www.w3.org/pub/WWW/TR/WD-mptp; Common Markup for web Micropayment Systems, www.w3.org/TR/WD-Micropayment-Markup (9 Jun. 1999); "Distributing Intellectual Property: a Model of Microtransaction Based Upon Metadata and Digital Signatures", Olivia, Maurizio, olivia.modlang.denison.edu/~olivia/RFC/09/, all of which are expressly incorporated herein by reference.

See, also: U.S. Pat. No. 4,977,595 (Dec. 11, 1990, Method and apparatus for implementing electronic cash); U.S. Pat. No. 5,224,162 (Jun. 29, 1993, Electronic cash system); U.S. Pat. No. 5,237,159 (Aug. 17, 1993, Electronic check presentment system); U.S. Pat. No. 5,392,353 (February 1995, Morales, TV Answer, Inc. Interactive satellite broadcast network); U.S. Pat. No. 5,511,121(Apr. 23, 1996, Efficient electronic money); U.S. Pat. No. 5,621,201(April 1997, Langhans et al., Visa International Automated purchasing control system); U.S. Pat. No. 5,623,547 (Apr. 22, 1997, Value transfer system); U.S. Pat. No. 5,679,940 (October 1997, Templeton et al., TeleCheck International, Inc. Transaction system with on/off line risk assessment); U.S. Pat. No. 5,696,908 (December 1997, Muehlberger et al., Southeast Phonecard, Inc. Telephone debit card dispenser and method); U.S. Pat. No. 5,754,939 (May 1998, Herz et al., System for generation of user profiles for a system for customized electronic identification of desirable objects); U.S. Pat. No. 5,768,385 (Jun. 16, 1998, Untraceable electronic cash); U.S. Pat. No. 5,799,087 (Aug. 25, 1998, Electronic-monetary system); U.S. Pat. No. 5,812,668 (Sep. 22, 1998, System, method and article of manufacture for verifying the operation of a remote transaction clearance system utilizing a multichannel, extensible, flexible architecture); U.S. Pat. No. 5,828,840 (Oct. 27, 1998, Server for starting client application on client if client is network terminal and initiating client application on server if client is non network terminal); U.S. Pat. No. 5,832,089 (Nov. 3, 1998, Off-line compatible electronic cash method and system); U.S. Pat. No. 5,850,446 (Dec. 15, 1998, System, method and article of manufacture for virtual point of sale processing utilizing an extensible, flexible architecture); U.S. Pat. No. 5,889,862 (Mar. 30, 1999, Method and apparatus for implementing traceable electronic cash); U.S. Pat. No. 5,889,863 (Mar. 30, 1999, System, method and article of manufacture for remote virtual point of sale processing utilizing a multichannel, extensible, flexible architecture); U.S. Pat. No. 5,898,154 (Apr. 27, 1999, System and method for updating security information in a time-based electronic monetary system); U.S. Pat. No. 5,901,229 (May 4, 1999, Electronic cash implementing method using a trustee); U.S. Pat. No. 5,920,629 (Jul. 6, 1999, Electronic-monetary system); U.S. Pat. No. 5,926,548 (Jul. 20, 1999, Method and apparatus for implementing hierarchical electronic cash); U.S. Pat. No. 5,943,424 (Aug. 24, 1999, System, method and article of manufacture for processing a plurality of transactions from a single initiation point on a multichannel, extensible, flexible architecture); U.S. Pat. No. 5,949,045 (Sep. 7, 1999, Micro-dynamic simulation of electronic cash transactions); U.S. Pat. No. 5,952,638 (Sep. 14, 1999, Space efficient method of electronic payments); U.S. Pat. No. 5,963,648 (Oct. 5, 1999, Electronic-monetary system); U.S. Pat. No. 5,978,840 (System, method and article of manufacture for a payment gateway system architecture for processing encrypted payment transactions utilizing a multichannel, extensible, flexible architecture); U.S. Pat. No. 5,983,208 (Nov. 9, 1999, System, method and article of manufacture for handling transaction results in a gateway payment architecture utilizing a multichannel, extensible, flexible architecture); U.S. Pat. No. 5,987,140 (Nov. 16, 1999, System, method and article of manufacture for secure network electronic payment and credit collection); U.S. Pat. No. 6,002,767 (Dec. 14, 1999, System, method and article of manufacture for a modular gateway server architecture); U.S. Pat. No. 6,003,765 (Dec. 21, 1999, Electronic cash implementing method with a surveillance institution, and user apparatus and surveillance institution apparatus for implementing the same); U.S. Pat. No. 6,021,399 (Feb. 1, 2000, Space efficient method of verifying electronic payments); U.S. Pat. No. 6,026,379 (Feb. 15, 2000, System, method and article of manufacture for managing transactions in a high availability system); U.S. Pat. No. 6,029,150 (Feb. 22, 2000, Payment and transactions in electronic commerce system); U.S. Pat. No. 6,029,151(Feb. 22, 2000, Method and system for performing electronic money transactions); U.S. Pat. No. 6,047,067 (Apr. 4, 2000, Electronic-monetary system); U.S. Pat. No. 6,047,887 (Apr. 11, 2000, System and method for connecting money modules); U.S. Pat. No. 6,055,508 (Apr. 25, 2000, Method for secure accounting and auditing on a communications network); U.S. Pat. No. 6,065,675 (May 23, 2000, Processing system and method for a heterogeneous electronic cash environment); U.S. Pat. No. 6,072,870 (Jun. 6, 2000, System, method and article of manufacture for a gateway payment architecture utilizing a multichannel, extensible, flexible architecture), each of which is expressly incorporated herein by reference.

The invention claimed is:

1. A method for fairly allocating use rights among automated agents based on transactions in consideration of a virtual currency for at least one of (a) at least one communications channel in a network, and (b) at least one computational resource in a computer system, comprising:
   determining a use demand function for each of a plurality of automated agents having a consumer agent role, for obtaining the use rights in consideration of the virtual currency;
   determining a use supply function for each of a plurality of automated agents having a supply agent role, for relinquishing use rights in consideration of the virtual currency;
   wherein at least one of the use demand function and the use supply function is risk responsive;
   providing at least one automated agent, having an economic agent role, said at least one automated agent having an economic agent role providing at least one risk-altering economic service to other automated agents independent of a use or supply of the rights, through at least one transaction in consideration of the virtual currency, selected from the group consisting of loaning an economic resource, borrowing an economic resource, insuring a use, guaranteeing a payment use, arbitraging a risk, buying use options, selling use options, buying use futures, and selling use futures;
   generating by an automated processor amounts of the virtual currency on behalf of at least one automated agent over time; and
   outputting, from the automated processor, information defining a market economy optimization representing a consistent set of self interested transactions between the automated agents having respective roles as consumer agents, supply agents and economic agents, wherein the risk-responsive at least one of the use demand function and the use supply function has a value dependent on the risk-altering economic service.

2. The method according to claim 1, wherein the use comprises a right to access at least one communications channel in a communication network.

3. The method according to claim 1, wherein the use comprises a right to access at least one communications channel in an ad hoc communication network.

4. The method according to claim 1, wherein the use comprises a right to access at least one communications channel in a multihop ad hoc communication network.

5. The method according to claim 1, wherein the use comprises a right to access at least one computational resource in a computer system.

6. The method according to claim 1, wherein the use comprises a right to access at least one processor core in a computer system.

7. The method according to claim 1, wherein the use comprises a right to access at least one communication channel in a computer system.

8. The method according to claim 1, wherein the use comprises a right to access at least one memory location in a computer system.

9. The method according to claim 1, wherein the use comprises a right to access at least one peripheral device in a computer system.

10. The method according to claim 1, wherein the use comprises a right to access at least one functional processor element in a computer system.

11. The method according to claim 1, wherein the economic market optimization comprises issuing, by an automated agent, a loan for economic consideration.

12. The method according to claim 1, wherein the economic market optimization comprises issuing, by an automated agent, a loan for consideration in kind.

13. The method according to claim 1, wherein the economic market optimization comprises borrowing, by the at least one automated agent having an economic agent role, an economic resource for economic consideration.

14. The method according to claim 1, wherein the economic market optimization comprises borrowing, by the at least one automated agent having an economic agent role, an economic resource for consideration in kind.

15. The method according to claim 1, wherein the economic market optimization comprises insuring, by the at least one automated agent having an economic agent role, a use of a resource.

16. The method according to claim 1, wherein the economic market optimization comprises guaranteeing, by the at least one automated agent having an economic agent role, a payment for use of a resource.

17. The method according to claim 1, wherein the consistent set of self interested transactions comprises acquisition and sale, by an automated agent, of the same resource in a series of transactions.

18. The method according to claim 1, wherein the economic market optimization comprises selling, by an automated agent, an option for purchase of a resource.

19. The method according to claim 1, wherein the economic market optimization comprises buying, by an automated agent, an option for purchase of a resource.

20. The method according to claim 1, wherein the economic market optimization comprises selling, by an automated agent, a future contract for transferring a use at a later time.

21. The method according to claim 1, wherein the economic market optimization comprises buying, by an automated agent, a future contract for acquiring a use at a later time.

22. The method according to claim 1, further comprising assigning to each of at least two automated agents a hierarchal rank, wherein one of the at least two automated agents has a higher rank than another of the at least two automated agents, and delegating an economic right from the higher ranked automated agent to the lower ranked automated agent.

23. The method according to claim 1, further comprising assigning to each of at least two automated agents a hierarchal rank, wherein one of the at least two automated agents has a higher rank than another of the at least two automated agents, and allocating an economic right held by lower ranked automated agent on behalf of the higher ranked automated agent.

24. The method according to claim 1, further comprising assigning to each of a plurality of automated agents a rank, and delegating rights from a lower ranked automated agent to the higher ranked automated agent, separately from the market economy optimization.

25. The method according to claim 1, further comprising transacting, in accordance with the market economy optimization, between the automated agents using a virtual currency.

26. The method according to claim 1, further comprising transacting, in accordance with the market economy optimization, between the automated agents using a virtual currency, each automated agent having an associated virtual currency generation function.

27. The method according to claim 1, further comprising transacting, in accordance with the market economy optimization, between the automated agents using the virtual currency, each automated agent having an associated virtual currency generation function, the virtual currency having a virtual currency expiration function.

28. The method according to claim 1, further comprising transacting, in accordance with the market economy optimization, between the automated agents using a cryptographically authenticated virtual currency.

29. The method according to claim 1, further comprising transacting, in accordance with the market economy optimization, between the automated agents using the virtual currency, wherein respective different automated agents have respectively different currency generation functions and the virtual currency is subject to changes in value according to currency expiration functions.

30. The method according to claim 1, wherein said market economy optimization comprises an auction.

31. The method according to claim 1, wherein said market economy optimization comprises a multifactorial auction.

32. The method according to claim 1, wherein said market economy optimization allocates communication bandwidth within a communication network.

33. The method according to claim 1, wherein said market economy optimization operates according to a Vickrey-Clark-Groves combinatorial auction framework.

34. The method according to claim 1, further comprising transacting, in accordance with the market economy optimization, between the automated agents using a virtual currency, wherein an economic value of the virtual currency varies in dependence on a location of an automated agent.

35. The method according to claim 1, further comprising transacting, in accordance with the market economy optimization, between the automated agents using a virtual currency produced by a respective automated agent using a generation function, and transferring between respective automated agents, at least a portion of the generation function.

36. The method according to claim 1, wherein the market economy optimization defines an economic compensation to at least one consumer automated agent for deferring to another consumer automated agent.

37. A system, adapted to allocate use rights among automated agents, comprising:
at least one memory, configured to store a use demand function for each of a plurality of automated agents assuming a consumer agent role representing an economic value for obtaining control over use of the rights, a use supply function for each of a plurality of automated agents assuming a supply agent role representing an economic value for relinquishing control over use of the rights, and economic valuation characteristics of at least one automated agent assuming an economic agent role and providing at least one risk-altering service to other automated agents independent of a use or supply of the rights, selected from the group consisting of loaning an economic resource, borrowing an economic resource, insuring a use, guaranteeing a payment, arbitraging a risk, buying use options, selling use options, buying use futures, and selling use futures, wherein at least one of the use demand function and the use supply function is risk responsive;

at least one processor, configured to automatically generate amounts of a virtual currency having economic value over time on behalf of at least one automated agent, and to compute a market economy optimization based on at least the stored use demand functions, the stored use supply functions, and the stored economic characteristics, representing a consistent set of self interested transactions between the automated agents assuming roles respectively as consumer agents, supply agents and economic agents, wherein the risk-responsive at least one of the use demand function and the use supply function has a value dependent on the risk-altering service; and a port, configured to convey at least one signal selectively dependent on the market economy optimization.

38. The system according to claim 37, wherein the use comprises a right to access or control at least one communications channel.

39. The system according to claim 37, wherein the use comprises a right to access or control at least one computational resource in a computer system.

40. The system according to claim 37, wherein the use comprises a right to access or control at least one memory in a computer system.

41. The system according to claim 37, wherein the use comprises a right to access or control at least one peripheral device in a computer system.

42. The system according to claim 37, wherein the economic market optimization comprises a loan between respective automated agents.

43. The system according to claim 37, wherein the economic market optimization comprises insuring a use of a resource.

44. The system according to claim 37, wherein the economic market optimization comprises guaranteeing a payment for use of a resource.

45. The system according to claim 37, wherein the economic market optimization comprises an option for purchase of a resource.

46. The system according to claim 37, wherein the economic market optimization comprises a future contract for transferring a use at a later time.

47. The system according to claim 37, wherein the consistent set of self interested transactions comprises acquisition and sale, by an automated agent, of the same resource in a series of transactions.

48. The system according to claim 37, wherein each of at least two automated agents are assigned a hierarchal rank, wherein one of the at least two automated agents has a higher rank than another of the at least two automated agents, further comprising at least one of: delegating an economic right from the higher ranked automated agent to the lower ranked automated agent; and allocating an economic right held by lower ranked automated agent on behalf of the higher ranked automated agent.

49. The system according to claim 37, wherein each of a plurality of automated agents are assigned a respective a rank, wherein the at least one processor is configured to automatically delegate rights from a lower ranked automated agent to the higher ranked automated agent, separately from the market economy optimization.

50. The system according to claim 37, wherein the at least one processor is configured to automatically account between automated agents in accordance with the market economy optimization, using a virtual currency.

51. The system according to claim 37, wherein the at least one processor is configured to automatically account between automated agents in accordance with the market economy optimization using a cryptographically authenticated virtual currency.

52. The system according to claim 37, wherein the at least one processor is configured to automatically account between automated agents in accordance with the market economy optimization using a virtual currency, each automated agent having at least one of a respective virtual currency generation function, and the virtual currency is subject to a respective virtual currency expiration function, and a virtual currency valuation function dependent on a location of an automated agent.

53. The system according to claim 37, wherein said at least one processor is configured to automatically conduct an auction to determine the market economy optimization.

54. The system according to claim 37, wherein said at least one processor is configured to automatically conduct a multifactorial auction to determine the market economy optimization.

55. The system according to claim 37, wherein said at least one processor is configured to automatically conduct a combinatorial auction to determine the market economy optimization.

56. The system according to claim 37, wherein the market economy optimization defines an economic compensation to at least one automated agent having a consumer agent role for deferring to another automated agent having a consumer agent role.

57. A non-transitory computer-readable medium comprising computer-executable instructions for controlling at least one computer processor to perform operations for fairly allocating use rights based on transactions of a virtual currency among agents for at least one of (a) at least one communications channel in a network, and (b) at least one computational resource in a computer system, the operations comprising:

defining a plurality of consumer agents, each having a use demand function, for obtaining the use rights in consideration of the virtual currency;

defining a plurality of supply agents, each having a use supply function, for relinquishing use rights in consideration of the virtual currency;

wherein at least one of the use demand function and the use supply function is risk responsive;

defining a risk-altering service of at least one economic agent, performed in consideration of the virtual currency, distinct from a use or supply of the rights, selected from the group consisting of loaning an economic resource, borrowing an economic resource, insuring a use, guaranteeing a use, arbitraging a risk, buying use options, selling use options, buying use futures, and selling use futures;

generating amounts of the virtual currency on behalf of at least one agent over time; and outputting information defining a market economy optimization representing a consistent set of self interested transactions between the consumer agents, supply agents and at least one economic agent, wherein the risk-responsive at least one of the use demand function and the use supply function has a value dependent on the risk-altering service.

58. A fair rights allocation method, comprising:

defining a respective use demand function for each of a plurality of automated consumer agents, for obtaining the use rights in consideration of the virtual currency;

defining respective a use supply function for each of a plurality of supply automated agents, for relinquishing use rights in consideration of the virtual currency;

wherein at least one of the use demand function and the use supply function is risk responsive;

defining a service valuation function for at least one economic automated agent, for a risk-altering service performed in consideration of the virtual currency, the economic agent providing at least one service distinct from a use or supply of the rights, selected from the group consisting of loaning a resource, borrowing a resource, insuring a use, guaranteeing a payment use, arbitraging a risk, buying use options, selling use options, buying use futures, and selling use futures;

automatically generating amounts of a virtual currency over time on behalf of at least one automated agent; and computing, with an automated processing system, a market economy optimization representing a consistent set of self-interested transactions between the consumer automated agents, supply automated agents and the at least one economic automated agent, in consideration of payments of the virtual currency, for fairly allocating use rights for at least one of (a) at least one communications channel in a network, and (b) at least one computational resource in a computer system, wherein the risk-responsive at least one of the use demand function and the use supply function has a value dependent on the risk-altering service.

59. A method for fairly allocating use rights among automated agents for at least one of (a) at least one communications channel in a network, and (b) at least one computational resource in a computer system, comprising:

determining a use demand function for each of a plurality of consumer agents;

determining a use supply function for each of a plurality of supply agents;

wherein at least one of the use demand function and the use supply function is risk responsive;

providing at least one economic agent, said economic agent providing at least one risk-altering service to other agents performed by an automated processing system, selected from the group consisting of loaning an economic resource, borrowing an economic resource, insuring a use, guaranteeing a payment, arbitraging use rights, buying use options, selling use options, buying use futures, and selling use futures;

wherein a single agent can fulfill one or more role selected from the roles of supply agent, consumer agent, and economic agent, and wherein each respective role may have independent valuation with respect to the use;

outputting, from an automated processing system, information defining a market economy optimization representing a consistent set of self interested transactions between the consumer agents, supply agents and economic agents, wherein the risk-responsive at least one of the use demand function and the use supply function has a value dependent on the risk-altering service; and transacting, in accordance with the market economy optimization, between the agents using a virtual currency, wherein an economic value of the virtual currency varies in dependence on a location of an agent.

60. A method for fairly allocating use rights among automated agents for at least one of (a) at least one communications channel in a network, and (b) at least one computational resource in a computer system, comprising:

determining a use demand function for each of a plurality of consumer agents;

determining a use supply function for each of a plurality of supply agents;

wherein at least one of the use demand function and the use supply function is risk responsive;

providing at least one economic agent, said economic agent providing at least one risk- modifying service to other agents performed by an automated processing system, selected from the group consisting of loaning an economic resource, borrowing an economic resource, insuring a use, guaranteeing a payment, arbitraging use rights, buying use options, selling use options, buying use futures, and selling use futures;

wherein a single agent can fulfill one or more role selected from the roles of supply agent, consumer agent, and economic agent, and wherein each respective role may have independent valuation with respect to the use;

outputting, from an automated processing system, information defining a market economy optimization representing a consistent set of self interested transactions between the consumer agents, supply agents and economic agents, wherein the risk-responsive at least one of the use demand function and the use supply function has a value dependent on the risk- modifying service; and transacting, in accordance with the market economy optimization, between the agents using a virtual currency produced by a respective agent using a generation function, and transferring between respective agents, at least a portion of the generation function.

61. The system according to claim 37, wherein the at least one processor is further configured to transact, using the virtual currency, in accordance with the computed market economy optimization, wherein at least one of:

the at least one processor is configured to change a rate of generation or an economic value of the virtual currency in dependence on a defined location, and the at least one processor is configured to at least one of give or receive at least a portion of a capacity to generate amounts of the virtual currency having economic value over time.

62. The non-transitory computer readable medium according to claim 57, further comprising transacting between the agents using a virtual currency in accordance with the market economy optimization, wherein at least one of: an economic value of the virtual currency varies in dependence on a location of an agent, and at least a portion of a capacity to generate amounts of the virtual currency on behalf of at least one agent over time is transferred between respective agents.

63. The fair rights allocation method according to claim 58, further comprising transacting between the automated agents using a virtual currency in accordance with the market economy optimization, wherein at least one of: an economic value of the virtual currency varies in dependence on a location of an agent, and at least a portion of a capacity to generate amounts of the virtual currency on behalf of at least one automated agent over time is transferred between respective automated agents.

64. A method for allocating use rights among automated agents, comprising:

communicating, through an automated communication network, between at least one automated consumer agent, having a risk-sensitive demand value function representing a risk-dependent valuation for obtaining the rights in consideration of a virtual currency, at least one automated supply agent, having a supply value function representing a valuation for relinquishing rights in consideration of the virtual currency, and at least one automated economic agent, having an economic value function for at least one risk modifying derivative transaction distinct from obtaining or relinquishing of the rights, selected from the group consisting of a loan transaction, an insurance transaction, a guaranty transaction, a risk arbitrage transaction, an option transaction, and a future transaction, representing a valuation for engaging in the risk modifying derivative transaction which does not involve obtaining or relinquishing the right, in consideration of a virtual currency;

transacting the risk modifying derivative transaction with respect to the right between at least one automated consumer agent and at least one automated economic agent;

automatically defining with at least one automated processor, based on said communicating, a market economy optimization representing a consistent set of self interested transactions between the automated agents having respective roles as consumer agents and supply agents, comprising at least one transaction in which the at least one consumer agent obtains the right, and the at least one supply agent relinquishes the right;

communicating, information defining at least a portion of the defined market economy optimization.

* * * * *